US012764757B2

(12) United States Patent
Jang et al.

(10) Patent No.: US 12,764,757 B2
(45) Date of Patent: Oct. 13, 2026

(54) METHOD AND APPARATUS OF ANTENNA SWITCHING IN WIRELESS COMMUNICATION SYSTEMS

(71) Applicant: SAMSUNG ELECTRONICS CO., LTD., Suwon-si (KR)

(72) Inventors: Youngrok Jang, Suwon-si (KR); Ameha Tsegaye Abebe, Suwon-si (KR); Seongmok Lim, Suwon-si (KR); Hyoungju Ji, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 202 days.

(21) Appl. No.: 18/405,990

(22) Filed: Jan. 5, 2024

(65) Prior Publication Data

US 2024/0251423 A1 Jul. 25, 2024

(30) Foreign Application Priority Data

Jan. 5, 2023 (KR) ........................ 10-2023-0001931

(51) Int. Cl.
*H04W 72/232* (2023.01)
*H04L 5/00* (2006.01)

(52) U.S. Cl.
CPC ......... *H04W 72/232* (2023.01); *H04L 5/0048* (2013.01)

(58) Field of Classification Search
CPC ............... H04W 72/232; H04W 72/21; H04W 72/0457; H04W 72/0446; H04W 72/1263; H04B 7/0874; H04B 7/0413; H04L 5/0094
See application file for complete search history.

(56) References Cited

U.S. PATENT DOCUMENTS

2022/0029764 A1 1/2022 Liou et al.
2022/0201657 A1 * 6/2022 Wang .................... H04L 5/0091
2022/0232535 A1 7/2022 Abdelghaffar et al.
2022/0360405 A1 11/2022 Jiang et al.
2022/0394499 A1 * 12/2022 Matsumura ........... H04L 5/0051
2023/0300806 A1 * 9/2023 Haghighat ............ H04L 5/0048 370/329

FOREIGN PATENT DOCUMENTS

KR 10-2021-0128314 A1 10/2021

OTHER PUBLICATIONS

International Search Report and Written Opinion of the International Searching Authority dated Apr. 8, 2024, in connection with International Application No. PCT/KR2024/000175, 7 pages.

(Continued)

*Primary Examiner* — Khalid W Shaheed

(57) ABSTRACT

The disclosure relates to a 5G or 6G communication system for supporting a higher data transmission rate. A method performed by a user equipment (UE) in a communication system may include receiving, via a higher layer signaling, a sounding reference signal (SRS) configuration including SRS resource sets configured with antenna switching; receiving downlink control information (DCI) for SRS triggering; and transmitting an SRS based on the SRS configuration and the DCI.

20 Claims, 25 Drawing Sheets

(56) References Cited

OTHER PUBLICATIONS

NOKIA, “Rel-17 editorial corrections for TS 38.214”, R1-2213012, 3GPP TSG RAN WG1 Meeting #111, Nov. 2022, 99 pages.

3rd Generation Partnership Project, “Technical Specification Group Radio Access Network; NR; Physical layer procedures for data (Release 17),” 3GPP Standard; Technical Specification; 3GPP TS 38.214, vol. RAN WG1, No. V17.3.0, Sep. 21, 2022, 232 pages.

ZTE, “Moderator Summary on Rel-17 FeMIMO maintenance for SRS in Round 1,” 3GPP Draft; R1-2212767, vol. RAN WG1, No. #111, Nov. 17, 2022, 48 pages.

Samsung, “Draft CR on slot offset parameters for multiple aperiodic SRS resource sets,” 3GPP TSG RAN WG1 #112; R1-2301232, vol. 17.4.0, No. #112, Feb. 27-Mar. 3, 2023, 6 pages.

Extended European Search Report dated Dec. 17, 2025, in connection with European Patent Application No. 24738726.9, 12 pages.

Office Action issued May 18, 2026, in connection with European Patent Application No. 24738726.9, 8 pages.

* cited by examiner

METHOD AND APPARATUS OF ANTENNA SWITCHING IN WIRELESS COMMUNICATION SYSTEMS

CROSS-REFERENCE TO RELATED APPLICATION

This application is based on and claims priority under 35 U.S.C. § 119 to Korean Patent Application No. 10-2023-0001931, filed on Jan. 5, 2023, in the Korean Intellectual Property Office, the disclosure of which is herein incorporated by reference in its entirety.

BACKGROUND

1. Field

The disclosure relates to operations of a user equipment (UE) and a base station in a wireless communication system. More specifically, the disclosure relates to an antenna switching method in a wireless communication system and an apparatus capable of performing the same.

2. Description of Related Art

5$^{th}$ generation (5G) mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G.

In the initial stage of 5G mobile communication technologies, in order to support services and to satisfy performance requirements in connection with enhanced Mobile BroadBand, (eMBB), Ultra Reliable & Low Latency Communications (URLLC), and massive Machine-Type Communications (mMTC), there has been ongoing standardization regarding beamforming and massive MIMO for alleviating radio-wave path loss and increasing radio-wave transmission distances in mmWave, numerology (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large-capacity data transmission and a polar code for highly reliable transmission of control information, L2 pre-processing, and network slicing for providing a dedicated network customized to a specific service.

Currently, there is ongoing discussion regarding improvement and performance enhancement of initial 5G mobile communication technologies in view of services to be supported by 5G mobile communication technologies, and there has been physical layer standardization regarding technologies such as V2X for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for securing coverage in an area in which communication with terrestrial networks is impossible, and positioning.

Moreover, there has been ongoing standardization in wireless interface architecture/protocol fields regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service fields regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

If such 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting Augmented Reality (AR), Virtual Reality (VR), Mixed Reality (MR), and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for securing coverage in terahertz bands of 6G mobile communication technologies, Full Dimensional MIMO (FD-MIMO), multi-antenna transmission technologies such as array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

A disclosed embodiment may provide an apparatus and a method capable of effectively providing a service in a mobile communication system.

The disclosure may provide methods and apparatuses of antenna switching in a wireless communication system.

The technical objects to be achieved by various embodiments of the disclosure are not limited to the technical objects mentioned above, and other technical objects not mentioned may be considered by those skilled in the art from various embodiments of the disclosure to be described below.

According to an embodiment, a method performed by a user equipment (UE) in a communication system may be provided.

According to an embodiment, the method may include receiving, via a higher layer signaling, a sounding reference signal (SRS) configuration including SRS resource sets configured with antenna switching.

According to an embodiment, the method may include receiving downlink control information (DCI) for SRS triggering.

According to an embodiment, the method may include transmitting an SRS based on the SRS configuration and the DCI.

According to an embodiment, the SRS resource sets may respectively include slot offsets.

According to an embodiment, a slot offset may be a number of slots between the DCI and an SRS transmission corresponding to SRS resource set including the slot offset.

According to an embodiment, in case that none of the SRS resource sets is configured with a list of available slot offsets, values of the slot offsets may be different from each other.

According to an embodiment, the SRS resource sets may be configured across all configured bandwidth parts (BWPs) in a carrier.

According to an embodiment, 1T4R for the antenna switching may be supported by the UE.

According to an embodiment, the method may include transmitting capability information including an SRS transmission port switching pattern supported by the UE.

According to an embodiment, the SRS transmission port switching pattern may include the 1T4R.

According to an embodiment, an available slot offset may be a number of available slots from a slot n+k to a slot for the SRS transmission corresponding to SRS resource set including the slot offset, wherein n is a slot with the DCI and k is the slot offset.

According to an embodiment, a user equipment (UE) in a communication system may be provided.

According to an embodiment, the UE may include a transceiver; and a processor coupled with the transceiver.

According to an embodiment, the processor may be configured to receive, via a higher layer signaling, a sounding reference signal (SRS) configuration including SRS resource sets configured with antenna switching.

According to an embodiment, the processor may be configured to receive downlink control information (DCI) for SRS triggering.

According to an embodiment, the processor may be configured to transmit an SRS based on the SRS configuration and the DCI.

According to an embodiment, the SRS resource sets may respectively include slot offsets.

According to an embodiment, a slot offset may be a number of slots between the DCI and an SRS transmission corresponding to SRS resource set including the slot offset.

According to an embodiment, in case that none of the SRS resource sets is configured with a list of available slot offsets, values of the slot offsets may be different from each other.

According to an embodiment, the SRS resource sets may be configured across all configured bandwidth parts (BWPs) in a carrier.

According to an embodiment, 1T4R for the antenna switching may be supported by the UE.

According to an embodiment, the method may include transmitting capability information including an SRS transmission port switching pattern supported by the UE.

According to an embodiment, the SRS transmission port switching pattern may include the 1T4R.

According to an embodiment, an available slot offset may be a number of available slots from a slot n+k to a slot for the SRS transmission corresponding to SRS resource set including the slot offset, wherein n is a slot with the DCI and k is the slot offset.

According to an embodiment, a method performed by a base station in a communication system may be provided.

According to an embodiment, the method may include transmitting, to a user equipment (UE) via a higher layer signaling, a sounding reference signal (SRS) configuration including SRS resource sets configured with antenna switching.

According to an embodiment, the method may include transmitting, to the UE, downlink control information (DCI) for SRS triggering.

According to an embodiment, the method may include receiving, from the UE, an SRS associated with the SRS configuration and the DCI.

According to an embodiment, the SRS resource sets may respectively include slot offsets.

According to an embodiment, a slot offset may be a number of slots between the DCI and an SRS transmission corresponding to SRS resource set including the slot offset.

According to an embodiment, in case that none of the SRS resource sets is configured with a list of available slot offsets, values of the slot offsets may be different from each other.

According to an embodiment, the SRS resource sets may be configured across all configured bandwidth parts (BWPs) in a carrier.

According to an embodiment, 1T4R for the antenna switching may be supported by the UE.

According to an embodiment, the method may include receiving capability information including an SRS transmission port switching pattern supported by the UE.

According to an embodiment, the SRS transmission port switching pattern may include the 1T4R.

According to an embodiment, an available slot offset may be a number of available slots from a slot n+k to a slot for the SRS transmission corresponding to SRS resource set including the slot offset, wherein n is a slot with the DCI and k is the slot offset.

According to an embodiment, a base station in a communication system may be provided.

According to an embodiment, the base station may include a transceiver; and a processor coupled with the transceiver.

According to an embodiment, the processor may be configured to transmit, to a user equipment (UE) via a higher layer signaling, a sounding reference signal (SRS) configuration including SRS resource sets configured with antenna switching.

According to an embodiment, the processor may be configured to transmit, to the UE, downlink control information (DCI) for SRS triggering.

According to an embodiment, the processor may be configured to receive, from the UE, an SRS associated with the SRS configuration and the DCI.

According to an embodiment, the SRS resource sets may respectively include slot offsets.

According to an embodiment, a slot offset may be a number of slots between the DCI and an SRS transmission corresponding to SRS resource set including the slot offset.

According to an embodiment, in case that none of the SRS resource sets is configured with a list of available slot offsets, values of the slot offsets may be different from each other.

According to an embodiment, the SRS resource sets may be configured across all configured bandwidth parts (BWPs) in a carrier.

According to an embodiment, 1T4R for the antenna switching may be supported by the UE.

According to an embodiment, the method may include receiving capability information including an SRS transmission port switching pattern supported by the UE.

According to an embodiment, the SRS transmission port switching pattern may include the 1T4R.

According to an embodiment, an available slot offset may be a number of available slots from a slot n+k to a slot for the SRS transmission corresponding to SRS resource set including the slot offset, wherein n is a slot with the DCI and k is the slot offset.

A disclosed embodiment advantageously provides an apparatus and a method capable of effectively providing a service in a mobile communication system.

The disclosure may provide methods and apparatuses of antenna switching in a wireless communication system.

The effects that can be achieved through the disclosure are not limited to the effects mentioned in the various embodiments, and other effects not mentioned will be clearly understood by those skilled in the art from the description below.

Before undertaking the DETAILED DESCRIPTION below, it may be advantageous to set forth definitions of certain words and phrases used throughout this patent document: the terms “include” and “comprise,” as well as derivatives thereof, mean inclusion without limitation; the term “or,” is inclusive, meaning and/or; the phrases “associated with” and “associated therewith,” as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term “controller” means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms “application” and “program” refer to one or more computer programs, software components, sets of instructions, procedures, functions, objects, classes, instances, related data, or a portion thereof adapted for implementation in a suitable computer readable program code. The phrase “computer readable program code” includes any type of computer code, including source code, object code, and executable code. The phrase “computer readable medium” includes any type of medium capable of being accessed by a computer, such as read only memory (ROM), random access memory (RAM), a hard disk drive, a compact disc (CD), a digital video disc (DVD), or any other type of memory. A “non-transitory” computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
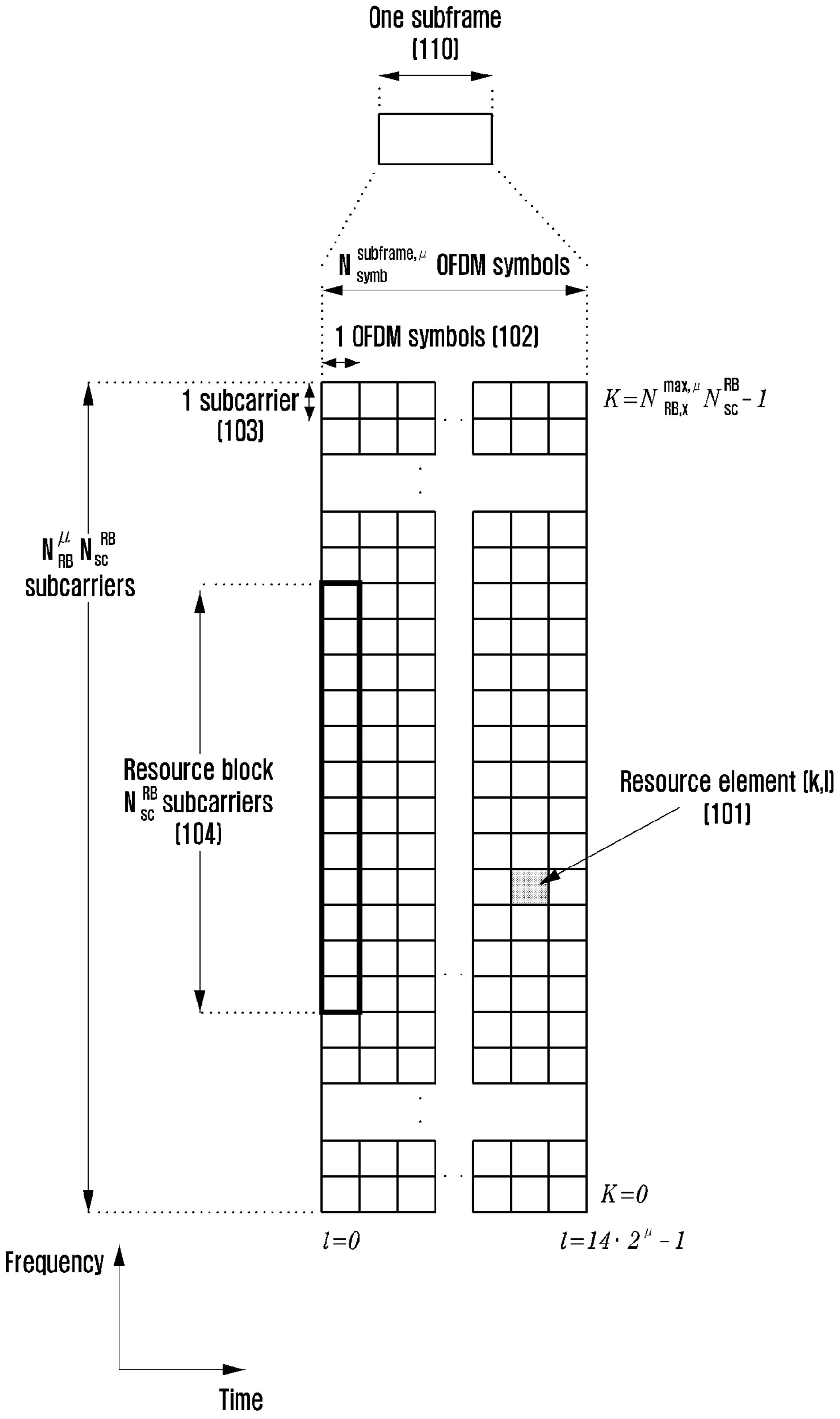
FIG. 1 illustrates the basic structure of a time-frequency domain in a wireless communication system according to an embodiment of the present disclosure.

FIGS. 1 through 24, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described in detail with reference to the accompanying drawings.

In describing the embodiments, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements. Furthermore, in describing the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In the following description, a base station is an entity that allocates resources to terminals, and may be at least one of a gNode B, an eNode B, a Node B, a base station (BS), a wireless access unit, a base station controller, and a node on a network. A terminal may include a user equipment (UE), a mobile station (MS), a cellular phone, a smartphone, a computer, or a multimedia system capable of performing communication functions. In the disclosure, a “downlink (DL)” refers to a radio link via which a base station transmits a signal to a terminal, and an “uplink (UL)” refers to a radio link via which a terminal transmits a signal to a base station. Furthermore, in the following description, LTE or LTE-A systems may be described by way of example, but the embodiments of the disclosure may also be applied to other communication systems having similar technical backgrounds or channel types. Examples of such communication systems may include 5th generation mobile communication technologies (5G, new radio, and NR) developed beyond LTE-A, and in the following description, the “5G” may be the concept that covers the exiting LTE, LTE-A, or other similar services. In addition, based on determinations by those skilled in the art, the embodiments of the disclosure may also be applied to other communication systems through some modifications without significantly departing from the scope of the disclosure.

Herein, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Furthermore, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used in the embodiments of the disclosure, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit," or divided into a larger number of elements, or a "unit." Moreover, the elements and "units" or may be implemented to reproduce one or more CPUs within a device or a security multimedia card. Furthermore, the "unit" in the embodiments may include one or more processors.

A wireless communication system is advancing to a broadband wireless communication system for providing high-speed and high-quality packet data services using communication standards, such as high-speed packet access (HSPA) of 3GPP, LTE {long-term evolution or evolved universal terrestrial radio access (E-UTRA)}, LTE-Advanced (LTE-A), LTE-Pro, high-rate packet data (HRPD) of 3GPP2, ultra-mobile broadband (UMB), IEEE 802.16e, and the like, as well as typical voice-based services.

As a typical example of the broadband wireless communication system, an LTE system employs an orthogonal frequency division multiplexing (OFDM) scheme in a downlink (DL) and employs a single carrier frequency division multiple access (SC-FDMA) scheme in an uplink (UL). The uplink indicates a radio link through which a user equipment (UE) (or a mobile station (MS)) transmits data or control signals to a base station (BS) (eNode B), and the downlink indicates a radio link through which the base station transmits data or control signals to the UE. The above multiple access scheme may separate data or control information of respective users by allocating and operating time-frequency resources for transmitting the data or control information for each user so as to avoid overlapping each other, that is, so as to establish orthogonality.

Since a 5G communication system, which is a post-LTE communication system, must freely reflect various requirements ofusers, service providers, and the like, services satisfying various requirements must be supported. The services considered in the 5G communication system include enhanced mobile broadband (eMBB) communication, massive machine-type communication (mMTC), ultra-reliability low-latency communication (URLLC), and the like.

eMBB aims at providing a data rate higher than that supported by existing LTE, LTE-A, or LTE-Pro. For example, in the 5G communication system, eMBB must provide a peak data rate of 20 Gbps in the downlink and a peak data rate of 10 Gbps in the uplink for a single base station. Furthermore, the 5G communication system must provide an increased user-perceived data rate to the UE, as well as the maximum data rate. In order to satisfy such requirements, transmission/reception technologies including a further enhanced multi-input multi-output (MIMO) transmission technique are required to be improved. In addition, the data rate required for the 5G communication system may be obtained using a frequency bandwidth more than 20 MHz in a frequency band of 3 to 6 GHz or 6 GHz or more, instead of transmitting signals using a transmission bandwidth up to 20 MHz in a band of 2 GHz used in LTE.

In addition, mMTC is being considered to support application services such as the Internet of Things (IoT) in the 5G communication system. mMTC has requirements, such as support of connection of a large number of UEs in a cell, enhancement coverage of UEs, improved battery time, a reduction in the cost of a UE, and the like, in order to effectively provide the Internet of Things. Since the Internet of Things provides communication functions while being provided to various sensors and various devices, it must support a large number of UEs (e.g., 1,000,000 UEs/km2) in a cell. In addition, the UEs supporting mMTC may require wider coverage than those of other services provided by the 5G communication system because the UEs are likely to be located in a shadow area, such as a basement of a building, which is not covered by the cell due to the nature of the service. The UE supporting mMTC must be configured to be inexpensive, and may require a very long battery life-time such as 10 to 15 years because it is difficult to frequently replace the battery of the UE.

Lastly, URLLC, which is a cellular-based mission-critical wireless communication service, may be used for remote control for robots or machines, industrial automation, unmanned aerial vehicles, remote health care, emergency alert, and the like. Thus, URLLC must provide communication with ultra-low latency and ultra-high reliability. For example; a service supporting URLLC must satisfy an air interface latency of less than 0.5 ms, and also requires a packet error rate of 10-5 or less. Therefore, for the services supporting URLLC, a 5G system must provide a transmit time interval (TTI) shorter than those of other services, and also may require a design for assigning a large number of resources in a frequency band in order to secure reliability of a communication link.

The three 5G services, that is, eMBB, URLLC, and mMTC, may be multiplexed and transmitted in a single system. In this case, different transmission/reception techniques and transmission/reception parameters may be used between services in order to satisfy different requirements of the respective services. Of course, 5G is not limited to the above-described three services.

[NR Time-Frequency Resources]

Hereinafter, the frame structure of a 5G system will be described in more detail with reference to the accompanying drawings.

FIG. 1 illustrates the basic structure of a time-frequency domain which is a radio resource domain used to transmit data or control channels in a 5G system.

In FIG. 1, the horizontal axis denotes a time domain, and the vertical axis denotes a frequency domain. The basic unit of resources in the time and frequency domains is a resource element (RE) 101, which may be defined as one orthogonal frequency division multiplexing (OFDM) symbol 102 along the time axis and one subcarrier 103 along the frequency axis. In the frequency domain, $$N_{SC}^{RB}$$

(for example, 12) consecutive REs may constitute one resource block (RB) 104.

Figure 2:
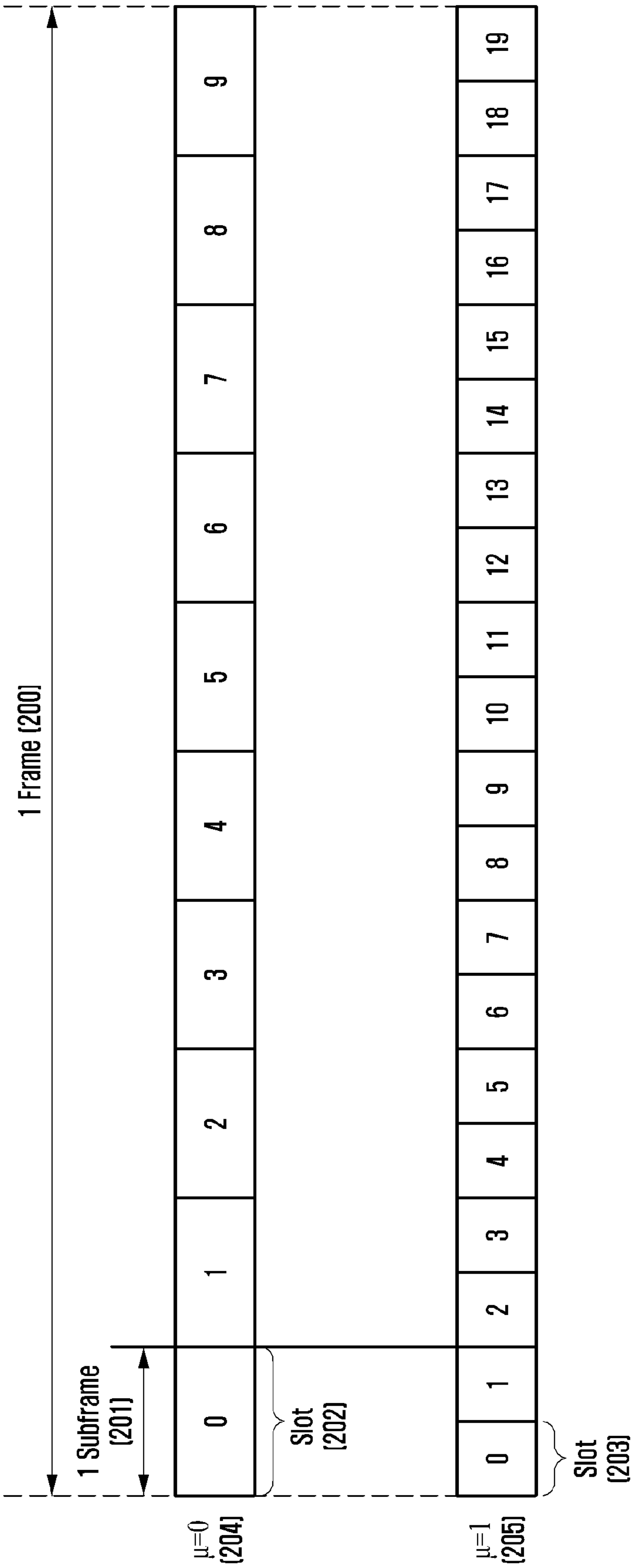
FIG. 2 illustrates the structure of frames, subframes, and slots in a wireless communication system according to an embodiment of the present disclosure.

FIG. 2 illustrates the structure of frames, subframes, and slots in a wireless communication system according to an embodiment of the present disclosure.

FIG. 2 illustrates an example of the structure of a frame 200, a subframe 201, and a slot 202. One frame 200 may be defined as 10 ms. One subframe 201 may be defined as 1 ms. Therefore, one frame 200 may include a total of ten subframes 201. One slot 202 or 203 may be defined as 14 OFDM symbols (that is, the number of symbols per one slot $$N_{symb}^{slot} = 14).$$

One subframe 201 may include one slot or multiple slots 202 and 203. The number of slots 202 and 203 per one subframe 201 may differ depending on configuration values p 204 and 205 regarding the subcarrier spacing. The example in FIG. 2 illustrates a case in which the subcarrier spacing configuration value is μ=0 (204), and a case in which μ=1 (205). In the case of μ=0 (204), one subframe 201 may include one slot 202. In the case of μ=1 (205), one subframe 201 may include two slots 203. That is, the number of slots per one subframe $$N_{slot}^{subframe,\mu}$$

may differ depending on the subcarrier spacing configuration value μ, and the number of slots per one frame $$N_{slot}^{frame,\mu}$$

may differ accordingly.

$$N_{slot}^{subframe,\mu} \text{ and } N_{slot}^{frame,\mu}$$

may be defined according to each subcarrier spacing configuration g as in Table 1 below:

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |

TABLE 1-continued

| μ | $N_{symb}^{slot}$ | $N_{slot}^{frame,\mu}$ | $N_{slot}^{subframe,\mu}$ |
|---|---|---|---|
| 2 | 14 | 40 | 4 |
| 3 | 14 | 80 | 8 |
| 4 | 14 | 160 | 16 |
| 5 | 14 | 320 | 32 |

[Bandwidth Part (BWP)]

Next, bandwidth part (BWP) configuration in a 5G communication system will be described in detail with reference to the accompanying drawings.

Figure 3:
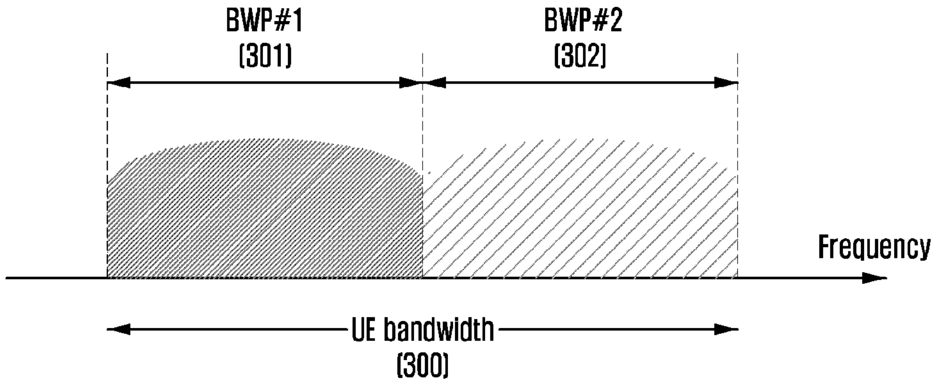
FIG. 3 illustrates an example of bandwidth part configuration in a wireless communication system according to an embodiment of the present disclosure.

FIG. 3 illustrates an example of bandwidth part configuration in a wireless communication system according to an embodiment of the disclosure.

FIG. 3 illustrates an example in which a UE bandwidth 300 is configured to include two bandwidth parts, that is bandwidth part #1 (BWP #1) 301 and bandwidth part #2 (BWP #2) 302. A base station may configure one or multiple bandwidth parts for a UE, and may configure the following pieces of information with regard to each bandwidth part.

TABLE 2

SEQUENCE

```
BWP ::=                          SEQUENCE {
    bwp-Id                           BWP-Id,
  (bandwidth part identifier)
    locationAndBandwidth             INTEGER (1..65536),
    (bandwidth part location)
    subcarrierSpacing                ENUMERATED {n0, n1, n2,
    (subcarrier spacing)             n3, n4, n5},
    cyclicPrefix                     ENUMERATED { extended }
    (cyclic prefix)
}
```

Obviously, the above example is not limiting, and various parameters related to the bandwidth part may be configured for the UE, in addition to the above configuration information. The above pieces of information may be transferred from the base station to the UE through higher layer signaling, for example, radio resource control (RRC) signaling. One configured bandwidth part or at least one bandwidth part among multiple configured bandwidth parts may be activated. Whether or not to activate a configured bandwidth part may be semi-statically transferred from the base station to the UE through RRC signaling, or dynamically transferred through downlink control information (DCI).

According to some embodiment, the UE, prior to radio resource control (RRC) connection, may have an initial BWP for initial access configured by the base station through a master information block (MIB). To be more specific, the UE may receive configuration information regarding a control resource set (CORESET) and a search space which may be used to transmit a PDCCH for receiving system information (which may correspond to remaining system information (RMSI) or system information block 1 (SIB1) necessary for initial access through the MIB in the initial access step. Each of the control resource set and the search space configured by the MIB may be considered as identity (ID) 0. The base station may notify the UE of configuration information, such as frequency allocation information regarding control resource set #0, time allocation information, and numerology, through the MIB. In addition, the base station may notify the UE of configuration information regarding the monitoring cycle and occasion regarding control resource set #0, that is, configuration information regarding control resource set #0, through the MIB. The UE may consider that a frequency domain configured by control resource set #0 acquired from the MIB is an initial bandwidth part for initial access. The ID of the initial bandwidth part may be considered to be 0.

The bandwidth part-related configuration supported by 5G may be used for various purposes.

According to some embodiments, if the bandwidth supported by the UE is smaller than the system bandwidth, this may be supported through the bandwidth part configuration. For example, the base station may configure the frequency location (configuration information 2) of the bandwidth part for the UE such that the UE can transmit/receive data at a specific frequency location within the system bandwidth.

In addition, according to some embodiments, the base station may configure multiple bandwidth parts for the UE for the purpose of supporting different numerologies. For example, in order to support a UE's data transmission/reception using both a subcarrier spacing of 15 kHz and a subcarrier spacing of 30 kHz, two bandwidth parts may be configured as subcarrier spacings of 15 kHz and 30 kHz, respectively. Different bandwidth parts may be subjected to frequency division multiplexing, and when data is to be transmitted/received at a specific subcarrier spacing, the bandwidth part configured as the corresponding subcarrier spacing may be activated.

In addition, according to some embodiments, the base station may configure bandwidth parts having different sizes of bandwidths for the UE for the purpose of reducing power consumed by the UE. For example, if the UE supports a substantially large bandwidth (for example, 100 MHz) and always transmits/receives data with the corresponding bandwidth, a substantially large amount of power consumption may occur. Particularly, it may be substantially inefficient from the viewpoint of power consumption to unnecessarily monitor the downlink control channel with a large bandwidth of 100 MHz in the absence of traffic. In order to reduce power consumed by the UE, the base station may configure a bandwidth part of a relatively small bandwidth, for example, a bandwidth part of 20 MHz, for the UE. The UE may perform a monitoring operation in the 20 MHz bandwidth part in the absence of traffic, and may transmit/receive data with the 100 MHz bandwidth part as instructed by the base station if data has occurred.

In connection with the bandwidth part configuring method, UEs, before being RRC-connected, may receive configuration information regarding the initial bandwidth part through a master information block (MIB) in the initial access step. To be more specific, a UE may have a control resource set (CORESET) configured for a downlink control channel which may be used to transmit downlink control information (DCI) for scheduling a system information block (SIB) from the MIB of a physical broadcast channel (PBCH). The bandwidth of the control resource set configured by the MIB may be considered as the initial bandwidth part, and the UE may receive, through the configured initial bandwidth part, a physical downlink shared channel (PDSCH) through which an SIB is transmitted. The initial bandwidth part may be used not only for the purpose of receiving the SIB, but also for other system information (OSI), paging, random access, or the like.

[BWP Change]

If a UE has one or more bandwidth parts configured therefor, the base station may instruct to the UE to change (or switch) the bandwidth parts by using a bandwidth part indicator field inside DCI. As an example, if the currently activated bandwidth part of the UE is bandwidth part #1 301 in FIG. 3, the base station may indicate bandwidth part #2 302 with a bandwidth part indicator inside DCI, and the UE may change the bandwidth part to bandwidth part #2 302 indicated by the bandwidth part indicator inside received DCI.

As described above, DCI-based bandwidth part changing may be indicated by DCI for scheduling a PDSCH or a PUSCH, and a UE, upon receiving a bandwidth part change request, needs to be able to receive or transmit the PDSCH or PUSCH scheduled by the corresponding DCI in the changed bandwidth part with no problem. To this end, a requirement regarding the delay time ($T_{BWP}$) required during a bandwidth part change are specified standards, and may be defined, for example, as follows:

TABLE 3

| μ | NR Slot length (ms) | BWP switch delay $T_{BWP}$ (slots) | |
|---|---|---|---|
| | | Type 1[Note 1] | Type 2[Note 1] |
| 0 | 1 | 1 | 3 |
| 1 | 0.5 | 2 | 5 |
| 2 | 0.25 | 3 | 9 |
| 3 | 0.125 | 6 | 18 |

Note 1

Depends on UE capability.

Note 2:

If the BWP switch involves changing of SCS, the BWP switch delay is determined by the larger one between the SCS before BWP switch and the SCS after BWP switch.

The requirement regarding the bandwidth part change delay time supports type 1 or type 2, depending on the capability of the UE. The UE may report the supportable bandwidth part delay time type to the base station.

If the UE has received DCI including a bandwidth part change indicator in slot n, according to the above-described requirement regarding the bandwidth part change delay time, the UE may complete a change to the new bandwidth part indicated by the bandwidth part change indicator at a timepoint not later than slot n+$T_{BwP}$, and may transmit/receive a data channel scheduled by the corresponding DCI in the newly changed bandwidth part. If the base station wants to schedule a data channel by using the new bandwidth part, the base station may determine time domain resource allocation regarding the data channel in view of the UE's bandwidth part change delay time ($T_{BWP}$). That is, when scheduling a data channel by using the new bandwidth part, the base station may schedule the corresponding data channel after the bandwidth part change delay time, in connection with the method for determining time domain resource allocation regarding the data channel. Accordingly, the UE may not expect that the DCI that indicates a bandwidth part change may indicate a slot offset (K0 or K2) value smaller than the bandwidth part change delay time ($T_{BWP}$).

If the UE has received DCI (for example, DCI format 1_1 or 0_1) indicating a bandwidth part change, the UE may perform no transmission or reception during a time interval from the third symbol of the slot used to receive a PDCCH including the corresponding DCI to the start point of the slot indicated by a slot offset (K0 or K2) value indicated by a time domain resource allocation indicator field in the corresponding DCI. For example, if the UE has received DCI indicating a bandwidth part change in slot n, and if the slot offset value indicated by the corresponding DCI is K, the UE may perform no transmission or reception from the third symbol of slot n to the symbol before slot n+K (that is, the last symbol of slot n+K−1).

[SS/PBCH Block]

Next, synchronization signal (SS)/PBCH blocks in 5G will be described.

An SS/PBCH block may refer to a physical layer channel block including a primary SS (PSS), a secondary SS (SSS), and a PBCH. Details thereof are as follows:

- PSS: a signal which becomes a reference of downlink time/frequency synchronization, and provides partial information of a cell ID;
- SSS: becomes a reference of downlink time/frequency synchronization, and provides remaining cell ID information not provided by the PSS. Additionally, the SSS may play the role of a reference signal for PBCH demodulation;
- PBCH: provides essential system information necessary for the UE's data channel and control channel transmission/reception. The essential system information may include search space-related control information indicating a control channel's radio resource mapping information, scheduling control information regarding a separate data channel for transmitting system information, and the like; and
- SS/PBCH block: the SS/PBCH block includes a combination of a PSS, an SSS, and a PBCH. One or multiple SS/PBCH blocks may be transmitted within a time of 5 ms, and each transmitted SS/PBCH block may be distinguished by an index.

The UE may detect the PSS and the SSS in the initial access step, and may decode the PBCH. The UE may acquire an MIB from the PBCH, and this may be used to configure control resource set (CORESET) #0 (which may correspond to a control resource set having a control resource set index of 0). The UE may monitor control resource set #0 by assuming that the demodulation reference signal (DMRS) transmitted in the selected SS/PBCH block and control resource set #0 is quasi-co-located (QCL). The UE may receive system information with downlink control information transmitted in control resource set #0. The UE may acquire configuration information related to a random access channel (RACH) necessary for initial access from the received system information. The UE may transmit a physical RACH (PRACH) to the base station in view of a selected SS/PBCH index, and the base station, upon receiving the PRACH, may acquire information regarding the SS/PBCH block index selected by the UE. The base station may know which block the UE has selected from respective SS/PBCH blocks, and the fact that control resource set #0 associated therewith is monitored.

[DRX]

Figure 6:
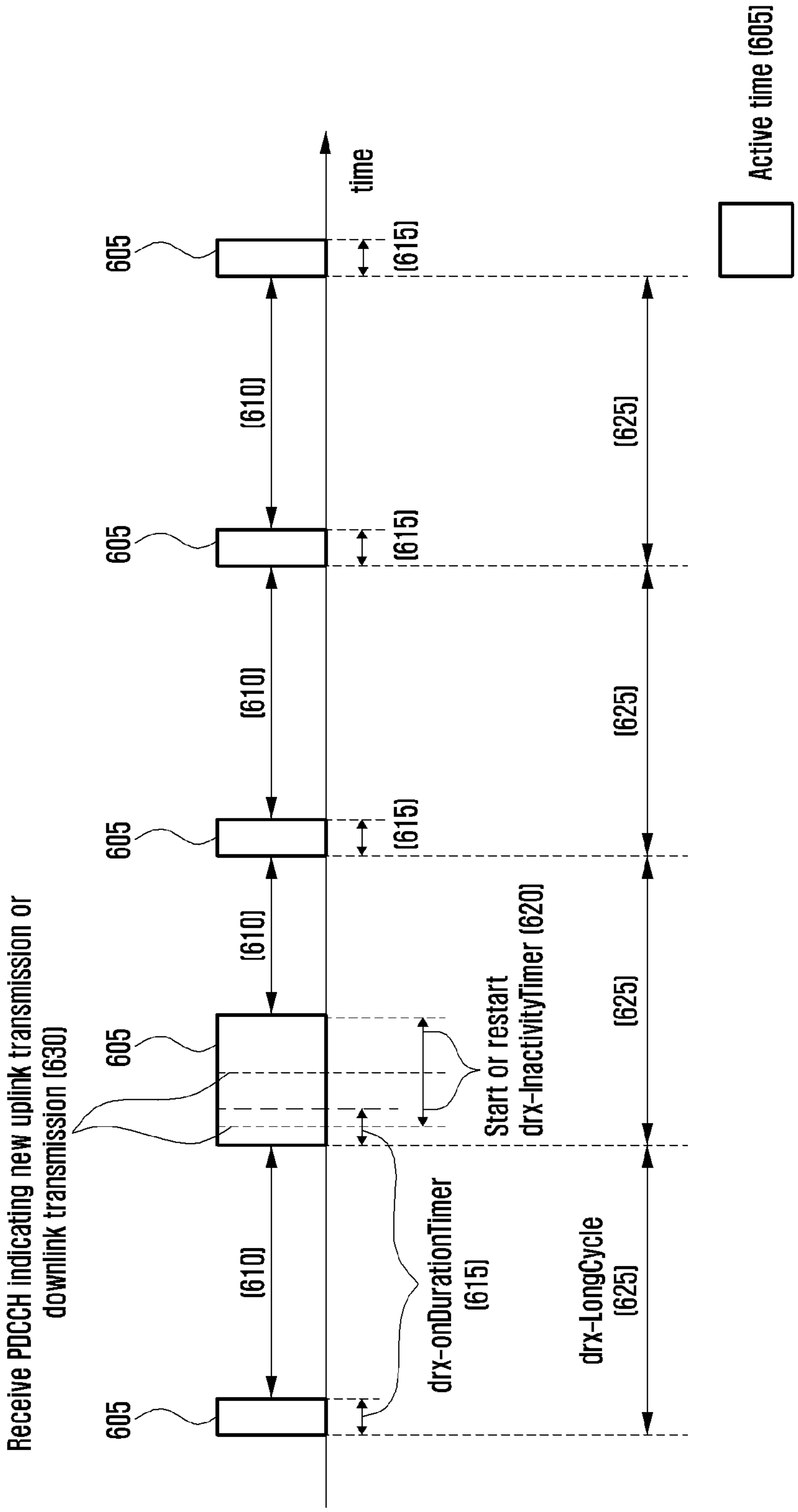
FIG. 6 illustrates an example of DRX operation in a wireless communication system according to an embodiment of the present disclosure.

FIG. 6 illustrates discontinuous reception (DRX).

Discontinuous reception (DRX) refers to an operation in which a UE currently using a service discontinuously receives data in an RRC-connected state in which a radio link is configured between the base station and the UE. If the DRX is applied, the UE may turn on a receiver at a specific timepoint so as to monitor a control channel, and may turn off the receiver if there is no data received for a predetermined period of time, thereby reducing power consumed by the UE. The DRX operation may be controlled by a MAC layer device, based on various parameters and timers.

Referring to FIG. 6, the active time 605 refers to a time during which the UE wakes up at each DRX cycle and monitors the PDCCH. The active timer 605 may be defined as follows:

- drx-onDurationTimer or drx-InactivityTimer or drx-RetransmissionTimerDL or drx-RetransmissionTimerUL or ra-ContentionResolutionTimer is running;
- a Scheduling Request is sent on PUCCH and is pending; or
- a PDCCH indicating a new transmission addressed to the C-RNTI of the MAC entity has not been received after successful reception of a random access response for the random access preamble not selected by the MAC entity among the contention-based random access preamble.

drx-onDurationTimer, drx-InactivityTimer, drx-RetransmissionTimerDL, drx-RetransmissionTimerUL, ra-ContentionResolutionTimer, and the like are timers having values configured by the base station, and have functions which cause the UE to monitor the PDCCH in a situation in which a predetermined condition is satisfied.

drx-onDurationTimer 615 is a parameter for configuring the minimum time during which the UE is awake at the DRX cycle. drx-InactivityTimer 620 is a parameter for configuring a time during which the UE is additionally awake upon receiving (630) a PDCCH indicating new uplink transmission or downlink transmission. drx-RetransmissionTimerDL is a parameter for configuring the maximum time during which the UE is awake in order to receive downlink retransmission in a downlink HARQ procedure. drx-RetransmissionTimerUL is a parameter for configuring the maximum time during which the UE is awake in order to receive an uplink retransmission grant in an uplink HARQ procedure. drx-onDurationTimer, drx-InactivityTimer, drx-RetransmissionTimerDL, and drx-RetransmissionTimerUL may be configured as, for example, time, the number of subframes, the number of slots, and the like. ra-ContentionResolutionTimer is a parameter for monitoring the PDCCH in a random access procedure.

The inActive time 610 refers to a time configured such that the PDCCH is not monitored during the DRX operation or a time configured such that the PDCCH is not received, and the inActive time 610 may be obtained by subtracting the active timer 605 from the entire time during which the DRX operation is performed. If the UE does not monitor the PDCCH during the active time 605, the UE may enter a sleep or inActive state, thereby reducing power consumption.

The DRX cycle refers to the cycle at which the UE wakes up and monitors the PDCCH. That is, the DRX cycle refers to the time interval between when the UE monitors a PDCCH and when the next PDCCH is monitored, or the cycle at which on-duration occurs. There are two kinds of DRX cycles: a short DRX cycle and a long DRX cycle. The short DRX cycle may be optionally applied.

The long DRX cycle 625 is the longer cycle between two DRX cycles configured for the UE. While operating with long DRX, the UE restarts the drx-onDurationTimer 615 at a timepoint at which the long DRX cycle 625 has elapsed from the start point (for example, start symbol) of the drx-onDurationTimer 615. When operating at the long DRX cycle 625, the UE may start the drx-onDurationTimer 615 in a slot after drx-SlotOffset in a subframe satisfying Equation 1 below. As used herein, drx-SlotOffset refers to a delay before the drx-onDurationTimer 615 is started. The drx-SlotOffset may be configured, for example, as time, the number of slots, or the like.

[Equation 1]

$$[(SFN \times 10) + \text{subframe number}] \text{ modulo } (drx-LongCycle) = drx-StartOffset$$

wherein drx-LongCycleStartOffset may be used to define the long DRX cycle 625, and drx-StartOffset may be used to define a subframe to start the long DRX cycle 625. drx-LongCycleStartOffset may be configured as, for example, time, the number of subframes, the number of slots, or the like.

[PDCCH: Regarding DCI]

Next, downlink control information (DCI) in a 5G system will be described in detail.

In a 5G system, scheduling information regarding uplink data (or physical uplink shared channel (PUSCH)) or downlink data (or physical downlink shared channel (PDSCH)) is transferred from a base station to a UE through DCI. The UE may monitor, with regard to the PUSCH or PDSCH, a fallback DCI format and a non-fallback DCI format. The fallback DCI format may include a fixed field predefined between the base station and the UE, and the non-fallback DCI format may include a configurable field.

The DCI may be subjected to channel coding and modulation processes and then transmitted through a physical downlink control channel (PDCCH). A cyclic redundancy check is attached to the DCI message payload, and the CRC may be scrambled by a radio network temporary identifier (RNTI) corresponding to the identity of the UE. Different RNTIs may be used according to the purpose of the DCI message, for example, UE-specific data transmission, power control command, random access response, or the like. That is, the RNTI is not explicitly transmitted, but is transmitted while being included in a CRC calculation process. Upon receiving a DCI message transmitted through the PDCCH, the UE may identify the CRC by using the allocated RNTI. If the CRC identification result is right, the UE may know that the corresponding message has been transmitted to the UE.

For example, DCI for scheduling a PDSCH regarding system information (SI) may be scrambled by an SI-RNTI. DCI for scheduling a PDSCH regarding a random access response (RAR) message may be scrambled by an RA-RNTI. DCI for scheduling a PDSCH regarding a paging message may be scrambled by a P-RNTI. DCI for notifying of a slot format indicator (SFI) may be scrambled by an SFI-RNTI. DCI for notifying of transmit power control (TPC) may be scrambled by a TPC-RNTI. DCI for scheduling a UE-specific PDSCH or PUSCH may be scrambled by a cell RNTI (C-RNTI).

DCI format 0_0 may be used as fallback DCI for scheduling the PUSCH, and the CRC may be scrambled by a C-RNTI. DCI format 0_0 in which the CRC is scrambled by a C-RNTI may include the following pieces of information, for example:

TABLE 4

| |
|---|
| Identifier for DCI formats - [1] bit |
| Frequency domain resource assignment - $\left[\lceil \log_2(N_{RB}^{UL,BWP}(N_{RB}^{UL,BWP}+1)/2)\rceil\right]$ bits |
| Time domain resource assignment - X bits |
| Frequency hopping flag - 1 bit. |
| Modulation and coding scheme - 5 bits |
| New data indicator - 1 bit |
| Redundancy version - 2 bits |
| HARQ process number - 4 bits |
| Transmit power control (TPC) command for scheduled PUSCH - [2] bits |
| Uplink/supplementary uplink indicator (UL/SUL indicator) - 0 or 1 bit |

DCI format 0_1 may be used as non-fallback DCI for scheduling the PUSCH, and the CRC may be scrambled by a C-RNTI. DCI format 0_1 in which the CRC is scrambled by a C-RNTI may include the following pieces of information, for example:

TABLE 5

| |
|---|
| Carrier indicator - 0 or 3 bits |
| UL/SUL indicator - 0 or 1 bit |
| Identifier for DCI formats - [1] bits |
| Bandwidth part indicator - 0, 1 or 2 bits |
| Frequency domain resource assignment |
| For resource allocation type 0, $\lceil N_{RB}^{UL,BWP}/P\rceil$ bits |
| For resource allocation type 1, $\lceil \log_2(N_{RB}^{UL,BWP}(N_{RB}^{UL,BWP}+1)/2)\rceil$ bits |
| Time domain resource assignment -1, 2, 3, or 4 bits |
| virtual resource block-to-physical resource block (VRB-to-PRB) mapping - 0 or 1 bit, only for resource allocation type 1. |
| 0 bit if only resource allocation type 0 is configured; |
| 1 bit otherwise. |
| Frequency hopping flag - 0 or 1 bit, only for resource allocation type 1. |
| 0 bit if only resource allocation type 0 is configured; |
| 1 bit otherwise. |
| Modulation and coding scheme - 5 bits |
| New data indicator - 1 bit |
| Redundancy version - 2 bits |
| HARQ process number - 4 bits |
| 1st downlink assignment index- 1 or 2 bits |
| 1 bit for semi-static HARQ-ACK codebook; |
| 2 bits for dynamic HARQ-ACK codebook with single HARQ-ACK codebook. |

TABLE 5-continued

| |
|---|
| 2nd downlink assignment index - 0 or 2 bits |
| 2 bits for dynamic HARQ-ACK codebook with two HARQ-ACK sub-codebooks; |
| 0 bit otherwise. |
| TPC command for scheduled PUSCH - 2 bits |
| SRS resource indicator $- \left\lceil \log_2\left(\sum_{k=l}^{L_{max}} \Sigma \binom{N_{SRS}}{k} ( ) \right) □□ \right\rceil$ or $\lceil \log_2(N_{SRS}) \rceil$ bits |
| $\left\lceil \log_2\left(\sum_{k=l}^{L_{max}} \Sigma \binom{N_{SRS}}{k} ( ) \right) □□ \right\rceil$ bits for non-codebook based PUSCH transmission; |
| $\lceil \log_2(N_{SRS}) \rceil$ bits for codebook based PUSCH transmission. |
| Precoding information and number of layers-up to 6 bits |
| Antenna ports - up to 5 bits |
| SRS request - 2 bits |
| CSI request - 0, 1, 2, 3, 4, 5, or 6 bits |
| Code block group (CBG) transmission information - 0, 2, 4, 6, or 8 bits |
| Phase tracking reference signal (PTRS)-demodulation reference signal (DMRS) association- 0 or 2 bits. |
| beta_offset indicator- 0 or 2 bits |
| DMRS sequence initialization- 0 or 1 bit |

DCI format 1_0 may be used as fallback DCI for scheduling the PDSCH, and the CRC may be scrambled by a C-RNTI. DCI format 1_0 in which the CRC is scrambled by a C-RNTI may include the following pieces of information, for example:

TABLE 6

| |
|---|
| Identifier for DCI formats - [1] bit |
| Frequency domain resource assignment - $[\lceil \log_2(N_{RB}^{UL,BWP}(N_{RB}^{UL,BWP}+1)/2) \rceil]$ bits |
| Time domain resource assignment - X bits |
| VRB-to-PRB mapping - 1 bit. |
| Modulation and coding scheme - 5 bits |
| New data indicator - 1 bit |
| Redundancy version - 2 bits |
| HARQ process number - 4 bits |
| Downlink assignment index - 2 bits |
| TPC command for scheduled PUCCH - [2] bits |
| Physical uplink control channel (PUCCH) resource indicator - 3 bits |
| PDSCH-to-HARQ feedback timing indicator - [3] bits |

DCI format 1_1 may be used as non-fallback DCI for scheduling the PDSCH, and the CRC may be scrambled by a C-RNTI. DCI format 1-1 in which the CRC is scrambled by a C-RNTI may include the following pieces of information, for example:

TABLE 7

| |
|---|
| Carrier indicator - 0 or 3 bits |
| Identifier for DCI formats - [1] bits |
| Bandwidth part indicator - 0, 1 or 2 bits |
| Frequency domain resource assignment |
| For resource allocation type 0, $\lceil N_{RB}^{DL,BWP}/P \rceil$ bits |
| For resource allocation type 1, |
| $[\lceil \log_2(N_{RB}^{UL,BWP}(N_{RB}^{UL,BWP}+1)/2) \rceil]$ bits |

TABLE 7-continued

| |
|---|
| Time domain resource assignment - 1, 2, 3, or 4 bits |
| VRB-to-PRB mapping - 0 or 1 bit, only for resource allocation type 1. |
| 0 bit if only resource allocation type 0 is configured; |
| 1 bit otherwise. |
| PRB bundling size indicator - 0 or 1 bit |
| Rate matching indicator - 0, 1, or 2 bits |
| ZP CSI-RS trigger - 0, 1, or 2 bits |
| For transport block 1: |
| Modulation and coding scheme - 5 bits |
| New data indicator - 1 bit |
| Redundancy version - 2 bits |
| For transport block 2: |
| Modulation and coding scheme - 5 bits |
| New data indicator - 1 bit |
| Redundancy version - 2 bits |
| HARQ process number - 4 bits |
| Downlink assignment index - 0 or 2 or 4 bits |
| TPC command for scheduled PUCCH - 2 bits |
| PUCCH resource indicator - 3 bits |
| PDSCH-to-HARQ_feedback timing indicator - 3 bits |
| Antenna ports - 4, 5 or 6 bits |
| Transmission configuration indication - 0 or 3 bits |
| SRS request - 2 bits |
| CBG transmission information - 0, 2, 4, 6, or 8 bits |
| CBG flushing out information - 0 or 1 bit |
| DMRS sequence initialization - 1 bit |

[PDCCH: CORESET, REG, CCE, Search Space]

Hereinafter, a downlink control channel in a 5G communication system will be described in more detail with reference to the accompanying drawings.

Figure 4:
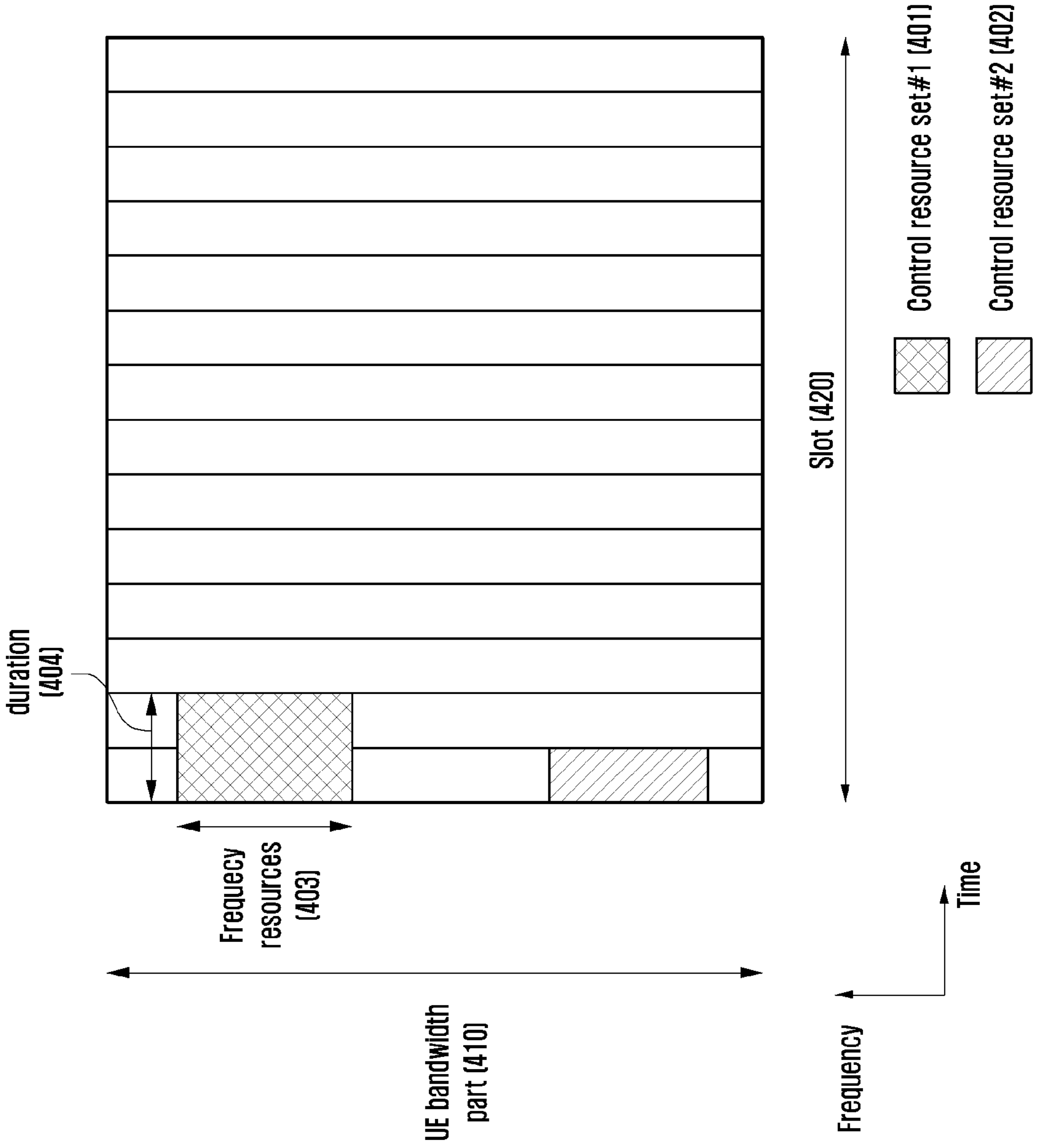
FIG. 4 illustrates an example of configuration of a control resource set of a downlink control channel in a wireless communication system according to an embodiment of the present disclosure.

FIG. 4 illustrates an example of a control resource set (CORESET) used to transmit a downlink control channel in a 5G wireless communication system. FIG. 4 illustrates an example in which a UE bandwidth part 410 is configured along the frequency axis, and two control resource sets (control resource set #1 401 and control resource set #2 402) are configured within one a lot 420 along the time axis. The control resource sets 401 and 402 may be configured in a specific frequency resource 403 within the entire UE bandwidth part 410 along the frequency axis. One or multiple OFDM symbols may be configured along the time axis, and this may be defined as a control resource set duration 404. Referring to the example illustrated in FIG. 4, control resource set #1 401 is configured to have a control resource set duration corresponding to two symbols, and control resource set #2 402 is configured to have a control resource set duration corresponding to one symbol.

A control resource set in 5G described above may be configured for a UE by a base station through higher layer signaling (for example, system information, master information block (MIB), radio resource control (RRC) signaling). The description that a control resource set is configured for a UE means that information such as a control resource set identity, the control resource set's frequency location, and the control resource set's symbol duration is provided. For example, the control resource set may include the following pieces of information:

TABLE 8

```
ControlResourceSet ::=              SEQUENCE {
  -- Corresponds to L1 parameter 'CORESET-ID'
  controlResourceSetId              ControlResourceSetId,
  (control resource set identity))
  frequencyDomainResources            BIT STRING (SIZE (45)),
  (frequency domain resource assignment information)
  duration                          INTEGER
    (1..maxCoReSetDuration),
  (time domain resource assignment information)
  cce-REG-MappingType                   CHOICE {
  (CCE-to-REG mapping type)
    interleaved                     SEQUENCE {
      reg-BundleSize                ENUMERATED {n2, n3, n6},
    (REG bundle size)
      precoderGranularity               ENUMERATED
    {sameAsREG-bundle, allContiguousRBs},
      interleaverSize               ENUMERATED {n2, n3, n6}
      (interleaver size)
      shiftIndex
      INTEGER(0..maxNrofPhysicalResourceBlocks-1)
        OPTIONAL
      (interleaver shift)
  },
    nonInterleaved                  NULL
  },
  tci-StatesPDCCH                   SEQUENCE(SIZE
    (1..maxNrofTCI-StatesPDCCH)) OF TCI-StateId
      OPTIONAL,
  (QCL configuration information)
  tci-PresentInDCI                  ENUMERATED {enabled}
                                        OPTIONAL,   -- Need S
}
```

In Table 8, tci-StatesPDCCH (simply referred to as transmission configuration indication (TCI) state) configuration information may include information of one or multiple synchronization signal (SS)/physical broadcast channel (PBCH) block index or channel state information reference signal (CSI-RS) index, which is quasi-co-located with a DMRS transmitted in a corresponding control resource set.

Figure 5A:
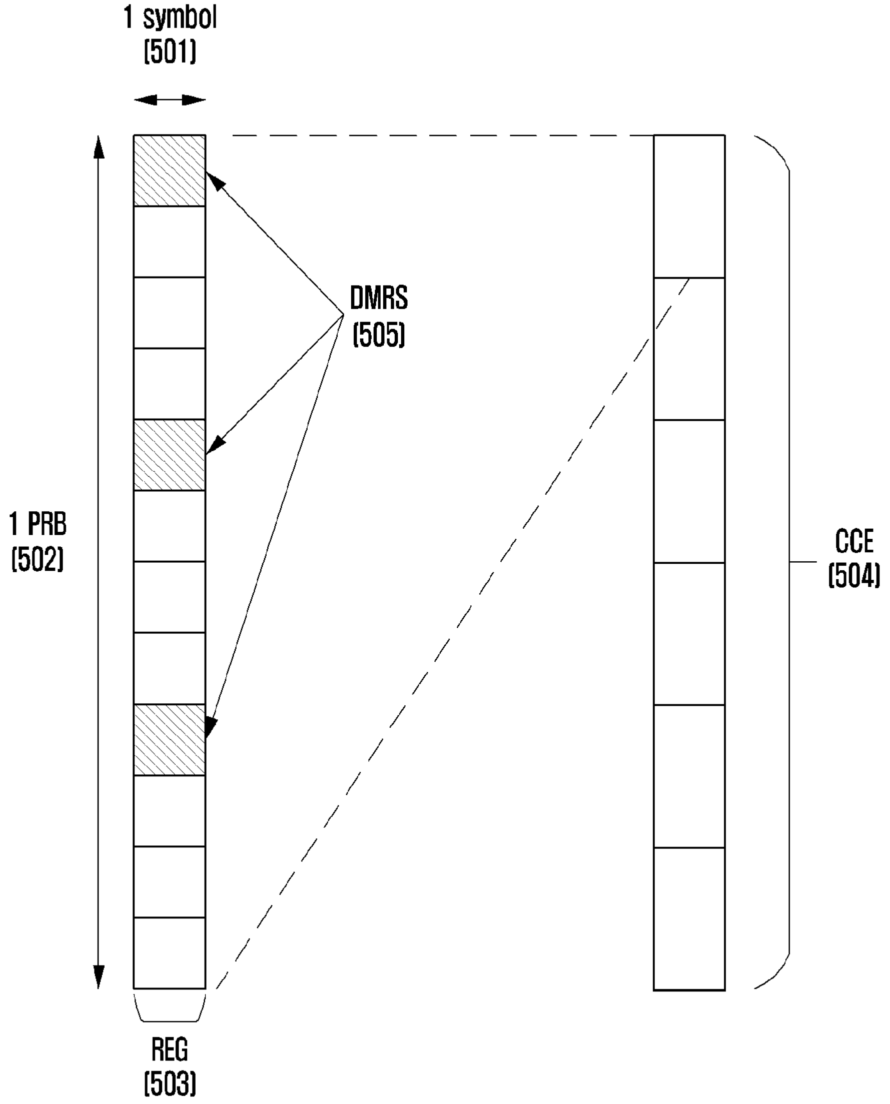
FIG. 5A illustrates the structure of a downlink control channel in a wireless communication system according to an embodiment of the present disclosure.

FIG. 5A illustrates an example of the basic unit of time and frequency resources constituting a downlink control channel available in 5G. According to FIG. 5A, the basic unit of time and frequency resources constituting a control channel may be referred to as a resource element group (REG) 503, and the REG 503 may be defined by one OFDM symbol 501 along the time axis and one physical resource block (PRB) 502 (that is, 12 subcarriers) along the frequency axis. The base station may constitute a downlink control channel allocation unit by connecting REGs 503.

Provided that the basic unit of downlink control channel allocation in 5G is a control channel element 504 as illustrated in FIG. 5A, one CCE 504 may include multiple REGs 503. To describe the REG 503 illustrated in FIG. 5A, for example, the REG 503 may include 12 REs, and if one CCE 504 includes six REGs 503, one CCE 504 may then include 72 REs. A downlink control resource set, once configured, may include multiple CCEs 504, and a specific downlink control channel may be mapped to one or multiple CCEs 504 and then transmitted according to the aggregation level (AL) in the control resource set. The CCEs 504 in the control resource set are distinguished by numbers, and the numbers of CCEs 504 may be allocated according to a logical mapping scheme.

The basic unit of the downlink control channel illustrated in FIG. 5A, that is, the REG 503 may include both REs to which DCI is mapped, and an area to which a reference signal (DMRS 505) for decoding the same is mapped. As in FIG. 5A, three DRMSs 505 may be transmitted inside one REG 503. The number of CCEs necessary to transmit a PDCCH may be 1, 2, 4, 8, or 16 according to the aggregation level (AL), and different number of CCEs may be used to implement link adaption of the downlink control channel. For example, in the case of AL=L, one downlink control channel may be transmitted through L CCEs. The UE needs to detect a signal while being no information regarding the downlink control channel, and a search space indicating a set of CCEs has thus been defined for blind decoding. The search space is a set of downlink control channel candidates including CCEs which the UE needs to attempt to decode at a given AL. Since 1, 2, 4, 8, or 16 CCEs constitute a bundle at various ALs, the UE may have multiple search spaces. A search space set may be defined as a set of search spaces at all configured ALs.

Search spaces may be classified into common search spaces and UE-specific search spaces. A group of UEs or all UEs may investigate a common search space of the PDCCH in order to receive cell-common control information such as a paging message or dynamic scheduling regarding system information. For example, PDSCH scheduling allocation information for transmitting an SIB including a cell operator information or the like may be received by investigating the common search space of the PDCCH. In the case of a common search space, a group of UEs or all UEs need to receive the PDCCH, and the same may thus be defined as a pre-promised set of CCEs. Scheduling allocation information regarding a UE-specific PDSCH or PUSCH may be received by investigating the UE-specific search space of the PDCCH. The UE-specific search space may be defined UE-specifically as a function of various system parameters and the UE's identity.

In 5G, a parameter regarding a search parameter regarding a PDCCH may be configured for the UE by the base station through higher layer signaling (for example, SIB, MIB, RRC signaling). For example, the base station may provide the UE with configurations such as the number of PDCCH candidates at each aggregation level L, the monitoring cycle regarding the search space, the monitoring occasion with regard to each symbol in a slot regarding the search space, the search space type (common search space or UE-specific search space), a combination of an RNTI and a DCI format to be monitored in the corresponding search space, a control resource set index for monitoring the search space, and the like. For example, the parameter may include the following pieces of information:

TABLE 9

```
Search Space ::=                          SEQUENCE
  -- Identity of the search space. SearchSpaceId = 0 identifies the SearchSpace
     configured via PBCH (MIB) or ServingCellConfigCommon.
  searchSpaceId                             SearchSpaceId,
  (search space identity)
  controlResourceSetId                      ControlResourceSetId,
  (control resource set identity)
   monitoringSlotPeriodicityAndOffset         CHOICE {
  (monitoring slot level cycle)
    sl1                                       NULL,
    sl2                                       INTEGER (0..1),
    sl4                                       INTEGER (0..3),
    sl5                                     INTEGER (0..4),
    sl8                                       INTEGER (0..7),
    sl10                                    INTEGER (0..9),
    sl16                                    INTEGER (0..15),
    sl20                                    INTEGER (0..19)
  }
                                          OPTIONAL,
  duration(monitoring duration)             INTEGER (2..2559)
   monitoringSymbolsWithinSlot                  BIT STRING (SIZE (14))
                                                OPTIONAL,
  (monitoirng symbols within slot)
   nrofCandidates                           SEQUENCE {
  (number of PDCCH candidates per aggregation level)
    aggregationLevel1                         ENUMERATED {n0, n1, n2, n3,
    n4, n5, n6, n8 },
    aggregationLevel2                         ENUMERATED {n0, n1, n2, n3,
    n4, n5, n6, n8},
    aggregationLevel4                         ENUMERATED {n0, n1, n2, n3,
    n4, n5, n6, n8},
    aggregationLevel8                         ENUMERATED {n0, n1, n2, n3,
    n4, n5, n6, n8},
    aggregationLevel16                        ENUMERATED {n0, n1, n2, n3,
    n4, n5, n6, n8}
  },
   searchSpaceType                             CHOICE {
   (search space type)
    -- Configures this search space as common search space (CSS) and DCI
    formats to monitor.
    common                                    SEQUENCE {
    (common search space)
  }
    ue-Specific                               SEQUENCE {
   (UE-specific search space)
      -- Indicates whether the UE monitors in this USS for DCI formats 0-0 and
    1-0 or for formats 0-1 and 1-1.
      formats                                 ENUMERATED {formats0-0-
    And-1-0, formats0-1-And-1-1},
      ...
    }
```

According to configuration information, the base station may configure one or multiple search space sets for the UE. According to some embodiments, the base station may configure search space set 1 and search space set 2 for the UE, may configure DCI format A scrambled by an a X-RNTI to be monitored in a common search space in search space set 1, and may configure DCI format B scrambled by a Y-RNTI to be monitored in a UE-specific search space in search space set 2.

According to configuration information, one or multiple search space sets may exist in a common search space or a UE-specific search space. For example, search space set #1 and search space set #2 may be configured as a common search space, and search space set #3 and search space set #4 may be configured as a UE-specific search space.

Combinations of DCI formats and RNTIs given below may be monitored in a common search space. Obviously, the example given below is not limiting.

- DCI format 0_0/1_0 with CRC scrambled by C-RNTI, CS-RNTI, SP-CSI-RNTI, RA-RNTI, TC-RNTI, P-RNTI, SI-RNTI;
- DCI format 2_0 with CRC scrambled by SFI-RNTI;
- DCI format 2_1 with CRC scrambled by INT-RNTI;
- DCI format 2_2 with CRC scrambled by TPC-PUSCH-RNTI, TPC-PUCCH-RNTI; and
- DCI format 2_3 with CRC scrambled by TPC-SRS-RNTI;

Combinations of DCI formats and RNTIs given below may be monitored in a UE-specific search space. Obviously, the example given below is not limiting.

- DCI format 0_0/1_0 with CRC scrambled by C-RNTI, CS-RNTI, TC-RNTI;
- DCI format 1_0/1_1 with CRC scrambled by C-RNTI, CS-RNTI, TC-RNTI Enumerated RNTIs may follow the definition and usage given below:

- Cell RNTI (C-RNTI): used to schedule a UE-specific PDSCH;
- Temporary cell RNTI (TC-RNTI): used to schedule a UE-specific PDSCH;
- Configured scheduling RNTI (CS-RNTI): used to schedule a semi-statically configured UE-specific PDSCH;
- Random access RNTI (RA-RNTI): used to schedule a PDSCH in a random access step;

Paging RNTI (P-RNTI): used to schedule a PDSCH in which paging is transmitted;

System information RNTI (SI-RNTI): used to schedule a PDSCH in which system information is transmitted;

Interruption RNTI (INT-RNTI): used to indicate whether a PDSCH is punctured

Transmit power control for PUSCH RNTI (TPC-PUSCH-RNTI): used to indicate a power control command regarding a PUSCH;

Transmit power control for PUCCH RNTI (TPC-PUCCH-RNTI): used to indicate a power control command regarding a PUCCH; and Transmit power control for SRS RNTI (TPC-SRS-RNTI): used to indicate a power control command regarding an SRS.

The DCI formats enumerated above may follow the definitions given below:

TABLE 10

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In 5G, the search space at aggregation level L in connection with control resource set p and search space set s may be expressed by Equation 2 below:

$$L\cdot\left\{\left(Y_{p,n^{\mu}_{s,f}}+\left\lfloor\frac{m_{s,n_{CI}}\cdot N_{CCE,p}}{L\cdot M^{(L)}_{s,max}}\right\rfloor+n_{CI}\right)\bmod\left\lfloor\frac{N_{CCE,p}}{L}\right\rfloor\right\}+i \quad \text{[Equation 2]}$$

$L$: aggregation level;

$n_{CI}$: carrier index;

$N_{CCE,p}$: total number of $CCEs$ existing in control resource set $p$;

$n^{\mu}_{s,f}$: slot index;

$M^{(L)}_{s,max}$: number of $PDCCH$ candidates at aggregation level $L$;

$m_{s,n_{CI}}=0,\ldots,M^{(L)}_{s,max}-1$:

$PDCCH$ candidate index at aggregation level $L$;

$i=0,\ldots,L-1$;

$Y_{p,n^{\mu}_{s,f}}=\left(A_p\cdot Y_{p,n^{\mu}_{s,f}-1}\right)\bmod D$, $Y_{p,-1}=n_{RNTI}\neq 0$, $A_p=39827$ for $p\bmod 3=0$, $A_p=39829$ for $p\bmod 3=1$, $A_p=39839$ for $p\bmod 3=2$, $D=65537$;

and $n_{RNTI}$: $UE$ identity;

The $$Y_{p,n^{\mu}_{s,f}}$$

value may correspond to 0 in the case of a common search space.

The $$Y_{p,n^{\mu}_{s,f}}$$

value may correspond to a value changed by the UE's identity (C-RNTI or ID configured for the UE by the base station) and the time index in the case of a UE-specific search space.

In 5G, multiple search space sets may be configured by different parameters (for example, parameters in Table 9), and the group of search space sets monitored by the UE at each timepoint may differ. For example, if search space set #1 is configured at by X-slot cycle, if search space set #2 is configured at by Y-slot cycle, and if X and Y are different, the UE may monitor search space set #1 and search space set #2 both in a specific slot, and may monitor one of search space set #1 and search space set #2 both in another specific slot.

[PDCCH: Span]

The UE may perform UE capability reporting at each subcarrier spacing with regard to a case in which the same has multiple PDCCH monitoring occasions inside a slot, and the concept "span" may be used in this regard. A span refers to consecutive symbols configured such that the UE can monitor the PDCCH inside the slot, and each PDCCH monitoring occasion is inside one span. A span may be described by (X,Y) wherein X refers to the minimum number of symbols by which the first symbols of two consecutive spans are spaced apart from each other, and Y refers to the number of consecutive symbols configured such that the PDCCH can be monitored inside one span. The UE may monitor the PDCCH in a range inside a span corresponding to Y symbols from the first symbol of the span.

Figure 5B:
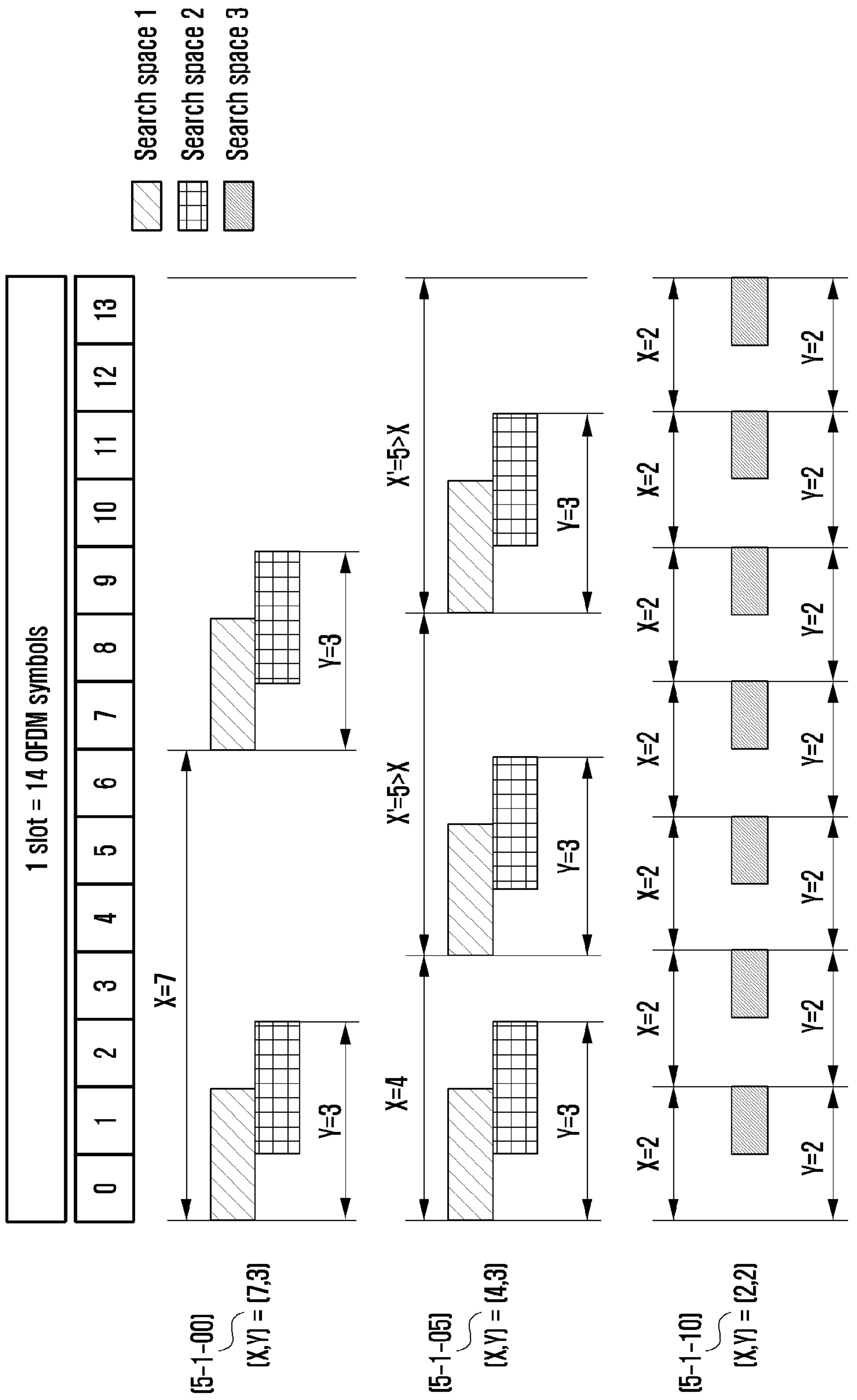
FIG. 5B illustrates, in terms of spans, a case in which a UE may have multiple PDCCH monitoring occasions inside a slot in a wireless communication system according to an embodiment of the present disclosure.

FIG. 5B illustrates, in terms of spans, a case in which a UE may have multiple PDCCH monitoring occasions inside a slot in a wireless communication system. Possible spans are (X, Y)=(7, 3), (4, 3), (2, 2), and the three cases are indicated by (5-1-00), (5-1-05), and (5-1-10) in FIG. 5B, respectively. As an example, (5-1-00) describes a case in which there are two spans described by (7, 4) inside a slot. The spacing between the first symbols of two spans is described as X=7, a PDCCH monitoring occasion may exist inside a total of Y=3 symbols from the first symbol of each span, and search spaces 1 and 2 exist inside Y=3 symbols, respectively. As another example, (5-1-05) describes a case in which there are a total of three spans described by (4, 3) inside a slot, and the second and third spans are spaced apart by X'=5 symbols which are larger than X=4.

[PDCCH: UE Capability Report]

The slot location at which the above-described common search space and the UE-specific search space are positioned is indicated by parameter "monitoringSymbolsWitninSlot" in Table 11-1, and the symbol location inside the slot is indicated as a bitmap through parameter "monitoringSymbolsWithinSlot" in Table 9. Meanwhile, the symbol location inside a slot at which the UE can monitor search spaces may be reported to the base station through the following UE capabilities:

UE capability 1 (hereinafter, referred to as FG 3-1). This UE capability has the following meaning: if there is one monitoring occasion (MO) regarding type 1 and type 3 common search spaces or UE-specific search spaces inside a slot, as in following Table 9a, the UE can monitor the corresponding MO when the corresponding MO is located inside the first three symbols inside the slot. This UE capability is a mandatory capability which is to be supported by all UEs that support NR, and whether or not this capability is supported is not explicitly reported to the base station.

TABLE 11-1

| Index | Feature group | Components | Field name in TS 38.331 |
|---|---|---|---|
| 3-1 | Basic DL control channel | 1) One configured CORESET per BWP per cell in addition to CORESET0<br>CORESET resource allocation of 6RB bit-map and duration of 1-3 OFDM symbols for FR1<br>For type 1 CSS without dedicated RRC configuration and for type 0, 0A, and 2 CSSs, CORESET resource allocation of 6RB bit-map and duration 1-3 OFDM symbols for FR2<br>For type 1 CSS with dedicated RRC configuration and for type 3 CSS, UE specific SS, CORESET resource allocation of 6RB bit-map and duration 1-2 OFDM symbols for FR2<br>REG-bundle sizes of 2/3 RBs or 6 RBs<br>Interleaved and non-interleaved CCE-to-REG mapping<br>Precoder-granularity of REG-bundle size<br>PDCCH DMRS scrambling determination<br>TCI state(s) for a CORESET configuration<br>2) CSS and UE-SS configurations for unicast PDCCH transmission per BWP per cell<br>PDCCH aggregation levels 1, 2, 4, 8, 16<br>UP to 3 search space sets in a slot for a scheduled SCell per BWP<br>This search space limit is before applying all dropping rules.<br>For type 1 CSS with dedicated RRC configuration, type 3 CSS, and UE-SS, the monitoring occasion is within the first 3 OFDM symbols of a slot<br>For type 1 CSS without dedicated RRC configuration and for type 0, 0A, and 2 CSS, the monitoring occasion can be any OFDM symbol(s) of a slot, with the monitoring occasions for any of Type 1- CSS without dedicated RRC configuration, or Types 0, 0A, or 2 CSS configurations within a single span of three consecutive OFDM symbols within a slot | n/a |

TABLE 11-1-continued

| Index | Feature group | Components | Field name in TS 38.331 |
|---|---|---|---|
| | | 3) Monitoring DCI formats 0_0, 1_0, 0_1, 1_1<br>4) Number of PDCCH blind decodes per slot with a given SCS follows Case 1-1 table<br>5) Processing one unicast DCI scheduling DL and one unicast DCI scheduling UL per slot per scheduled CC for FDD<br>6) Processing one unicast DCI scheduling DL and 2 unicast DCI scheduling UL per slot per scheduled CC for TDD | |

UE capability 2 (hereinafter, referred to as FG 3-2). This UE capability has the following meaning: if there is one monitoring occasion (MO) regarding a common search space or a UE-specific search space inside a slot, as in following Table 11-2, the UE can monitor the corresponding MO no matter what of the start symbol location of the corresponding MO may be. This UE capability is optionally supported by the UE, and whether or not this capability is supported is explicitly reported to the base station.

TABLE 11-2

| Index | Feature group | Components | Field name in TS 38.331 |
|---|---|---|---|
| 3-2 | PDCCH monitoring on any span of up to 3 consecutive OFDM symbols of a slot | For a given UE, all search space configurations are within the same span of 3 consecutive OFDM symbols in the slot | pdcchMonitoringSingleOccasion |

UE capability 3 (hereinafter, referred to as FG 3-5, 3-5*a*, or 3-5*b*). This UE capability has the following meaning: if there are multiple monitoring occasions (MO) regarding a common search space or a UE-specific search space inside a slot, as in following Table 11-3, the pattern of the MO which the UE can monitor is indicated. The above-mentioned pattern includes the spacing X between start symbols of different MOs, and the maximum symbol length Y regarding one MO. The combination of (X, Y) supported by the UE may be one or multiple among {(2, 2), (4, 3), (7, 3)}. This UE capability is optionally supported by the UE, and whether or not this capability is supported and the above-mentioned combination of (X, Y) are explicitly reported to the base station.

TABLE 11-3

| Index | Feature group | Components | Field name in TS 38.331 |
|---|---|---|---|
| 3-5 | For type 1 CSS with dedicated RRC configuration, type 3 CSS, and UE-SS, monitoring occasion can be any | For type 1 CSS with dedicated RRC configuration, type 3 CSS, and UE-SS, monitoring occasion can be any OFDM symbol(s) of a slot for Case 2 | pdcch-MonitoringAnyOccasions<br>{<br>3-5. withoutDCI-Gap<br>3-5a. withDCI-Gap<br>} |

TABLE 11-3-continued

| Index | Feature group | Components | Field name in TS 38.331 |
|---|---|---|---|
| | OFDM symbol(s) of a slot for Case 2 | | |
| 3-5a | For type 1 CSS with dedicated RRC configuration, type 3 CSS, and UE-SS, monitoring occasion can be any OFDM symbol(s) of a slot for Case 2 with a DCI gap | For type 1 CSS with dedicated RRC configuration, type 3 CSS and UE-SS, monitoring occasion can be any OFDM symbol(s) of a slot for Case 2, with minimum time separation (including the cross-slot boundary case) between two DL unicast DCIs, between two UL unicast DCIs, or between a DL and an UL unicast DCI in different monitoring occasions where at least one of them is not the monitoring occasions of FG-3-1, for a same UE as<br>2OFDM symbols for 15 kHz<br>4OFDM symbols for 30 kHz<br>7OFDM symbols for 60 kHz with NCP<br>11OFDM symbols for 120 kHz<br>Up to one unicast DL DCI and up to one unicast UL DCI in a monitoring occasion except for the monitoring occasions of FG 3-1.<br>In addition for TDD the minimum separation between the first two UL unicast DCIs within the first 3 OFDM symbols of a slot can be zero OFDM symbols. | |
| 3-5b | All PDCCH monitoring occasion can be any OFDM symbol(s) of a slot for Case 2 with a span gap | PDCCH monitoring occasions of FG-3-1, plus additional PDCCH monitoring occasion(s) can be any OFDM symbol(s) of a slot for Case 2, and for any two PDCCH monitoring occasions belonging to different spans, where at least one of them is not the monitoring occasions of FG-3-1, in same or different search spaces, there is a minimum time separation of X OFDM symbols (including the cross-slot boundary case) between the start of two spans, where each span is of length up to Y consecutive OFDM symbols of a slot. Spans do not overlap. Every span is contained in a single slot. The same span pattern repeats in every slot. The separation between consecutive spans within and across slots may be unequal but the same (X, Y) limit must be satisfied by all spans. Every monitoring occasion is fully contained in one span. In order to determine a suitable span pattern, first a bitmap b(1), 0 <= 1 <= 13 is generated, where b(1) = 1 if symbol 1 of any slot is part of a monitoring occasion, b(1) = 0 otherwise. The first span in the span pattern begins at the smallest 1 for which b(1) = 1. The next span in the span pattern begins at the smallest 1 not included in the previous span(s) for which b(1) = 1. The span duration is max {maximum value of all CORESET durations, minimum value of Y in the UE reported candidate value} except possibly the last span in a slot which can be of shorter duration. A particular PDCCH monitoring configuration meets the UE capability limitation if the span arrangement satisfies the gap separation for at least one (X, Y) in the UE reported candidate value set in every slot, including cross slot boundary.<br>For the set of monitoring occasions which are within the same span:<br>Processing one unicast DCI | |

TABLE 11-3-continued

| Index | Feature group | Components | Field name in TS 38.331 |
|---|---|---|---|
| | | scheduling DL and one unicast DCI scheduling UL per scheduled CC across this set of monitoring occasions for FDD<br>Processing one unicast DCI scheduling DL and two unicast DCI scheduling UL per scheduled CC across this set of monitoring occasions for TDD<br>Processing two unicast DCI scheduling DL and one unicast DCI scheduling UL per scheduled CC across this set of monitoring occasions for TDD<br>The number of different start symbol indices of spans for all PDCCH monitoring occasions per slot, including PDCCH monitoring occasions of FG-3-1, is no more than floor(14/X) (X is minimum among values reported by UE).<br>The number of different start symbol indices of PDCCH monitoring occasions per slot including PDCCH monitoring occasions of FG-3-1, is no more than 7.<br>The number of different start symbol indices of PDCCH monitoring occasions per half-slot including PDCCH monitoring occasions of FG-3-1 is no more than 4 in SCell. | |

The UE may report whether the above-described capability 2 and/or capability 3 are supported and relevant parameters to the base station. The base station may allocate time-domain resources to the common search space and the UE-specific search space, based on the UE capability report. During the resource allocation, the base station may ensure that the MO is not positioned at a location at which the UE cannot monitor the same.

[PDCCH: BD/CCE Limit]

If there are multiple search space sets configured for a UE, the following conditions may be considered in connection with a method for determining a search space set to be monitored by the UE.

If the value of "monitoringCapabilityConfig-r16" (higher layer signaling) has been configured to be "r15monitoringcapability" for the UE, the UE defines maximum values regarding the number of PDCCH candidates that can be monitored and the number of CCEs constituting the entire search space (as used herein, the entire search space refers to the entire CCE set corresponding to a union domain of multiple search space sets) with regard to each slot. If the value of "monitoringCapabilityConfig-r16" has been configured to be "r16monitoringcapability," the UE defines maximum values regarding the number of PDCCH candidates that can be monitored and the number of CCEs constituting the entire search space (as used herein, the entire search space refers to the entire CCE set corresponding to a union domain of multiple search space sets) with regard to each span.

[Condition 1: Maximum Number of PDCCH Candidates Limited]

According to the above-mentioned higher layer signaling configuration value, the maximum number M of PDCCH candidates that the UE can monitor may follow Table 12-1 given below if the same is defined with reference to a slot in a cell configured to have a subcarrier spacing of $15 \cdot 2^{\mu}$kHz, and may follow Table 12-2 given below if the same is defined with reference to a span.

TABLE 12-1

| $\mu$ | Maximum number of PDCCH candidates per slot and per serving cell ($M^{\mu}$) |
|---|---|
| 0 | 44 |
| 1 | 36 |
| 2 | 22 |
| 3 | 20 |

TABLE 12-2

| $\mu$ | Maximum number $M^{\mu}$ of monitored PDCCH candidates per span for combination (X, Y) and per serving cell | | |
|---|---|---|---|
| | (2, 2) | (4, 3) | (7, 3) |
| 0 | 14 | 28 | 44 |
| 1 | 12 | 24 | 36 |

[Condition 2: Maximum Number of CCEs Limited]

According to the above-mentioned higher layer signaling configuration value, the maximum number C of CCEs constituting the entire search space (as used herein, the entire search space refers to the entire CCE set corresponding to a union domain of multiple search space sets) may follow Table 12-3 given below if the same is defined with reference to a slot in a cell configured to have a subcarrier spacing of 15-21 kHz, and may follow Table 12-4 given below if the same is defined with reference to a span.

TABLE 12-3

| μ | Maximum number of non-overlapped CCEs per slot and per serving cell ($C^{\mu}$) |
|---|---|
| 0 | 56 |
| 1 | 56 |
| 2 | 48 |
| 3 | 32 |

TABLE 12-4

| | Maximum number $C^{\mu}$ of non-overlapped CCEs per span for combination (X, Y) and per serving cell | | |
|---|---|---|---|
| μ | (2, 2) | (4, 3) | (7, 3) |
| 0 | 18 | 36 | 56 |
| 1 | 18 | 36 | 56 |

For convenience of description, a situation satisfying both conditions 1 and 2 above at a specific timepoint will be defined as "condition A." Therefore, the description that condition A is not satisfied may mean that at least one of conditions 1 and 2 above is not satisfied.

[PDCCH: Overbooking]

According to the configuration of search space sets of the base station, a case in which condition A is not satisfied may occur at a specific timepoint. If condition A is not satisfied at a specific timepoint, the UE may select and monitor only some of search space sets configured to satisfy condition A at the corresponding timepoint, and the base station may transmit a PDCCH to the selected search space set.

A method for selecting some search spaces from all configured search space sets may follow methods given below:

If condition A regarding a PDCCH fails to be satisfied at a specific timepoint (slot), the UE (or the base station) may preferentially select a search space set having a search space type configured as a common search space, among search space sets existing at the corresponding timepoint, over a search space set configured as a UE-specific search space.

If all search space sets configured as common search spaces have been selected (that is, if condition A is satisfied even after all search spaces configured as common search spaces have been selected), the UE (or the bae station) may select search space sets configured as UE-specific search spaces. If there are multiple search space sets configured as UE-specific search spaces, a search space set having a lower search space set index may have a higher priority. UE-specific search space sets may be selected as long as condition A is satisfied, in view of the priority.

[QCL, TCI state]

In a wireless communication system, one or more different antenna ports (which may be replaced with one or more channels, signals, and combinations thereof, but may be referred to as different antenna ports, as a whole, for convenience of description of the disclosure) may be associated with each other by a quasi-co-location (QCL) configuration as in Table 10 below. A TCI state is for publishing the QCL relation between a PDCCH (or a PDCCH DMRS) and another RS or channel. The description that a reference antenna port A (reference RS #A) and another target antenna port B (target RS #B) are QCLed with each other means that the UE is allowed to apply some or all of large-scale channel parameters estimated in the antenna port A to channel measurement form the antenna port B. The QCL needs to be associated with different parameters according to the situation such as 1) time tracking influenced by average delay and delay spread, 2) frequency tracking influenced by Doppler shift and Doppler spread, 3) radio resource management (RRM) influenced by average gain, or 4) beam management (BM) influenced by a spatial parameter. Accordingly, four types of QCL relations are supported in NR as in Table 13 below:

TABLE 13

| QCL type | Large-scale characteristics |
|---|---|
| A | Doppler shift, Doppler spread, average delay, delay spread |
| B | Doppler shift, Doppler spread |
| C | Doppler shift, average delay |
| D | Spatial Rx parameter |

The spatial RX parameter may refer to some or all of various parameters as a whole, such as angle of arrival (AoA), power angular spectrum (PAS) of AoA, angle of departure (AoD), PAS of AoD, transmit/receive channel correlation, transmit/receive beamforming, and spatial channel correlation.

The QCL relation may be configured for the UE through RRC parameter TCI-state and QCL-info as in Table 14 below. Referring to Table 14, the base station may configure one or more TCI states for the UE, thereby informing of a maximum of two kinds of QCL relations (qcl-Type1, qcl-Type2) regarding the RS that refers to the ID of the TCI state, that is, the target RS. Each piece of QCL information (QCL-Info) that each TCI state includes the serving cell index and the BWP index of the reference RS indicated by the corresponding QCL information, the type and ID of the reference BS, and a QCL type as in Table 13 above.

TABLE 14

```
TCI-State ::=                SEQUENCE {
   tci-StateId                  TCI-StateId,
   (ID of corresponding TCI state)
   qcl-Type 1                   QCL-Info,
   (QCL information of first refernece RS of RS (target RS) referring to
corresponding TCI state ID)
   qcl-Type2                    QCL-Info                    OPTIONAL, -
- Need R
   (QCL information of second refernece RS of RS (target RS) referring to
corresponding TCI state ID)
   ...
}
```

TABLE 14-continued

```
QCL-Info ::=                SEQUENCE {
   cell                     ServCellIndex                 OPTIONAL, --
Need R
   (serving cell index of reference RS indicated by corresponding QCL information)
   bwp-Id                      BWP-Id
   OPTIONAL, -- Cond CSI-RS-Indicated
   (BWP index of reference RS indicated by corresponding QCL information)
   referenceSignal             CHOICE {
      csi-rs                      NZP-CSI-RS-ResourceId,
      ssb                         SSB-Index
      (one of CSI-RS ID or SSB ID indicated by corresponding QCL information)
   },
   qcl-Type                    ENUMERATED {typeA, typeB, typeC,
typeD},
   ...
}
```

Figure 7:
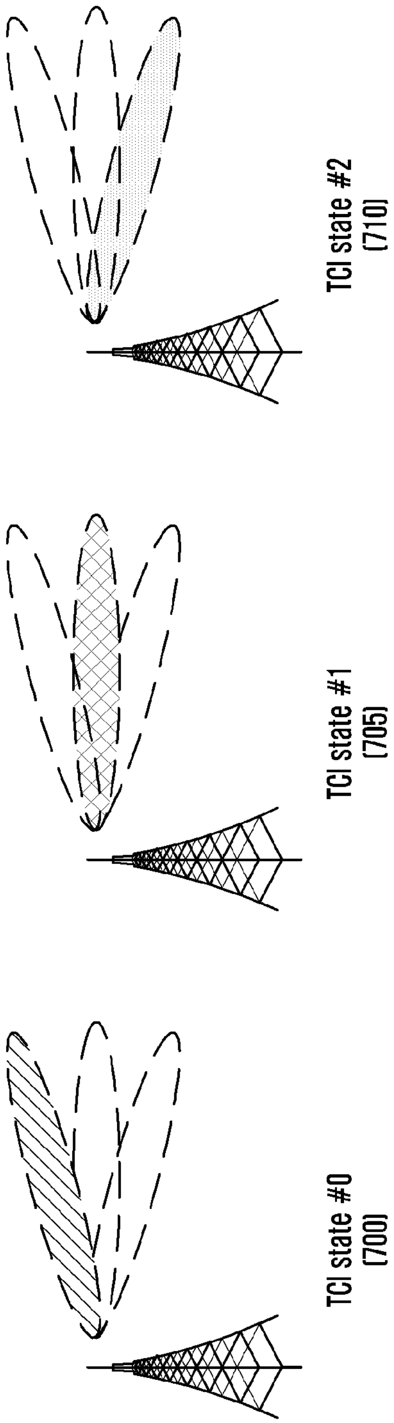
FIG. 7 illustrates an example of base station beam allocation according to TCI state configuration in a wireless communication system according to an embodiment of the present disclosure.

FIG. 7 illustrates an example of base station beam allocation according to TCI state configuration. Referring to FIG. 7, the base station may transfer information regarding N different beams to the UE through N different TCI states. For example, in the case of N=3 as in FIG. 7, the base station may configure qcl-Type2 parameters included in three TCI states 700, 705, and 710 in QCL type D while being associated with CSI-RSs or SSBs corresponding to different beams, thereby notifying that antenna ports referring to the different TCI states 700, 705, and 710 are associated with different spatial Rx parameters (that is, different beams).

Tables 15-1 to 15-5 below enumerate valid TCI state configurations according to the target antenna port type.

Table 15-1 enumerates valid TCI state configurations when the target antenna port is a CSI-RS for tracking (TRS). The TRS refers to an NZP CSI-RS which has no repetition parameter configured therefor, and trs-Info of which is configured as "true," among CRI-RSs. In Table 15-1, configuration no. 3 may be used for an aperiodic TRS.

TABLE 15-1

Valid TCI state configurations when the target antenna port is a CSI-RS for tracking (TRS)

| Valid TCI state Configuration | DL RS 1 | qcl-Type1 | DL RS 2 (If configured) | qcl Type2 (If configured) |
|---|---|---|---|---|
| 1 | SSB | QCL-TypeC | SSB | QCL-TypeD |
| 2 | SSB | QCL-TypeC | CSI-RS (BM) | QCL-TypeD |
| 3 | TRS (periodic) | QCL-TypeA | TRS (same as DL RS 1) | QCL-TypeD |

Table 15-2 enumerates valid TCI state configurations when the target antenna port is a CSI-RS for CSI. The CSI-RS for CSI refers to an NZP CSI-RS which has no parameter indicating repetition (for example, repetition parameter) configured therefor, and trs-Info of which is not configured as "true," among CRI-RSs.

TABLE 15-2

Valid TCI state configurations when the target antenna port is a CSI-RS for CSI

| Valid TCI state Configuration | DL RS 1 | qcl-Type1 | DL RS 2 (If configured) | qcl Type2 (If configured) |
|---|---|---|---|---|
| 1 | TRS | QCL-TypeA | SSB | QCL-TypeD |
| 2 | TRS | QCL-TypeA | CSI-RS for BM | QCL-TypeD |
| 3 | TRS | QCL-TypeA | TRS (same as DL RS 1) | QCL-TypeD |
| 4 | TRS | QCL-TypeB | | |

Table 15-3 enumerates valid TCI state configurations when the target antenna port is a CSI-RS for beam management (BM) (which has the same meaning as CSI-RS for L1 RSRP reporting). The CSI-RS for BM refers to an NZP CSI-RS which has a repetition parameter configured to have a value of "on" or "off," and trs-Info of which is not configured as "true," among CRI-RSs.

TABLE 15-3

Valid TCI state configurations when the target antenna port is a CSI-RS for BM (for L1 RSRP reporting)

| Valid TCI state Configuration | DL RS 1 | qcl-Type1 | DL RS 2 (If configured) | qcl Type2 (If configured) |
|---|---|---|---|---|
| 1 | TRS | QCL-TypeA | TRS (same as DL RS 1) | QCL-TypeD |
| 2 | TRS | QCL-TypeA | CSI-RS (BM) | QCL-TypeD |
| 3 | SS/PBCH Block | QCL-TypeC | SS/PBCH Block | QCL-TypeD |

Table 15-4 enumerates valid TCI state configurations when the target antenna port is a PDCCH DMRS.

TABLE 15-4

Valid TCI state configurations when the target antenna port is a PDCCH DMRS

| Valid TCI state Configuration | DL RS 1 | qcl-Type1 | DL RS 2 (If configured) | qcl Type2 (If configured) |
|---|---|---|---|---|
| 1 | TRS | QCL-TypeA | TRS (same as DL RS 1) | QCL-TypeD |
| 2 | TRS | QCL-TypeA | CSI-RS (BM) | QCL-TypeD |
| 3 | CSI-RS (CSI) | QCL-TypeA | CSI-RS (same as DL RS 1) | QCL-TypeD |

Table 15-5 enumerates valid TCI state configurations when the target antenna port is a PDSCH DMRS.

TABLE 15-5

| Valid TCI state configurations when the target antenna port is a PDSCH DMRS | | | | |
|---|---|---|---|---|
| Valid TCI state Configuration | DL RS 1 | qcl-Type1 | DL RS 2 (If configured) | qcl Type2 (If configured) |
| 1 | TRS | QCL-TypeA | TRS | QCL-TypeD |
| 2 | TRS | QCL-TypeA | CSI-RS (BM) | QCL-TypeD |
| 3 | CSI-RS (CSI) | QCL-TypeA | CSI-RS (CSI) | QCL-TypeD |

According to a representative QCL configuration method based on Tables 15-1 to 15-5 above, the target antenna port and reference antenna port for each step are configured and operated such as "SSB"→"TRS"→"CSI-RS for CSI, or CSI-RS for BM, or PDCCH DMRS, or PDSCH DMRS." Accordingly, it is possible to help the UE's receiving operation by associating statistical characteristics that can be measured from the SSB and TRS with respective antenna ports.

[PDCCH: Regarding TCI State]

Specific TCI state combinations applicable to a PDCCH DMRS antenna port are given in Table 16 below. The fourth row in Table 16 corresponds to a combination assumed by the UE before RRC configuration, and no configuration is possible after the RRC.

TABLE 16

| Valid TCI state Configuration | DL RS 1 | qcl-Type1 | DL RS 2 (if configured) | qcl-Type2 if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3 | CSI-RS (CSI) | QCL-TypeA | | |
| 4 | SS/PBCH Block | QCL-TypeA | SS/PBCH Block | QCL-TypeD |

Figure 8:
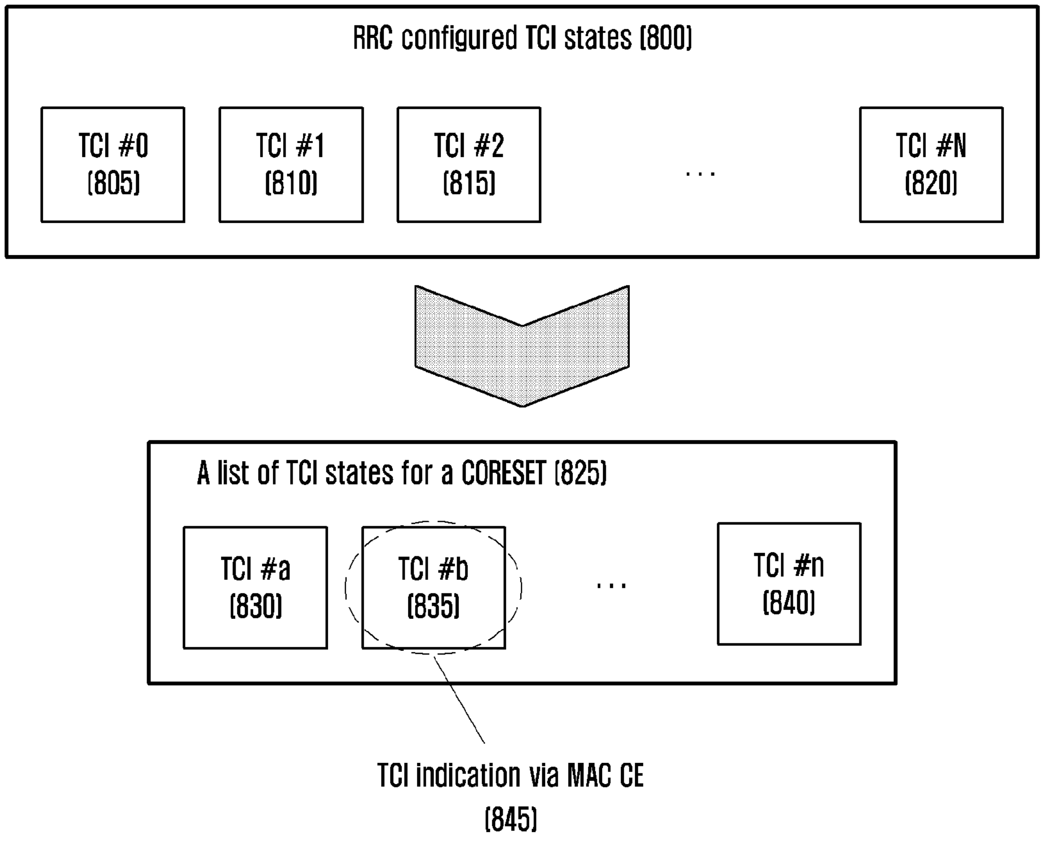
FIG. 8 illustrates an example of a method for allocating a TCI state to a PDCCH in a wireless communication system according to an embodiment of the present disclosure.

In NR, a hierarchical signaling method as illustrated in FIG. 8 is supported for dynamic allocation regarding a PDCCH beam. Referring to FIG. 8, the base station may configure N TCI states 805, 810, . . . , 820 for the UE through RRC signaling 800, and may configure some thereof as TCI states for a CORESET (825). The base station may then indicate one of the TCI states 830, 835, and 340 for the CORESET to the UE through MAC CE signaling (845). The UE then receives a PDCCH, based on beam information included in the TCI state indicated by the MAC CE signaling.

Figure 9:
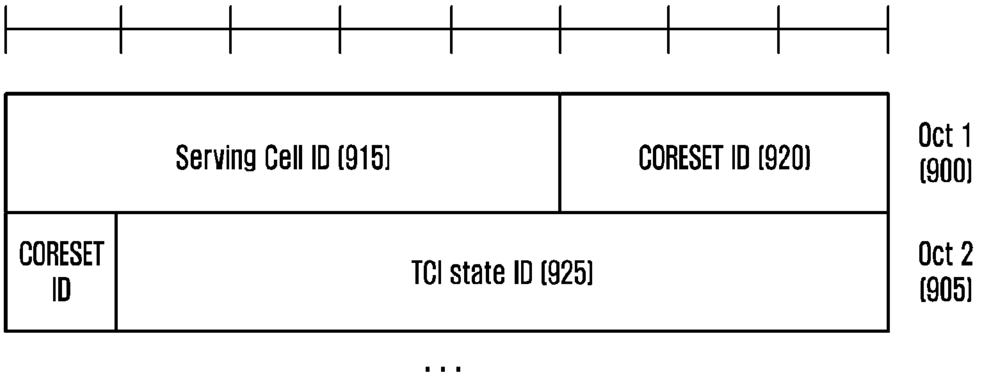
FIG. 9 illustrates a TCI indication MAC CE signaling structure for a PDCCH DMRS in a wireless communication system according to an embodiment of the present disclosure.

FIG. 9 illustrates a TCI indication MAC CE signaling structure for the PDCCH DMRS. Referring to FIG. 9, the TCI indication MAC CE signaling for the PDCCH DMRS is configured by 2 bytes (16 bits), and includes a 5-bit serving cell ID 915, a 4-bit CORESET ID 920, and a 7-bit TCI state ID 925.

Figure 10:
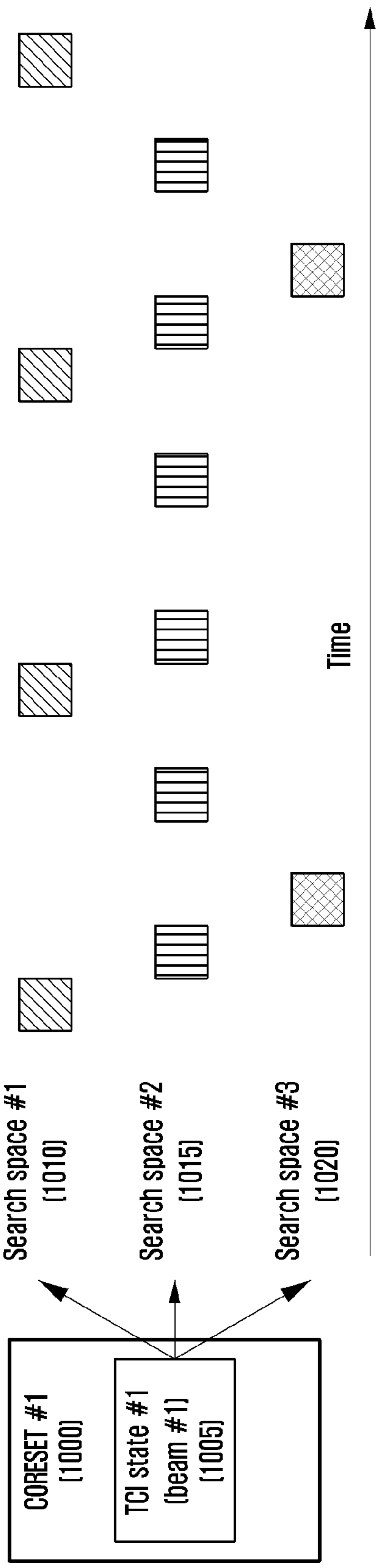
FIG. 10 illustrates an example of beam configuration with regard to a control resource set and a search space in a wireless communication system according to an embodiment of the present disclosure.

FIG. 10 illustrates an example of beam configuration with regard to a CORESET and a search space according to the above description. Referring to FIG. 10, the base station may indicate one of TCI state lists included in CORESET 1000 configuration through MAC CE signaling (1005). Until a different TCI state is indicated for the corresponding CORESET through different MAC CE signaling, the UE considers that identical QCL information (beam #1) 1005 is all applied to one or more search spaces 1010, 1015, and 1020 connected to the CORESET. The above-described PDCCH beam allocation method has a problem in that it is difficult to indicate a beam change faster than MAC CE signaling delay, and the same beam is unilaterally applied to each CORESET regardless of search space characteristics, thereby making flexible PDCCH beam operation difficult. Following embodiments of the disclosure provide more flexible PDCCH beam configuration and operation methods. Although multiple distinctive examples will be provided for convenience of description of embodiments of the disclosure, they are not mutually exclusive, and can be combined and applied appropriately for each situation.

The base station may configure one or multiple TCI states for the UE with regard to a specific control resource set, and may activate one of the configured TCI states through a MAC CE activation command. For example, if {TCI state #0, TCI state #1, TCI state #2} are configured as TCI states for control resource set #1, the base station may transmit an activation command to the UE through a MAC CE such that TCI state #0 is assumed as the TCI state regarding control resource set #1. Based on the activation command regarding the TCI state received through the MAC CE, the UE may correctly receive the DMRS of the corresponding control resource set, based on QCL information in the activated TCI state.

With regard to a control resource set having a configured index of 0 (control resource set #0), if the UE has failed to receive a MAC CE activation command regarding the TCI state of control resource set #0, the UE may assume that the DMRS transmitted in control resource set #0 has been QCL-ed with a SS/PBCH block identified in the initial access process, or in a non-contention-based random access process not triggered by a PDCCH command.

With regard to a control resource set having a configured index value other than 0 (control resource set #X), if the UE has no TCI state configured regarding control resource set #X, or if the UE has one or more TCI states configured therefor but has failed to receive a MAC CE activation command for activating one thereof, the UE may assume that the DMRS transmitted in control resource set #X has been QCL-ed with a SS/PBCH block identified in the initial access process.

[PDCCH: Regarding QCL Prioritization Rule]

Hereinafter, operations for determining QCL priority regarding a PDCCH will be described in detail.

If multiple control resource sets which operate according to carrier aggregation inside a single cell or band and which exist inside a single or multiple in-cell activated bandwidth parts overlap temporally while having identical or different QCL-TypeD characteristics in a specific PDCCH monitoring occasion, the UE may select a specific control resource set according to a QCL priority determining operation and may monitor control resource sets having the same QCL-TypeD characteristics as the corresponding control resource set. That is, if multiple control resource sets overlap temporally, only one QCL-TypeD characteristic can be received. The QCL priority may be determined by the following criteria:

Criterion 1: a control resource set connected to a common search space having the lowest index inside a cell corresponding to the lowest index among cells including a common search space; and/or Criterion 2: a control resource set connected to a UE-specific search space having the lowest index inside a cell corresponding to the lowest index among cells including a UE-specific search space.

As described above, if one criterion among the criteria is not satisfied, the next criterion is applied. For example, if control resource sets overlap temporally in a specific PDCCH monitoring occasion, and if all control resource sets are not connected to a common search space but connected to a UE-specific search space (that is, if criterion 1 is not satisfied), the UE may omit application of criterion 1 and apply criterion 2.

When selecting control resource set according to the above-mentioned criteria, the UE may additionally consider the two aspects with regard to QCL information configured for the control resource set. Firstly, if control resource set 1 has CSI-RS 1 as a reference signal having a relation of QCL-TypeD, if this CSI-RS 1 has a relation of QCL-TypeD with reference signal SSB 1, and if another control resource set 2 has a relation of QCL-TypeD with reference signal SSB 1, the UE may consider that the two control resource sets 1 and 2 have different QCL-TypeD characteristics. Secondly, if control resource set 1 has CSI-RS 1 configured for cell 1 as a reference signal having a relation of QCL-TypeD, if this CSI-RS 1 has a relation of QCL-TypeD with reference signal SSB 1, if control resource set 2 has a relation of QCL-TypeD with reference signal CSI-RS 2 configured for cell 2, and if this CSI-RS 2 has a relation of QCL-TypeD with the same reference signal SSB 1, the UE may consider that the two control resource sets have the same QCL-TypeD characteristics.

Figure 12:
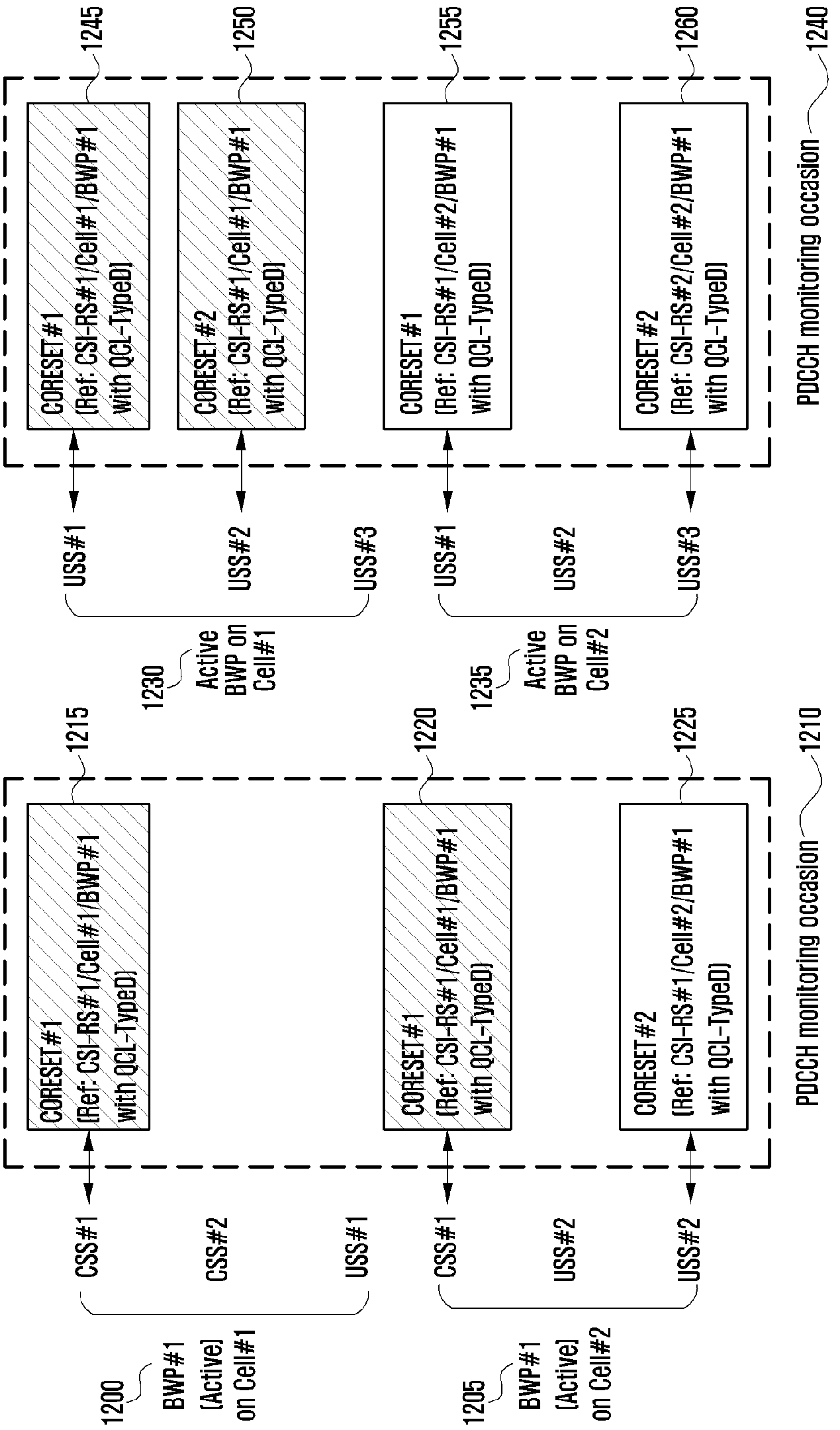
FIG. 12 illustrates a method in which, upon receiving a downlink control channel, a UE selects a receivable control resource set in view of priority in a wireless communication system according to an embodiment of the present disclosure.

FIG. 12 illustrates a method in which, upon receiving a downlink control channel, a UE selects a receivable control resource set in view of priority in a wireless communication system according to an embodiment of the present disclosure. As an example, the UE may be configured to receive multiple control resource sets overlapping temporally in a specific PDCCH monitoring occasion 1210, and such multiple control resource sets may be connected to a common search space or a UE-specific search space with regard to multiple cells. In the corresponding PDCCH monitoring occasion, control resource set no. 1 1215 connected to common search space no. 1 may exist in bandwidth part no. 1 1200 of cell no. 1, and control resource set no. 1 1220 connected to common search space no. 1 and control resource set no. 2 1225 connected to UE-specific search space no. 2 may exist in bandwidth part no. 1 1205 of cell no. 2. The control resource sets 1215 and 1220 may have a relation of QCL-TypeD with CSI-RS resource no. 1 configured in bandwidth part no. 1 of cell no. 1, and the control resource set 1225 may have a relation of QCL-TypeD with CSI-RS resource no. 1 configured in bandwidth part no. 1 of cell no. 2. Therefore, if criterion 1 is applied to the corresponding PDCCH monitoring occasion 1210, all other control resource sets having the same reference signal of QCL-TypeD as control resource set no. 1 1215 may be received. Therefore, the UE may receive the control resource sets 1215 and 1220 in the corresponding PDCCH monitoring occasion 1210. As another example, the UE may be configured to receive multiple control resource sets overlapping temporally in a specific PDCCH monitoring occasion 1240, and such multiple control resource sets may be connected to a common search space or a UE-specific search space with regard to multiple cells. In the corresponding PDCCH monitoring occasion, control resource set no. 1 1245 connected to UE-specific search space no. 1 and control resource set no. 2 1250 connected to UE-specific search space no. 2 may exist in bandwidth part no. 1 1230 of cell no. 1, and control resource set no. 1 1255 connected to UE-specific search space no. 1 and control resource set no. 2 1260 connected to UE-specific search space no. 3 may exist in bandwidth part no. 1 1235 of cell no. 2. The control resource sets 1245 and 1250 may have a relation of QCL-TypeD with CSI-RS resource no. 1 configured in bandwidth part no. 1 of cell no. 1, the control resource set 1255 may have a relation of QCL-TypeD with CSI-RS resource no. 1 configured in bandwidth part no. 1 of cell no. 2, and the control resource set 1260 may have a relation of QCL-TypeD with CSI-RS resource no. 2 configured in bandwidth part no. 1 of cell no. 2. If criterion 1 is applied to the corresponding PDCCH monitoring occasion 1240, there is no common search space, and the next criterion (criterion 2) may thus be applied. If criterion 2 is applied to the corresponding PDCCH monitoring occasion 1240, all other control resource sets having the same reference signal of QCL-TypeD as control resource set no. 1 1245 may be received. Therefore, the UE may receive the control resource sets 1245 and 1250 in the corresponding PDCCH monitoring occasion 1240.

[Regarding Rate Matching/Puncturing]

Hereinafter, a rate matching operation and a puncturing operation will be described in detail.

If time and frequency resource A to transmit symbol sequence A overlaps time and frequency resource B, a rate matching or puncturing operation may be considered as an operation of transmitting/receiving channel A in view of resource C (area in which resource A and resource B overlap). Specific operations may follow the following description:

Rate Matching Operation

The base station may transmit channel A after mapping the same only to remaining resource domains other than resource C (area overlapping resource B) among the entire resource A which is to be used to transmit symbol sequence A to the UE. For example, assuming that symbol sequence A is configured as {symbol #1, symbol #2, symbol #3, symbol4}, resource A is {resource #1, resource #2, resource #3, resource #4}, and resource B is {resource #3, resource #5}, the base station may send symbol sequence A after successively mapping the same to remaining resources {resource #1, resource #2, resource #4} other than {resource #3} (corresponding to resource C) among resource A. Consequently, the base station may transmit symbol sequence {symbol #1, symbol #2, symbol #3} after mapping the same to {resource #1, resource #2, resource #4}, respectively.

The UE may assess resource A and resource B from scheduling information regarding symbol sequence A from the base station, thereby assessing resource C (area in which resource A and resource B overlap). The UE may receive symbol sequence A based on an assumption that symbol sequence A has been mapped and transmitted in the remaining area other than resource C among the entire resource A. For example, if symbol sequence A is configured as {symbol #1, symbol #2, symbol #3, symbol4}, if resource A is {resource #1, resource #2, resource #3, resource #4}, and if resource B is {resource #3, resource #5}, the UE may receive symbol sequence A based on an assumption that the same has been successively mapped to remaining resources {resource #1, resource #2, resource #4} other than {resource #3} (corresponding to resource C) among resource A. Consequently, the UE may perform a series of following receiving operations based on an assumption that symbol sequence {symbol #1, symbol #2, symbol #3} has been transmitted after being mapped to {resource #1, resource #2, resource #4}, respectively.

Puncturing Operation

If there is resource C (area overlapping resource B) among the entire resource A which is to be used to transmit symbol sequence A to the UE, the base station may map symbol sequence A to the entire resource A, but may not perform transmission in the resource area corresponding to resource C, and may perform transmission with regard to only the remaining resource area other than resource C among resource A. For example, assuming that symbol sequence A is configured as {symbol #1, symbol #2, symbol #3, symbol4}, resource A is {resource #1, resource #2, resource #3, resource #4}, and resource B is {resource #3, resource #5}, the base station may map symbol sequence {symbol #1, symbol #2, symbol #3, symbol #4} to resource A {resource #1, resource #2, resource #3, resource #4}, respectively, may transmit only symbol sequence {symbol #1, symbol #2, symbol #4} corresponding to remaining resources {resource #1, resource #2, resource #4} other than {resource #3} (corresponding to resource C) among resource A, and may not transmit {symbol #3} mapped to {resource #3} (corresponding to resource C). Consequently, the base station may transmit symbol sequence {symbol #1, symbol #2, symbol #4} after mapping the same to {resource #1, resource #2, resource #4}, respectively.

The UE may assess resource A and resource B from scheduling information regarding symbol sequence A from the base station, thereby assessing resource C (area in which resource A and resource B overlap). The UE may receive symbol sequence A based on an assumption that symbol sequence A has been mapped to the entire resource A but transmitted only in the remaining area other than resource C among the resource area A. For example, if symbol sequence A is configured as {symbol #1, symbol #2, symbol #3, symbol4}, if resource A is {resource #1, resource #2, resource #3, resource #4}, and if resource B is {resource #3, resource #5}, the UE may assume that symbol sequence A {symbol #1, symbol #2, symbol #3, symbol4} is mapped to resource A {resource #1, resource #2, resource #3, resource #4}, respectively, but {symbol #3} mapped to {resource #3} (corresponding to resource C) is not transmitted. Based on the assumption that symbol sequence {symbol #1, symbol #2, symbol #4} corresponding to remaining resources {resource #1, resource #2, resource #4} other than {resource #3}(corresponding to resource C) among resource A has been mapped and transmitted, the UE may receive the same. Consequently, the UE may perform a series of following receiving operations based on an assumption that symbol sequence {symbol #1, symbol #2, symbol #4} has been transmitted after being mapped to {resource #1, resource #2, resource #4}, respectively.

Hereinafter, a method for configuring a rate matching resource for the purpose of rate matching in a 5G communication system will be described. Rate matching refers to adjusting the size of a signal in view of the amount of resources that can be used to transmit the signal. For example, data channel rate matching may mean that a data channel is not mapped and transmitted with regard to specific time and frequency resource domains, and the size of data is adjusted accordingly.

Figure 11:
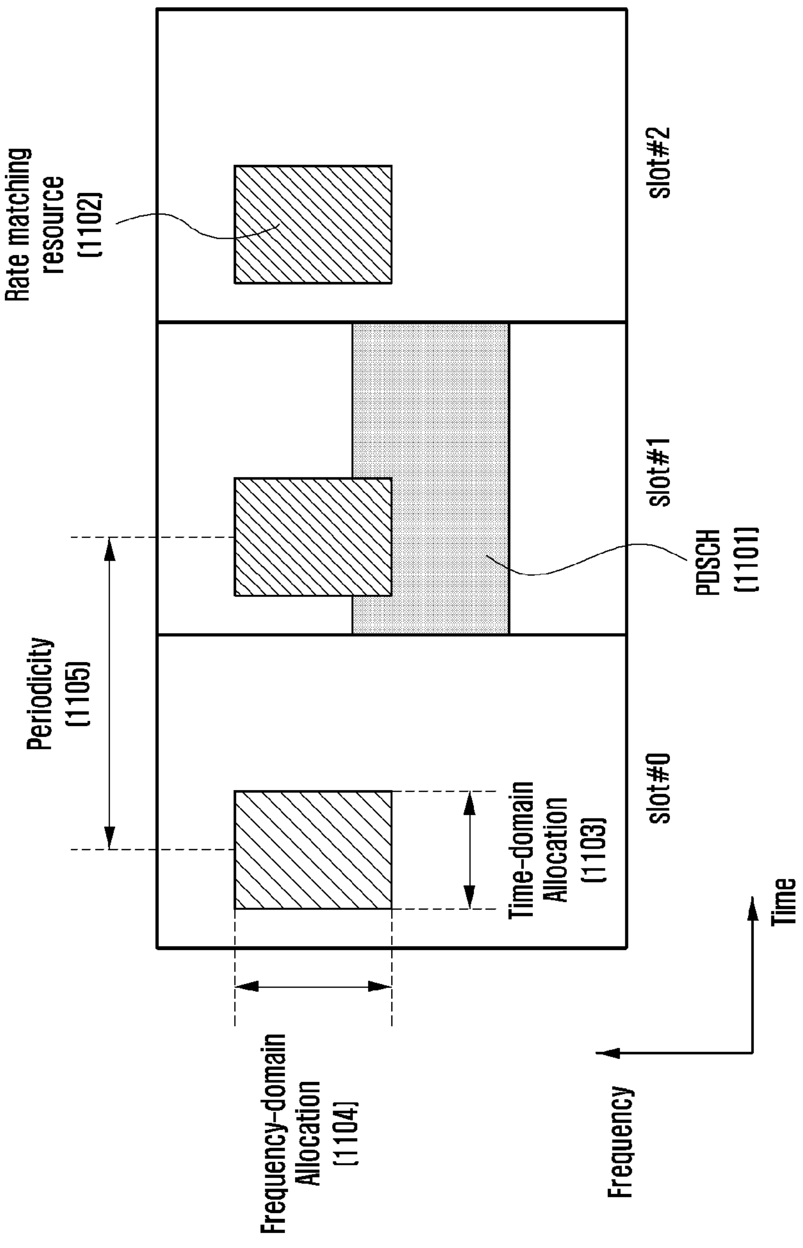
FIG. 11 illustrates a method in which a base station and a UE transmit/receive data in view of a PDSCH and a rate matching resource in a wireless communication system according to an embodiment of the present disclosure.

FIG. 11 illustrates a method in which a base station and a UE transmit/receive data in view of a PDSCH and a rate matching resource.

FIG. 11 illustrates a PDSCH 1101 and a rate matching resource 1102. The base station may configure one or multiple rate matching resources 1102 for the UE through higher layer signaling (for example, RRC signaling). Rate matching resource 1102 configuration information may include time-domain resource allocation information 1103, frequency-domain resource allocation information 1104, and periodicity information 1105. A bitmap corresponding to the frequency-domain resource allocation information 1104 will hereinafter be referred to as "first bitmap," a bitmap corresponding to the time-domain resource allocation information 1103 will be referred to as "second bitmap," and a bitmap corresponding to the periodicity information 1105 will be referred to as "third bitmap." If all or some of time and frequency resources of the scheduled PDSCH 1101 overlap a configured rate matching resource 602, the base station may rate-match and transmit the PDSCH 1101 in a rate matching resource 1102 part, and the UE may perform reception and decoding after assuming that the PDSCH 1101 has been rate-matched in a rate matching resource 1102 part.

The base station may dynamically notify the UE, through DCI, of whether the PDSCH may be rate-matched in the configured rate matching resource part through an additional configuration (corresponding to "rate matching indicator" inside DCI format described above). Specifically, the base station may select some from the configured rate matching resources and group them into a rate matching resource group, and may indicate, to the UE, whether the PDSCH is rate-matched with regard to each rate matching resource group through DCI by using a bitmap type. For example, if four rate matching resources RMR #1, RMR #2, RMR #3, and RMR #4 are configured, the base station may configure a rate matching groups RMG #1={RMR #1, RMR #2}, RMG #2={RMR #3, RMR #4}, and may indicate, to the UE, whether rate matching occurs in RMG #1 and RMG #2, respectively, through a bitmap by using two bits inside the DCI field. For example, "1" may mean that rate matching is to be conducted, and "0" may mean that rate matching is not to be conducted.

5G supports granularity of "RB symbol level" and "RE level" as a method for configuring the above-described rate matching resources for a UE. More specifically, the following configuration method may be followed:

RB Symbol Level

The UE may have a maximum of four RateMatchPatterns configured per each bandwidth part through higher layer signaling, and one RateMatchPattern may include the following content:

- may include, in connection with a reserved resource inside a bandwidth part, a resource having time and frequency resource domains of the corresponding reserved resource configured as a combination of an RB-level bitmap and a symbol-level bitmap in the frequency domain. The reserved resource may span one or two slots. A time domain pattern (periodicityAndPattern) may be additionally configured wherein time and frequency domains including respective RB-level and symbol-level bitmap pairs are repeated; And
- may include a resource area corresponding to a time domain pattern configured by time and frequency domain resource areas configured by a control resource set inside a bandwidth part and a search space configuration in which corresponding resource areas are repeated.

RE Level

The UE may have the following content configured through higher layer signaling:

- configuration information (lte-CRS-ToMatchAround) regarding a RE corresponding to a LTE CRS (Cell-specific Reference Signal or common reference signal) pattern, which may include LTE CRS's port number (nrofCRS-Ports) and LTE-CRS-vshift(s) value (v-shift), location information (carrierFreqDL) of a center subcarrier of a LTE carrier from a reference frequency point (for example, reference point A), the LTE carrier's bandwidth size (carrierBandwidthDL) information, subframe configuration information (mbsfn-SubframConfigList) corresponding to a multi-cast-broadcast single-frequency network (MBSFN), and the like. The UE may determine the position of the CRS inside the NR slot corresponding to the LTE subframe, based on the above-mentioned pieces of information; and may include configuration information regarding a resource set corresponding to one or multiple zero power (ZP) CSI-RSs inside a bandwidth part.

[Regarding LTE CRS Rate Match]

Next, a rate matching process regarding the above-mentioned LTE CRS will be described in detail. For coexistence between long term evolution (LTE) and new RAT (NR) (LTE-NR coexistence), NR provides an NR UE with a function for configuring the pattern of cell-specific reference signal (CRS) of LTE. More specifically, the CRS pattern may be provided by RRC signaling including at least one parameter inside ServingCellConfig IE (information element) or ServingCellConfigCommon IE. Examples of the parameter may include lte-CRS-ToMatchAround, lte-CRS-PatternList1-r16, lte-CRS-PatternList2-r16, crs-RateMatch-PerCORESETPoolIndex-r16, and the like.

Rel-15 NR provides a function such that one CRS pattern can be configured per serving cell through parameter lte-CRS-ToMatchAround. In Rel-16 NR, the above function has been expanded such that multiple CRS patterns can be configured per serving cell. More specifically, a UE having a single-TRP (transmission and reception point) configuration may now have one CRS pattern configured per one LTE carrier, and a UE having a multi-TRP configuration may now have two CRS patterns configured per one LTE carrier. For example, the UE having a single-TRP configuration may have a maximum of three CRS patterns configured per serving cell through parameter lte-CRS-PatternList1-r16. As another example, the UE having a multi-TRP configuration may have a CRS configured for each TRP. That is, the CRS pattern regarding TRP1 may be configured through parameter lte-CRS-PatternList1-r16, and the CRS pattern regarding TRP2 may be configured through parameter lte-CRS-PatternList2-r16. Meanwhile, if two TRPs are configured as above, whether the CRS patterns of TRP1 and TRP2 are both to be applied to a specific physical downlink shared channel (PDSCH) or only the CRS pattern regarding one TRP is to be applied is determined through parameter crs-RateMatch-PerCORESETPoolIndex-r16. If parameter crs-RateMatch-PerCORESETPoolIndex-r16 is configured "enabled," only the CRS pattern of one TRP is applied, and both CRS patterns of the two TRPs are applied in other cases.

Table 17 shows a ServingCellConfig IE including the CRS patterns, and Table 18 shows a RateMatchPatternLTE-CRS IE including at least one parameter regarding CRS patterns.

TABLE 17

```
ServingCellConfig ::=                    SEQUENCE {
  tdd-UL-DL-ConfigurationDedicated                                 TDD-UL-DL-ConfigDedicated
OPTIONAL,   -- Cond TDD
  initialDownlinkBWP                          BWP-DownlinkDedicated              OPTIONAL,  -
- Need M
  downlinkBWP-ToReleaseList                                  SEQUENCE (SIZE (1..maxNrofBWPs)) OF
BWP-Id                                OPTIONAL,   -- Need N
  downlinkBWP-ToAddModList                                   SEQUENCE (SIZE (1..maxNrofBWPs)) OF
BWP-Downlink                          OPTIONAL,   -- Need N
  firstActiveDownlinkBWP-Id                                                               BWP-Id
OPTIONAL,   -- Cond SyncAndCellAdd
  bwp-InactivityTimer                            ENUMERATED {ms2, ms3, ms4, ms5, ms6, ms8,
ms10, ms20, ms30,
                        ms40,ms50, ms60, ms80,ms100, ms200,ms300, ms500,
                        ms750, ms1280, ms1920, ms2560, spare10, spare9, spare8,
                        spare7, spare6, spare5, spare4, spare3, spare2, spare1 OPTIONAL,
--Need R
  defaultDownlinkBWP-Id      BWP-Id                                   OPTIONAL,   -- Need S
  uplinkConfig          UplinkConfig                                  OPTIONAL,   -- Need M
  supplementaryUplink      UplinkConfig                                  OPTIONAL,   -- Need M
  pdcch-ServingCellConfig                          SetupRelease     { PDCCH-ServingCellConfig }
OPTIONAL,   -- Need M
  pdsch-ServingCellConfig                          SetupRelease     { PDSCH-ServingCellConfig }
OPTIONAL,   -- Need M
  csi-MeasConfig      SetupRelease { CSI-MeasConfig }                                OPTIONAL,
  -- Need M
  sCellDeactivationTimer                      ENUMERATED {ms20, ms40, ms80, ms160, ms200,
ms240,
                  ms320, ms400, ms480, ms520, ms640, ms720,
                  ms840, ms1280, spare2, spare1}                      OPTIONAL, -- Cond
ServingCellWithoutPUCCH
  crossCarrierSchedulingConfig                                      CrossCarrierSchedulingConfig
OPTIONAL,   -- Need M
  tag-Id                              TAG-Id,
  dummy             ENUMERATED {enabled}                              OPTIONAL,   -- Need R
  pathlossReferenceLinking                              ENUMERATED        {spCell,        sCell}
OPTIONAL,   -- Cond SCellOnly
  servingCellMO          MeasObjectId                                 OPTIONAL,   -- Cond
MeasObject
  ...,
```

TABLE 17-continued

```
  [[
  lte-CRS-ToMatchAround                              SetupRelease { RateMatchPatternLTE-CRS }
OPTIONAL,   -- Need M
  rateMatchPatternToAddModList                                               SEQUENCE (SIZE
(1..maxNrofRateMatchPatterns)) OF RateMatchPattern                     OPTIONAL,   -- Need N
  rateMatchPatternToReleaseList                                              SEQUENCE (SIZE
(1..maxNrofRateMatchPatterns)) OF RateMatchPatternId                   OPTIONAL,   -- Need N
  downlinkChannelBW-PerSCS-List                      SEQUENCE (SIZE (1..maxSCSs)) OF SCS-
SpecificCarrier                         OPTIONAL   -- Need S
  ]],
  [[
  supplementaryUplinkRelease       ENUMERATED {true}                              OPTIONAL,
  -- Need N
  tdd-UL-DL-ConfigurationDedicated-IAB-MT-r16                     TDD-UL-DL-ConfigDedicated-
IAB-MT-r16 OPTIONAL,       -- Cond TDD_IAB
  dormantBWP-Config-r16                              SetupRelease       { DormantBWP-Config-r16 }
OPTIONAL,   -- Need M
  ca-SlotOffset-r16                 CHOICE {
    refSCS15kHz                       INTEGER (-2..2),
    refSCS30KHz                        INTEGER (-5..5),
    refSCS60KHz                        INTEGER (-10..10),
    refSCS120KHz                       INTEGER (-20..20)
  }                                               OPTIONAL,-- Cond AsyncCA
  channelAccessConfig-r16                            SetupRelease { ChannelAccessConfig-r16 }
OPTIONAL,   -- Need M
  intraCellGuardBandsDL-List-r16                          SEQUENCE (SIZE (1..maxSCSs)) OF
IntraCellGuardBandsPerSCS-r16                                   OPTIONAL,   -- Need S
  intraCellGuardBandsUL-List-r16                          SEQUENCE (SIZE (1..maxSCSs)) OF
IntraCellGuardBandsPerSCS-r16                                   OPTIONAL,   -- Need S
  csi-RS-ValidationWith-DCI-r16                                       ENUMERATED {enabled}
OPTIONAL,   -- Need R
  lte-CRS-PatternList1-r16                           SetupRelease { LTE-CRS-PatternList-r16 }
OPTIONAL,   -- Need M
  lte-CRS-PatternList2-r16                           SetupRelease { LTE-CRS-PatternList-r16 }
OPTIONAL,   -- Need M
  crs-RateMatch-PerCORESETPoolIndex-r16                               ENUMERATED {enabled}
OPTIONAL,   -- Need R
  enableTwoDefaultTCI-States-r16                                      ENUMERATED {enabled}
OPTIONAL,   -- Need R
  enableDefaultTCI-StatePerCoresetPoolIndex-r16                       ENUMERATED {enabled}
OPTIONAL,   -- Need R
  enableBeamSwitchTiming-r16                         ENUMERATED {true}              OPTIONAL,
  -- Need R
  cbg-TxDiffTBsProcessingType1-r16                                    ENUMERATED {enabled}
OPTIONAL,   -- Need R
  cbg-TxDiffTBsProcessingType2-r16                                    ENUMERATED {enabled}
OPTIONAL   -- Need R
  ]]
}
```

TABLE 18

```
            - RateMatchPatternLTE-CRS
The IE RateMatchPatternLTE-CRS is used to configure a pattern to
rate match around LTE CRS. See TS 38.214 [19], clause 5.1.4.2.
                      RateMatchPatternLTE-CRS information element
-- ASN1START
-- TAG-RATEMATCHPATTERNLTE-CRS-START
RateMatchPatternLTE-CRS ::=           SEQUENCE {
  carrierFreqDL                     INTEGER (0..16383),
  carrierBandwidthDL                  ENUMERATED {n6, n15, n25, n50, n75, n100,
spare2, spare1},
  mbsfn-SubframeConfigList                EUTRA-MBSFN-SubframeConfigList
OPTIONAL,   -- Need M
  nrofCRS-Ports                     ENUMERATED {n1, n2, n4},
  v-Shift                         ENUMERATED {n0, n1, n2, n3, n4, n5}
}
LTE-CRS-PatternList-r16 ::=           SEQUENCE (SIZE (1..maxLTE-CRS-Patterns-
r16)) OF RateMatchPatternLTE-CRS
-- TAG-RATEMATCHPATTERNLTE-CRS-STOP
-- ASN1STOP
```

TABLE 18-continued

| RateMatchPatternLTE-CRS field descriptions |
|---|
| carrierBandwidthDL<br>BW of the LTE carrier in number of PRBs (see TS 38.214, clause 5.1.4.2).<br>carrierFreqDL<br>Center of the LTE carrier (see TS 38.214, clause 5.1.4.2).<br>mbsfn-SubframeConfigList<br>LTE MBSFN subframe configuration (see TS 38.214 , clause 5.1.4.2).<br>nrofCRS-Ports<br>Number of LTE CRS antenna port to rate-match around (see TS 38.214, clause 5.1.4.2).<br>v-Shift<br>Shifting value v-shift in LTE to rate match around LTE CRS (see TS 38.214, clause 5.1.4.2). |

[PDSCH: Regarding Frequency Resource Allocation]

Figure 13:
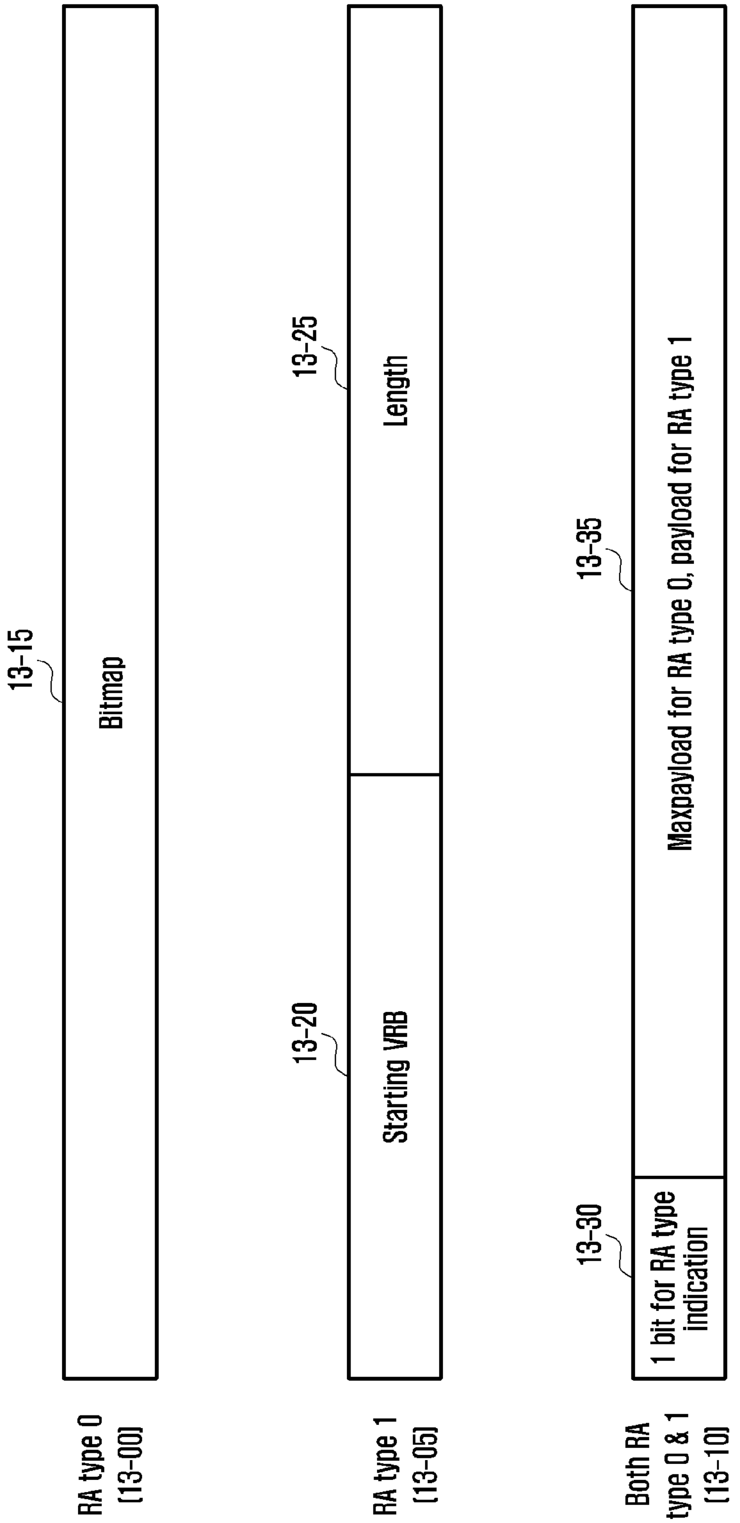
FIG. 13 illustrates an example of frequency domain resource allocation with regard to a PDSCH in a wireless communication system according to an embodiment of the present disclosure.

FIG. 13 illustrates an example of frequency domain resource allocation with regard to a physical downlink shared channel (PDSCH) in a wireless communication system according to an embodiment of the present disclosure.

FIG. 13 illustrates three frequency domain resource allocation methods of type 0 13-00, type 1 13-05, and dynamic switch 13-10 which can be configured through a higher layer in an NR wireless communication system.

Referring to FIG. 13, in the case 13-00 in which a UE is configured to use only resource type 0 through higher layer signaling, partial downlink control information (DCI) for allocating a PDSCH to the UE include a bitmap including NRBG bits. The condition for this will be described later. As used herein, NRBG refers to the number of resource block groups (RBGs) determined according to the BWP size allocated by a BWP indicator and higher layer parameter rbg-Size, as in Table 19 below, and data is transmitted in RBGs indicated as "1" by the bitmap.

TABLE 19

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

In the case 13-05 in which the UE is configured to use only resource type 1 through higher layer signaling, partial DCI includes frequency domain resource allocation information including $$\lceil \log_2(N_{RB}^{DL,BWP}(N_{RB}^{DL,BWP}+1)/2\rceil$$

bits. The condition for this will be described later. The base station may thereby configure a starting VRB 13-20 and the length 13-25 of a frequency domain resource allocated continuously therefrom.

In the case 13-10 in which the UE is configured to use both resource type 0 and resource type 1 through higher layer signaling, partial DCI for allocating a PDSCH to the corresponding UE includes frequency domain resource allocation information including as many bits as the larger value 13-35 between the payload 13-15 for configuring resource type 0 and the payload 13-20 and 13-25 for configuring resource type 1. The condition for this will be described later. One bit may be added to the foremost part (MSB) of the frequency domain resource allocation information inside the DCI. If the bit has the value of "0," use of resource type 0 may be indicated, and if the bit has the value of "1," use of resource type 1 may be indicated.

[PDSCH/PUSCH: Regarding Time Resource Allocation]

Hereinafter, a time domain resource allocation method regarding a data channel in a next-generation mobile communication system (5G or NR system) will be described.

A base station may configure table regarding time domain resource allocation information regarding a physical downlink shared channel (PDSCH) and a physical uplink shared channel (PUSCH) for a UE through higher layer signaling (for example, RRC signaling). A table including a maximum of maxNrofDL-Allocations=16 entries may be configured for the PDSCH, and a table including a maximum of maxNrof UL-Allocations=16 entries may be configured for the PUSCH. In an embodiment, the time domain resource allocation information may include PDCCH-to-PDSCH slot timing (corresponding to a slot-unit time interval between a timepoint at which a PDCCH is received and a timepoint at which a PDSCH scheduled by the received PDCCH is transmitted; labeled K0), PDCCH-to-PUSCH slot timing (corresponding to a slot-unit time interval between a timepoint at which a PDCCH is received and a timepoint at which a PUSCH scheduled by the received PDCCH is transmitted; labeled K2), information regarding the location and length of the start symbol by which a PDSCH or PUSCH is scheduled inside a slot, the mapping type of a PDSCH or PUSCH, and the like. For example, information such as in Table 20 or Table 21 below may be transmitted from the base station to the UE.

TABLE 20

PDSCH-TimeDomainResourceAllocationList information element

```
PDSCH-TimeDomainResourceAllocationList ::=   SEQUENCE (SIZE(1..maxNrofDL-Allocations)) OF PDSCH-
TimeDomainResourceAllocation
PDSCH-TimeDomainResourceAllocation ::=   SEQUENCE {
k0                                                                  INTEGER(0..32)
OPTIONAL,    -- Need S
   mappingType                          ENUMERATED {typeA, typeB},
   startSymbolAndLength                 INTEGER (0..127)
}
```

TABLE 21

| PUSCH-TimeDomainResourceAllocation information element |
|---|
| PUSCH-TimeDomainResourceAllocationList ::= SEQUENCE (SIZE(1..maxNrofUL-Allocations)) OF PUSCH-TimeDomainResourceAllocation<br>PUSCH-TimeDomainResourceAllocation ::= SEQUENCE {<br>k2 INTEGER(0..32)<br>OPTIONAL, -- Need S<br>mappingType ENUMERATED {typeA, typeB},<br>startSymbolAndLength INTEGER (0..127)<br>} |

The base station may notify the UF of one of the entries of the table regarding time domain resource allocation information described above through L1 signaling (for example, DCI) (for example, "time domain resource allocation" field inside DCI may indicate the same). The UE may acquire time domain resource allocation information regarding a PDSCH or PUSCH, based on the DCI acquired from the base station.

Figure 14:
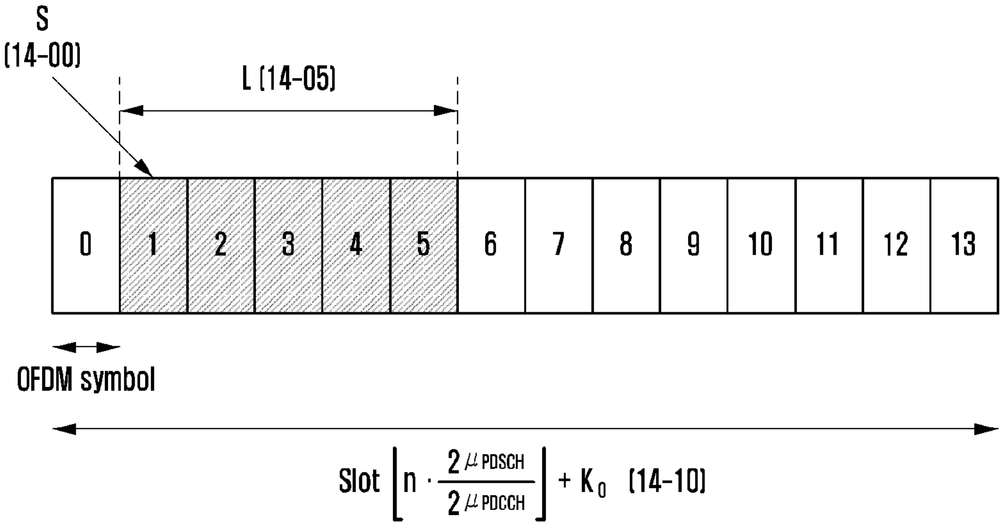
FIG. 14 illustrates an example of time domain resource allocation with regard to a PDSCH in a wireless communication system according to an embodiment of the present disclosure.

FIG. 14 illustrates an example of time domain resource allocation with regard to a PDSCH in a wireless communication system according to an embodiment of the present disclosure.

Referring to FIG. 14, the UE may indicate the time domain location of a PDSCH resource according to the subcarrier spacing (SCS)($\mu_{PDSCH}$, $\mu_{PDCCH}$) of a data channel and a control channel configured by using a higher layer, the scheduling offset (K0) value, and the start location 14-00 and length 14-05 of an OFDM symbol inside one slot dynamically indicated through DCI.

Figure 15:
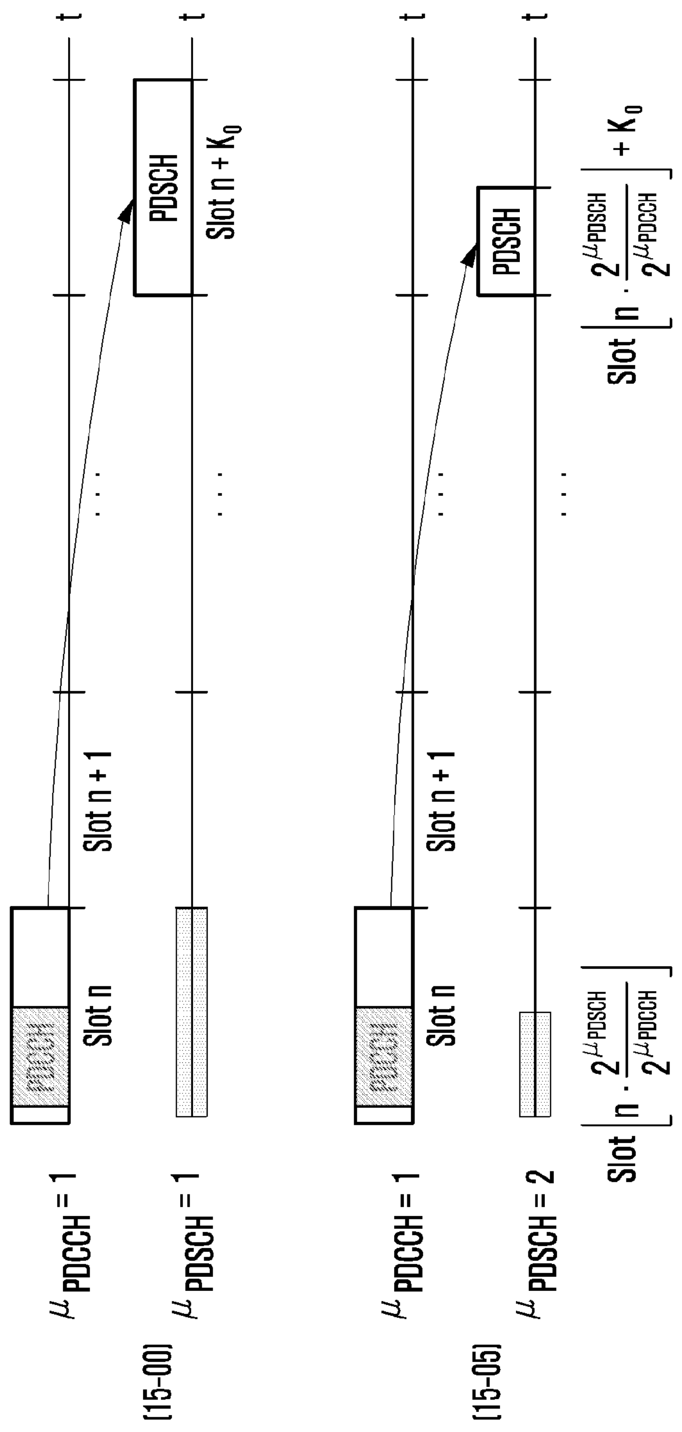
FIG. 15 illustrates an example of time domain resource allocation according to a subcarrier spacing with regard to a data channel and a control channel in a wireless communication system according to an embodiment of the present disclosure.

FIG. 15 illustrates an example of time domain resource allocation according to a subcarrier spacing with regard to a data channel and a control channel in a wireless communication system according to an embodiment of the present disclosure.

Referring to FIG. 15, if the data channel and the control channel have the same subcarrier spacing 15-00 ($\mu_{PDSCH}=\mu_{PDCCH}$), the slot number for data and that for control are identical, and the base station and the UE may accordingly generate a scheduling offset in conformity with a predetermined slot offset K0. On the other hand, if the data channel and the control channel have different subcarrier spacings 15-05 ($\mu_{PDSCH}\neq\mu_{PDCCH}$), the slot number for data and that for control are different, and the base station and the UE may accordingly generate a scheduling offset in conformity with a predetermined slot offset K0 with reference to the subcarrier spacing of the PDCCH.

[PDSCH: Processing Time]

Next, a PDSCH processing time (PDSCH processing procedure time) will be described. When the base station schedules the UE to transmit a PDSCH by using DCI format 1_0, 1_1 or 1_2, the UE may need a PDSCH processing time for receiving a PDSCH by applying a transmission method (modulation/demodulation and coding indication index (MCS), demodulation reference signal-related information, time and frequency resource allocation information, and the like) indicated through DCI. The PDSCH processing time has been defined in NR in view thereof. The PDSCH processing time of the UE may follow [Equation 3] given below:

$$T_{proc,1}=(N_1+d_{1,1}+d_2)(2048+144)\kappa 2^{-\mu}T_c+T_{ext} \quad \text{[Equation 3]}$$

Each parameter in $T_{proc,1}$ described above in Equation 3 may have the following meaning:

$N_1$: the number of symbols determined according to UE processing capability 1 or 2 based on the UE's capability and numerology μ. May have a value in [Table 22] if UE processing capability 1 is reported according to the UE's capability report, and may have a value in [Table 23] if UE processing capability 2 is reported, and if availability of UE processing capability 2 is configured through higher layer signaling. The numerology μ may correspond to the minimum value among $\mu_{PDCCH}$, $\mu_{PDSCH}$, $\mu_{UL}$ so as to maximize $T_{proc,1}$, and $\mu_{PDCCH}$, $\mu_{PDSCH}$, $\mu_{UL}$ may refer to the numerology of a PDCCH that scheduled a PDSCH, the numerology of the scheduled PDSCH, and numerology of an uplink channel in which a HARQ-ACK is to be transmitted.

TABLE 22

PDSCH processing time in the case of PDSCH processing capability 1

| μ | PDSCH decoding time $N_1$ [symbols]<br>If PDSCH mapping type A and B both correspond to dmrs-AdditionalPosition = pos0 inside DMRS-DownlinkConfig which is higher layer signaling | If PDSCH mapping type A and B both do not correspond to dmrs-AdditionalPosition = pos0 inside DMRS-DownlinkConfig which is higher layer signaling, or if no higher layer parameter is configured |
|---|---|---|
| 0 | 8 | $N_{1,0}$ |
| 1 | 10 | 13 |
| 2 | 17 | 20 |
| 3 | 20 | 24 |

TABLE 23

PDSCH processing time in the case of PDSCH processing capability 2

| μ | PDSCH decoding time $N_1$ [symbols]<br>If PDSCH mapping type A and B both correspond to dmrs-AdditionalPosition = pos0 inside DMRS-DownlinkConfig which is higher layer signaling |
|---|---|
| 0 | 3 |
| 1 | 4.5 |
| 2 | 9 for frequency range 1 |

κ: 64.

$T_{ext}$: if the UE uses a shared spectrum channel access scheme, the UE may calculate Text and apply the same to the PDSCH processing time. Otherwise, Text is assumed to be 0.

If $1_1$ which represents the PDSCH DMRS location value is 12, N1,0 in [table 22] above has the value of 14, and otherwise has the value of 13.

With regard to PDSCH mapping type A, if the last symbol of the PDSCH is the ith symbol in the slot in which the PDSCH is transmitted, and if i<7, d1,1 is then 7-i, and $d_{1,1}$ is otherwise 0.

$d_2$: if a PUCCH having a high priority index temporally overlaps another PUCCH or a PUSCH having a low priority index, $d_2$ of the PUCCH having a high priority index may be configured as a value reported from the UE. Otherwise, $d_2$ is 0.

If PDSCH mapping type B is used with regard to UE processing capability 1, the $d_{1,1}$ value may be determined by the number (L) of symbols of a scheduled PDSCH and the number of overlapping symbols between the PDCCH that schedules the PDSCH and the scheduled PDSCH, as follows:

If L≥7, then $d_{1,1}=0$.

If −L≥4 and L≤6, then $d_{1,1}=7-L$.

If L=3, then $d_{1,1}=\min(d, 1)$.

If L=2, then $d_{1,1}=3+d$.

If PDSCH mapping type B is used with regard to UE processing capability 2, the d1,1 value may be determined by the number (L) of symbols of a scheduled PDSCH and the number of overlapping symbols between the PDCCH that schedules the PDSCH and the scheduled PDSCH, as follows:

If L≥7, then $d_{1,1}=0$.

If—L≥4 and L≤6, then $d_{1,1}=7-L$.

If L=2,

If the scheduling PDCCH exists inside a CORESET including three symbols, and if the CORESET and the scheduled PDSCH have the same start symbol, then $d_{1,1}=3$.

Otherwise, $d_{1,1}=d$.

In the case of a UE supporting capability 2 inside a given serving cell, the PDSCH processing time based on UE processing capability 2 may be applied by the UE if processingType2Enabled (higher layer signaling) is configured as "enable" with regard to the corresponding cell.

If the location of the first uplink transmission symbol of a PUCCH including HARQ-ACK information (in connection with the corresponding location, K1 defined as the HARQ-ACK transmission timepoint, a PUCCH resource used to transmit the HARQ-ACK, and the timing advance effect may be considered) does not start earlier than the first uplink transmission symbol that comes after the last symbol of the PDSCH over a time of $T_{proc,1}$, the UE needs to transmit a valid HARQ-ACK message. That is, the UE needs to transmit a PUCCH including a HARQ-ACK only if the PDSCH processing time is sufficient. The UE cannot otherwise provide the base station with valid HARQ-ACK information corresponding to the scheduled PDSCH. The Tproc,1 may be used in the case of either a normal or an expanded CP. In the case of a PDSCH having two PDSCH transmission locations configured inside one slot, d1,1 is calculated with reference to the first PDSCH transmission location inside the corresponding slot.

[PDSCH: Reception Preparation Time During Cross-Carrier Scheduling]

Next, in the case of cross-carrier scheduling in which the numerology ($\mu_{PDCCH}$) by which a scheduling PDCCH is transmitted and the numerology ($\mu_{PDSCH}$) by which a PDSCH scheduled by the corresponding PDCCH is transmitted are different from each other, the PDSCH reception reparation time ($N_{pdsch}$) of the UE defined with regard to the time interval between the PDCCH and PDSCH will be described.

If $\mu_{PDCCH}<\mu_{PDSCH}$, the scheduled PDSCH cannot be transmitted before the first symbol of the slot coming after $N_{pdsch}$ symbols from the last symbol of the PDCCH that scheduled the corresponding PDSCH. The transmission symbol of the corresponding PDSCH may include a DM-RS.

If $\mu_{PDCCH}>\mu_{PDSCH}$, the scheduled PDSCH may be transmitted after $N_{pdsch}$ symbols from the last symbol of the PDCCH that scheduled the corresponding PDSCH. The transmission symbol of the corresponding PDSCH may include a DM-RS.

TABLE 24

| $N_{pdsch}$ based on scheduled PDCCH subcarrier spacing | |
|---|---|
| $\mu_{PDCCH}$ | $N_{pdsch}$ [symbols] |
| 0 | 4 |
| 1 | 5 |
| 2 | 10 |
| 3 | 14 |

[PDSCH: TCI State Activation MAC-CE]

Figure 16:
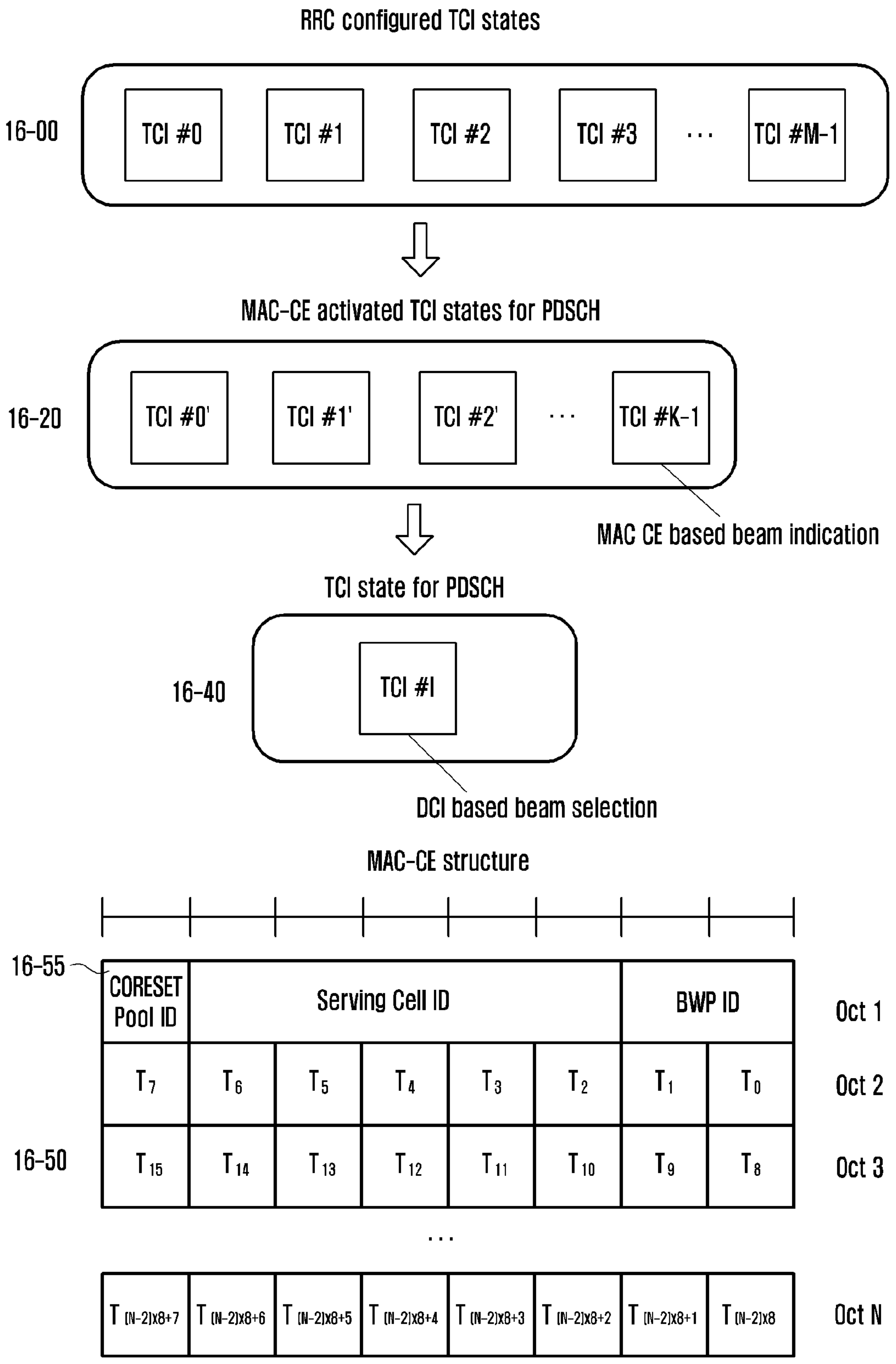
FIG. 16 illustrates a process for beam configuration and activation with regard to a PDSCH according to an embodiment of the present disclosure.

Next, a beam configuration method regarding a PDSCH will be described. FIG. 16 illustrates a process for beam configuration and activation with regard to a PDSCH. A list of TCI states regarding a PDSCH may be indicated through a higher layer list such as RRC (16-00). The list of TCI states may be indicated by tci-StatesToAddModList and/or tci-StatesToReleaseList inside a BWP-specific PDSCH-Config IE, for example. Next, a part of the list of TCI states may be activated through a MAC-CE (16-20). The maximum number of activated TCI states may be determined by the capability reported by the UE. Reference numeral 16-50 illustrates an example of MAC-CE structure for PDSCH TCI state activation/deactivation.

The meaning of respective fields inside the MAC CE and values configurable for respective fields are as follows:

Serving Cell ID: This field indicates the identity of the Serving Cell for which the MAC CE applies. The length of the field is 5 bits. If the indicated Serving Cell is configured as part of a simultaneousTCI-UpdateList1 or simultaneousTCI-UpdateList2 as specified in TS 38.331, this MAC CE applies to all the Serving Cells configured in the set simultaneousTCI-UpdateList1 or simultaneousTCI-UpdateList2, respectively;

BWP ID: This field indicates a DL BWP for which the MAC CE applies as the codepoint of the DCI bandwidth part indicator field as specified in TS 38.212. The length of the BWP ID field is 2 bits. This field is ignored if this MAC CE applies to a set of Serving Cells;

$T_i$ (TCI state ID): If there is a TCI state with TCI-StateId i as specified in TS 38.331, this field indicates the activation/deactivation status of the TCI state with TCI-StateId i, otherwise MAC entity shall ignore the Ti field. The Ti field is set to 1 to indicate that the TCI state with TCI-StateId i shall be activated and mapped to the codepoint of the DCI Transmission Configuration -continued

| |
|---|
| Indication field, as specified in TS 38.214. The Ti field is set to 0 to indicate that the TCI state with TCI-StateId i shall be deactivated and is not mapped to the codepoint of the DCI Transmission Configuration Indication field. The codepoint to which the TCI State is mapped is determined by its ordinal position among all the TCI States with Ti field set to 1, i.e., the first TCI State with $T_i$ field set to 1 shall be mapped to the codepoint value 0, second TCI State with Ti field set to 1 shall be mapped to the codepoint value 1 and so on. The maximum number of activated TCI states is 8; |
| CORESET Pool ID: This field indicates that mapping between the activated TCI states and the codepoint of the DCI Transmission Configuration Indication set by field Ti is specific to the ControlResourceSetId configured with CORESET Pool ID as specified in TS 38.331. This field set to 1 indicates that this MAC CE shall be applied for the DL transmission scheduled by CORESET with the CORESET pool ID equal to 1, otherwise, this MAC CE shall be applied for the DL transmission scheduled by CORESET pool ID equal to 0. If the coresetPoolIndex is not configured for any CORESET, MAC entity shall ignore the CORESET Pool ID field in this MAC CE when receiving the MAC CE. If the Serving Cell in the MAC CE is configured in a cell list that contains more than one Serving Cell, the CORESET Pool ID field shall be ignored when receiving the MAC CE. |

[PUSCH: Regarding Transmission Scheme]

Next, a PUSCH transmission scheduling scheme will be described. PUSCH transmission may be dynamically scheduled by a UL grant inside DCI, or operated by means of configured grant Type 1 or Type 2. Dynamic scheduling indication regarding PUSCH transmission can be made by DCI format 0_0 or 0_1.

Configured grant Type 1 PUSCH transmission may be configured semi-statically by receiving configuredGrantConfig including rrc-ConfiguredUplinkGrant in [Table 25] through higher layer signaling, without receiving a UL grant inside DCI. Configured grant Type 2 PUSCH transmission may be scheduled semi-persistently by a UL grant inside DCI after receiving configuredGrantConfig not including rrc-ConfiguredUplinkGrant in [Table 25] through higher layer signaling. If PUSCH transmission is operated by a configured grant, parameters applied to the PUSCH transmission are applied through configuredGrantConfig (higher layer signaling) in [Table 25] except for dataScramblingIdentityPUSCH, txConfig, codebookSubset, maxRank, and scaling of UCI-OnPUSCH, which are provided by pusch-Config in [Table 26], which is higher layer signaling. If provided with transformPrecoder inside configuredGrantConfig (higher layer signaling) in [Table 25], the UE applies tp-pi2BPSK inside pusch-Config in [Table 26] to PUSCH transmission operated by a configured grant.

TABLE 25

```
ConfiguredGrantConfig ::=  SEQUENCE {
  frequencyHopping  ENUMERATED {intraSlot, interSlot}
OPTIONAL,  -- Need S,
  cg-DMRS-Configuration  DMRS-UplinkConfig,
  mcs-Table  ENUMERATED {qam256, qam64LowSE}
OPTIONAL,  -- Need S
  mcs-TableTransformPrecoder  ENUMERATED {qam256, qam64LowSE}
OPTIONAL,  -- Need S
  uci-OnPUSCH  SetupRelease { CG-UCI-OnPUSCH }
OPTIONAL,  -- Need M
  resourceAllocation  ENUMERATED { resourceAllocationType0,
resourceAllocationType1, dynamicSwitch },
  rbg-Size  ENUMERATED {config2}          OPTIONAL,  -- Need S
  powerControlLoopToUse  ENUMERATED {n0, n1},
  p0-PUSCH-Alpha  P0-PUSCH-AlphaSetId,
  transformPrecoder  ENUMERATED { enabled, disabled }
OPTIONAL,  -- Need S
  nrofHARQ-Processes  INTEGER(1..16),
  repK  ENUMERATED {n1, n2, n4, n8},
  repK-RV  ENUMERATED {s1-0231, s2-0303, s3-0000}
OPTIONAL,  -- Need R
  periodicity  ENUMERATED {
      sym2, sym7, sym1x14, sym2x14, sym4x14, sym5x14, sym8x14,
sym10x14, sym16x14, sym20x14,
      sym32x14, sym40x14, sym64x14, sym80x14, sym128x14, sym160x14,
sym256x14, sym320x14, sym512x14,
      sym640x14, sym1024x14, sym1280x14, sym2560x14, sym5120x14,
      sym6, sym1x12, sym2x12, sym4x12, sym5x12, sym8x12, sym10x12,
sym16x12, sym20x12, sym32x12,
      sym40x12, sym64x12, sym80x12, sym128x12, sym160x12,
sym256x12, sym320x12, sym512x12, sym640x12,
      sym1280x12, sym2560x12
  },
```

TABLE 25-continued

```
  configuredGrantTimer   INTEGER (1..64)              OPTIONAL,   -- Need R
  rrc-ConfiguredUplinkGrant   SEQUENCE {
    timeDomainOffset   INTEGER (0..5119),
    timeDomainAllocation   INTEGER (0..15),
    frequencyDomainAllocation   BIT STRING (SIZE(18)),
    antennaPort   INTEGER (0..31),
    dmrs-SeqInitialization   INTEGER (0..1)      OPTIONAL,   -- Need R
    precodingAndNumberOfLayers   INTEGER (0..63),
    srs-ResourceIndicator   INTEGER (0..15)        OPTIONAL,   -- Need R
    mcsAndTBS   INTEGER (0..31),
    frequencyHoppingOffset   INTEGER (1..maxNrofPhysicalResourceBlocks-1)
OPTIONAL,   -- Need R
    pathlossReferenceIndex   INTEGER (0..maxNrofPUSCH-
PathlossReferenceRSs-1),
    ...
  }                                   OPTIONAL, -- Need R
  ...
}
```

Next, a PUSCH transmission method will be described. The DMRS antenna port for PUSCH transmission is identical to an antenna port for SRS transmission. PUSCH transmission may follow a codebook-based transmission method and a non-codebook-based transmission method according to whether the value of txConfig inside pusch-Config in [Table 26], which is higher layer signaling, is “codebook” or “nonCodebook.”

As described above, PUSCH transmission may be dynamically scheduled through DCI format 0_0 or 0_1, and may be semi-statically configured by a configured grant. Upon receiving indication of scheduling regarding PUSCH transmission through DCI format 0_0, the UE perform beam configuration for PUSCH transmission by using pucch-spatialRelationInfoID corresponding to a UE-specific PUCCH resource corresponding to the minimum ID inside an activated uplink BWP inside a serving cell, and the PUSCH transmission is based on a single antenna port. The UE does not expect scheduling regarding PUSCH transmission through DCI format 0_0 inside a BWP having no configured PUCCH resource including pucch-spatialRelationInfo. If the UE has no configured txConfig inside pusch-Config in [Table 26], the UE does not expect scheduling through DCI format 0_1.

TABLE 26

```
PUSCH-Config ::=   SEQUENCE {
  dataScramblingIdentityPUSCH   INTEGER (0..1023)            OPTIONAL,
-- Need S
  txConfig   ENUMERATED {codebook, nonCodebook}
OPTIONAL,   -- Need S
  dmrs-UplinkForPUSCH-MappingTypeA   SetupRelease { DMRS-UplinkConfig }
OPTIONAL,   -- Need M
  dmrs-UplinkForPUSCH-MappingTypeB   SetupRelease { DMRS-UplinkConfig }
OPTIONAL,   -- Need M
  pusch-PowerControl                OPTIONAL, -- Need M
  frequencyHopping   ENUMERATED {intraSlot, interSlot}
OPTIONAL,   -- Need S
  frequencyHoppingOffsetLists   SEQUENCE (SIZE (1..4)) OF INTEGER (1..
maxNrofPhysicalResourceBlocks-1)
                                    OPTIONAL, --Need M
  resourceAllocation   ENUMERATED { resourceAllocation Type0,
resourceAllocationType1, dynamicSwitch},
  pusch-TimeDomainAllocationList   SetupRelease { PUSCH-
TimeDomainResourceAllocationList }   OPTIONAL,   -- Need M
  pusch-AggregationFactor   ENUMERATED { n2, n4, n8 }
OPTIONAL,   -- Need S
  mcs-Table   ENUMERATED {qam256, qam64LowSE}
OPTIONAL,   -- Need S
  mcs-TableTransformPrecoder   ENUMERATED {qam256, qam64LowSE}
OPTIONAL,   -- Need S
  transformPrecoder   ENUMERATED {enabled, disabled}
OPTIONAL,   -- Need S
  codebookSubset   ENUMERATED {fullyAndPartialAndNonCoherent,
partialAndNonCoherent, nonCoherent}
                                  OPTIONAL, -- Cond codebookBased
  maxRank   INTEGER (1..4)                  OPTIONAL, -- Cond
codebookBased
  rbg-Size   ENUMERATED { config2}     OPTIONAL, -- Need S
  uci-OnPUSCH   SetupRelease { UCI-OnPUSCH}            OPTIONAL, --
Need M
  tp-pi2BPSK   ENUMERATED {enabled}                  OPTIONAL, -- Need S
  ...
}
```

Next, codebook-based PUSCH transmission will be described. The codebook-based PUSCH transmission may be dynamically scheduled through DCI format 0_0 or 0_1, and may be operated semi-statically by a configured grant. If a codebook-based PUSCH is dynamically scheduled through DCI format 0_1 or configured semi-statically by a configured grant, the UE determine a precoder for PUSCH transmission, based on an SRS resource indicator (SRI), a transmission precoding matrix indicator (TPMI), and a transmission rank (the number of PUSCH transmission layers).

The SRI may be given through the SRS resource indicator (a field inside DCI) or configured through srs-ResourceIndicator (higher layer signaling). During codebook-based PUSCH transmission, the UE has at least one SRS resource configured therefor, and may have a maximum of two SRS resources configured therefor. If the UE is provided with an SRI through DCI, the SRS resource indicated by the SRI refers to the SRS resource corresponding to the SRI among SRS resources transmitted prior to the PDCCH including the SRI. In addition, the TPMI and the transmission rank may be given through "precoding information and number of layers" (a field inside DCI) or configured through precodingAndNumberOfLayers (higher layer signaling). The TPMI is used to indicate a precoder applied to PUSCH transmission. If one SRS resource is configured for the UE, the TPMI is used to indicate a precoder to be applied in the configured SRS resource. If multiple SRS resources are configured for the UE, the TPMI is used to indicate a precoder to be applied in an SRS resource indicated through the SRI.

The precoder to be used for PUSCH transmission is selected from an uplink codebook having the same number of antenna ports as the value of nrofSRS-Ports inside SRS-Config (higher layer signaling). In connection with codebook-based PUSCH transmission, the UE determines a codebook subset, based on codebookSubset inside pusch-Config (higher layer signaling) and TPMI. The codebookSubset inside pusch-Config (higher layer signaling) may be configured to be one of "fullyAndPartialAndNonCoherent," "partialAndNonCoherent," or "noncoherent," based on UE capability reported by the UE to the base station. If the UE reported "partialAndNonCoherent" as UE capability, the UE does not expect that the value of codebookSubset (higher layer signaling) will be configured as "fullyAndPartialAndNonCoherent." In addition, if the UE reported "nonCoherent" as UE capability, UE does not expect that the value of codebookSubset (higher layer signaling) will be configured as "fullyAndPartialAndNonCoherent" or "partialAndNonCoherent." If nrofSRS-Ports inside SRS-ResourceSet (higher layer signaling) indicates two SRS antenna ports, UE does not expect that the value of codebookSubset (higher layer signaling) will be configured as "partialAndNonCoherent."

The UE may have one SRS resource set configured therefor, wherein the value of usage inside SRS-ResourceSet (higher layer signaling) is "codebook," and one SRS resource may be indicated through an SRI inside the SRS resource set. If multiple SRS resources are configured inside the SRS resource set wherein the value of usage inside SRS-ResourceSet (higher layer signaling) is "codebook," the UE expects that the value of nrofSRS-Ports inside SRS-Resource (higher layer signaling) is identical with regard to all SRS resources.

The UE transmit, to the base station, one or multiple SRS resources included in the SRS resource set wherein the value of usage is configured as "codebook" according to higher layer signaling, and the base station selects one from the SRS resources transmitted by the UE and instructs the UE to transmit a PUSCH by using transmission beam information of the corresponding SRS resource. In connection with the codebook-based PUSCH transmission, the SRI is used as information for selecting the index of one SRS resource, and is included in DCI. Additionally, the base station adds information indicating the rank and TPMI to be used by the UE for PUSCH transmission to the DCI. By using the SRS resource indicated by the SRI, the UE applies the precoder indicated by the rank and TPMI indicated based on the transmission beam of the corresponding SRS resource, thereby performing PUSCH transmission.

Next, non-codebook-based PUSCH transmission will be described. The non-codebook-based PUSCH transmission may be dynamically scheduled through DCI format 0_0 or 0_1, and may be operated semi-statically by a configured grant. If at least one SRS resource is configured inside an SRS resource set wherein the value of usage inside SRS-ResourceSet (higher layer signaling) is "nonCodebook," non-codebook-based PUSCH transmission may be scheduled for the UE through DCI format 0_1.

With regard to the SRS resource set wherein the value of usage inside SRS-ResourceSet (higher layer signaling) is "nonCodebook," one connected NZP CSI-RS resource (non-zero power CSI-RS) may be configured for the UE. The UE may calculate a precoder for SRS transmission by measuring the NZP CSI-RS resource connected to the SRS resource set. If the difference between the last received symbol of an aperiodic NZP CSI-RS resource connected to the SRS resource set and the first symbol of aperiodic SRS transmission in the UE is less than 42 symbols, the UE does not expect that information regarding the precoder for SRS transmission will be updated.

If the configured value of resourceType inside SRS-ResourceSet (higher layer signaling) is "aperiodic," the connected NZP CSI-RS is indicated by an SRS request which is a field inside DCI format 0_1 or 1_1. If the connected NZP CSI-RS resource is an aperiodic NZP CSI-RS resource, the existence of the connected NZP CSI-RS is indicated with regard to the case in which the value of SRS request (a field inside DCI format 0_1 or 1_1) is not "00." The corresponding DCI may not indicate cross carrier or cross BWP scheduling. In addition, if the value of SRS request indicates the existence of a NZP CSI-RS, the NZP CSI-RS is positioned in the slot used to transmit the PDCCH including the SRS request field. In this case, TCI states configured for the scheduled subcarrier are not configured as QCL-TypeD.

If there is a periodic or semi-persistent SRS resource set configured, the connected NZP CSI-RS may be indicated through associated CSI-RS inside SRS-ResourceSet (higher layer signaling). With regard to non-codebook-based transmission, the UE does not expect that spatialRelationInfo which is higher layer signaling regarding the SRS resource and associated CSI-RS inside SRS-ResourceSet (higher layer signaling) will be configured together.

If multiple SRS resources are configured for the UE, the UE may determine a precoder to be applied to PUSCH transmission and the transmission rank, based on an SRI indicated by the base station. The SRI may be indicated through the SRS resource indicator (a field inside DCI) or configured through srs-ResourceIndicator (higher layer signaling). Similarly to the above-described codebook-based PUSCH transmission, if the UE is provided with the SRI through DCI, the SRS resource indicated by the corresponding SRI refers to the SRS resource corresponding to the SRI, among SRS resources transmitted prior to the PDCCH including the corresponding SRI. The UE may use one or multiple SRS resources for SRS transmission, and the maximum number of SRS resources that can be transmitted simultaneously in the same symbol inside one SRS resource set and the maximum number of SRS resources are determined by UE capability reported to the base station by the UE. SRS resources simultaneously transmitted by the UE occupy the same RB. The UE configures one SRS port for each SRS resource. There may be only one configured SRS resource set wherein the value of usage inside SRS-ResourceSet (higher layer signaling) is "nonCodebook," and a maximum of four SRS resources can be configured for non-codebook-based PUSCH transmission.

The base station transmits one NZP-CSI-RS connected to the SRS resource set to the UE, and the UE calculates the precoder to be used when transmitting one or multiple SRS resources inside the corresponding SRS resource set, based on the result of measurement when the corresponding NZP-CSI-RS is received. The UE applies the calculated precoder when transmitting, to the base station, one or multiple SRS resources inside the SRS resource set wherein the configured usage is "nonCodebook," and the base station selects one or multiple SRS resources from the received one or multiple SRS resources. In connection with the non-codebook-based PUSCH transmission, the SRI indicates an index that may express one SRS resource or a combination of multiple SRS resources, and the SRI is included in DCI. The number of SRS resources indicated by the SRI transmitted by the base station may be the number of transmission layers of the PUSCH, and the UE transmits the PUSCH by applying the precoder applied to SRS resource transmission to each layer.

[PUSCH: Preparation Procedure Time]

Next, a PUSCH preparation procedure time will be described. If a base station schedules a UE so as to transmit a PUSCH by using DCI format 0_0, 0_1, or 0_2, the UE may require a PUSCH preparation procedure time such that a PUSCH is transmitted by applying a transmission method (SRS resource transmission precoding method, the number of transmission layers, spatial domain transmission filter) indicated through DCI. The PUSCH preparation procedure time is defined in NR in view thereof. The PUSCH preparation procedure time of the UE may follow [Equation 4] given below:

[Equation 4]

$$T_{proc,2} = \max((N_2 + d_{2,1} + d_2)(2048 + 144)\kappa 2^{-\mu} T_c + T_{ext} + T_{switch}, d_{2,2})$$

Each parameter in $T_{proc,2}$ described above in Equation 4 may have the following meaning:

$N_2$: the number of symbols determined according to UE processing capability 1 or 2, based on the UE's capability, and numerology μ. May have a value in [Table 27] if UE processing capability 1 is reported according to the UE's capability report, and may have a value in [Table 28] if UE processing capability 2 is reported, and if availability of UE processing capability 2 is configured through higher layer signaling.

TABLE 27

| μ | PUSCH preparation time $N_2$ [symbols] |
|---|---|
| 0 | 10 |
| 1 | 12 |
| 2 | 23 |
| 3 | 36 |

TABLE 28

| μ | PUSCH preparation time $N_2$ [symbols] |
|---|---|
| 0 | 5 |
| 1 | 5.5 |
| 2 | 11 for frequency range 1 |

$d_{2,1}$: the number of symbols determined to be 0 if all resource elements of the first OFDM symbol of PUSCH transmission include DM-RSs, and to b1 otherwise.

κ: 64.

μ: follows a value, among $\mu_{DL}$ and $\mu_{UL}$, which makes $T_{proc,2}$ larger. $\mu_{DL}$ refers to the numerology of a downlink used to transmit a PDCCH including DCI that schedules a PUSCH, and $\mu_{UL}$ refers to the numerology of an uplink used to transmit a PUSCH.

$T_c$: has $1/(\Delta f_{max} \cdot N_f)$, $\Delta f_{max}=480 \cdot 10^3$ Hz, $N_f=4096$ $d_{2,2}$: follows a BWP switching time if DCI that schedules a PUSCH indicates BWP switching, and has 0 otherwise.

$d_2$: if OFDM symbols overlap temporally between a PUSCH having a high priority index and a PUCCH having a low priority index, the $d_2$ value of the PUSCH having a high priority index is used. Otherwise, $d_2$ is 0.

$T_{ext}$: if the UE uses a shared spectrum channel access scheme, the UE may calculate $T_{ext}$ and apply the same to a PUSCH preparation procedure time. Otherwise, $T_{ext}$ is assumed to be 0.

$T_{switch}$: if an uplink switching spacing has been triggered, Twitch is assumed to be the switching spacing time. Otherwise, $T_{switch}$ is assumed to be 0.

The base station and the UE determine that the PUSCH preparation procedure time is insufficient if the first symbol of a PUSCH starts earlier than the first uplink symbol in which a CP starts after $T_{proc,2}$ from the last symbol of a PDCCH including DCI that schedules the PUSCH, in view of the influence of timing advance between the uplink and the downlink and time domain resource mapping information of the PUSCH scheduled through the DCI. Otherwise, the base station and the UE determine that the PUSCH preparation procedure time is sufficient. The UE may transmit the PUSCH only if the PUSCH preparation procedure time is sufficient, and may ignore the DCI that schedules the PUSCH if the PUSCH preparation procedure time is insufficient.

[PUSCH: Regarding Repeated Transmission]

Hereinafter, repeated transmission of an uplink data channel in a 5G system will be described in detail. A 5G system supports two types of methods for repeatedly transmitting an uplink data channel, PUSCH repeated transmission type A and PUSCH repeated transmission type B. One of PUSCH repeated transmission type A and type B may be configured for a UE through higher layer signaling.

PUSCH repeated transmission type A

As described above, the symbol length of an uplink data channel and the location of the start symbol may be determined by a time domain resource allocation method in one slot, and a base station may notify a UE of the number of repeated transmissions through higher layer signaling (for example, RRC signaling) or L1 signaling (for example, DCI).

Based on the number of repeated transmissions received from the base station, the UE repeatedly transmit an uplink data channel having the same length and start symbol as the configured uplink data channel, in a continuous slot. If the base station configured a slot as a downlink for the UE, or if at least one of symbols of the uplink data channel configured for the UE is configured as a downlink, the UE omits uplink data channel transmission, but counts the number of repeated transmissions of the uplink data channel.

PUSCH Repeated Transmission Type B

As described above, the start symbol and length of an uplink data channel may be determined by a time domain resource allocation method in one slot, and the base station may notify the UE of the number of repeated transmissions (numberofrepetitions) through higher layer signaling (for example, RRC signaling) or L1 signaling (for example, DCI).

The nominal repetition of the uplink data channel is determined as follows, based on the previously configured start symbol and length of the uplink data channel. The slot in which the nth nominal repetition starts is given by $$K_s + \left\lfloor \frac{S + n \cdot L}{N_{symb}^{slot}} \right\rfloor,$$

and the symbol starting in that slot is given by $$\mathrm{mod}\left(S + n \cdot L, N_{symb}^{slot}\right).$$

The slot in which the nth nominal repetition ends is given by $$K_s + \left\lfloor \frac{S + (n+1) \cdot L - 1}{N_{symb}^{slot}} \right\rfloor,$$

and the symbol ending in that slot is given by $$\mathrm{mod}\ \left(S + (n+1) \cdot L - 1, N_{symb}^{slot}\right).$$

In this regard, n=0, . . . , numberofrepetitions-1, S refers to the start symbol of the configured uplink data channel, and L refers to the symbol length of the configured uplink data channel. $K_s$ refers to the slot in which PUSCH transmission starts, and $$N_{symb}^{slot}$$

refers to the number of symbols per slot.

The UE determines an invalid symbol for PUSCH repeated transmission type B. A symbol configured as a downlink by tdd-UL-DL-ConfigurationCommon or tdd-UL-DL-ConfigurationDedicated is determined as the invalid symbol for PUSCH repeated transmission type B. Additionally, the invalid symbol may be configured in a higher layer parameter (for example, InvalidSymbolPattern). The higher layer parameter (for example, InvalidSymbolPattern) may provide a symbol level bitmap across one or two slots, thereby configuring the invalid-symbol. In the bitmap, 1 represents the invalid symbol. Additionally, the cycle and pattern of the bitmap may be configured through the higher layer parameter (for example, InvalidSymbolPattern). If a higher layer parameter (for example, InvalidSymbolPattern) is configured, and if parameter InvalidSymbolPatternIndicator-ForDCIFormat0_1 or InvalidSymbolPatternIndicator-ForDCIFormat0_2 indicates 1, the UE applies an invalid symbol pattern, and if the above parameter indicates 0, the UE does not apply the invalid symbol pattern. If a higher layer parameter (for example, InvalidSymbolPattern) is configured, and if parameter InvalidSymbolPatternIndicator-ForDCIFormat0_1 or InvalidSymbolPattemIndicator-ForDCIFormat0_2 is not configured, the UE applies the invalid symbol pattern.

After an invalid symbol is determined, the UE may consider, with regard to each nominal repetition, that symbols other than the invalid symbol are valid symbols. If one or more valid symbols are included in each nominal repetition, the nominal repetition may include one or more actual repetitions. Each actual repetition includes a set of consecutive valid symbols available for PUSCH repeated transmission type B in one slot.

Figure 17:
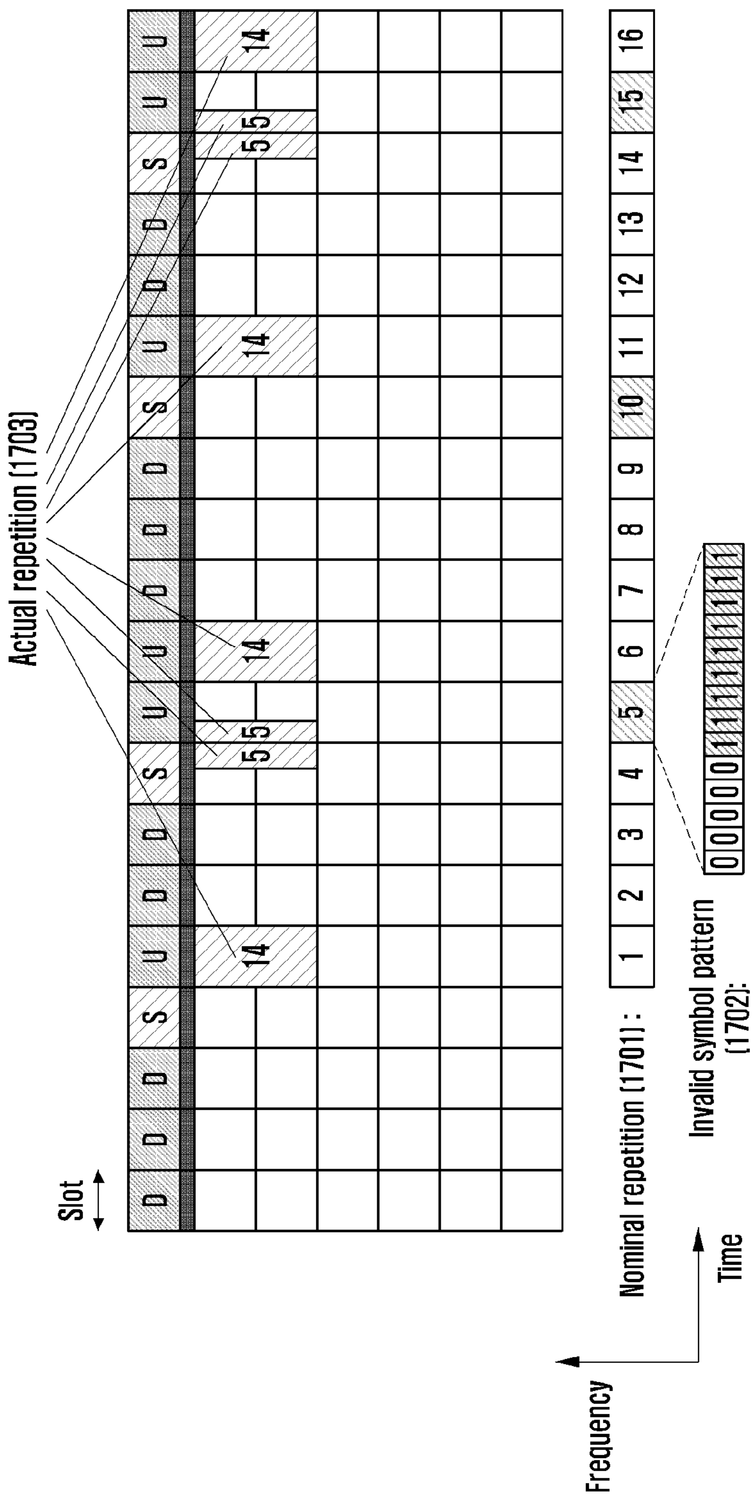
FIG. 17 illustrates an example of PUSCH repeated transmission type B in a wireless communication system according to an embodiment of the present disclosure.

FIG. 17 illustrates an example of PUSCH repeated transmission type B in a wireless communication system according to an embodiment of the present disclosure. The UE may receive the following configurations: the start symbol S of an uplink data channel is 0, the length L of the uplink data channel is 14, and the number of repeated transmissions is 16. In this case, nominal repetitions appear in 16 consecutive slots (1701). Thereafter, the UE may determine that the symbol configured as a downlink symbol in each nominal repetition is an invalid symbol. In addition, the UE determines that symbols configured as 1 in the invalid symbol pattern 1702 are invalid symbols. If valid symbols other than invalid symbols in respective nominal repetitions constitute one or more consecutive symbols in one slot, they are configured and transmitted as actual repetitions (1703).

In addition, with regard to PUSCH repeated transmission, additional methods may be defined in NR Release 16 with regard to UL grant-based PUSCH transmission and configured grant-based PUSCH transmission, across slot boundaries, as follows:

Method 1 (mini-slot level repetition): through one UL grant, two or more PUSCH repeated transmissions are scheduled inside one slot or across the boundary of consecutive slots. In addition, in connection with method 1, time domain resource allocation information inside DCI indicates resources of the first repeated transmission. In addition, time domain resource information of remaining repeated transmissions may be determined according to time domain resource information of the first repeated transmission, and the uplink or downlink direction determined with regard to each symbol of each slot. Each repeated transmission occupies consecutive symbols.

Method 2 (multi-segment transmission): through one UL grant, two or more PUSCH repeated transmissions are scheduled in consecutive slots. Transmission no. 1 is designated with regard to each slot, and the start point or repetition length may differ between respective transmission. In addition, in method 2, time domain resource allocation information inside DCI indicates the start point and repetition length of all repeated transmissions. In addition, when performing repeated transmissions inside a single slot through method 2, if there are multiple bundles of consecutive uplink symbols in the corresponding slot, respective repeated transmissions are performed with regard to respective uplink symbol bundles. If there is a single bundle of consecutive uplink symbols in the corresponding slot, PUSCH repeated transmission is performed once according to the method of NR Release 15.

Method 3: two or more PUSCH repeated transmissions are scheduled in consecutive slots through two or more UL grants. Transmission no. 1 is designated with regard to each slot, and the nth UL grant may be received before PUSCH transmission scheduled by the (n−1)th UL grant is over.

Method 4: through one UL grant or one configured grant, one or multiple PUSCH repeated transmissions inside a single slot, or two or more PUSCH repeated transmissions across the boundary of consecutive slots may be supported. The number of repetitions indicated to the UE by the base station is only a nominal value, and the UE may actually perform a larger number of PUSCH repeated transmissions than the nominal number of repetitions. Time domain resource allocation information inside DCI or configured grant indicates resources of the first repeated transmission indicated by the base station. Time domain resource information of remaining repeated transmissions may be determined with reference to resource information of the first repeated transmission and the uplink or downlink direction of symbols. If time domain resource information of a repeated transmission indicated by the base station spans a slot boundary or includes an uplink/downlink switching point, the corresponding repeated transmission may be divided into multiple repeated transmissions. One repeated transmission may be included in one slot with regard to each uplink period.

[PUSCH: Frequency Hopping Process]

Hereinafter, frequency hopping of a physical uplink shared channel (PUSCH) in a 5G system will be described in detail.

5G supports two kinds of PUSCH frequency hopping methods with regard to each PUSCH repeated transmission type. In PUSCH repeated transmission type A, intra-slot frequency hopping and inter-slot frequency hopping are supported, and in PUSCH repeated transmission type B, inter-repetition frequency hopping and inter-slot frequency hopping are supported.

According to the inter-slot frequency hopping method supported in PUSCH repeated transmission type A, a UE transmits allocated resources in the frequency domain, after changing the same by a configured frequency offset, by two hops in one slot. The start RB of each hop in connection with intra-slot frequency hopping may be expressed by Equation 5 below:

$$RB_{start} = \begin{cases} RB_{start} & i = 0 \\ (RB_{start} + RB_{offset}) \bmod N_{BWP}^{size} & i = 1 \end{cases} \quad \text{[Equation 5]}$$

In Equation 5, i=0 and i=1 indicate the first and second hops, respectively, and $RB_{start}$ represents the start RB in a UL BWP and is calculated from a frequency resource allocation method. $B_{offset}$ indicates a frequency offset between two hops through a higher layer parameter. The number of symbols of the first hop may be $$\lfloor N_{symb}^{PUSCH,s}/2 \rfloor,$$

and number of symbols of the second hop may be $$N_{symb}^{PUSCH,s} - \lfloor N_{symb}^{PUSCH,s}/2 \rfloor. \; N_{symb}^{PUSCH,s}$$

represents the number of OFDM symbols, which corresponds to the length of PUSCH transmission in one slot.

Next, according to the inter-slot frequency hopping method supported in PUSCH repeated transmission types A and B, the UE transmits allocated resources in the frequency domain, after changing the same by a configured frequency offset, in each slot. The start RB during $$n_s^\mu$$

slots in connection with inter-slot frequency hopping may be expressed by Equation 6 below:

$$RB_{start}(n_s^\mu) = \begin{cases} RB_{start} & n_s^\mu \bmod 2 = 0 \\ (RB_{start} + RB_{offset}) \bmod N_{BWP}^{size} & n_s^\mu \bmod 2 = 1 \end{cases}. \quad \text{[Equation 6]}$$

In Equation 6, $$n_s^\mu$$

refers to the current slot number during multi-slot PUSCH transmission, and $RB_{start}$ refers to the start RB inside a UL BWP and is calculated from a frequency resource allocation method. $RB_{offset}$ refers to a frequency offset between two hops through a higher layer parameter.

Next, according to the inter-repetition frequency hopping method supported in PUSCH repeated transmission type B, resources allocated in the frequency domain regarding one or multiple actual repetitions in each nominal repetition are moved by a configured frequency offset and then transmitted. The index RBstart(n) of the start RB in the frequency domain regarding one or multiple actual repetitions in the nth nominal repetition may follow Equation 7 given below:

$$RB_{start}(n) = \begin{cases} RB_{start} & n \bmod 2 = 0 \\ (RB_{start} + RB_{offset}) \bmod N_{BWP}^{size} & n \bmod 2 = 1 \end{cases} \quad \text{[Equation 7]}$$

In Equation 7, n refers to the index of nominal repetition, and $RB_{offset}$ refers to an RB offset between two hops through a higher layer parameter.

[Regarding UE Capability Report]

In LTE and NR, a UE may perform a procedure in which, while being connected to a serving base station, the UE reports capability supported by the UE to the corresponding base station. This will be referred to as a UE capability report in the following description.

The base station may transfer a UE capability enquiry message to the UE in a connected state so as to request a capability report. The message may include a UE capability request with regard to each radio access technology (RAT) type of the base station. The RAT type-specific request may include supported frequency band combination information and the like. In addition, in the case of the UE capability enquiry message, UE capability with regard to multiple RAT types may be requested through one RRC message container transmitted by the base station, or the base station may transfer a UE capability enquiry message including multiple UE capability requests with regard to respective RAT types. That is, multiple capability enquiries may be included in one message, and may configure a UE capability information message corresponding thereto and report the same multiple times. In next-generation mobile communication systems, a UE capability request may be made regarding multi-RAT dual connectivity (MR-DC), such as NR, LTE, E-UTRA—NR dual connectivity (EN-DC). In addition, the UE capability enquiry message is transmitted initially after the UE is connected to the base station, in general, but may be requested in any condition if needed by the base station.

Upon receiving the UE capability report request from the base station in the above step, the UE configures UE capability according to band information and RAT type required by the base station. The method in which the UE configures UE capability in an NR system is summarized below:

1. If the UE receives a list regarding LTE and/or NR bands from the base station at a UE capability request, the UE constructs band combinations (BCs) regarding EN-DC and NR standalone (SA). That is, the UE configures a candidate list of BCs regarding EN-DC and NR SA, based on bands received from the base station at a request through FreqBandList. In addition, bands have priority in the order described in FreqBandList;
2. If the base station has set "eutra-nr-only" flag or "eutra" flag and requested a UE capability report, the UE removes everything related to NR SA BCs from the configured BC candidate list. Such an operation may occur only if an LTE base station (eNB) requests "eutra" capability;
3. The UE then remove fallback BCs from the BC candidate list configured in the above step. As used herein, a fallback BC refers to a BC that can be obtained by removing a band corresponding to at least one SCell from a specific BC, and since a BC before removal of the band corresponding to at least one SCell can already cover a fallback BC, the same can be omitted. This step is applied in MR-DC as well, that is, LTE bands are also applied. BCs remaining after this step constitute the final "candidate BC list";
4. The UE selects BCs appropriate for the requested RAT type from the final "candidate BC list" and selects BCs to report. In this step, the UE configures supportedBandCombinationList in a determined order. That is, the UE configures BCs and UE capability to report according to a preconfigured rat-Type order (nr→eutra-nr→eutra). In addition, the UE configures featureSetCombination regarding the configured supportedBandCombinationList and configures a list of "candidate feature set combinations" from a candidate BC list from which a list regarding fallback BCs (including capability of the same or lower step) is removed. The "candidate feature set combinations" include all feature set combinations regarding NR and EUTRA-NR BCs, and are obtainable from feature set combinations of containers of UE-NR-Capabilities and UE-MRDC-Capabilities; and
5. In addition, if the requested RAT type is eutra-nr and has an influence, featureSetCombinations is included on both containers of UE-MRDC-Capabilities and UE-NR-Capabilities. However, the feature set of NR is included only in UE-NR-Capabilities.

After the UE capability is configured, the UE transfers a UE capability information message including the UE capability to the base station. The base stations performs scheduling and transmission/reception management appropriate for the UE, based on the UE capability received from the UE.

[Regarding CA/DC]

Figure 18:
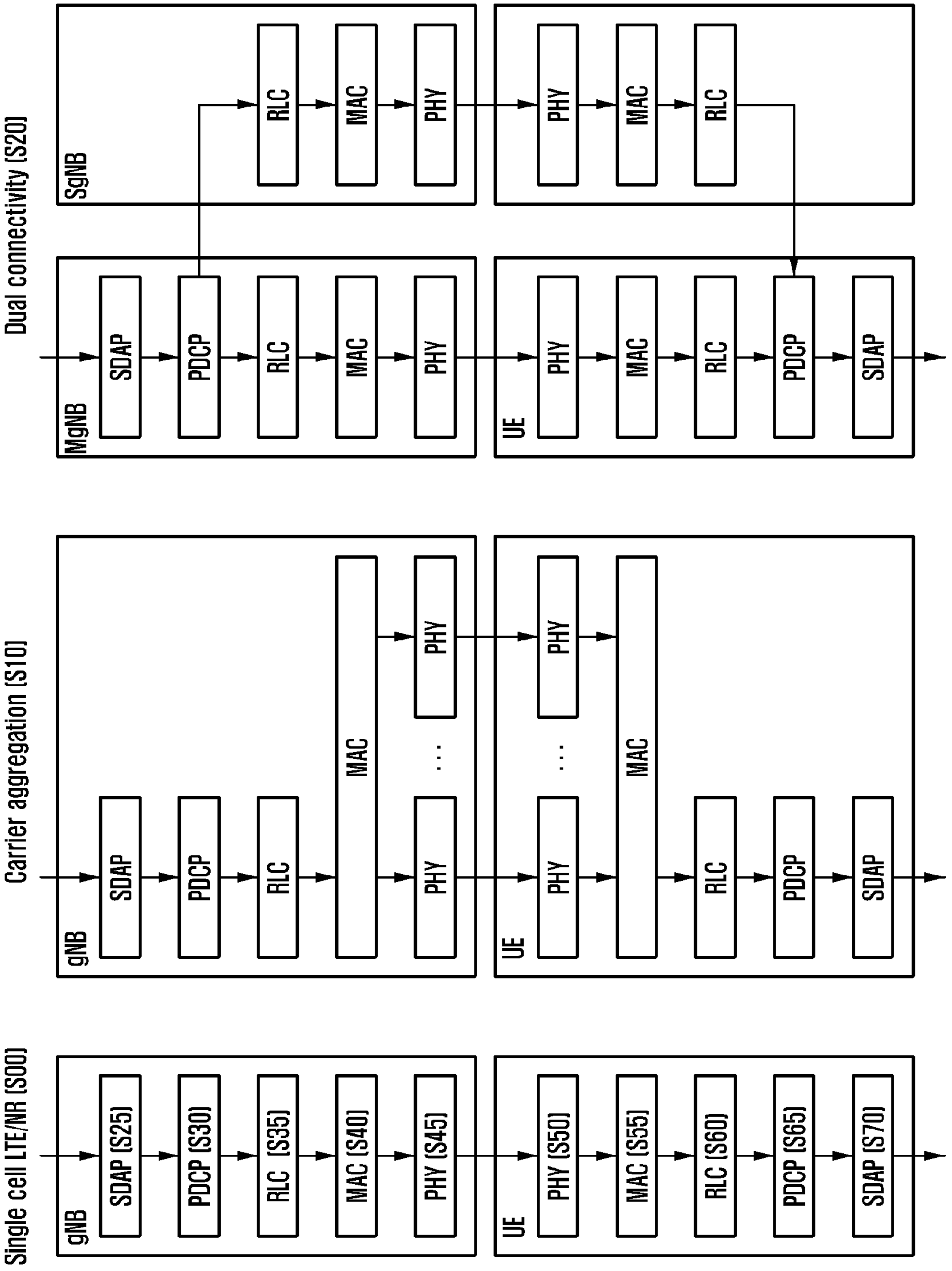
FIG. 18 illustrates radio protocol structures of a base station and a UE in single cell, carrier aggregation, and dual connectivity situations in a wireless communication system according to an embodiment of the present disclosure.

FIG. 18 illustrates radio protocol structures of a base station and a UE in single cell, carrier aggregation, and dual connectivity situations according to an embodiment of the present disclosure.

Referring to FIG. 18, the radio protocol of a next-generation mobile communication system includes NR service data adaptation protocols (SDAPs) S25 and S70, NR packet data convergence protocols (PDCPs) S30 and S65, NR radio link controls (RLCs) S35 and S60, and NR medium access controls (MACs) S40 and S55, on UE and NR base stations sides, respectively.

Major functions of the NR SDAPs S25 and S70 may include some of the following functions:

- transfer of user plane data;
- mapping between a QoS flow and a DRB for both DL and UL;
- marking QoS flow ID in both DL and UL packets; and
- reflective QoS flow to DRB mapping for the UL SDAP PDUs.

With regard to the SDAP layer device, the UE may be configured, through an RRC message, whether to use the header of the SDAP layer device with regard to each PDCP layer device or with regard to each bearer or with regard to each logical channel, or whether to use functions of the SDAP layer device. If an SDAP header is configured, the NAS QoS reflection configuration 1-bit indicator (NAS reflective QoS) of the SDAP header and the AS QoS reflection configuration 1-bit indicator (AS reflective QoS) thereof may be indicated such that the UE can update or reconfigure mapping information regarding the QoS flow and data bearer of the uplink and downlink. The SDAP header may include QoS flow ID information indicating the QoS. The QoS information may be used as data processing priority for providing efficient services, scheduling information, or the like.

Major functions of the NR PDCPs S30 and S65 may include some of the following functions:

- Header compression and decompression: ROHC only;
- Transfer ofuser data;
- In-sequence delivery of upper layer PDUs;
- Out-of-sequence delivery of upper layer PDUs;
- PDCP PDU reordering for reception;
- Duplicate detection of lower layer SDUs;
- Retransmission of PDCP SDUs;
- Ciphering and deciphering; and
- Timer-based SDU discard in uplink.

The above-mentioned reordering function of the NR PDCP device refers to a function of reordering PDCP PDUs received from a lower layer in an order based on the PDCP sequence number (SN), and may include a function of transferring data to an upper layer in the reordered sequence. Alternatively, the reordering function of the NR PDCP device may include a function of instantly transferring data without considering the order, may include a function of recording PDCP PDUs lost as a result of reordering, may include a function of reporting the state of the lost PDCP PDUs to the transmitting side, and may include a function of requesting retransmission of the lost PDCP PDUs.

Major functions of the NR RLCs S35 and S60 may include some of the following functions:

Transfer of upper layer PDUs;
In-sequence delivery of upper layer PDUs;
Out-of-sequence delivery of upper layer PDUs;
Error Correction through ARQ;
Concatenation, segmentation and reassembly of RLC SDUs;
Re-segmentation of RLC data PDUs;
Reordering of RLC data PDUs;
Duplicate detection;
Protocol error detection;
RLC SDU discard; and
(RLC re-establishment.

The above-mentioned in-sequence delivery function of the NR RLC device refers to a function of successively delivering RLC SDUs received from the lower layer to the upper layer. The in-sequence delivery function of the NR RLC device may include a function of reassembling and delivering multiple RLC SDUs received, into which one original RLC SDU has been segmented, may include a function of reordering the received RLC PDUs with reference to the RLC sequence number (SN) or PDCP sequence number (SN), may include a function of recording RLC PDUs lost as a result of reordering, may include a function of reporting the state of the lost RLC PDUs to the transmitting side, and may include a function of requesting retransmission of the lost RLC PDUs. The in-sequence delivery function of the NR RLC device may include a function of, if there is a lost RLC SDU, successively delivering only RLC SDUs before the lost RLC SDU to the upper layer, and may include a function of, if a predetermined timer has expired although there is a lost RLC SDU, successively delivering all RLC SDUs received before the timer was started to the upper layer. Alternatively, the in-sequence delivery function of the NR RLC device may include a function of, if a predetermined timer has expired although there is a lost RLC SDU, successively delivering all currently received RLC SDUs to the upper layer. In addition, the RLC PDUs may be processed in the received order (regardless of the sequence number order, in the order of arrival) and delivered to the PDCP device regardless of the order (out-of-sequence delivery). In the case of segments, segments which are stored in a buffer, or which are to be received later, may be received, reconfigured into one complete RLC PDU, processed, and delivered to the PDCP device. The NR RLC layer may include no concatenation function, which may be performed in the NR MAC layer or replaced with a multiplexing function of the NR MAC layer.

The out-of-sequence delivery function of the NR RLC device refers to a function of instantly delivering RLC SDUs received from the lower layer to the upper layer regardless of the order, may include a function of reassembling and delivering multiple RLC SDUs received, into which one original RLC SDU has been segmented, and may include a function of storing the RLC SN or PDCP SN of received RLC PDUs, and recording RLC PDUs lost as a result of reordering.

The NR MACs S40 and S55 may be connected to multiple NR RLC layer devices configured in one UE, and major functions of the NR MACs may include some of the following functions:

Mapping between logical channels and transport channels;
Multiplexing/demultiplexing of MAC SDUs;
Scheduling information reporting;
Error correction through HARQ;
Priority handling between logical channels of one UE;
Priority handling between UEs by means of dynamic scheduling;
MBMS service identification;
Transport format selection; and
Padding.

The NR PHY layers S45 and S50 may perform operations of channel-coding and modulating upper layer data, thereby obtaining OFDM symbols, and delivering the same through a radio channel, or demodulating OFDM symbols received through the radio channel, channel-decoding the same, and delivering the same to the upper layer.

The detailed structure of the radio protocol structure may be variously changed according to the carrier (or cell) operating scheme. As an example, assuming that the base station transmits data to the UE based on a single carrier (or cell), the base station and the UE use a protocol structure having a single structure with regard to each layer, such as S00. On the other hand, assuming that the base station transmits data to the UE based on carrier aggregation (CA) which uses multiple carriers in a single TRP, the base station and the UE use a protocol structure which has a single structure up to the RLC, such as S10, but multiplexes the PHY layer through a MAC layer. As another example, assuming that the base station transmits data to the UE based on dual connectivity (DC) which uses multiple carriers in multiple TRPs, the base station and the UE use a protocol structure which has a single structure up to the RLC, such as S20, but multiplexes the PHY layer through a MAC layer.

[Regarding SRS]

Next, an uplink channel estimation method using sounding reference signal (SRS) transmission of a UE will be described. The base station may configure at least one SRS configuration with regard to each uplink BWP in order to transfer configuration information for SRS transmission to the UE, and may also configure as least one SRS resource set with regard to each SRS configuration. As an example, the base station and the UE may exchange higher layer signaling information as follows, in order to transfer information regarding the SRS resource set.

srs-ResourceSetId: SRS resource set index.
srs-ResourceIdList: a set of SRS resource indices referred to by SRS resource sets.
resourceType: time domain transmission configuration of SRS resources referred to by SRS resource sets, and may be configured as one of "periodic," "semi-persistent," and "aperiodic." If configured as "periodic" or "semi-persistent," associated CSI-RS information may be provided according to the place of use of SRS resource sets. If configured as "aperiodic," an aperiodic SRS resource trigger list/slot offset information may be provided, and associated CSI-RS information may be provided according to the place of use of SRS resource sets.
usage: a configuration regarding the place of use of SRS resources referred to by SRS resource sets, and may be configured as one of "beamManagement," "codebook," "nonCodebook," and "antennaSwitching."

alpha, p0, pathlossReferenceRS, srs-PowerControlAdjustmentStates: provides a parameter configuration for adjusting the transmission power of SRS resources referred to by SRS resource sets.

The UE may understand that an SRS resource included in a set of SRS resource indices referred to by an SRS resource set follows the information configured for the SRS resource set.

In addition, the base station and the UE may transmit/receive higher layer signaling information in order to transfer individual configuration information regarding SRS resources. As an example, the individual configuration information regarding SRS resources may include time-frequency domain mapping information inside slotsof the SRS resources, and this may include information regarding intra-slot or inter-slot frequency hopping of the SRS resources. In addition, the individual configuration information regarding SRS resources may include time domain transmission configuration of SRS resources, and may be configured as one of "periodic," "semi-persistent," and "aperiodic." This may be limited to have the same time domain transmission configuration as the SRS resource set including the SRS resources. If the time domain transmission configuration of SRS resources is configured as "periodic" or "semi-persistent," the time domain transmission configuration may further include an SRS resource transmission cycle and a slot offset (for example, periodicityAndOffset).

The base station may activate or deactivate or trigger SRS transmission by the UE through higher layer signaling including RRC signaling or MAC CE signaling, or L1 signaling (for example, DCI). For example, the base station may activate or deactivate periodic SRS transmission by the UE through higher layer signaling. The base station may indicate activation of an SRS resource set having resourceType configured as "periodic" through higher layer signaling, and the UE may transmit the SRS resource referred to by the activated SRS resource set. Intra-slot time-frequency domain resource mapping of the transmitted SRS resource follows resource mapping information configured for the SRS resource, and slot mapping, including the transmission cycle and slot offset, follows periodicityAndOffset configured for the SRS resource. In addition, the spatial domain transmission filter applied to the transmitted SRS resource may refer to spatial relation info configured for the SRS resource, or may refer to associated CSI-RS configured for the SRS resource set including the SRS resource. The UE may transmit the SRS resource inside the uplink BWP activated with regard to the periodic SRS resource activated through higher layer signaling.

For example, the base station may activate or deactivate semi-persistent SRS transmission by the UE through higher layer signaling. The base station may indicate activation of an SRS resource set through MAC CE signaling, and the UE may transmit the SRS resource referred to by the activated SRS resource set. The SRS resource set activated through MAC CE signaling may be limited to an SRS resource set having resourceType configured as "semi-persistent." Intra-slot time-frequency domain resource mapping of the transmitted SRS resource follows resource mapping information configured for the SRS resource, and slot mapping, including the transmission cycle and slot offset, follows periodicityAndOffset configured for the SRS resource. In addition, the spatial domain transmission filter applied to the transmitted SRS resource may refer to spatial relation info configured for the SRS resource, or may refer to associated CSI-RS configured for the SRS resource set including the SRS resource. If the SRS resource has spatial relation info configured therefor, the spatial domain transmission filter may be determined, without following the same, by referring to configuration information regarding spatial relation info transferred through MAC CE signaling that activates semi-persistent SRS transmission. The UE may transmit the SRS resource inside the uplink BWP activated with regard to the semi-persistent SRS resource activated through higher layer signaling.

For example, the base station may trigger aperiodic SRS transmission by the UE through DCI. The base station may indicate one of aperiodic SRS triggers (aperiodicSRS-ResourceTrigger) through the SRS request field of DCI. The UE may understand that the SRS resource set including the aperiodic SRS resource trigger indicated through DCI in the aperiodic SRS resource trigger list, among configuration information of the SRS resource set, has been triggered. The UE may transmit the SRS resource referred to by the triggered SRS resource set. Intra-slot time-frequency domain resource mapping of the transmitted SRS resource follows resource mapping information configured for the SRS resource. In addition, slot mapping of the transmitted SRS resource may be determined by the slot offset between the SRS resource and a PDCCH including DCI, and this may refer to value(s) included in the slot offset set configured for the SRS resource set. Specifically, as the slot offset between the SRS resource and the PDCCH including DCI, a value indicated in the time domain resource assignment field of DCI, among offset value(s) included in the slot offset set configured for the SRS resource set, may be applied. In addition, the spatial domain transmission filter applied to the transmitted SRS resource may refer to spatial relation info configured for the SRS resource, or may refer to associated CSI-RS configured for the SRS resource set including the SRS resource. The UE may transmit the SRS resource inside the uplink BWP activated with regard to the aperiodic SRS resource triggered through DCI.

When the base station triggers aperiodic SRS transmission by the UE through DCI, a minimum time interval may be necessary between the transmitted SRS and the PDCCH including the DCI that triggers aperiodic SRS transmission, in order for the UE to transmit the SRS by applying configuration information regarding the SRS resource. The time interval for SRS transmission by the UE may be defined as the number of symbols between the last symbol of the PDCCH including the DCI that triggers aperiodic SRS transmission and the first symbol mapped to the first transmitted SRS resource among transmitted SRS resource(s). The minimum time interval may be determined with reference to the PUSCH preparation procedure time needed by the UE to prepare PUSCH transmission. In addition, the minimum time interval may have a different value depending on the place of use of the SRS resource set including the transmitted SRS resource. For example, the minimum time interval may be determined as N2 symbols defined in view of UE processing capability that follows the UE's capability with reference to the UE's PUSCH preparation procedure time. In addition, if the place of use of the SRS resource set is configured as "codebook" or "antennaSwitching" in view of the place of use of the SRS resource set including the transmitted SRS resource, the minimum time interval may be determined as N2 symbols, and if the place of use of the SRS resource set is configured as "nonCodebook" or "beamManagement," the minimum time interval may be determined as N2+14 symbols. The UE may transmit an aperiodic SRS if the time interval for aperiodic SRS transmission is larger than or equal to the minimum time interval, and may ignore the DCI that triggers the aperiodic SRS if the time interval for aperiodic SRS transmission is smaller than the minimum time interval.

TABLE 29

```
SRS-Resource ::=   SEQUENCE {
   srs-ResourceId   ,
   nrofSRS-Ports   ENUMERATED {port1, ports2, ports4},
   ptrs-PortIndex   ENUMERATED {n0, n1 }       OPTIONAL,   -- Need R
   transmissionComb   CHOICE {
      n2   SEQUENCE {
         combOffset-n2   INTEGER (0..1),
         cyclicShift-n2   INTEGER (0..7)
      },
      n4   SEQUENCE {
         combOffset-n4   INTEGER (0..3),
         cyclicShift-n4   INTEGER (0..11)
      }
   },
   resourceMapping   SEQUENCE {
      startPosition   INTEGER (0..5),
      nrofSymbols   ENUMERATED {n1, n2, n4},
      repetitionFactor   ENUMERATED {n1, n2, n4}
   },
   freqDomainPosition   INTEGER (0..67),
   freqDomainShift   INTEGER (0..268),
   freqHopping   SEQUENCE {
      c-SRS   INTEGER (0..63),
      b-SRS   INTEGER (0..3),
      b-hop   INTEGER (0..3)
   },
   groupOrSequenceHopping   ENUMERATED { neither, groupHopping,
sequenceHopping },
   resourceType   CHOICE {
      aperiodic   SEQUENCE {
         ...
      },
      semi-persistent   SEQUENCE {
         periodicityAndOffset-sp   SRS-PeriodicityAndOffset,
         ...
   },
      periodic   SEQUENCE {
         periodicityAndOffset-p   SRS-PeriodicityAndOffset,
         ...
      }
   },
   sequenceId   INTEGER (0..1023),
   spatialRelationInfo   SRS-SpatialRelationInfo            OPTIONAL,   -- Need R
   ...,
         [[
         resourceMapping-r16   SEQUENCE {
            startPosition-r16   INTEGER (0..13),
            nrofSymbols-r16   ENUMERATED {n1, n2, n4},
            repetitionFactor-r16   ENUMERATED {n1, n2, n4}
         } OPTIONAL -- Need R
         ]],
         [[
         spatialRelationInfo-PDC-r17   SetupRelease { SpatialRelationInfo-PDC-
r17 } OPTIONAL, -- Need M
         resourceMapping-r17   SEQUENCE {
            startPosition-r17 INTEGER (0..13),
            nrofSymbols-r17 ENUMERATED {n1, n2, n4, n8, n10, n12, n14},
            repetitionFactor-r17 ENUMERATED {n1, n2, n4, n5, n6, n7, n8, n10,
n12, n14}
         } OPTIONAL, -- Need R
         partialFreqSounding-r17   SEQUENCE {
            startRBIndexFScaling-r17   CHOICE{
               startRBIndexAndFreqScalingFactor2-r17 INTEGER (0..1),
               startRBIndexAndFreqScalingFactor4-r17 INTEGER (0..3)
         },
         enableStartRBHopping-r17 ENUMERATED {enable} OPTIONAL -- Need R
         } OPTIONAL, -- Need R
         transmissionComb-n8-r17 SEQUENCE {
            combOffset-n8-r17 INTEGER (0..7),
            cyclicShift-n8-r17 INTEGER (0..5)
         } OPTIONAL, -- Need R
         srs-TCIState-r17 CHOICE {
            srs-UL-TCIState-r17 TCI-UL-State-Id-r17,
            srs-DLorJoint-TCIState-r17 TCI-StateId
         } OPTIONAL -- Need R
         ]]
      }
}
```

Next, SRS parameters may be semi-statically configured by higher layer parameter SRS-Resource.

- srs-ResourceId determines an SRS resource configuration identifier.
- The number of SRS ports may be configured by higher layer parameter nrofSRS-Ports and may be 1, 2, or 4. If nrofSRS-Ports is not configured, nrofSRS-Ports is 1.
- The time domain operation of SRS resource deployment indicated by higher layer parameter resourceType may be one of "periodic," "semi-persistent," and "aperiodic" SRS transmission.
- If the SRS resource type is periodic or semi-persistent, the slot level cycle and the slot level offset are determined by higher layer parameter periodicityAndOffset-p or periodicityAndOffset-sp. The UE expects that SRS resources may not be configured inside the same SRS resource set SRS-ResourceSet at different slot level cycles. If higher layer parameter resourceType is configured as "aperiodic" with regard to SRS-ResourceSet, the slot level offset is defined by higher layer parameter slotOffset.
- The number of OFDM symbols of the SRS resource, the start OFDM symbol inside the slot, and the repetition factor R are determined by higher layer parameter resourceMapping. If R is not configured, R is identical to the number of OFDM symbols of the SRS resource.
- SRS bandwidths B_SRS and C_SRS are determined by higher layer parameter freqHopping. If not configured, B_SRS is 0.
- The frequency hopping bandwidth b_hop is determined by higher layer parameter freqHopping. If not configured, b_hop is 0.
- The frequency domain location and configurable shift are determined by higher layer parameters freqDomainPosition and freqDomainShift, respectively. If freqDomainPosition is not configured, its value is 0.
- The cyclic shift is configured by higher layer parameter cyclicShift-n2, cyclicShift-n4, or cyclicShift-n8 with regard to transmission comb values 2, 4, and 8, respectively.
- The transmission comb value is configured by higher layer parameter transmissionComb.
- The transmission comb offset is configured by higher layer parameter combOffset-n2, combOffset-n4, or combOffset-n8 with regard to transmission comb values 2, 4, and 8, respectively.
- The SRS sequence ID is configured by higher layer parameter sequenceID.
- As many adjacent symbols as Ns=1, 2, or 4 inside the last six symbols of a slot may be configured as the UE's SRS resource by higher layer parameter resourceMapping inside SRS-Resource. Respective symbols of the resource are all mapped to SRS antenna ports.
- The base station may configure as many adjacent symbols as Ns=1, 2, or 4 at all symbol locations inside a slot as the UE's SRS time resource by higher layer parameter resourceMapping-r16 inside the SRS resource. In addition, repetitionFactor-r16 can have one value among R=1, 2, or 4, and R may be a divisor of Ns.
- The base station may configure as many adjacent symbols as Ns=1, 2, 4, 8, 10, 12, 14 at all symbol locations inside a slot as the UE's SRS time resource by higher layer parameter resourceMapping-r17 inside the SRS resource. In addition, repetitionFactor-r17 can have one value among 1, 2, 4, 5, 6, 7, 8, 10, 12, 14, and R may be a divisor of Ns.

Configuration information spatialRelationInfo in [Table 29] above is applied, with reference to one reference signal, to a beam used for SRS transmission corresponding to beam information of the corresponding reference signal. For example, configuration of spatialRelationInfo may include information as in [Table 30] below:

TABLE 30

```
SRS-SpatialRelationInfo ::=   SEQUENCE {
  servingCellId   ServCellIndex   OPTIONAL,   -- Need S
  referenceSignal   CHOICE {
    ssb-Index   SSB-Index,
    csi-RS-Index   NZP-CSI-RS-ResourceId,
    srs   SEQUENCE {
      resourceId   SRS-ResourceId,
      uplinkBWP   BWP-Id
    }
  }
}
```

Referring to the spatialRelationInfo configuration, an SS/PBCH block index, CSI-RS index, or SRS index may be configured as the index of a reference signal to be referred to in order to use beam information of a specific reference signal. Higher layer signaling referenceSignal corresponds to configuration information indicating which reference signal's beam information is to be referred to for corresponding SRS transmission, ssb-Index refers to the index of an SS/PBCH block, csi-RS-Index refers to the index of a CSI-RS, and srs refers to the index of an SRS. If higher layer signaling referenceSignal has a configured value of "ssb-Index," the UE may apply the reception beam which was used to receive the SS/PBCH block corresponding to ssb-Index as the transmission beam for the corresponding SRS transmission. If higher layer signaling referenceSignal has a configured value of "csi-RS-Index," the UE may apply the reception beam which was used to receive the CSI-RS corresponding to csi-RS-Index as the transmission beam for the corresponding SRS transmission. If higher layer signaling referenceSignal has a configured value of "srs," the UE may apply the reception beam which was used to transmit the SRS corresponding to srs as the transmission beam for the corresponding SRS transmission.

It is to be noted that, although it has been assumed in the above description that a TCI state is used for downlink channel beam indication (UE's reception space filter value/type indication), and SpatialRelationInfo is used for uplink channel beam indication (UE's transmission space filter value/type indication), this does not mean limitations based on the up/downlink type, and can be expanded mutually in the future. For example, a conventional downlink TCI state (DL TCI state) may be expanded to an uplink TCI state (UL TCI state) through a method such as adding an uplink channel or signal to the type of target RS that can refer to the TCI state, or adding an uplink channel or signal to the type of referenceSignal (reference RS) included in the TCI state or QCL-Info. As an example, the base station may configure a higher layer signaling parameter, such as srs-TCIState-r17 in [Table 29] described, for the UE, thereby notifying of SRS transmission beam information by using a TCI state, not spatialrelationinfo. There are various other expansion methods such as DL-UL joint TCI state, but not all methods will be described not to unnecessarily obscure the gist of description:

An SRS may include a constant amplitude zero auto correlation (CAZAC) sequence. CAZAC sequences constituting respective SRSs transmitted from multiple UEs have different cyclic shift values. In addition, CAZAC sequences generated through a cyclic shift from one CAZAC sequence are characterized by having zero correlation value with sequences having different cyclic shift values from them, respectively. Such characteristics may be used to distinguish SRSs allocated in the same frequency domain simultaneously according to the CAZAC sequence cyclic shift value configured for each SRS by the base station.

SRSs of multiple UEs may be distinguished not only according to the cyclic shift value, but also according to the frequency location. The frequency location may be distinguished by SRS sub-band unit allocation or Comb. 5G or NR systems may support Comb2, Comb4, and Comb8. In the case of Comb2, one SRS may be allocated only to even-numbered or odd-numbered subcarriers in an SRS sub-band. Each of the even-numbered subcarriers and odd-numbered subcarriers may constitute one Comb.

Each UE may have an SRS sub-band allocated based on a tree structure. The UE may then perform hopping with regard to the SRS allocated to each sub-band at each SRS transmission timepoint. Accordingly, all transmission antennas of the UE may transmit SRSs by using the entire uplink data transmission bandwidth.

Figure 19:
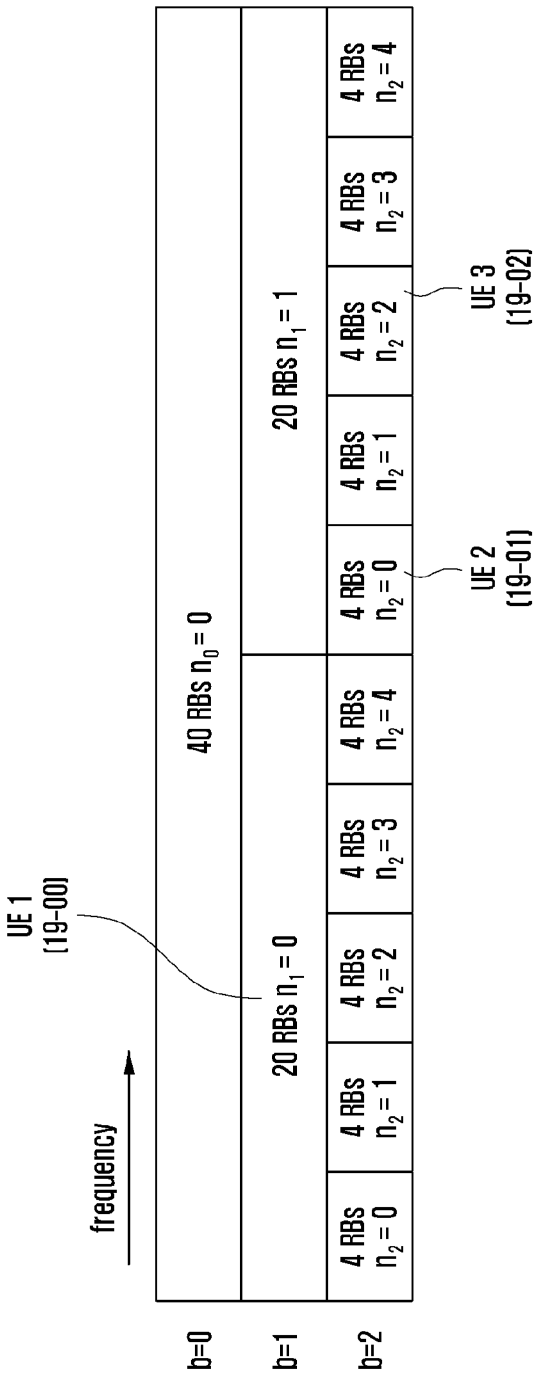
FIG. 19 illustrates a structure in which SRSs are allocated with regard to respective sub-bands according to an embodiment of the present disclosure.

FIG. 19 illustrates a structure in which SRSs are allocated with regard to respective sub-bands.

FIG. 19 illustrates an example in which SRSs are allocated to respective UEs according to a tree structure configured by the base station, assuming a data transmission band corresponding to 40 RBs in the frequency domain.

Assuming that the level indexof the tree structure in FIG. 19 is b, the highest level (b=0) of the tree structure may include one SRS sub-band corresponding to a bandwidth of 40 RBs. At the second level (b=1), two SRS sub-bands corresponding to a bandwidth of 20 RBs may be generated from the SRS sub-band at level b=0. Therefore, two SRS sub-bands may exist in the entire data transmission band at the second level (b=1). At the third level (b=2), five 4-RB SRS sub-bands may be generated from each 20-RB SRS sub-band at the above level (b=1), and ten 4-RB SRS sub-bands may exist at one level in this structure.

The tree structure having the above configuration may have various level numbers, SRS sub-band sizes, and SRS sub-band numbers per one level, according to the base station's configuration. The number of SRS sub-bands generated at level b from one SRS sub-band at the upper level may be defined as Nb, and the index of the Nb SRS sub-bands may be defined as nb={0, . . . , Nb−1}. As sub-bands per level are varied in this manner, UEs may be allocated to respective sub-bands per level as illustrated in FIG. 19. For example, UE 1 19-00 may be allocated to the first SRS sub-band (n1=0) among two SRS sub-bands having a 20-RB bandwidth at level b=1, and UE 2 19-01 and UE 3 19-02 may be allocated to the locations of the first SRS sub-band (n2=0) and the third SRS sub-band (n2=2) below the second 20-RB SRS sub-band, respectively. Through such processes, UEs can simultaneously transmit SRSs through multiple component carriers (CC), and may simultaneously transmit SRSs through multiple SRS sub-bands in one CC.

Specifically, for the above-described SRS sub-band configuration, NR supports SRS bandwidth configurations as in [Table 31] below:

TABLE 31

| | $B_{SRS}=0$ | | $B_{SRS}=1$ | | $B_{SRS}=2$ | | $B_{SRS}=3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 4 | 1 | 4 | 1 | 4 | 1 | 4 | 1 |
| 1 | 8 | 1 | 4 | 2 | 4 | 1 | 4 | 1 |
| 2 | 12 | 1 | 4 | 3 | 4 | 1 | 4 | 1 |
| 3 | 16 | 1 | 4 | 4 | 4 | 1 | 4 | 1 |
| 4 | 16 | 1 | 8 | 2 | 4 | 2 | 4 | 1 |
| 5 | 20 | 1 | 4 | 5 | 4 | 1 | 4 | 1 |
| 6 | 24 | 1 | 4 | 6 | 4 | 1 | 4 | 1 |
| 7 | 24 | 1 | 12 | 2 | 4 | 3 | 4 | 1 |
| 8 | 28 | 1 | 4 | 7 | 4 | 1 | 4 | 1 |
| 9 | 32 | 1 | 16 | 2 | 8 | 2 | 4 | 2 |
| 10 | 36 | 1 | 12 | 3 | 4 | 3 | 4 | 1 |
| 11 | 40 | 1 | 20 | 2 | 4 | 5 | 4 | 1 |
| 12 | 48 | 1 | 16 | 3 | 8 | 2 | 4 | 2 |
| 13 | 48 | 1 | 24 | 2 | 12 | 2 | 4 | 3 |
| 14 | 52 | 1 | 4 | 13 | 4 | 1 | 4 | 1 |
| 15 | 56 | 1 | 28 | 2 | 4 | 7 | 4 | 1 |
| 16 | 60 | 1 | 20 | 3 | 4 | 5 | 4 | 1 |
| 17 | 64 | 1 | 32 | 2 | 16 | 2 | 4 | 4 |
| 18 | 72 | 1 | 24 | 3 | 12 | 2 | 4 | 3 |
| 19 | 72 | 1 | 36 | 2 | 12 | 3 | 4 | 3 |
| 20 | 76 | 1 | 4 | 19 | 4 | 1 | 4 | 1 |
| 21 | 80 | 1 | 40 | 2 | 20 | 2 | 4 | 5 |
| 22 | 88 | 1 | 44 | 2 | 4 | 11 | 4 | 1 |
| 23 | 96 | 1 | 32 | 3 | 16 | 2 | 4 | 4 |
| 24 | 96 | 1 | 48 | 2 | 24 | 2 | 4 | 6 |
| 25 | 104 | 1 | 52 | 2 | 4 | 13 | 4 | 1 |
| 26 | 112 | 1 | 56 | 2 | 28 | 2 | 4 | 7 |
| 27 | 120 | 1 | 60 | 2 | 20 | 3 | 4 | 5 |
| 28 | 120 | 1 | 40 | 3 | 8 | 5 | 4 | 2 |
| 29 | 120 | 1 | 24 | 5 | 12 | 2 | 4 | 3 |
| 30 | 128 | 1 | 64 | 2 | 32 | 2 | 4 | 8 |
| 31 | 128 | 1 | 64 | 2 | 16 | 4 | 4 | 4 |
| 32 | 128 | 1 | 16 | 8 | 8 | 2 | 4 | 2 |
| 33 | 132 | 1 | 44 | 3 | 4 | 11 | 4 | 1 |
| 34 | 136 | 1 | 68 | 2 | 4 | 17 | 4 | 1 |
| 35 | 144 | 1 | 72 | 2 | 36 | 2 | 4 | 9 |
| 36 | 144 | 1 | 48 | 3 | 24 | 2 | 12 | 2 |
| 37 | 144 | 1 | 48 | 3 | 16 | 3 | 4 | 4 |
| 38 | 144 | 1 | 16 | 9 | 8 | 2 | 4 | 2 |
| 39 | 152 | 1 | 76 | 2 | 4 | 19 | 4 | 1 |
| 40 | 160 | 1 | 80 | 2 | 40 | 2 | 4 | 10 |
| 41 | 160 | 1 | 80 | 2 | 20 | 4 | 4 | 5 |
| 42 | 160 | 1 | 32 | 5 | 16 | 2 | 4 | 4 |
| 43 | 168 | 1 | 84 | 2 | 28 | 3 | 4 | 7 |
| 44 | 176 | 1 | 88 | 2 | 44 | 2 | 4 | 11 |
| 45 | 184 | 1 | 92 | 2 | 4 | 23 | 4 | 1 |
| 46 | 192 | 1 | 96 | 2 | 48 | 2 | 4 | 12 |
| 47 | 192 | 1 | 96 | 2 | 24 | 4 | 4 | 6 |
| 48 | 192 | 1 | 64 | 3 | 16 | 4 | 4 | 4 |
| 49 | 192 | 1 | 24 | 8 | 8 | 3 | 4 | 2 |
| 50 | 208 | 1 | 104 | 2 | 52 | 2 | 4 | 13 |
| 51 | 216 | 1 | 108 | 2 | 36 | 3 | 4 | 9 |
| 52 | 224 | 1 | 112 | 2 | 56 | 2 | 4 | 14 |
| 53 | 240 | 1 | 120 | 2 | 60 | 2 | 4 | 15 |
| 54 | 240 | 1 | 80 | 3 | 20 | 4 | 4 | 5 |
| 55 | 240 | 1 | 48 | 5 | 16 | 3 | 8 | 2 |
| 56 | 240 | 1 | 24 | 10 | 12 | 2 | 4 | 3 |
| 57 | 256 | 1 | 128 | 2 | 64 | 2 | 4 | 16 |
| 58 | 256 | 1 | 128 | 2 | 32 | 4 | 4 | 8 |
| 59 | 256 | 1 | 16 | 16 | 8 | 2 | 4 | 2 |
| 60 | 264 | 1 | 132 | 2 | 44 | 3 | 4 | 11 |
| 61 | 272 | 1 | 136 | 2 | 68 | 2 | 4 | 17 |
| 62 | 272 | 1 | 68 | 4 | 4 | 17 | 4 | 1 |
| 63 | 272 | 1 | 16 | 17 | 8 | 2 | 4 | 2 |

In addition, NR supports SRS frequency hopping based on values in Table 31 above, and detailed procedures follow Table 32 below:

TABLE 32

When SRS is transmitted on a given SRS resource, the sequence $r^{(p_i)}(n, l')$ for each OFDM symbol l' and for each of the antenna ports of the SRS resource shall be multiplied with the amplitude scaling factor $\beta_{SRS}$ in order to conform to the transmit power specified in [5.38.213] and mapped in sequence starting with $r^{(p_i)}(0, l')$ to resource elements (k, l) in a slot for each of the antenna ports $p_i$ according to $$a^{(p_i)}_{K_{TC}k'+k_0^{(p_i)},l'+l_0} = \begin{cases} \frac{1}{\sqrt{N_{ap}}}\beta_{SRS} r^{(p_i)}(k', l') & k' = 0, 1, \ldots, M_{sc,b}^{SRS} - 1 \quad l' = 0, 1, \ldots, N_{symb}^{SRS} - 1 \\ 0 & \text{otherwise} \end{cases}$$

The length of the sounding reference signal sequence is given by $$M_{sc,b}^{SRS} = m_{SRS,b} N_{sc}^{RB} / K_{TC}$$

where $m_{SRS,b}$ is given by a selected row of Table 6.4.1.4.3-1 with $b = B_{SRS}$ where $B_{SRS} \in \{0, 1, 2, 3\}$ is given by the field b-SRS contained in the higher-layer parameter freqHopping. The row of the table is selected according to the index $C_{SRS} \in \{0, 1, \ldots, 63\}$ given by the field c-SRS contained in the higher-layer parameter freqHopping.

The frequency-domain starting position $k_0^{(p_i)}$ is defined by $$k_0^{(p_i)} = \bar{k}_0^{(p_i)} + \sum_{b=0}^{B_{SRS}} K_{TC} M_{sc,b}^{SRS} n_b$$

where $$\bar{k}_0^{(p_i)} = n_{shift} N_{sc}^{RB} + k_{TC}^{(p_i)}$$

$$k_{TC}^{(p_i)} = \begin{cases} (\bar{k}_{TC} + K_{TC}/2) \bmod K_{TC} & \text{if } n_{SRS}^{cs} \in \{n_{SRS}^{cs,max}/2, \ldots, n_{SRS}^{cs,max} - 1\} \text{ and } N_{ap}^{SRS} = 4 \text{ and } p_i \in \{1001, 1003\} \\ \bar{k}_{TC} & \text{otherwise} \end{cases}$$

If $N_{BWP}^{start} \le n_{shift}$ the reference point for $k_0^{(p_i)} = 0$ is subcarrier 0 in common resource block 0, otherwise the reference point is the lowest subcarrier of the BWP.

The frequency domain shift value $n_{shift}$ adjusts the SRS allocation with respect to the reference point grid and is contained in the higher-layer parameter freqDomainShift in the SRS-Config IE. The transmission comb offset $\bar{k}_{TC} \in \{0, 1, \ldots, K_{TC} - 1\}$ is contained in the higher-layer parameter transmissionComb in the SRS-Config IE and $n_b$ is a frequency position index.

Frequency hopping of the sounding reference signal is configured by the parameter $b_{hop} \in \{0, 1, 2, 3\}$, given by the field b-hop contained in the higher-layer parameter freqHopping.

If $b_{hop} \ge B_{SRS}$, frequency hopping is disabled and the frequency position index $n_b$ remains constant (unless re-configured) and is defined by $n_b = \lfloor 4n_{RRC}/m_{SRS,b} \rfloor \bmod N_b$ for all $N_{symb}^{SRS}$ OFDM symbols of the SRS resource. The quantity $n_{RRC}$ is given by the higher-layer parameter freqDomainPosition and the values of $m_{SRS,b}$ and $N_b$ for $b = B_{SRS}$ are given by the selected row of Table 6.4.1.4.3-1 corresponding to the configured value of $C_{SRS}$.

If $b_{bp} < B_{SRS}$ , frequency hopping is enabled and the frequency position indices $n_b$ are defined by $$n_b = \begin{cases} \lfloor 4n_{RRC}/m_{SRS,b} \rfloor \bmod N_b & b \le b_{hop} \\ \{F_b(n_{SRS}) + \lfloor 4n_{RRC}/m_{SRS,b} \rfloor\} \bmod N_b & \text{otherwise} \end{cases}$$

where $N_b$ is given by Table 6.4.1.4.3-1, $$F_b(n_{SRS}) = \begin{cases} (N_b/2)\left\lfloor \frac{n_{SRS} \bmod \prod_{b'=b_{hop}}^{b} N_{b'}}{\prod_{b'=b_{hop}}^{b-1} N_{b'}} \right\rfloor + \left\lfloor \frac{n_{SRS} \bmod \prod_{b'=b_{hop}}^{b} N_{b'}}{2\prod_{b'=b_{hop}}^{b-1} N_{b'}} \right\rfloor & \text{if } N_b \text{ even} \\ \lfloor N_b/2 \rfloor \left\lfloor n_{SRS} \middle/ \prod_{b'=b_{hop}}^{b-1} N_{b'} \right\rfloor & \text{if } N_b \text{ odd} \end{cases}$$

and where $N_{b_{hop}} = 1$ regardless of the value of $N_b$. The quantity $n_{SRS}$ counts the number of SRS transmissions.

For the case of an SRS resource configured as aperiodic by the higher-layer parameter resourceType, it is given by $n_{SRS} = \lfloor l'/R \rfloor$ within the slot in which the $N_{symb}^{SRS}$ symbol SRS resource is transmitted. The quantity $R \le N_{symb}^{SRS}$ is the repetition factor given by the field repetitionFactor containted in the higher-layer parameter resourceMapping.

As described above, 5G or NR UEs support a single user (SU)-MIMO technique and have a maximum of four transmission antennas. In addition, NR UEs may simultaneously transmit multiple SRSs through multiple CCs or multiple SRS sub-bands inside multiple CCs. 5G or NR systems support various numerologies, unlike LTE systems, may have multiple SRS transmission symbols configured variously, and may be allowed to repeatedly transmit SRSs through a repetition factor.

Therefore, it is necessary to count SRS transmissions in view thereof. Counting SRS transmissions may be variously utilized. For example, counting SRS transmissions may be utilized to support antenna switching resulting from SRS transmissions. Specifically, it may be determined by SRS transmission counting at what SRS transmission timepoint, an SRS corresponding to what antenna is to be transmitted in what band.

The UE does not expect different time domain operations to be configured with regard to SRS resources in the same SRS resource set. In addition, the UE does not expect different time domain operations to be configured with regard to the SRS resource set associated with SRS resources. An SRS request area included in DCI formats 0_1, 1_1, 0_2 (when the SRS request area exists), and 12 (when the SRS request area exists), indicates a triggered SRS resource set as in [Table 33] below. If higher layer parameter srs-TPC-PDCCH-Group regarding the UE is configured as "typeB," the 2-bit SRS request area included in DCI format 2_3 indicates a triggered SRS resource set. Alternatively, if higher layer parameter srs-TPC-PDCCH-Group regarding the UE is configured as "typeA," the 2-bit SRS request area included in DCI format 23 indicates SRS transmission regarding a set of resource cells configured by the higher layer.

With regard to a PUCCH and an SRS scheduled with the same carrier, if a semi-persistent SRS and a periodic SRS are configured in the same symbol as the PUCCH including only CSI report, or including only L1-RSRP report, or including only L1-SINR report, the UE does not transmit the SRS. If a semi-persistent SRS or a periodic SRS is configured in the same symbol as a PUCCH including a HARQ-ACK, a link restoration request, and/or an SR, or if an aperiodic SRS is triggered to be transmitted in the same symbol as a PUCCH including the above information, the UE transmits no SRS. If no SRS is transmitted while overlapping a PUCCH, only SRS symbol(s) overlapping the PUCCH are dropped. If an aperiodic SRS is triggered to overlap the same symbol as a PUCCH including a semi-persistent/periodic CSI report, or a semi-persistent/periodic L1-RSRP report only, or an L1-SINR report only, no PUCCH is transmitted.

In the case of a band-band combination which does not allow simultaneous transmission of an SRS and a PUCCH/PUSCH with regard to intra-band carrier aggregation or inter-band carrier aggregation, the UE does not expect PUSCH/UL DM-RS/UL PT-RS/PUCCH formats to be configured from a carrier different from the carrier having an SRS configured in the same symbol.

In the case of a band-band combination which does not allow simultaneous transmission of an SRS and a PRACH with regard to intra-band carrier aggregation or inter-band

TABLE 33

| Value of SRS request field | Triggered aperiodic SRS resource set(s) for DCI format 0_1, 0_2, 1_1, 1_2, and 2_3 configured with higher layer parameter srs-TPC-PDCCH-Group set to 'typeB' | Triggered aperiodic SRS resource set(s) for DCI format 2_3 configured with higher layer parameter srs-TPC-PDCCH-Group set to 'typeA' |
|---|---|---|
| 00 | No aperiodic SRS resource set triggered | No aperiodic SRS resource set triggered |
| 01 | SRS resource set(s) configured by SRS-ResourceSet with higher layer parameter aperiodicSRS-Resource Trigger set to 1 or an entry in aperiodicSRS-Resource TriggerList set to 1<br>SRS resource set(s) configured by SRS-PosResourceSet with an entry in aperiodicSRS-Resource TriggerList set to 1 when triggered by DCI formats 0_1, 0_2, 1_1, and 1_2 | SRS resource set(s) configured with higher layer parameter usage in SRS-ResourceSet set to 'antennaSwitching' and resourceType in SRS-ResourceSet set to 'aperiodic' for a 1st set of serving cells configured by higher layers |
| 10 | SRS resource set(s) configured by SRS-ResourceSet with higher layer parameter aperiodicSRS-Resource Trigger set to 2 or an entry in aperiodicSRS-Resource TriggerList set to 2<br>SRS resource set(s) configured by SRS-PosResourceSet with an entry in aperiodicSRS-Resource TriggerList set to 2 when triggered by DCI formats 0_1, 0_2, 1_1, and 1_2 | SRS resource set(s) configured with higher layer parameter usage in SRS-ResourceSet set to 'antennaSwitching' and resourceType in SRS-ResourceSet set to 'aperiodic' for a 2nd set of serving cells configured by higher layers |
| 11 | SRS resource set(s) configured by SRS-ResourceSet with higher layer parameter aperiodicSRS-ResourceTrigger set to 3 or an entry in aperiodicSRS-ResourceTriggerList set to 3<br>SRS resource set(s) configured by SRS-PosResourceSet with an entry in aperiodicSRS-ResourceTriggerList set to 3 when triggered by DCI formats 0_1, 0_2, 1_1, and 1_2 | SRS resource set(s) configured with higher layer parameter usage in SRS-ResourceSet set to 'antennaSwitching' and resourceType in SRS-ResourceSet set to 'aperiodic' for a 3rd set of serving cells configured by higher layers |

carrier aggregation, the UE does not simultaneously transmit the SRS from one carrier and the PRACH from another carrier.

If an SRS resource having higher layer parameter resourceType configured as "aperiodic" is triggered by OFDM symbol(s) for periodic/semi-persistent SRS, the UE transmits an aperiodic SRS resource, periodic/semi-persistent SRS symbol(s) overlapping the corresponding symbol(s) are dropped, and non-overlapping periodic/semi-persistent SRS symbol(s) are transmitted. If an SRS resource having higher layer parameter resourceType configured as "semi-persistent" is triggered by OFDM symbol(s) for periodic SRS transmission, the UE transmits a semi-persistent SRS resource, periodic SRS symbol(s) are dropped during overlapping symbols, and non-overlapping periodic SRS symbol(s) are transmitted.

If higher layer parameter "usage" inside SRS-ResourceSet is configured as "antennaSwitching," and if a guard period corresponding to Y symbols is configured, the UE follows the same priority rule as defined above like an SRS is configured even during the guard period.

When higher layer parameter spatialRelationInfo of a semi-persistent or aperiodic SRS resource is activated or updated by a MAC CE with regard to a CC/bandwidth part indicated by a set of higher layer parameters applicableCellList, spatialRelationInfo is applied to semi-persistent or aperiodic SRS resource(s) having the same SRS resource ID with regard to all bandwidth parts inside indicated CCs.

If higher layer parameter enableDefaultBeamPlForSRS is configured as "enable," ifhigher layer parameter spatialRelationInfo for SRS resources is not configured in FR2, except for a case in which higher layer parameter "usage" of SRS resources is configured as "beamManagement" or configured as "nonCodebook" together with associated CSI-RS configuration, and if higher layer parameter pathlossReferenceRS regarding the UE is not configured, the UE transmits a target SRS resource according to the following configurations:

transmits the target SRS resource to the same space domain transmission filter as that used to receive a CORESET having the lowest controlResoureSetID in the activated DL bandwidth part inside a CC; and If the UE has no CORESET configured in the CC, the UE transmits the target SRS resource to the same space domain transmission filter as that used to receive the activated TCI state having the lowest ID applicable to the PDSCH inside the activated DL bandwidth part of the CC.

Table 34 describes UE capability containing resource-related information of positioning uplink reference signals.

TABLE 34

| Index | Feature group | Components |
|---|---|---|
| 13-8 | SRS Resources for Positioning | 1. Max number of SRS Resource Sets for positioning supported by UE per BWP<br>Values = {1, 2, 4, 8, 12, 16}.<br>2. Max number of P/SP/AP SRS Resources for positioning per BWP.<br>Values = {1, 2, 4, 8, 16, 32, 64}<br>3. Max number of P/SP/AP SRS Resources including the SRS resources for positioning per BWP per slot.<br>Values = {1, 2, 3, 4, 5, 6, 8, 10, 12, 14}<br>Note: Max number of P/SP/AP SRS Resources in Component 3 include both SRS resources configured by SRS-Resource and SRS resources configured by SRS-PosResource-r16 supported by UE<br>4. Max number of periodic SRS Resources for positioning per BWP.<br>Values = {1, 2, 4, 8, 16, 32, 64}<br>5. Max number of periodic SRS Resources for positioning per BWP per slot.<br>Values = {1, 2, 3, 4, 5, 6, 8, 10, 12, 14}<br>OLPC for SRS for positioning based on SSB from serving cell is part of FG13-8<br>Note: no dedicated capability signaling is intended for this component |

TABLE 35

| Index | Feature group | Components |
|---|---|---|
| 10-11 | SRS starting position at any OFDM symbol in a slot | 1. Support transmitting SRS starting in all symbols (0, . . . , 13) of a slot |

After reporting the UD capability in Table 34 above (hereinafter, referred to as FG 13-8), the UE may transmit an uplink reference signals at all OFDM symbol locations inside a specific slot during uplink reference signal transmission.

Table 35. describes UE capability containing information of intra-slot transmission symbol locations of an uplink reference signal in an unlicensed band.

After reporting the UE capability in Table 35 above (hereinafter, referred to as FG 10-11), the UE may transmit an uplink reference signals at all OFDM symbol locations inside any slot in both a licensed band and an unlicensed band during uplink reference signal transmission.

[Regarding SRS Antenna Switching]

Hereinafter, an SRS for antenna switching will be described.

An SRS transmitted from a UE may be used by a base station to acquire DL channel state information (CSI) (for example, DL CSI acquisition). As a specific example, in a single-cell or multi-cell (for example, carrier aggregation (CA)) situation based on time division duplex (TDD), a base station (BS) may schedule transmission of an SRS to user equipment (UE) and then measure the SRS transmitted from the UE. In this case, by assuming reciprocity between the downlink (DL) and the uplink (UL) channels, the base station may consider that uplink channel information estimated based on the SRS transmitted from the UE is downlink channel information, and may perform scheduling of downlink signal/channel for the UE by using this. The usage of the SRS for downlink channel information acquisition may be configured for the UE as antenna switching by the base station.

As an example, according to specifications (for example, 3gpp TS38.214), the usage of an SRS may be configured for the base station and/or UE by using a higher layer parameter (for example, usage of RRC parameter SRS-ResourceSet). The usage of an SRS may be configured as beam management usage, codebook transmission usage, non-codebook transmission usage, antenna switching usage, and the like.

As described, if parameter "usage" inside higher layer signaling SRS-ResourceSet is configured by the base station as "antennaSwitcing" for the UE, the UE may receive at least one higher layer signaling configuration from the base station according to reported UE capability. The UE may report "supportedSRS-TxPortSwitch" as UE capability, and its value may be as follows. In the following, "mTnR" may mean UE capability supporting transmission through m antennas and reception through n antennas.

- "t1r2": a UE capability report value meaning that the UE is capable of 1T2R operation.
- "t1r1-t1r2": a UE capability report value meaning that the UE is capable of 1T1R or 1T2R operation.
- "t2r4": a UE capability report value meaning that the UE is capable of 2T4R operation.
- "t1r4": a UE capability report value meaning that the UE is capable of 1T4R operation.
- "t1r6": a UE capability report value meaning that the UE is capable of 1T6R operation.
- "t1r8": a UE capability report value meaning that the UE is capable of 1T8R operation.
- "t2r6": a UE capability report value meaning that theUE is capable of 2T6R operation.
- "t2r8": a UE capability report value meaning that the UE is capable of 2T8R operation.
- "t4r8": a UE capability report value meaning that the UE is capable of 4T8R operation.
- "t1r1-t1r2-t1r4": a UE capability report value meaning that the UE is capable of 1T1R, 1T2R, or 1T4R operation.
- "t1r4-t2r4": a UE capability report value meaning that the UE is capable of 1T4R or 2T4R operation.
- "t1r1-t1r2-t2r2-t2r4": a UE capability report value meaning that the UE is capable of 1T1R, 1T2R, 2T2R, or 2T4R operation.
- "t1r1-t1r2-t2r2-t1r4-t2r4": a UE capability report value meaning that the UE is capable of 1T1R, 1T2R, 2T2R, 1T4R, or 2T4R operation.
- "t1r1": a UE capability report value meaning that the UE is capable of 1T1R operation.
- "t2r2": a UE capability report value meaning that the UE is capable of 2T2R operation.
- "t1r1-t2r2": a UE capability report value meaning that the UE is capable of 1T1R or 2T2R operation.
  - "t4r4": a UE capability report value meaning that the UE is capable of 4T4R operation.
  - "t1r1-t2r2-t4r4": a UE capability report value meaning that the UE is capable of 1T1R, 2T2R, or 4T4R operation.

Regarding the UE's 1T2R operation, higher layer signaling from the base station regarding a combination of at least one of the following details may be configured, and an operation based thereon may be possible.

- If the UE reported some or all of srs-AntennaSwitching2SP-1Periodic-r17 and srs-ExtensionAperiodicSRS-r17 which are UE capability reports
  - If the UE reported only srs-AntennaSwitching2SP-1Periodic-r17,
  - The base station may configure, for the UE, a maximum of two SRS resource sets having resourceType value of "semi-persistent" in SRS-ResourceSet which is higher layer signaling, and the base station may configure, for the UE, a maximum of one SRS resource set having resourceType value of "periodic" in SRS-ResourceSet which is higher layer signaling, or
  - The base station may configure, for the UE, a maximum of two SRS resource sets having different values of resourceType in SRS-ResourceSet which is higher layer signaling.
  - Regarding the above details, two SRS resource sets having resourceType value of "semi-persistent" in SRS-ResourceSet which is higher layer signaling may not be activated simultaneously.
  - Regarding the above details, each SRS resource set may include two SRS resources transmitted in different OFDM symbols.
  - Regarding the above details, each SRS resource in each SRS resource set may include one SRS port, and the SRS ports of respective SRS resources in each SRS resource set may be connected to different UE antenna ports.
- As an example, first and second SRS resources each including one SRS port may be included in the corresponding SRS resource set, respective SRS ports of the first and second SRS resources may be connected to different UE antenna ports, the SRS port of the first SRS resource may be transmitted at a first OFDM symbol location, and the SRS port of the second SRS resource may be transmitted at a second OFDM symbol location. The first and second OFDM symbol locations are different from each other, but slot locations may be equal to or different from each other.
  - If the UE reported only srs-ExtensionAperiodicSRS-r17,
  - The base station may configure, for the UE, a maximum of two SRS resource sets having resourceType value of "aperiodic" in SRS-ResourceSet which is higher layer signaling, and the base station may configure, for the UE, a maximum of one SRS resource set having resourceType value of "periodic" or "semi-persistent" in SRS-ResourceSet which is higher layer signaling, or
  - The base station may configure, for the UE, a maximum of two SRS resource sets having different values of resourceType in SRS-ResourceSet which is higher layer signaling.
  - Regarding the above details, if the base station configured, for the UE, two SRS resource sets having resourceType value of "aperiodic" in SRS-ResourceSet which is higher layer signaling, respective SRS resources in the two SRS resource sets may be transmitted at identical or different OFDM symbol locations in two different slots, each SRS resource set may include one SRS resource, each SRS resource in the two SRS resource sets may include one SRS port, and the SRS ports of respective SRS resources in the two SRS resource sets may be connected to different UE antenna ports.
- As an example, a first SRS resource including one SRS port may be included in the first SRS resource set, a second SRS resource including one SRS port may be included in the second SRS resource set, respective SRS ports of the first and second SRS resources may be connected to different UE antenna ports, the SRS port of the first SRS resource may be transmitted at a first OFDM symbol location of the first slot, and the SRS port of the second SRS resource may be transmitted at a second OFDM symbol location of the second slot. The first and second OFDM symbol locations may be identical to or different from each other in each slot, but slot locations may be different from each other.

Regarding the above details, if the base station configured, for the UE, one SRS resource set having resourceType value of "aperiodic" in SRS-ResourceSet which is higher layer signaling, two SRS resources in the corresponding SRS resource set may be transmitted at different OFDM symbol locations in the same slot, each SRS resource in the corresponding SRS resource set may include one SRS port, and the SRS ports of respective SRS resources may be connected to different UE antenna ports.

As an example, first and second SRS resources each including one SRS port may be included in the corresponding SRS resource set, respective SRS ports of the first and second SRS resources may be connected to different UE antenna ports, the SRS port of the first SRS resource may be transmitted at a first OFDM symbol location in the first slot, and the SRS port of the second SRS resource may be transmitted at a second OFDM symbol location in the same slot.

Regarding the above details, if the base station configured, for the UE, one SRS resource set having resourceType value of "periodic" or "semi-persistent" in SRS-ResourceSet which is higher layer signaling, two SRS resources in the corresponding SRS resource set may be transmitted at different OFDM symbol location, each SRS resource in the corresponding SRS resource set may include one SRS port, and the SRS ports of respective SRS resource may be connected to different UE antenna ports.

As an example, first and second SRS resources each including one SRS port may be included in the corresponding SRS resource set, respective SRS ports of the first and second SRS resources may be connected to different UE antenna ports, the SRS port of the first SRS resource may be transmitted at a first OFDM symbol location in the first slot, and the SRS port of the second SRS resource may be transmitted at a second OFDM symbol location in the same slot.

If the UE did not report srs-AntennaSwitching2SP-1Periodic-r17, the base station may configure, for the UE, a maximum of two (for example, 0, 1, or 2) SRS resource sets having resourceType values which are "periodic" or "semi-persistent," and which are different from each other, in SRS-ResourceSet which is higher layer signaling. As an example, the base station may configure one of the following details for the UE.

No configured SRS resource set having resourceType value of "periodic" or "semi-persistent" in SRS-ResourceSet which is higher layer signaling One SRS resource set having resourceType value of "periodic" in SRS-ResourceSet which is higher layer signaling One SRS resource set having resourceType value of "semi-persistent" in SRS-ResourceSet which is higher layer signaling One SRS resource set having resourceType value of "periodic" in SRS-ResourceSet which is higher layer signaling, and one SRS resource set having resourceType value of "semi-persistent" therein Regarding the above details, two SRS resource sets having resourceType value of "semi-persistent" in SRS-ResourceSet which is higher layer signaling may not be activated simultaneously.

Regarding the above details, each SRS resource set may include two SRS resources, the two SRS resources may be transmitted at different OFDM symbol locations, each SRS resource in the corresponding SRS resource set may include one SRS port, and the SRS ports of respective SRS resources may be connected to different UE antenna ports.

As an example, first and second SRS resources each including one SRS port may be included in the corresponding SRS resource set, respective SRS ports of the first and second SRS resources may be connected to different UE antenna ports, the SRS port of the first SRS resource may be transmitted at a first OFDM symbol location in the first slot, and the SRS port of the second SRS resource may be transmitted at a second OFDM symbol location in the same slot.

If the UE reported srs-AntennaSwitching2SP-1Periodic-r17, the base station may configure, for the UE, a maximum of two SRS resource sets having resourceType value of "semi-persistent" in SRS-ResourceSet which is higher layer signaling, and the base station may configure, for the UE, a maximum of one SRS resource set having resourceType value of "periodic" in SRS-ResourceSet which is higher layer signaling.

Regarding the above details, two SRS resource sets having resourceType value of "semi-persistent" in SRS-ResourceSet which is higher layer signaling may not be activated simultaneously.

Regarding the above details, each SRS resource set may include two SRS resources, the two SRS resources may be transmitted at different OFDM symbol locations, each SRS resource in the corresponding SRS resource set may include one SRS port, and the SRS ports of respective SRS resources may be connected to different UE antenna ports.

As an example, first and second SRS resources each including one SRS port may be included in the corresponding SRS resource set, respective SRS ports of the first and second SRS resources may be connected to different UE antenna ports, the SRS port of the first SRS resource may be transmitted at a first OFDM symbol location, and the SRS port of the second SRS resource may be transmitted at a second OFDM symbol location. The first and second OFDM symbol locations are different from each other, but slot locations may be equal to or different from each other.

If the UE did not report srs-ExtensionAperiodicSRS-r17 only, the base station may configure, for the UE, a maximum of one (for example, 0 or 1) SRS resource set having resourceType value of "aperiodic" in SRS-ResourceSet which is higher layer signaling. As an example, the base station may configure one of the following details for the UE.

No configured SRS resource set having resourceType value of "aperiodic" in SRS-ResourceSet which is higher layer signaling One SRS resource set having resourceType value of "aperiodic" in SRS-ResourceSet which is higher layer signaling Regarding the above details, if one SRS resource set is configured, each SRS resource set may include two SRS resources, the two SRS resources may be transmitted at different OFDM symbol locations in the same slot, each SRS resource in the corresponding SRS resource set may include one SRS port, and the SRS ports of respective SRS resources may be connected to different UE antenna ports.

As an example, first and second SRS resources each including one SRS port may be included in the corresponding SRS resource set, respective SRS ports of the first and second SRS resources may be connected to different UE antenna ports, the SRS port of the first SRS resource may be transmitted at a first OFDM symbol location in the first slot, and the SRS port of the second SRS resource may be transmitted at a second OFDM symbol location in the same slot.

If the UE reported srs-ExtensionAperiodicSRS-r17 only, the base station may configure, for the UE, a maximum of two (for example, 0, 1, or 2) SRS resource set having resourceType value of "aperiodic" in SRS-ResourceSet which is higher layer signaling. As an example, the base station may configure one of the following details for the UE.

No configured SRS resource set having resourceType value of "aperiodic" in SRS-ResourceSet which is higher layer signaling One SRS resource set having resourceType value of "aperiodic" in SRS-ResourceSet which is higher layer signaling Two SRS resource sets having resourceType value of "aperiodic" in SRS-ResourceSet which is higher layer signaling Regarding the above details, if one SRS resource set is configured, each SRS resource set may include two SRS resources, the two SRS resources may be transmitted at different OFDM symbol locations in the same slot, each SRS resource in the corresponding SRS resource set may include one SRS port, and the SRS ports of respective SRS resources may be connected to different UE antenna ports.

As an example, first and second SRS resources each including one SRS port may be included in the corresponding SRS resource set, respective SRS ports of the first and second SRS resources may be connected to different UE antenna ports, the SRS port of the first SRS resource may be transmitted at a first OFDM symbol location in the first slot, and the SRS port of the second SRS resource may be transmitted at a second OFDM symbol location in the same slot.

Regarding the above details, if two SRS resource sets are configured, respective SRS resources in the two SRS resource sets may be transmitted at identical or different OFDM symbol locations in two different slots, each SRS resource set may include one SRS resource, each SRS resource in the two SRS resource sets may include one SRS port, and the SRS ports of respective SRS resources in the two SRS resource sets may be connected to different UE antenna ports.

As an example, a first SRS resource including one SRS port may be included in the first SRS resource set, a second SRS resource including one SRS port may be included in the second SRS resource set, respective ports of the first and second SRS resources may be connected to different UE antenna ports, the SRS port of the first SRS resource may be transmitted at a first OFDM symbol location of the first slot, and the SRS port of the second SRS resource may be transmitted at a second OFDM symbol of the second slot. The first and second OFDM symbol locations may be identical to or different from each other in respective slots, but the slot locations may be different from each other.

If the UE did not report both srs-AntennaSwitching2SP-1Periodic-r17 and srs-ExtensionAperiodicSRS-r17 which are UE capability reports The base station may configure, for the UE, a maximum of two SRS resource set having different resourceType values in SRS-ResourceSet which is higher layer signaling.

Regarding the above details, each SRS resource set may include two SRS resources, the two SRS resources may be transmitted at different OFDM symbol locations, each SRS resource in the corresponding SRS resource set may include one SRS port, and the SRS ports of the respective SRS resources may be connected to different UE antenna ports.

As an example, first and second SRS resources each including one SRS port may be included in the corresponding SRS resource set, respective SRS ports of the first and second SRS resources may be connected to different UE antenna ports, the SRS port of the first SRS resource may be transmitted at a first OFDM symbol location, and the SRS port of the second SRS resource may be transmitted at a second OFDM symbol location. The first and second OFDM symbol locations may be different from each other, but the slot locations may be identical to or different from each other.

Regarding the UE's 2T4R operation, higher layer signaling from the base station regarding a combination of at least one of the following details may be configured, and an operation based thereof may be possible.

If the UE reported some or all of srs-AntennaSwitching2SP-1Periodic-r17 and srs-ExtensionAperiodicSRS-r17 which are UE capability reports If the UE reported only srs-AntennaSwitching2SP-1Periodic-r17, The base station may configure, for the UE, a maximum of two SRS resource sets having resourceType value of "semi-persistent" in SRS-ResourceSet which is higher layer signaling, and thebase station may configure, for the UE, a maximum of one SRS resource set having resourceType value of "periodic" in SRS-ResourceSet which is higher layer signaling, or The base station may configure, for the UE, a maximum of two SRS resource sets having different values of resourceType in SRS-ResourceSet which is higher layer signaling.

Regarding the above details, two SRS resource sets having resourceType value of "semi-persistent" in SRS-ResourceSet which is higher layer signaling may not be activated simultaneously.

Regarding the above details, each SRS resource set may include two SRS resources transmitted in different OFDM symbols.

Regarding the above details, each SRS resource in each SRS resource set may include two SRS ports, and the two SRS ports of each SRS resource in each SRS resource set may be connected to different UE antenna ports.

As an example, first and second SRS resources each including one SRS port may be included in the corresponding SRS resource set, the two SRS ports of the first and second SRS resources may be connected to different UE antenna ports, the two SRS port of the first SRS resource may be transmitted at a first OFDM symbol location, and the two SRS ports of the second SRS resource may be transmitted at a second OFDM symbol location, the first and second OFDM symbol locations may be different from each other in each slot, but may have identical or different slot locations.

If the UE reported only srs-ExtensionAperiodicSRS-r17,

The base station may configure, for the UE, a maximum of two SRS resource sets having resourceType value of"aperiodic" in SRS-ResourceSet which is higher layer signaling, and the base station may configure, for the UE, a maximum of one SRS resource set having resourceType value of "periodic" or "semi-persistent" in SRS-ResourceSet which is higher layer signaling, or The base station may configure, for the UE, a maximum of two SRS resource sets having different values of resourceType in SRS-ResourceSet which is higher layer signaling.

Regarding the above details, if the base station configured, for the UE, two SRS resource sets having resourceType value of "aperiodic" in SRS-ResourceSet which is higher layer signaling, respective SRS resources in the two SRS resource sets may be transmitted at identical or different OFDM symbol locations in two different slots, each SRS resource set may include one SRS resource, each SRS resource in the two SRS resource sets may include two SRS ports, and the two SRS ports of respective SRS resources in the two SRS resource sets may be connected to different UE antenna ports.

As an example, a first SRS resource including two SRS ports may be included in the first SRS resource set, a second SRS resource including two SRS ports may be included in the second SRS resource set, the two SRS ports of the first and second SRS resources may be connected to different UE antenna ports, the two SRS ports of the first SRS resource may be transmitted at a first OFDM symbol location of the first slot, and the two SRS ports of the second SRS resource may be transmitted at a second OFDM symbol location of the second slot. The first and second OFDM symbol locations may be identical to or different from each other in each slot, but slot locations may be different from each other.

Regarding the above details, if the base station configured, for the UE, one SRS resource set having resourceType value of "aperiodic" in SRS-ResourceSet which is higher layer signaling, two SRS resources in the corresponding SRS resource set may be transmitted at different OFDM symbol locations in the same slot, each SRS resource in the corresponding SRS resource set may include two SRS ports, and the SRS ports of respective SRS resources may be connected to different UE antenna ports.

Regarding the above details, if the base station configured, for the UE, one SRS resource set having resourceType value of "periodic" or "semi-persistent" in SRS-ResourceSet which is higher layer signaling, two SRS resources in the corresponding SRS resource set may be transmitted at different OFDM symbol locations, each SRS resource in the corresponding SRS resource set may include two SRS ports, and the two SRS ports of respective SRS resources may be connected to different UE antenna ports.

As an example, first and second SRS resources each including two SRS ports may be included in the corresponding SRS resource set, the two SRS ports of the first and second SRS resources may be connected to different UE antenna ports, the two SRS ports of the first SRS resource may be transmitted at a first OFDM symbol location, and the two SRS ports of the second SRS resource may be transmitted at a second OFDM symbol location. The first and second OFDM symbol locations may be different from each other, but the slot locations may be identical to or different from each other.

If the UE did not report srs-AntennaSwitching2SP-1Periodic-r17, the base station may configure, for the UE, a maximum of two (for example, 0, 1, or 2) SRS resource sets having resourceType values which are "periodic" or "semi-persistent," and which are different from each other, in SRS-ResourceSet which is higher layer signaling. As an example, the base station may configure one of the following details for the UE.

No configured SRS resource set having resourceType value of "periodic" or "semi-persistent" in SRS-ResourceSet which is higher layer signaling.

One SRS resource set having resourceType value of "periodic" in SRS-ResourceSet which is higher layer signaling.

One SRS resource set having resourceType value of "semi-persistent" in SRS-ResourceSet which is higher layer signaling.

One SRS resource set having resourceType value of "periodic" in SRS-ResourceSet which is higher layer signaling, and one SRS resource set having resourceType value of "semi-persistent" therein.

Regarding the above details, two SRS resource sets having resourceType value of "semi-persistent" in SRS-ResourceSet which is higher layer signaling may not be activated simultaneously.

Regarding the above details, each SRS resource set may include two SRS resources, the two SRS resources may be transmitted at different OFDM symbol locations, each SRS resource in the corresponding SRS resource set may include two SRS ports, and the two SRS ports of respective SRS resources may be connected to different UE antenna ports.

As an example, first and second SRS resources each including two SRS ports may be included in the corresponding SRS resource set, the two SRS ports of the first and second SRS resources may be connected to different UE antenna ports, the two SRS ports of the first SRS resource may be transmitted at a first OFDM symbol location, and the two SRS ports of the second SRS resource may be transmitted at a second OFDM symbol location. The first and second OFDM symbol locations may be different from each other, but the slot locations may be identical to or different from each other.

If the UE reported srs-AntennaSwitching2SP-1Periodic-r17, the base station may configure, for the UE, a maximum of two SRS resource sets having resourceType value of "semi-persistent" in SRS-ResourceSet which is higher layer signaling, and the base station may configure, for the UE, a maximum of one SRS resource set having resourceType value of "periodic" in SRS-ResourceSet which is higher layer signaling.

Regarding the above details, two SRS resource sets having resourceType value of "semi-persistent" in SRS-ResourceSet which is higher layer signaling may not be activated simultaneously.

Regarding the above details, each SRS resource set may include two SRS resources, the two SRS resources may be transmitted at different OFDM symbol locations, each SRS resource in the corresponding SRS resource set may include two SRS ports, and the two SRS ports of respective SRS resources may be connected to different UE antenna ports.

As an example, first and second SRS resources each including two SRS ports may be included in the corresponding SRS resource set, the two SRS ports of the first and second SRS resources may be connected to different UE antenna ports, the two SRS ports of the first SRS resource may be transmitted at a first OFDM symbol location, and the two SRS ports of the second SRS resource may be transmitted at a second OFDM symbol location. The first and second OFDM symbol locations may be different from each other, but slot locations may be equal to or different from each other.

If the UE did not report srs-ExtensionAperiodicSRS-r17, the base station may configure, for the UE, a maximum of one (for example, 0 or 1) SRS resource set having resourceType value of "aperiodic" in SRS-ResourceSet which is higher layer signaling. As an example, the base station may configure one of the following details for the UE.

No configured SRS resource set having resourceType value of "aperiodic" in SRS-ResourceSet which is higher layer signaling One SRS resource set having resourceType value of "aperiodic" in SRS-ResourceSet which is higher layer signaling Regarding the above details, if one SRS resource set is configured, each SRS resource set may include two SRS resources, the two SRS resources may be transmitted at different OFDM symbol locations in the same slot, each SRS resource in the corresponding SRS resource set may include two SRS ports, and the two SRS ports of respective SRS resources may be connected to different UE antenna ports.

As an example, first and second SRS resources each including two SRS ports may be included in the corresponding SRS resource set, the two SRS ports of the first and second SRS resources may be connected to different UE antenna ports, the two SRS ports of the first SRS resource may be transmitted at a first OFDM symbol location in the first slot, and the two SRS ports of the second SRS resource may be transmitted at a second OFDM symbol location in the same slot.

If the UE reported srs-ExtensionAperiodicSRS-r17, the base station may configure, for the UE, a maximum of two (for example, 0, 1, or 2) SRS resource set having resourceType value of "aperiodic" in SRS-ResourceSet which is higher layer signaling. As an example, the base station may configure one of the following details for the UE.

No configured SRS resource set having resourceType value of "aperiodic" in SRS-ResourceSet which is higher layer signaling One SRS resource set having resourceType value of "aperiodic" in SRS-ResourceSet which is higher layer signaling Two SRS resource sets having resourceType value of "aperiodic" in SRS-ResourceSet which is higher layer signaling Regarding the above details, if one SRS resource set is configured, each SRS resource set may include two SRS resources, the two SRS resources may be transmitted at different OFDM symbol locations in the same slot, each SRS resource in the corresponding SRS resource set may include two SRS ports, and the two SRS ports of respective SRS resources may be connected to different UE antenna ports.

As an example, first and second SRS resources each including two SRS ports may be included in the corresponding SRS resource set, the two SRS ports of the first and second SRS resources may be connected to different UE antenna ports, the two SRS ports of the first SRS resource may be transmitted at a first OFDM symbol location in the first slot, and the two SRS ports of the second SRS resource may be transmitted at a second OFDM symbol location in the same slot.

Regarding the above details, if two SRS resource sets are configured, respective SRS resources in the two SRS resource sets may be transmitted at identical or different OFDM symbol locations in two different slots, each SRS resource set may include one SRS resource, each SRS resource in the two SRS resource sets may include two SRS ports, and the two SRS ports of respective SRS resources in the two SRS resource sets may be connected to different UE antenna ports.

As an example, a first SRS resource including two SRS ports may be included in the first SRS resource set, a second SRS resource including two SRS ports may be included in the second SRS resource set, the two SRS ports of the first and second SRS resources may be connected to different UE antenna ports, the two SRS ports of the first SRS resource may be transmitted at a first OFDM symbol location of the first slot, and the two SRS ports of the second SRS resource may be transmitted at a second OFDM symbol of the second slot. The first and second OFDM symbol locations may be identical to or different from each other in respective slots, but the slot locations may be different from each other.

If the UE did not report both srs-AntennaSwitching2SP-1Periodic-r17 and srs-ExtensionAperiodicSRS-r17 which are UE capability reports The base station may configure, for the UE, a maximum of two SRS resource set having different resourceType values in SRS-ResourceSet which is higher layer signaling.

Regarding the above details, each SRS resource set may include two SRS resources, the two SRS resources may be transmitted at different OFDM symbol locations, each SRS resource in the corresponding SRS resource set may include two SRS ports, and the two SRS ports of the respective SRS resources may be connected to different UE antenna ports.

As an example, first and second SRS resources each including two SRS ports may be included in the corresponding SRS resource set, the two SRS ports of the first and second SRS resources may be connected to different UE antenna ports, the two SRS ports of the first SRS resource may be transmitted at a first OFDM symbol location, and the two SRS ports of the second SRS resource may be transmitted at a second OFDM symbol location. The first and second OFDM symbol locations may be different from each other, but the slot locations may be identical to or different from each other.

Regarding the UE's 1T4R operation, higher layer signaling from the base station regarding a combination of at least one of the following details may be configured, and an operation based thereof may be possible.

If the UE reported some or all of srs-AntennaSwitching2SP-1Periodic-r17, srs-ExtensionAperiodicSRS-r17, and srs-OneAP-SRS-r17 which are UE capability reports If the UE did not report srs-AntennaSwitching2SP-1Periodic-r17, the base station may configure, for the UE, a maximum of one (for example, 0 or 1) SRS resource set having resourceType value of "periodic" or "semi-persistent" in SRS-ResourceSet which is higher layer signaling. As an example, the base station may configure one of the following details for the UE.

No configured SRS resource set having resourceType value of "periodic" or "semi-persistent" in SRS-ResourceSet which is higher layer signaling.

One SRS resource set having resourceType value of "periodic" in SRS-ResourceSet which is higher layer signaling.

One SRS resource set having resourceType value of "semi-persistent" in SRS-ResourceSet which is higher layer signaling.

Regarding the above details, each SRS resource set may include four SRS resources, the four SRS resources may be transmitted at different OFDM symbol locations, each SRS resource in the corresponding SRS resource set may include one SRS port, and the one SRS port of respective SRS resources may be connected to different UE antenna ports.

As an example, first to fourth SRS resources each including one SRS port may be included in the corresponding SRS resource set, the one SRS port of the first to fourth SRS resources may be connected to different UE antenna ports, the one SRS port of the first to fourth SRS resources may be transmitted at first to fourth OFDM symbol locations, and the first to fourth OFDM symbol locations may be different from each other, but the slot locations may be identical to or different from each other.

If the UE reported srs-AntennaSwitching2SP-1Periodic-r17, the base station may configure, for the UE, a maximum of two SRS resource sets having resourceType value of "semi-persistent" in SRS-ResourceSet which is higher layer signaling, and the base station may configure, for the UE, a maximum of one SRS resource set having resourceType value of "periodic" in SRS-ResourceSet which is higher layer signaling.

Regarding the above details, two SRS resource sets having resourceType value of "semi-persistent" in SRS-ResourceSet which is higher layer signaling may not be activated simultaneously.

Regarding the above details, each SRS resource set may include four SRS resources, the four SRS resources may be transmitted at different OFDM symbol locations, each SRS resource in the corresponding SRS resource set may include one SRS port, and the one SRS port of respective SRS resources may be connected to different UE antenna ports.

As an example, first to fourth SRS resources each including one SRS ports may be included in the corresponding SRS resource set, the one SRS port of the first to fourth SRS resources may be connected to different UE antenna ports, the one SRS port of the first to fourth SRS resources may be transmitted at first to fourth OFDM symbol locations, and first to fourth OFDM symbol locations may be different from each other, but slot locations may be equal to or different from each other.

According to which is reported by the UE between srs-ExtensionAperiodicSRS-r17 and srs-OneAP-SRS-r17 which are UE capability reports, the base station's higher layer signaling configuration and the UE's operation may be expected as follow.

If the UE did not report both srs-ExtensionAperiodicSRS-r17 and srs-OneAP-SRS-r17, the base station may configure, for the UE, 0 or 2 SRS resource sets having resourceType value of "aperiodic" in SRS-ResourceSet which is higher layer signaling.

If the UE reported both srs-ExtensionAperiodicSRS-r17 and srs-OneAP-SRS-r17, the base station may configure, for the UE, 0, 1, 2, or 4 SRS resource sets having resourceType value of "aperiodic" in SRS-ResourceSet which is higher layer signaling.

If the UE reported only srs-ExtensionAperiodicSRS-r17 among srs-ExtensionAperiodicSRS-r17 and srs-OneAP-SRS-r17, the base station may configure, for the UE, 0, 2, or 4 SRS resource sets having resourceType value of "aperiodic" in SRS-ResourceSet which is higher layer signaling.

If the UE reported only srs-OneAP-SRS-r17 among srs-ExtensionAperiodicSRS-r17 and srs-OneAP-SRS-r17, the base station may configure, for the UE, 0, 1, or 2 SRS resource sets having resourceType value of "aperiodic" in SRS-ResourceSet which is higher layer signaling.

Regarding the above details, if one SRS resource set is configured, each SRS resource set may include four SRS resources, the four SRS resources may be transmitted at different OFDM symbol locations in the same slot, each SRS resource in the corresponding SRS resource set may include one SRS port, and the one SRS port of respective SRS resources may be connected to different UE antenna ports.

As an example, first to fourth SRS resources each including one SRS port may be included in the corresponding SRS resource set, the one SRS port of the first to fourth SRS resources may be connected to different UE antenna ports, the one SRS port of the first to fourth SRS resources may be transmitted at first to fourth OFDM symbol locations in the same slot, and the first to fourth OFDM symbol locations may be different from each other.

Regarding the above details, if two SRS resource sets are configured,

Each SRS resource set may include two SRS resources, or the first SRS resource set may include one SRS resource, and the second SRS resource set may include three SRS resources.

Respective SRS resources in each SRS resource set may be transmitted at different OFDM symbol locations in the same slot, and SRS transmission regarding respective SRS resource sets may be performed in different slots. During SRS transmission between different SRS resources of different SRS resource sets, the same may be transmitted at identical or different OFDM symbols, but the slot locations may differ.

Respective SRS resources may include one SRS port, and the one SRS port of respective SRS resources may be connected to different UE antenna ports.

As an example, first and second SRS resources each including one SRS port may be included in the first SRS resource set, and third and fourth SRS resources each including one SRS port may be included in the second SRS resource set. The one SRS port of the first to fourth SRS resources may be connected to different UE antenna ports. The one SRS port of each of the first and second SRS resources may be transmitted at first and second OFDM symbol locations in the same slot, and the first and second OFDM symbol locations may be different from each other. The one SRS port of each of the third and fourth SRS resources may be transmitted at third and fourth OFDM symbol locations in a slot different from the slot in which the first and second SRS resources are transmitted, and the third and fourth OFDM symbol locations may be different from each other. The first OFDM symbol location may be identical to or different from the third and fourth OFDM symbol locations, and the second OFDM symbol location may be similarly identical to or different from the third and fourth OFDM symbol locations.

As another example, a first SRS resource including one SRS port may be included in the first SRS resource set, and second to fourth SRS resources each including one SRS port may be included in the second SRS resource set. The one SRS port of the first to fourth SRS resources may be connected to different UE antenna ports. The one SRS port of the first SRS resource may be transmitted at a first OFDM symbol location in a slot. The one SRS port of each of the second to fourth SRS resources may be transmitted at second to fourth OFDM symbol locations in a slot different from the slot in which the first SRS resource is transmitted, and the second to fourth OFDM symbol locations may be different from each other. The first OFDM symbol location may be identical to or different from the second to fourth OFDM symbol locations.

Regarding the above details, if four SRS resource sets are configured, each SRS resource set may include one SRS resource, the four SRS resources may be transmitted at identical or different OFDM symbol locations in each slot, and SRS transmission regarding respective SRS resource sets may be performed in different slots. Each SRS resource in the corresponding SRS resource set may include one SRS port, and the one SRS port of respective SRS resources may be connected to different UE antenna ports.

As an example, first to fourth SRS resources may be included in first to fourth SRS resource sets, respectively, (that is, one SRS resource is included in one SRS resource set), the one SRS port of the first to fourth SRS resources may be connected to different UE antenna ports, the one SRS port of the first to fourth SRS resources may be transmitted at first to fourth OFDM symbol locations in different slots, and the first to fourth OFDM symbol locations in each slot may be identical to or different from each other, but the slot locations may be different from each other.

If the UE did not report all of srs-AntennaSwitching2SP-1Periodic-r17, srs-ExtensionAperiodicSRS-r17, and srs-OneAP-SRS-r17 which are UE capability reports, that is, if all of the three UE capability reports are not reported, The base station may configure, for the UE, a maximum of one (that is, 0 or 1) SRS resource set having resourceType value of “periodic” or “semi-persistent” in SRS-ResourceSet which is higher layer signaling.

Regarding the above details, each SRS resource set may include four SRS resources, the four SRS resources may be transmitted at different OFDM symbol locations, each SRS resource in the corresponding SRS resource set may include one SRS port, and the one SRS port of the respective SRS resources may be connected to different UE antenna ports.

As an example, first to fourth SRS resources each including one SRS port may be included in the corresponding SRS resource set, the one SRS port of the first to fourth SRS resources may be connected to different UE antenna ports, the one SRS port of the first to fourth SRS resources may be transmitted at first to fourth OFDM symbol locations, and the first to fourth second OFDM symbol locations may be different from each other, but the slot locations may be identical to or different from each other.

The base station may configure, for the UE, 0 or 2 SRS resource sets having resourceType value of “aperiodic” in SRS-ResourceSet which is higher layer signaling. If two SRS resource sets are configured, some or all of the following details may be considered.

Each SRS resource set may include two SRS resources, or the first SRS resource set may have one SRS resource, and the second SRS resource set may have three SRS resources.

Respective SRS resources in each SRS resource set may be transmitted at different OFDM symbol locations in the same slot, and SRS transmission regarding respective SRS resource sets may be performed in different slots. SRS transmission of different SRS resources of different SRS resource sets may occur at identical or different OFDM symbol locations, but the slot locations may be different.

Each SRS resource may include one SRS port, and the one SRS port of respective SRS resources may be connected to different UE antenna ports.

As an example, first and second SRS resources each including one SRS port may be included in the first SRS resource set, and third and fourth SRS resources each including one SRS port may be included in the second SRS resource set. The one SRS port of the first to fourth SRS resources may be connected to different UE antenna ports. The one SRS port of the first and second SRS resources may be transmitted at first and second OFDM symbol locations in an identical slot, and the first and second OFDM symbol locations may be different from each other. The one SRS port of the third and fourth SRS resources may be transmitted at third and fourth OFDM symbol locations in a slot different from the slot in which the first and second SRS resources are transmitted, and the third and fourth OFDM symbol locations may be different from each other. The first OFDM symbol location may be identical to or different from the third and fourth OFDM symbol locations, and the second OFDM symbol location may be similarly identical to or different from the third and fourth OFDM symbol locations.

As another example, a first SRS resource including one SRS port may be included in the first SRS resource set, and second to fourth SRS resources each including one SRS port may be included in the second SRS resource set. The one SRS port of the first to fourth SRS resources may be connected to different UE antenna ports. The one SRS port of the first SRS resource may be transmitted at a first OFDM symbol location in a slot. The one SRS port of each of the second to fourth SRS resources may be transmitted at second to fourth OFDM symbol locations in a slot different from the slot in which the first SRS resource is transmitted, and the second to fourth OFDM symbol locations may be different from each other. The first OFDM symbol location may be identical to or different from the second to fourth OFDM symbol locations.

Regarding the above details, if multiple SRS resource sets are configured (for example, if two or four SRS resource sets are configured).

The UE may expect that the base station may configure the same values of p0, alpha, pathlossReferenceRS, and srs-PowerControlAdjustmentStates, which are power control parameters that can be configured in each SRS resource set through higher layer signaling, in all SRS resource sets, respectively. That is, the UE may expect that multiple SRS resource sets may all have the same power control parameters. Such a restriction may be hereinafter referred to as a [power control parameter restriction].

The [power control parameter restriction] may be applied only to SRS resource sets having the value of resourceType configured as "aperiodic" in SRS-ResourceSet which is higher layer signaling by the base station for the UE.

The [power control parameter restrictions] may be applied only to SRS resource sets having the value of resourceType configured as "periodic," "semi-persistent," or "aperiodic" in SRS-ResourceSet which is higher layer signaling by the base station for the UE.

The UE may expect that the base station may configure the value of aperiodicSRS-ResourceTrigger which is higher layer signaling or the value of one entry in AperiodicSRS-ResourceTriggerList which is higher layer signaling to be identical in all SRS resource sets. Such a restriction may be hereinafter referred to as a [aperiodic SRS trigger restriction].

In this regard, aperiodicSRS-ResourceTrigger which is higher layer signaling configured in an SRS resource set by the base station refers to aperiodic SRS trigger state information. If the UE receives an aperiodic SRS trigger regarding a specific aperiodic SRS trigger state from the base station through DCI, and if the value configured in aperiodicSRS-ResourceTrigger which is higher layer signaling corresponds to the aperiodic SRS trigger state indicated by the DCI, the UE may perform aperiodic SRS transmission regarding the corresponding SRS resource set.

Similarly, AperiodicSRS-ResourceTriggerList which is higher layer signaling configured in an SRS resource set by the base station includes multiple pieces of aperiodic SRS trigger state information. If the UE receives an aperiodic SRS trigger regarding a specific aperiodic SRS trigger state from the base station through DCI, and if the aperiodic SRS trigger state indicated by the DCI is included in multiple values configured in AperiodicSRS-ResourceTriggerList which is higher layer signaling, the UE may perform aperiodic SRS transmission regarding the corresponding SRS resource set.

While aperiodicSRS-ResourceTrigger which is higher layer signaling provided a function such that the corresponding SRS resource set can be included in one aperiodic SRS trigger state, AperiodicSRS-ResourceTriggerList which is higher layer signaling provides a function such that the corresponding SRS resource set can be included in multiple aperiodic SRS trigger states, and the possibility that the corresponding SRS resource set can be triggered by the base station may increase.

The [aperiodic SRS trigger restriction] may be applied only to SRS resource sets having the value of resourceType configured as "aperiodic" in SRS-ResourceSet which is higher layer signaling by the base station for the UE.

The UE may expect from the base station that slotOffset which is higher layer signaling inside respective SRS resource sets may have different values. Such a restriction may be hereinafter referred to as a [slot offset detail].

The [slot offset detail] may be applied only to SRS resource sets having the value of resourceType configured as "aperiodic" in SRS-ResourceSet which is higher layer signaling by the base station for the UE.

Regarding the UE's ITIR, 2T2R, and 4T4R operations, higher layer signaling from the base station regarding a combination of at least one of the following details may be configured, and an operation based thereof may be possible.

If the UE did not report srs-AntennaSwitching2SP-1Periodic-r17 which is a UE capability report, the base station may configure, for the UE, a maximum of two SRS resource sets.

If the UE reported srs-AntennaSwitching2SP-1Periodic-r17 which is a UE capability report, the UE may receive a higher layer signaling configuration from the base station as follows.

Two SRS resource sets having resourceType value of "semi-persistent" in SRS-ResourceSet which is higher layer signaling, and one SRS resource set having resourceType value of "periodic" in SRS-ResourceSet which is higher layer signaling.

Regarding the above details, two SRS resource sets having resourceType value of "semi-persistent" in SRS-ResourceSet which is higher layer signaling may not be activated simultaneously.

A maximum of two SRS resource sets

Each SRS resource sets includes one SRS resource, and in the case of 1T1R, 2T2R, and 4T4R, the number of SRS ports configured in respective SRS resources may be 1, 2, and 4, respectively.

The UE may not expect that, in the case of 1T1R, 2T2R, and 4T4R, SRS transmission regarding two or more SRS resource sets having "usage" which is higher layer signaling configured as "antennaSwitching" may be configured or triggered at the same OFDM symbol location.

Regarding the UE's 1T6R operation, higher layer signaling from the base station regarding a combination of at least one of the following details may be configured, and an operation based thereof may be possible.

The base station may configure, for the UE, a maximum of one (that is, 0 or 1) SRS resource set having resourceType value of "periodic" in SRS-ResourceSet which is higher layer signaling, one SRS resource set may include six SRS resources, each SRS resource may include one SRS port, respective SRS resource may be transmitted at different OFDM symbols in identical or different slots, and the one SRS port of respective SRS resources may be connected to different UE antenna ports.

The UE may receive a configuration regarding an SRS resource set having resourceType value of "semi-persistent" in SRS-ResourceSet which is higher layer signaling, as follows.

If the UE did not report srs-AntennaSwitching2SP-1Periodic-r17 whichis a UE capability report, the base station may configure, for the UE, a maximum of one (that is, 0 or 1) SRS resource set having resourceType value of "semi-persistent" in SRS-ResourceSet which is higher layer signaling.

If the UE reported srs-AntennaSwitching2SP-1Periodic-r17 which is a UE capability report, the base station may configure, for the UE, a maximum of two (that is, 0, 1, or 2) SRS resources set having resourceType value of "semi-persistent" in SRS-ResourceSet which is higher layer signaling, and two SRS resource sets having resourceType value of "semi-persistent" in SRS-ResourceSet which is higher layer signaling may not be activated simultaneously.

One SRS resource set may include six SRS resources, each SRS resource may include one SRS port, respective SRS resources may be transmitted at different OFDM symbol locations in identical or different slots, and the one SRS port of respective SRS resources may be connected to different UE antenna ports.

The base station may configure, for the UE, a maximum of three (that is, 0, 1, 2, or 3) SRS resource sets having resourceType value of "aperiodic" in SRS-ResourceSet which is higher layer signaling.

If one SRS resource set is configured, six SRS resources may be included therein, each SRS resource may include one SRS port, respective SRS resources may be transmitted at different OFDM symbol locations in the same slot, and the one SRS port of respective SRS resources may be connected to different UE antenna ports.

If two SRS resource sets are configured, a total of six SRS resources may be divided and included in the two SRS resource sets, each SRS resource may include one SRS port, all SRS resources in each SRS resource set may be transmitted at different OFDM symbol locations in the same slot, SRS transmission regarding different SRS resource sets may be performed in identical or different OFDM symbol locations of different slots, and the one SRS port of respective SRS resources may be connected to different UE antenna ports.

As an example, the UE may include first to third SRS resources in the first SRS resource set, and may include fourth to sixth SRS resources in the second SRS resource set. Transmission regarding the first to third SRS resources in the first SRS resource set may be performed at first to third OFDM symbol locations in the first slot, and the first to third OFDM symbol locations may be different from each other. Transmission regarding the fourth to sixth SRS resources in the second SRS resource set may be performed at fourth to sixth OFDM symbol locations in the second slot, and the fourth to sixth OFDM symbol locations may be different from each other. The first and second slot locations may be different from each other, and the first to third OFDM symbol locations may be identical to or different from the fourth to sixth OFDM symbol locations.

As another example, a case in which the first and second SRS resource sets include one (for example, a first SRS resource) and five (for example, second to sixth SRS resources) SRS resources, respectively, may also be possible, and other combinations may not be excluded.

If three SRS resource sets are configured, a total of six SRS resources may be divided and included in the three SRS resource sets, each SRS resource may include one SRS port, all SRS resources in each SRS resource set may be transmitted at different OFDM symbol locations in the same slot, SRS transmission regarding different SRS resource sets may be performed in identical or different OFDM symbol locations of different slots, and the one SRS port of respective SRS resources may be connected to different UE antenna ports.

As an example, the UE may include first and second SRS resources in the first SRS resource set, may include third and fourth SRS resources in the second SRS resource set, and may include fifth and sixth SRS resources in the third SRS resource set. Transmission regarding the first and second SRS resources in the first SRS resource set may be performed at first and second OFDM symbol locations in the first slot, and the first and second OFDM symbol locations may be different from each other. Transmission regarding the third and fourth SRS resources in the second SRS resource set may be performed at third and fourth OFDM symbol locations in the second slot, and the third and fourth OFDM symbol locations may be different from each other. Transmission regarding the fifth and sixth SRS resources in the third SRS resource set may be performed at fifth and sixth OFDM symbol locations in the third slot, and the fifth and sixth OFDM symbol locations may be different from each other. The first, second, and third slot locations may be different from each other, and the first and second OFDM symbol locations, the third and fourth OFDM symbol locations, and the fifth and sixth OFDM symbol locations may be identical to or different from each other.

As another example, a case in which the first, second, and third SRS resource sets include three (for example, first to third SRS resources), two (for example, fourth and fifth SRS resources), and one (for example, a sixth SRS resource) SRS resources, respectively, may also be possible, and other combinations may not be excluded.

Regarding the UE's 1T8R operation, higher layer signaling from the base station regarding a combination of at least one of the following details may be configured, and an operation based thereof may be possible.

The base station may configure, for the UE, a maximum of one (that is, 0 or 1) SRS resource set having resourceType value of "periodic" in SRS-ResourceSet which is higher layer signaling, one SRS resource set may include eight SRS resources, each SRS resource may include one SRS port, respective SRS resource may be transmitted at different OFDM symbols in identical or different slots, and the one SRS port of respective SRS resources may be connected to different UE antenna ports.

The UE may receive a configuration regarding an SRS resource set having resourceType value of "semi-persistent" in SRS-ResourceSet which is higher layer signaling, as follows.

If the UE did not report srs-AntennaSwitching2SP-1Periodic-r17 which is a UE capability report, the base station may configure, for the UE, a maximum of one (that is, 0 or 1) SRS resource set having resourceType value of "semi-persistent" in SRS-ResourceSet which is higher layer signaling.

If the UE reported srs-AntennaSwitching2SP-1Periodic-r17 which is a UE capability report, the base station may configure, for the UE, a maximum of two (that is, 0, 1, or 2) SRS resource sets having resourceType value of "semi-persistent" in SRS-ResourceSet which is higher layer signaling, and two SRS resource sets having resourceType value of "semi-persistent" in SRS-ResourceSet which is higher layer signaling may not be activated simultaneously.

One SRS resource set may include eight SRS resources, each SRS resource may include one SRS port, respective SRS resources may be transmitted at different OFDM symbol locations in identical or different slots, and the one SRS port of respective SRS resources may be connected to different UE antenna ports.

The base station may configure, for the UE, 0, 2, 3, or 4 SRS resource sets having resourceType value of "aperiodic" in SRS-ResourceSet which is higher layer signaling.

If two SRS resource sets are configured, a total of eight SRS resources may be divided and included in the two SRS resource sets, each SRS resource may include one SRS port, all SRS resources in each SRS resource set may be transmitted at different OFDM symbol locations in the same slot, SRS transmission regarding different SRS resource sets may be performed in identical or different OFDM symbol locations of different slots, and the one SRS port of respective SRS resources may be connected to different UE antenna ports.

As an example, the UE may include first to fourth SRS resources in the first SRS resource set, and may include fifth to eighth SRS resources in the second SRS resource set. Transmission regarding the first to fourth SRS resources in the first SRS resource set may be performed at first to fourth OFDM symbol locations in the first slot, and the first to fourth OFDM symbol locations may be different from each other. Transmission regarding the fifth to eighth SRS resources in the second SRS resource set may be performed at fifth to eighth OFDM symbol locations in the second slot, and the fifth to eighth OFDM symbol locations may be different from each other. The first and second slot locations may be different from each other, and the first to fourth OFDM symbol locations may be identical to or different from the fifth to eighth OFDM symbol locations.

As another example, a case in which the first and second SRS resource sets include one (for example, a first SRS resource) and seven (for example, second to eighth SRS resources) SRS resources, respectively, may also be possible, and other combinations may not be excluded.

If three SRS resource sets are configured, a total of eight SRS resources may be divided and included in the three SRS resource sets, each SRS resource may include one SRS port, all SRS resources in each SRS resource set may be transmitted at different OFDM symbol locations in the same slot, SRS transmission regarding different SRS resource sets may be performed in identical or different OFDM symbol locations of different slots, and the one SRS port of respective SRS resources may be connected to different UE antenna ports.

As an example, the UE may include first to third SRS resources in the first SRS resource set, may include fourth to sixth SRS resources in the second SRS resource set, and may include seventh and eighth SRS resources in the third SRS resource set. Transmission regarding the first to third SRS resources in the first SRS resource set may be performed at first to third OFDM symbol locations in the first slot, and the first to third OFDM symbol locations may be different from each other. Transmission regarding the fourth to sixth SRS resources in the second SRS resource set may be performed at fourth to sixth OFDM symbol locations in the second slot, and the fourth to sixth OFDM symbol locations may be different from each other. Transmission regarding the seventh and eighth SRS resources in the third SRS resource set may be performed at seventh and eighth OFDM symbol locations in the third slot, and the seventh and eighth OFDM symbol locations may be different from each other. The first, second, and third slot locations may be different from each other, and the first to third OFDM symbol locations, the fourth to sixth OFDM symbol locations, and the seventh and eighth OFDM symbol locations may be identical to or different from each other.

As another example, a case in which the first, second, and third SRS resource sets include four (for example, first to fourth SRS resources), two (for example, fifth and sixth SRS resources), and two (for example, seventh and eighth SRS resource) SRS resources, respectively, may also be possible, and other combinations may not be excluded.

If four SRS resource sets are configured, a total of eight SRS resources may be divided and included in the four SRS resource sets, each SRS resource may include one SRS port, all SRS resources in each SRS resource set may be transmitted at different OFDM symbol locations in the same slot, SRS transmission regarding different SRS resource sets may be performed in identical or different OFDM symbol locations of different slots, and the one SRS port of respective SRS resources may be connected to different UE antenna ports.

As an example, the UE may include first and second SRS resources in the first SRS resource set, may include third and fourth SRS resources in the second SRS resource set, may include fifth and sixth SRS resources in the third SRS resource set, and may include seventh and eighth SRS resources in the fourth SRS resource set. Transmission regarding the first and second SRS resources in the first SRS resource set may be performed at first and second OFDM symbol locations in the first slot, and the first and second OFDM symbol locations may be different from each other. Transmission regarding the third and fourth SRS resources in the second SRS resource set may be performed at third and fourth OFDM symbol locations in the second slot, and the third and fourth OFDM symbol locations may be different from each other. Transmission regarding the fifth and sixth SRS resources in the third SRS resource set may be performed at fifth and sixth OFDM symbol locations in the third slot, and the fifth and sixth OFDM symbol locations may be different from each other. Transmission regarding the seventh and eighth SRS resource in the fourth SRS resource set may be performed at seventh and eighth OFDM symbol locations in the fourth slot, and the seventh and eight OFDM symbol locations may be different from each other. The first to fourth slot locations may be different from each other, and the first and second OFDM symbol locations, the third and fourth OFDM symbol locations, the fifth and sixth OFDM symbol locations, and the seventh and eighth OFDM symbol locations, may be identical to or different from each other.

As another example, a case in which the first, second, third, and fourth SRS resource sets include three (for example, first to third SRS resources), two (for example, fourth and fifth SRS resources), and two (for example, sixth and seventh SRS resource), and one (for example, eighth SRS resource), SRS resources, respectively, may also be possible, and other combinations may not be excluded.

Regarding the UE's 2T6R operation, higher layer signaling from the base station regarding a combination of at least one of the following details may be configured, and an operation based thereof may be possible.

- The base station may configure, for the UE, a maximum of one (that is, 0 or 1) SRS resource set having resourceType value of "periodic" in SRS-ResourceSet which is higher layer signaling, one SRS resource set may include three SRS resources, each SRS resource may include two SRS ports, respective SRS resource may be transmitted at different OFDM symbols in identical or different slots, and the two SRS ports of respective SRS resources may be connected to different UE antenna ports.
- The UE may receive a configuration regarding an SRS resource set having resourceType value of "semi-persistent" in SRS-ResourceSet which is higher layer signaling from the base station, as follows.
  - If the UE did not report srs-AntennaSwitching2SP-1Periodic-r17 which is a UE capability report, the base station may configure, for the UE, a maximum of one (that is, 0 or 1) SRS resource set having resourceType value of "semi-persistent" in SRS-ResourceSet which is higher layer signaling.
  - If the UE reported srs-AntennaSwitching2SP-1Periodic-r17 which is a UE capability report, the base station may configure, for the UE, a maximum of two (that is, 0, 1, or 2) SRS resource sets having resourceType value of "semi-persistent" in SRS-ResourceSet which is higher layer signaling, and two SRS resource sets having resourceType value of "semi-persistent" in SRS-ResourceSet which is higher layer signaling may not be activated simultaneously.
  - One SRS resource set may include three SRS resources, each SRS resource may include two SRS ports, respective SRS resources may be transmitted at different OFDM symbol locations in identical or different slots, and the two SRS ports of respective SRS resources may be connected to different UE antenna ports.
- The base station may configure, for the UE, a maximum of 3 (that is, 0, 1, 2, or 3) SRS resource sets having resourceType value of "aperiodic" in SRS-ResourceSet which is higher layer signaling.
  - If one SRS resource set is configured, three SRS resources may be included therein, each SRS resource may include two SRS ports, respective SRS resources may be transmitted at different OFDM symbol locations in the same slot, and the two SRS ports of respective SRS resources may be connected to different UE antenna ports.
  - If two SRS resource sets are configured, a total of three SRS resources may be divided and included in the two SRS resource sets, each SRS resource may include two SRS ports, all SRS resources in each SRS resource set may be transmitted at different OFDM symbol locations in the same slot, SRS transmission regarding different SRS resource sets may be performed in identical or different OFDM symbol locations of different slots, and the two SRS ports of respective SRS resources may be connected to different UE antenna ports.
    - As an example, the UE may include first and second SRS resources in the first SRS resource set, and may include a third SRS resource in the second SRS resource set. Transmission regarding the first and second SRS resources in the first SRS resource set may be performed at first and second OFDM symbol locations in the first slot, and the first and second OFDM symbol locations may be different from each other. Transmission regarding the third SRS resource in the second SRS resource set may be performed at a third OFDM symbol location in the second slot. The first and second slot locations may be different from each other, and the first and second OFDM symbol locations may be identical to or different from the third OFDM symbol
    - As another example, a case in which the first and second SRS resource sets include one (for example, a first SRS resource) and two (for example, second and third SRS resources) SRS resources, respectively, may also be possible, and other combinations may not be excluded.
  - If three SRS resource sets are configured, a total of three SRS resources may be divided and included in the three SRS resource sets, each SRS resource may include two SRS ports, all SRS resources in each SRS resource set may be transmitted at different OFDM symbol locations in the same slot, SRS transmission regarding different SRS resource sets may be performed in identical or different OFDM symbol locations of different slots, and the two SRS ports of respective SRS resources may be connected to different UE antenna ports.
    - As an example, the UE may include a first SRS resource in the first SRS resource set, may include a second SRS resource in the second SRS resource set, and may include a third SRS resource in the third SRS resource set. Transmission regarding the first SRS resource in the first SRS resource set may be performed at a first OFDM symbol location in the first slot. Transmission regarding the second SRS resource in the second SRS resource set may be performed at a second OFDM symbol location in the second slot. Transmission regarding the third SRS resource in the third SRS resource set may be performed at a third OFDM symbol location in the third slot. The first, second, and third slot locations may be different from each other, and the first to third OFDM symbol locations may be identical to or different from each other.

Regarding the UE's 2T8R operation, higher layer signaling from the base station regarding a combination of at least one of the following details may be configured, and an operation based thereof may be possible.

The base station may configure, for the UE, a maximum of one (that is, 0 or 1) SRS resource set having resourceType value of "periodic" in SRS-ResourceSet which is higher layer signaling, one SRS resource set may include four SRS resources, each SRS resource may include two SRS ports, respective SRS resource may be transmitted at different OFDM symbols in identical or different slots, and the two SRS ports of respective SRS resources may be connected to different UE antenna ports.

The UE may receive a configuration regarding an SRS resource set having resourceType value of "semi-persistent" in SRS-ResourceSet which is higher layer signaling, as follows.

If the UE did not report srs-AntennaSwitching2SP-1Periodic-r17 which is a UE capability report, the base station may configure, for the UE, a maximum of one (that is, 0 or 1) SRS resource set having resourceType value of "semi-persistent" in SRS-ResourceSet which is higher layer signaling.

If the UE reported srs-AntennaSwitching2SP-1Periodic-r17 which is a UE capability report, the base station may configure, for the UE, a maximum of two (that is, 0, 1, or 2) SRS resource sets having resourceType value of "semi-persistent" in SRS-ResourceSet which is higher layer signaling, and two SRS resource sets having resourceType value of "semi-persistent" in SRS-ResourceSet which is higher layer signaling may not be activated simultaneously.

One SRS resource set may include four SRS resources, each SRS resource may include two SRS ports, respective SRS resources may be transmitted at different OFDM symbol locations in identical or different slots, and the two SRS ports of respective SRS resources may be connected to different UE antenna ports.

The base station may configure, for the UE, 0, 2, 3, or 4 SRS resource sets having resourceType value of "aperiodic" in SRS-ResourceSet which is higher layer signaling.

If one SRS resource set is configured, four SRS resources may be included therein, each SRS resource may include two SRS ports, respective SRS resources may be transmitted at different OFDM symbol locations in the same slot, and the two SRS ports of respective SRS resources may be connected to different UE antenna ports.

If two SRS resource sets are configured, a total of four SRS resources may be divided and included in the two SRS resource sets, each SRS resource may include two SRS ports, all SRS resources in each SRS resource set may be transmitted at different OFDM symbol locations in the same slot, SRS transmission regarding different SRS resource sets may be performed in identical or different OFDM symbol locations of different slots, and the two SRS ports of respective SRS resources may be connected to different UE antenna ports.

As an example, the UE may include first and second SRS resources in the first SRS resource set, and may include third and fourth SRS resources in the second SRS resource set. Transmission regarding the first and second SRS resources in the first SRS resource set may be performed at first and second OFDM symbol locations in the first slot, and the first and second OFDM symbol locations may be different from each other. Transmission regarding the third and fourth SRS resources in the second SRS resource set may be performed at third and fourth OFDMs symbol location in the second slot, and the third and fourth OFDM symbol locations may be different from each other. The first and second slot locations may be different from each other, and the first and second OFDM symbol locations may be identical to or different from the third and fourth OFDM symbol locations.

As another example, a case in which the first and second SRS resource sets include one (for example, a first SRS resource) and three (for example, second to fourth SRS resources) SRS resources, respectively, may also be possible, and other combinations may not be excluded.

If three SRS resource sets are configured, a total of four SRS resources may be divided and included in the three SRS resource sets, each SRS resource may include two SRS ports, all SRS resources in each SRS resource set may be transmitted at different OFDM symbol locations in the same slot, SRS transmission regarding different SRS resource sets may be performed in identical or different OFDM symbol locations of different slots, and the two SRS ports of respective SRS resources may be connected to different UE antenna ports.

As an example, the UE may include first and second SRS resources in the first SRS resource set, may include a third SRS resource in the second SRS resource set, and may include a fourth SRS resource in the third SRS resource set. Transmission regarding the first and second SRS resources in the first SRS resource set may be performed at first and second OFDM symbol locations in the first slot, and the first and second OFDM symbol locations may be different from each other. Transmission regarding the third SRS resource in the second SRS resource set may be performed at a third OFDM symbol location in the second slot. Transmission regarding the fourth SRS resource in the third SRS resource set may be performed at a fourth OFDM symbol location in the third slot. The first, second, and third slot locations may be different from each other, and the first to fourth OFDM symbol locations may be identical to or different from each other.

As an example, a case in which the first, second, and third SRS resource sets include one (for example, a first SRS resource), two (for example, second and third SRS resources), and one (for example, a fifth SRS resource), respectively, may also be possible, and other combinations may not be excluded.

If four SRS resource sets are configured, a total of four SRS resources may be divided and included in the four SRS resource sets, each SRS resource may include two SRS ports, all SRS resources in each SRS resource set may be transmitted at different OFDM symbol locations in the same slot, SRS transmission regarding different SRS resource sets may be performed in identical or different OFDM symbol locations of different slots, and the two SRS port of respective SRS resources may be connected to different UE antenna ports.

As an example, the UE may include first, second, third, and fourth SRS resources in the first, second, third, and fourth SRS resource sets, respectively, transmission regarding the first, second, third, and fourth SRS resources in the first, second, third, and fourth SRS resource sets may be performed at first, second, third, and fourth OFDM symbol locations in first, second, third, and fourth slots, respectively, the first to fourth slot locations may be different from each other, and the first to fourth OFDM symbol locations may be identical to or different from each other.

Regarding the UE's 4T8R operation, higher layer signaling from the base station regarding a combination of at least one of the following details may be configured, and an operation based thereof may be possible.

If the UE did not report srs-AntennaSwitching2SP-1Periodic-r17 which is a UE capability report, The base station may configure, for the UE, a maximum of two (for example, 0, 1, or 2) SRS resource set having resourceType value of "periodic" or "semi-persistent" in SRS-ResourceSet which is higher layer signaling. As an example, the base station may configure one of the following details for the UE.

No configured SRS resource set having resourceType value of "periodic" or "semi-persistent" in SRS-ResourceSet which is higher layer signaling.

One SRS resource set having resourceType value of "periodic" in SRS-ResourceSet which is higher layer signaling.

One SRS resource set having resourceType value of "semi-persistent" in SRS-ResourceSet which is higher layer signaling.

One SRS resource set having resourceType value of "periodic" in SRS-ResourceSet which is higher layer signaling, and one SRS resource set having resourceType value of "semi-persistent" therein.

Regarding the above details, each SRS resource set may include two SRS resources, each SRS resource may include four SRS ports, respective SRS resources may be transmitted at different OFDM symbol locations in identical or different slots, and the four SRS ports of respective SRS resources may be connected to different UE antenna ports.

If the UE reported srs-AntennaSwitching2SP-1Periodic-r17 which is a UE capability report, the base station may configure, for the UE, a maximum of two (that is, 0, 1, or 2) SRS resource sets having resourceType value of "semi-persistent" in SRS-ResourceSet which is higher layer signaling, the base station may configure, for the UE, a maximum of one (that is, 0 or 1) SRS resource set having resourceType value of "periodic" in SRS-ResourceSet which is higher layer signaling, and two SRS resource sets having resourceType value of "semi-persistent" in SRS-ResourceSet which is higher layer signaling may not be activated simultaneously.

Each SRS resource set may include two SRS resources, each SRS resource may include four SRS ports, respective SRS resources may be transmitted at different OFDM symbol locations in identical or different slots, and the fourth SRS ports of respective SRS resources may be connected to different UE antenna ports.

The base station may configure, for the UE, 0, 1, or 2 SRS resource sets having resourceType value of "aperiodic" in SRS-ResourceSet which is higher layer signaling.

If one SRS resource set is configured, two SRS resources may be included therein, each SRS resource may include four SRS ports, respective SRS resources may be transmitted at different OFDM symbol locations in the same slot, and the four SRS ports of respective SRS resources may be connected to different UE antenna ports.

If two SRS resource sets are configured, a total of two SRS resources may be divided and included in the two SRS resource sets, each SRS resource may include four SRS ports, all SRS resources in each SRS resource set may be transmitted at different OFDM symbol locations in the same slot, SRS transmission regarding different SRS resource sets may be performed in identical or different OFDM symbol locations of or different slots, and the four SRS port of respective SRS resources may be connected to different UE antenna ports.

As an example, the UE may include first and second SRS resources in the first and second SRS resource sets, respectively, and transmission regarding the first and second SRS resources in the first and second SRS resource sets may be performed at first and second OFDM symbol locations in the first and second slots, respectively. The first and second OFDM symbol locations may be different from each other.

When the UE performs an antenna switching operation, that is, when the UE transmits different SRS resources connected to different antenna port(s), a time interval of about 15 μs may be generally necessary between two adjacent SRS resources among all transmitted SRS resources. In view of this, a (minimum) guard period may be defined as in [Table 36] below:

TABLE 36

| μ | $\Delta f = 2^{\mu} \cdot 15$[kHz] | Y [symbol] |
|---|---|---|
| 0 | 15 | 1 |
| 1 | 30 | 1 |
| 2 | 60 | 1 |
| 3 | 120 | 2 |

In [Table 36], refers to numerology, Δf refers to a subcarrier spacing, and Y may refer to the number of OFDM symbols expressing the guard period, that is, the time length of the guard period. Referring to [Table 36], the guard period may be configured based on parameter p that determines the numerology. The UE is configured not to transmit any different signal in the guard period, and the guard period may be configured to be fully used for antenna switching.

As an example, the guard period may be configured between transmission timepoints of two adjacent SRS resources in view of SRS resources transmitted at different OFDM symbol locations in the same slot.

As another example, if the UE had two SRS resource sets configured for antenna switching usage, if the two SRS resource sets were configured or triggered to be transmitted in two consecutive slots, and if the UE reported a UE capability indicating that the UE can transmit SRSs at all OFDM symbol locations inside slots, the UE may expect that there may be a guard period for antenna switching corresponding to at least Y OFDM symbols, based on [Table 36] above, between the last OFDM symbol in which SRS transmission is performed in the first slot in which SRS transmission regarding the first SRS resource set is performed, and the first OFDM symbol in which SRS transmission is performed in the second slot in which SRS transmission regarding the second SRS resource set is performed. That is, the time difference between two SRS transmissions may be actually larger than or equal to the Y OFDM symbols.

With regard to such an inter-slot guard period, similarly to the above-described guard period between two SRS resources inside slots, if the actual time difference between the last SRS transmission of the first slot and the first SRS transmission of the next slot, in two consecutive slots, corresponds to Y OFDM symbols, the UE may not transmit any signal in the Y OFDM symbol intervals.

With regard to such an inter-slot guard period, if the actual time difference between the last SRS transmission of the first slot and the first SRS transmission of the next slot, in two consecutive slots, corresponds to Y OFDM symbols, and if all SRS transmissions before and after the guard period are dropped (canceled) due to overlapping with other signals, the UE may determine that the inter-slot guard period defined by Y OFDM symbols is also dropped (canceled) by applying the same priority as the SRS transmissions before and after the guard period, and may perform uplink transmission in this inter-slot guard period upon determining the dropping.

With regard to all antenna switching schemes described above, the UE may expect that the same number of SRS ports may be configured for all SRS resources in all SRS resource sets having higher layer signaling "usage" in SRS resource sets configured as "antennaSwitching" by the base station.

With regard to antenna switching schemes based on 1T24, 1T4R, 2T4R, 1T6R, 1T8R, 2T6R, 2T8R, and 4T8R operations described above, the UE may not expect that two or more among SRS resource sets having higher layer signaling "usage" configured as "antennaSwitching" by the base station may be configured or triggered in the same slot.

With regard to antenna switching schemes based on 1TR2T2R, and 4T4R operations, the UE may not expect that two or more among SRS resource sets having higher layer signaling "usage" configured as "antennaSwitching" by the base station may be configured or triggered in the same OFDM symbol.

Figure 20:
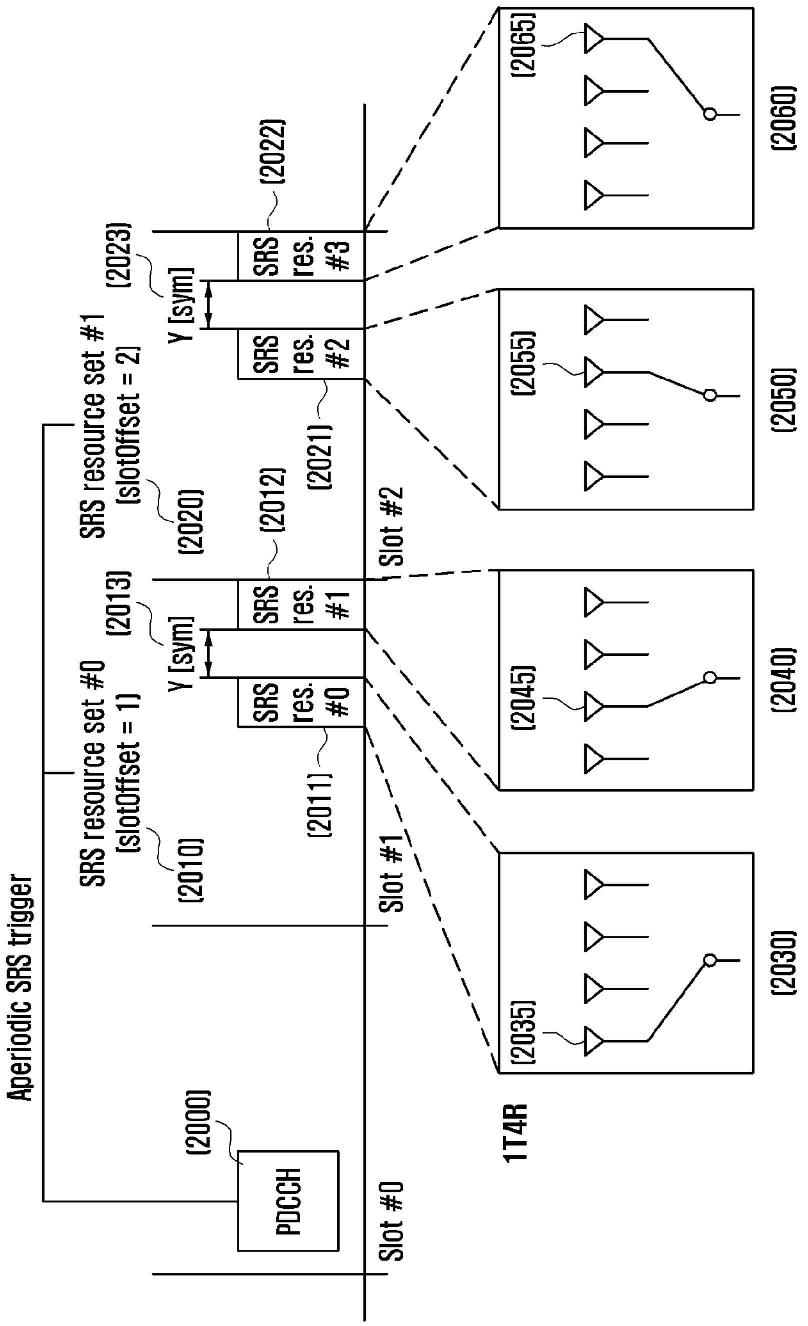
FIG. 20 illustrates an antenna switching operation according to an embodiment of the present disclosure.

FIG. 20 illustrates an antenna switching operation according to an embodiment of the present disclosure.

FIG. 20 illustrates a situation in which the UE operates based on 1T4R, and in which the UE may have two aperiodic SRS resource sets (for example, SRS resource set #0 and #1) configured therefor. The UE may receive a PDCCH from the base station (2000), and an aperiodic SRS trigger regarding SRS resource set #0 2010 and SRS resource set #2 2020 may be indicated through the PDCCH. The slot offset value regarding SRS resource set #0 2010 may be configured by slotOffset which is higher layer signaling, the value thereof may be 1, and aperiodic SRS transmission regarding SRS resource set #0 2010 may be performed at a location after one slot from the slot in which the PDCCH is received (that is, in slot #1). In addition, the slot offset value regarding SRS resource set #1 2020 may be configured by slotOffset which is higher layer signaling, the value thereof may be 2, and aperiodic SRS transmission regarding SRS resource set #1 may be performed at a location after two slots from the slot in which the PDCCH is received (that is, in slot #2).

SRS resource #0 2011 and SRS resource #1 2012 included in SRS resource set #0 2010 are transmitted at different OFDM symbol locations in slot #1, and Y OFDM symbols may exist as a guard period between SRS resource #0 and #1 (2013). In addition, during transmission regarding SRS resource #0 (2030), the UE may connect one SRS port to the first reception antenna port 2035 of the UE so as to perform SRS transmission, and during transmission regarding SRS resource #1 (2040), the UE may connect one SRS antenna port to the second reception antenna port 2045 of the UE so as to perform SRS transmission.

SRS resource #2 2021 and SRS resource #3 2022 included in SRS resource set #1 2020 are transmitted at different OFDM symbol locations in slot #1, and Y OFDM symbols may exist as a guard period between SRS resource #2 and #3 (2023). In addition, during transmission regarding SRS resource #2 (2050), the UE may connect one SRS port to the third reception antenna port 2055 of the UE so as to perform SRS transmission, and during transmission regarding SRS resource #3 (2060), the UE may connect one SRS antenna port to the fourth reception antenna port 2065 of the UE so as to perform SRS transmission.

By connecting the four SRS resources #0 to #3 described above to different reception antenna ports of the UE and then transmitting SRSs, the UE may transmit SRSs from all different reception antenna ports to be able to acquire information regarding channels connected to all reception antennas of the UE, and the base station may thereby acquire information regarding channels between the base station and the UE and utilize the same for uplink or downlink scheduling.

Hereinafter, embodiments of the disclosure will be described in detail with reference to the accompanying drawings. The content in the disclosure is applicable in FDD and TDD systems. As used herein, higher layer signaling (or higher layer signaling) is a method for transferring signals from a base station to a UE by using a downlink data channel of a physical layer, or from the UE to the base station by using an uplink data channel of the physical layer, and may also be referred to as RRC signaling, PDCP signaling, or a medium access control (MAC) control element (MAC CE).

Hereinafter, in the disclosure, the UE may use various methods to determine whether or not to apply cooperative communication, for example, PDCCH(s) that allocates a PDSCH to which cooperative communication is applied have a specific format, or PDCCH(s) that allocates a PDSCH to which cooperative communication is applied include a specific indicator indicating whether or not to apply cooperative communication, or PDCCH(s) that allocates a PDSCH to which cooperative communication is applied are scrambled by a specific RNTI, or cooperative communication application is assumed in a specific range indicated by a higher layer. Hereinafter, it will be assumed, for convenience of description, that NC-JT case refers to a case in which the UE receives a PDSCH to which cooperative communication is applied, based on conditions similar to those described above.

Hereinafter, the description that priority between A and B is determined may be variously mentioned, such as the entity having a high priority is selected according to a predetermined priority rule, and a corresponding operation is performed, or operations regarding the entity having a lower priority is omitted or dropped.

Hereinafter, the above examples may be described through multiple embodiments, but they are not independent of each other, and one or more embodiments may be applied simultaneously or in combination.

Hereinafter, for convenience of description, a cell, a transmission point, a panel, a beam, and/or a transmission direction which can be distinguished through a higher layer/L1 parameter such as a TCI state or spatial relation information, a cell ID, a TRP ID, or a panel ID may be described as a transmission reception point (TRP), a beam, or a TCI state as a whole. Therefore, during actual application, a TRP, a beam, or a TCI state may be appropriately replaced with one of the above terms.

Hereinafter, in the disclosure, the UE may use various methods to determine whether or not to apply cooperative communication, for example, PDCCH(s) that allocates a PDSCH to which cooperative communication is applied have a specific format, or PDCCH(s) that allocates a PDSCH to which cooperative communication is applied include a specific indicator indicating whether or not to apply cooperative communication, or PDCCH(s) that allocates a PDSCH to which cooperative communication is applied are scrambled by a specific RNTI, or cooperative communication application is assumed in a specific range indicated by a higher layer. Hereinafter, it will be assumed, for convenience of description, that NC-JT case refers to a case in which the UE receives a PDSCH to which cooperative communication is applied, based on conditions similar to those described above.

Hereinafter, embodiments of the disclosure will be described in detail with reference to the accompanying drawings. Hereinafter, a base station refers to an entity that allocates resources to a terminal, and may be at least one of a gNode B, a gNB, an eNode B, a node B, a base station (BS), a radio access unit, a base station controller, or a node on a network. A terminal may include user equipment (UE), a mobile station (MS), a cellular phone, a smart phone, a computer, or a multimedia system capable of performing a communication function. Hereinafter, although embodiments of the disclosure will be described with reference to a 5G system as an example, embodiments of the disclosure are also applicable to other communication systems having similar technical backgrounds or channel types. For example, LTE or LTE-A mobile communications and mobile communication technologies developed after 5G may be included therein. Therefore, embodiments of the disclosure are also applicable to other communication systems through a partial modification without substantially deviating from the scope of the disclosure as deemed by those skilled in the art. The content in the disclosure is applicable in FDD and TDD systems.

In addition, in the following description of the disclosure, detailed descriptions of related functions or configurations will be omitted if deemed to unnecessarily obscure the gist of the disclosure. The terminology used herein is defined in view of functions in the disclosure, and may be varied depending on the intent of the user/operator, practices, and the like. Therefore, the definition thereof is to be made based on the overall context of the disclosure.

In the following description of the disclosure, higher layer signaling may refer to signaling corresponding to at least one among the following signaling, or a combination of one or more thereof:

Master information block (MIB);

System information block (SIB) or SIB X (X=1, 2, . . . );

Radio resource control (RRC); or

Medium access control (MAC) control element (CE).

In addition, L1 may refer to signaling corresponding to at least one among signaling methods using the following physical layer channel or signaling, or a combination of one or more thereof:

Physical downlink control channel (PDCCH);

Downlink control information (DCI);

UE-specific DCI;

Group common DCI;

Common DCI;

Scheduling DCI (for example, DCI used for the purpose of scheduling downlink or uplink data);

Non-scheduling DCI (for example, DCI not used for the purpose of scheduling downlink or uplink data);

Physical uplink control channel (PUCCH); or

Uplink control information (UCI).

Hereinafter, the description that priority between A and B is determined may be variously mentioned, such as the entity having a high priority is selected according to a predetermined priority rule, and a corresponding operation is performed, or operations regarding the entity having a lower priority is omitted or dropped.

As used herein, the term "slot" may generally refer to a specific time unit corresponding to a transmit time interval (TTI), may specifically refer to a slot used in a 5G NR system, or may refer to a slot or a subframe used in a 4G LTE system.

Hereinafter, the above examples may be described through multiple embodiments, but they are not independent of each other, and one or more embodiments may be applied simultaneously or in combination.

Hereinafter, a/b/c may be understood as at least one of a, b, or c.

First Embodiment: SRS Resource Configuration and Indication Methods

As an embodiment of the disclosure, SRS resource configuration and indication methods will be described. The present embodiment may be combined with all embodiments in the disclosure and considered in a base station and a UE. A conventional SRS resource supports a maximum of four antenna ports (hereinafter, used interchangeably with ports) as described above, and with regard to the location of all SRS resource transmission symbols determined based on higher layer signaling, the UE may perform SRS transmission through all ports in respective symbols. As an example, if the UE had a 4-port SRS resource, the number of transmission symbols of which is 4, configured by the base station through higher layer signaling, the UE could perform transmission through four ports in respective symbols.

It is expected that improved releases of NR in the future may consider a maximum of eight UE antenna ports, thereby supporting improved specifications. Corresponding functions are under discussion in the current NR release 18. There may be a possibility that in future releases or in $6^{th}$ generation mobile communication systems, the UE may consider more than eight antenna ports. However, if SRSs are transmitted in all ports configured with regard to respective symbols in which SRSs are transmitted, as currently supported, and if the port number increases, transmission power for each port decreases during SRS transmission, and the base station's reception performance may be limited in the case of a UE which is at a cell boundary and thus has insufficient coverage. Therefore, the base station and the UE may consider various methods as follows such that the UE can transmit SRSs with N (a specific number larger than 4) antenna ports. Hereinafter, SRS resource transmission may be understood as transmission of an SRS based on an SRS resource. In addition, SRS resource set transmission may be understood as transmission of an SRS based on an SRS resource set. In addition, transmission of an SRS antenna port may be understood as transmission of SRSs having features of respective antenna ports.

[Method 1-1] Single SRS Resource Use Method 1

In order to transmit an SRS having N antenna ports, the UE may have a single SRS resource configured by the base station. The base station may configure, for the UE, a single SRS resource having N antenna ports, and during SRS transmission in a single or multiple symbols of the corresponding SRS resource through the N antenna ports, the N antenna ports may be all transmitted in respective symbols. As an example, when transmitting an SRS resource ofN antenna ports, the number Ns of SRS symbols of which is 4, the UE may transmit the SRS resource all through the N antenna ports in respective symbols.

Since current specification support regarding 1, 2, or 4 antenna ports is all based on a single SRS resource, and the same definition of various parameters regarding time and frequency resource allocation in [Table 29] above can be used in method 1-1. Therefore, method 1-1 may be a natural expansion in response to the increasing number of UE antenna ports. However, there may be a problem in that, based on method 1-1, the UE transmits all antenna ports in one symbol, thereby decreasing transmission power with regard to each antenna port in one symbol.

[Method 1-2] Single SRS Resource Use Method 2

In order to transmit an SRS having N antenna ports, the UE may have a single SRS resource configured by the base station. The base station may configure, for the UE, a single SRS resource having N antenna ports, and during SRS transmission in one or more symbols configured in the corresponding SRS resource, the number of antenna ports used for transmission in respective symbols may be smaller than or equal to N, and the number of symbols necessary to transmit an SRS resource all through N antenna ports may be larger than or equal to 1.

In method 1-2, the SRS resource is transmitted through some antenna ports among the total of N antenna ports in each symbol, and the transmission power of antenna ports with regard to each symbol may be increased compared with method 1-1 in which all of the N antenna ports for each symbol are used for transmission. However, transmission through antenna ports in method 1-2 is different from the definition of conventional specifications according to which SRSs are transmitted in respective symbols through all antenna ports configured in a specific SRS resource, and the definition of various parameters regarding time and frequency resource allocation in [Table 29] above may need to be partially changed or newly defined.

[Method 1-3] Multiple SRS Resource Use Method

In order to transmit an SRS having N antenna ports, the UE may have multiple SRS resources configured by the base station. The base station may configure, for the UE, M (M>1) SRS resources having antenna ports, the number of which is smaller than or equal to N, in order to support SRS transmission corresponding to N antenna ports from the UE. During SRS transmission in a single or multiple symbols of the corresponding SRS resource through antenna ports, the number of which is smaller than or equal to N, configured in respective SRS resources, two SRS resources may all be transmitted in respective symbols.

As an example, if two SRS resources having four antenna ports for each SRS resource are configured for the UE for SRS transmission of eight antenna ports, and if Ns is configured as 4 for the two SRS resources, the two SRS resources may all be transmitted through four antenna ports in each symbol with regard to the two SRS resources. Multiple SRS resources may be included in the same SRS resource set, or included in different SRS resource sets, respectively. Multiple SRS resources configured for SRS transmission of N (>4) antenna ports as described above may be referred to as an SRS resource group. The number N of antenna ports which may be expressed by multiple SRS resources may be larger than 4, may be 6, 8, 12, or 16, for example, and this may be expressed by SRS resources having 1, 2, or 4 antenna ports. The UE may expect that SRS resources configured by the base station or included in each SRS resource group which may be determined by the above-described rule may all have the same number of antenna ports (as in the above example, each SRS resource may have four antenna ports). In addition, case in which they have different numbers of antenna ports may not be excluded. As an example, if three SRS resources are configured to express N=8 antenna ports, the first and second SRS resources may have two antenna ports, and the third SRS resource may have four antenna ports.

Method 1-3 enables transmission of multiple SRS resources through N antenna ports unlike methods based on one SRS resource supported by current specifications, and the definition of various parameters regarding time and frequency resource allocation in [Table 29] above may need to be partially changed or newly defined. However, similarly to method 1-2, the number of antenna ports used to transmit respective SRS resource with regard to respective symbols is smaller than or equal to the entire number N of antenna ports, and the transmission power may increase with regard to each port.

[Method 1-4] Method for Selecting from Above-Described [Method 1-1] to [Method 1-3]

In order to transmit an SRS having N antenna ports, the UE may be instructed semi-statically or dynamically by the base station to use one of the above-described [Method 1-1] to [Method 1-3]. As an example, the UE may use one of the above-described [Method 1-1] to [Method 1-3] according to a configuration instruction received from the base station through higher layer signaling, or may dynamically receive an instruction through L1 signaling. Alternatively, the UE may use one of two methods, such as one of [Method 1-1] and [Method 12, one of [Method 1-1] and [Method 1-3], or one of [Method 1-2] and [Method 1-3], according to a configuration instruction received from the base station through higher layer signaling, or may dynamically receive an instruction through L1 signaling. If the UE is positioned inside a cell and thus has sufficient coverage, the base station may configure SRS transmission regarding N antenna ports based on [Method 1-1] for the UE through higher layer signaling, or may dynamically instruct the same through L1 signaling. As a method for dynamically instructing the same through L1 signaling, a new field inside a DCI format, for example, may be used, or a reserved code point of a currently existing DCI field may be used, and an SRS request field may be used, for example.

The UE may report UE capability to the base station regarding whether a combination of at least one of the above-described [Method 1-1] to [Method 1-4] can be supported. The UE capability may be reported differently depending on the frequency range (FR), or may be reported with regard to each band, each band combination, each feature set, or each feature set per CC. In addition, the above-mentioned UE capability may be UE capabilities independent of each other, or multiple components inside a single UE capability may be used to define whether respective methods are supported.

If the UE supports a combination of at least one of the above-described [Method 1-1] to [Method 1-4], higher layer signaling "usage" of an SRS resource set may be capable of codebook and antenna switching. In addition, a case in which the usage is non-codebook and beam management may not be excluded.

If the above-described [Method 1-3] is followed, and if the UE has multiple SRS resources configured in the same SRS resource set, the maximum number of SRS resources in the corresponding SRS resource set which may be configured for the UE through higher layer signaling may be 4 or larger. If the UE has multiple SRS resources configured in different SRS resource sets, the UE may have two or more SRS resource sets, the usage of which is codebook, through higher layer signaling.

If the above-described [Method 1-3] is followed, the UE uses multiple SRS resources having N antenna ports for SRS transmission, and the UE may thus need to change the definition regarding a codepoint inside an SRS resource indicator (SRI) inside DCI format 0_1, 0_2 transmitted from the base station for the purpose of scheduling regarding codebook-based PUSCH transmission. Each codepoint in the current SRIs indicates a single SRS resource, but if the UE is configured by the base station so as to use the above-described [Method 1-3], the definition regarding the codepoint of the SRI field may be changed according to the following methods:

[Method 1-3-1] SRS Resource Group Indication

The UE may assume that each codepoint of the SRI field in DCI format 0_1 and 0_2 indicated by the base station indicates an SRS resource group including multiple SRS resources. As an example, if the SRI has two codepoints, the first codepoint may indicate SRS resource group 0, and the second codepoint may indicate SRS resource group 1. SRS resource group 0 may include SRS resources 0 and 1, and SRS resource group 1 may include SRS resources 2 and 3. The base station may configure such SRS resource groups for the UE by a higher layer. In addition, if the base station configures multiple SRS resources in the same SRS resource group, the UE may determine that a specific number of SRS resources from the lowest SRS resource index in the corresponding SRS resource set constitutes one group.

The total number of antenna ports expressed through multiple SRS resources may be configured for each SRS resource set. As an example, if the number of antenna ports configured in an SRS resource set is 8, if the total number of SRS resources is 4, and if the index of respective SRS resources is 0 to 3, SRS resource indices 0 and 1 may constitute the first SRS resource group, and SRS resource indices 2 and 3 may constitute the second SRS resource group. In this case, the first SRS resource group may correspond to the first codepoint of the SRI field, and the second SRS resource group may correspond to the second codepoint.

[Method 1-3-2] a combination of multiple SRS resources indicated similarly to the non-codebook case.

The UE may assume that each codepoint of the SRI field in DCI format 0_1 and 0_2 indicated by the base station indicates a single SRS resource or a combination of multiple SRS resources. This may be similar to the meaning of the SRI field in DCI format 0_1 and 0_2 for scheduling non-codebook-based PUSCH transmission. If four SRS resources are configured in an SRS resource set having usage configured as non-codebook, a total of 24−1=15 codepoints may be needed by each SRI field in DCI format 0_1 and 0_2 for scheduling non-codebook-based PUSCH transmission, in order to express all methods for selecting one to four from the four SRS resources. Similarly to a non-codebook scheme that considers all methods for selecting subsets from all configured SRS resources in this manner, method 1-3-2 may use a method of selecting all or some of subsets.

As an example, assuming that the total number of SRS resources is M, and assuming that M SRS resources all have the same number of antenna ports, combinations of only a specific number of SRS resources among the M SRS resources may be considered. As an example, a method for selecting two from M may be considered. In this case, the SRI field may have as many codepoints as the methods for selecting two from M. If it is assumed that the M SRS resources may have different numbers of antenna ports, a case in which respective combinations of SRS resources have the same total number of antenna ports may be generated by considering the combination of a specific number of SRS resources or another specific number of SRS resources among M. The SRI field may have a codepoint which may indicate the number of respective combinations of SRS resources. As an example, if one SRS resource set includes four SRS resources each having two antenna ports and two SRS resources each having four antenna ports, and if a total of eight antenna ports are to be expressed by using multiple SRS resources, a combination of two SRS resources each having four antenna ports may be used, or a combination of one SRS resource having four antenna ports and two SRS resources each having two antenna ports may be used.

[Method 1-3-3] Indicating one SRS resource and automatically indicating other SRS resources connected to the indicated SRS resource.

The UE may assume that each codepoint of the SRI field in DCI format 0_1 and 02 indicated by the base station indicates a single SRS resource, and the single SRS resource indicated by each codepoint may be connected to multiple other SRS resources. The total number of SRS ports configured for multiple other SRS resources connected to the single SRS resource may be N. The corresponding connection may be configured through higher layer signaling. The base station and the UE may not change the definition of each codepoint of the SRI field, and the base station may indicate one SRS resource to the UE and may simultaneously indicate multiple SRS resources connected thereto through higher layer signaling as well.

The UE may report UE capability to the base station regarding whether a combination of at least one of the above-described [Method 1-3-1] to [Method 1-3-3] can be supported. The UE capability may be reported differently depending on the frequency range (FR), or may be reported with regard to each band, each band combination, each feature set, or each feature set per CC. In addition, the above-mentioned UE capability may be UE capabilities independent of each other, or multiple components inside a single UE capability may be used to define whether respective methods are supported.

With regard to above-described [Method 1-3], if the UE receives higher layer signaling from the base station with regard to multiple SRS resources in order to use above-described [Method 1-3-1] to [Method 1-3-3], the UE may distinguish, among various pieces of higher layer signaling configuration information inside SRS resources mentioned in [Table 29] above from the base station, pieces of higher layer signaling configuration information which need to be configured identically with regard to all of multiple SRS resources necessary to transmit an SRS having N antenna ports from pieces of information which may be identical or different between respective SRS resources.

The UE may expect that, among parameters in [Table 29], parameters related to the SRS transmission sequence, such as groupOrSequenceHopping and sequenceId, and a parameter indicating periodic, semi-static, or aperiodic transmission of SRS resources, such as resourceType, may be configured identically with regard to all of multiple SRS resources necessary to transmit an SRS having N antenna ports.

In addition, the UE may expect that, among parameters in [Table 29], resourceMapping, resourceMapping-r16, and resourceMapping-17 (information related to SRS time resource allocation), and freqDomainPosition, freqDomainShift, and freqHopping (information related to frequency resource allocation) may be configured identically or differently with regard to multiple SRS resources necessary to transmit an SRS having N antenna ports. In addition, the UE may expect that transmissionComb and transmissionComb-n8-r17, which determine the frequency and location of a transmission RE of an SRS, may have the same comb value with regard to multiple SRS resources, and may expect that the comb offset may be configured identically or differently. In addition, the UE may expect that the partial factor, which is configured for an RB level partial frequency sounding operation of an SRS, may also have the same value with regard to multiple SRS resources.

The UE may expect that, among parameters in [Table 29], information for determining the transmission beam of an SRS, such as spatialrelationinfo and srs-TCIState-r17, may be configured identically or differently with regard to multiple SRS resources. Particularly, if multiple SRS resources are configured in different SRS resource sets, the UE may expect that the two parameters related to transmission beam determination may be configured differently with regard to multiple SRS resources.

Second Embodiment: SRS Time Resource Allocation, Repeated Transmission, and Frequency Hopping Methods As an embodiment of the disclosure, SRS time resource allocation, repeated transmission, and frequency hopping methods according to the SRS resource configuration and indication methods described above in the above embodiment will be described. The present embodiment may be combined with all embodiments in the disclosure and considered in a base station and a UE.

According to [Table 29] above, the UE may determine the time domain transmission resource location during frequency hopping of an SRS resource through higher layer signaling such as startPosition which refers to a transmission start symbol in a slot of an SRS resource, nrofSymbols which refers to the number of consecutively transmitted symbols from the transmission start symbol in a slot, and repetitionFactor which refers to the number of consecutive symbols having frequency resources at the same location during frequency hopping.

If [method 1-1] in the above embodiment is used, that is, N antenna ports are all configured for one SRS resource, and if the SRS resource is transmitted by using all of N antenna ports with regard to each transmission symbol, the UE may perform the following operations or operations according to a combination of some thereof according to a combination of startPosition, nrofSymbols, and repetitionFactor, which are higher layer signaling, with regard to periodic/semi-persistent/aperiodic SRS transmission.

- The UE may have nrofSymbols-r17 (hereinafter, referred to as Ns) which is higher layer signaling configured as 2, 4, 8, 10, 12, or 14 with regard to an aperiodic SRS, and may have repetitionFactor-r17 (hereinafter, referred to as R) configured as 1. When performing frequency hopping, only intra-slot frequency hopping may be possible. When performing frequency hopping, the number of consecutive symbols having frequency resources at the same location may be 1 (=R).
  - The base station may configure corresponding higher layer signaling for the UE such that relatively small frequency resources are allocated to the UE during SRS transmission in each OFDM symbol, thereby reducing power consumed by the UE (this may cause less power consumption than in the case of wide frequency resource allocation), and channel estimation at multiple different frequency resource locations may be possible through frequency hopping.
- The UE may have Ns which is higher layer signaling configured as a value larger than or equal to 4 with regard to an aperiodic SRS, may have R configured as a value larger than or equal to 2, and R may be divisor of Ns. When performing frequency hopping, only intra-slot frequency hopping may be possible. When performing frequency hopping, the number of consecutive symbols having frequency resources at the same location may be R.
  - The base station may configure corresponding higher layer signaling for the UE such that, if the UE is positioned in a shaded area among the coverage of the base station, thereby degrading the channel estimation performance of the base station by receiving an SRS transmitted from the UE, channel estimation accuracy may be improved by transmitting an SRS on multiple OFDM symbols at a specific frequency location of the UE, and channel estimation at multiple different frequency resource, locations may be possible through frequency hopping.
- The UE may have Ns configured as 1 with regard to an aperiodic/semi-persistent SRS, and may have R configured as 1. When performing frequency hopping, only inter-slot frequency hopping may be possible. When performing frequency hopping, the number of consecutive symbols having frequency resources at the same location may be 1 (=R).
  - The base station may configure corresponding higher layer signaling for the UE such that, if the UE is positioned at a place having a good channel state among the coverage of the base station, thereby degrading the channel estimation performance of the base station by receiving an SRS transmitted from the UE, valid channel estimation performance may be secured even through SRS transmission in a single OFDM symbol of the UE. Despite being a periodically transmitted signal, the amount of time resource consumed for this may be reduced, and time resources secured accordingly may be utilized for scheduling other uplinks and downlinks.

The UE may have Ns which is higher layer signaling configured as a value larger than or equal to 4 with regard to a periodic/aperiodic SRS, may have R configured as a value larger than or equal to 2, and R may be divisor of Ns. When performing frequency hopping, inter-slot or intra-slot frequency hopping may be possible. When performing frequency hopping, the number of consecutive symbols having frequency resources at the same location may be R.

The base station may configure corresponding higher layer signaling for the UE such that channel estimation accuracy can be improved by transmitting an SRS on multiple OFDM symbols at a specific frequency location of the UE, and channel estimation at multiple different frequency resource locations may be possible through frequency hopping.

The UE may have Ns which is higher layer signaling configured as a value larger than or equal to 4 with regard to a periodic/aperiodic SRS, may have R configured as a value equal to Ns. When performing frequency hopping, inter-slot frequency hopping may be possible. When performing frequency hopping, the number of consecutive symbols having frequency resources at the same location in each slot may be R (=Ns).

The base station may configure corresponding higher layer signaling for the UE such that the UE performs repeated transmission by using multiple time resources at the same frequency resource location, thereby improving channel estimation accuracy regarding the corresponding frequency resource location during SRS reception by the base station.

If [method 1-2] in the above embodiment is used, that is, if N antenna ports are configured for one SRS resource, and if some of the N antenna ports are transmitted with regard to each transmission symbol, the UE may perform the following operations by considering the definition of startPosition, nrofSymbols, and repetitionFactor which are higher layer signaling.

[Time Resource Operation 2-1]

The UE may consider that Ns has the existing definition, that is, refers to the number of consecutive symbols in which the corresponding SRS resource is transmitted. If N antenna ports are configured for one SRS resource, and if the SRS resource is transmitted through some of the N antenna ports with regard to each transmission symbol, the UE may expect, based on an assumption that M symbols are necessary to transmit the SRS resource through all of the N antenna ports, that Ns having M as its divisor may be configured for the corresponding SRS resource.

As an example, assuming that N=8 antenna ports are configured for the UE, that an SRS resource is transmitted through four antenna ports with regard to each transmission symbol, and the SRS resource is transmitted through all of N=8 antenna ports through M=2 symbols, the UE may have one of Ns=2, 4, 8, 10, 12, and 14, which are multiples of M=2, configured with regard to the corresponding SRS resource. If Ns is 4, the number of consecutive symbols through which the corresponding SRS resource is transmitted is 4, and it may be expected that the SRS resource may be transmitted in the first and third symbols through 4 among the total of 8 antenna ports (for example, SRS antenna ports 0 to 3), and that the SRS resource may be transmitted in the second and fourth symbols through other 4 among the total of 8 antenna ports (for example, SRS antenna ports 4 to 7). As another method, it may be expected that the SRS resource may be transmitted in the first two symbols through 4 among the total of 8 antenna ports (for example, SRS antenna ports 0 to 3), and that the SRS resource may be transmitted in the remaining two symbols through other 4 among the total of 8 antenna ports (for example, SRS antenna ports 4 to 7). (The disclosure may not be limited to the above-described examples, and another example in which 4 among the total of 8 antenna ports are configured such as SRS antenna ports 0, 2, 4, 6 may not be excluded.)

The UE may consider that R has the existing definition, that is, refers to the number of consecutive symbols having frequency resources at the same location, in which the corresponding SRS resource is transmitted. Therefore, as described above, the value of R that may be configured for the UE may be a divisor of Ns. If the UE has N antenna ports configured for one SRS resource, if the SRS resource is transmitted through some of the N antenna ports with regard to each transmission symbol, and if M symbols are necessary to transmit the SRS resource through all of the N antenna ports, the minimum value of R may be 1 or M.

If the minimum value of R that may be configured for the UE is 1, meaning that the number of consecutive symbols having the same frequency resource is 1, only some of the N antenna ports may then be transmitted in one symbol, and an SRS corresponding to the corresponding antenna ports may be transmitted at different frequency locations with regard to each group of some specific antenna ports (which are transmitted in a specific symbol) among the N antenna ports. Therefore, an SRS corresponding to the total of N antenna ports cannot be transmitted at the same frequency location, and when the base station receives the corresponding SRS and performs channel estimation, channel information of a specific antenna port may be absent at some frequency resource locations. The base station may thus need to estimate channel information of a frequency location at which channel information does not exist by utilizing the frequency location at which channel information exists. In such a case, the frequency band of SRS transmission that the base station may estimate may widen, but the channel estimation performance may degrade at a frequency location at which channel information of a specific antenna port is absent.

If the minimum value of R that may be configured for the UE is M, meaning that the number of consecutive symbols having the same frequency resource is M, all of the N antenna ports may then be transmitted during M symbols, and an SRS corresponding to the N antenna ports may thus be transmitted at the same frequency location. Therefore, when the base station receives the corresponding SRS and performs channel estimation, channel information regarding N antenna ports may be acquired at all SRS transmission frequency locations. In such a case, the frequency band of SRS transmission that the base station may estimate decreases compared with the case in which the minimum value of R is 1, but the channel estimation performance may be improved because all antenna ports are transmitted at all SRS transmission frequency locations.

The minimum value of R that may be configured for the UE may be configured among 1 or M through higher layer signaling, indicated through L1 signaling, notified of through a combination of higher layer signaling and L1 signaling, activated/deactivated through MAC-CE signaling, or defined within specifications such that the UE operates accordingly.

Based on time resource operation 2-1 above, the UE may perform the following operations or operations according to a combination of some thereof according to a combination of startPosition, nrofSymbols, and repetitionFactor, which are higher layer signaling, with regard to periodic/semi-persistent/aperiodic SRS transmission.

- The UE may have Ns configured as 2, 4, 8, 10, 12, or 14 with regard to an aperiodic SRS, and may have R configured as 1 or M. M may be a divisor of NS. When the UE performs frequency hopping, only intra-slot frequency hopping may be possible. When performing frequency hopping, the number of consecutive symbols having frequency resources at the same location may be 1 or M (=R). Determination of the value of R may follow one of the above-described schemes.
  - If M is a divisor of Ns larger than 1 (for example, M=2), and if R is 1, SRS transmission regarding some of the total of N antenna ports is performed at a specific frequency location, and SRS transmission regarding remaining some of the total of N antenna ports is performed at a frequency location different therefrom. That is, an SRS corresponding to the total of N antenna ports cannot be transmitted at the same frequency location, and when the base station receives the corresponding SRS and performs channel estimation, channel information of a specific antenna port may be absent at some frequency resource locations. The base station may thus need to estimate channel information of a frequency location at which channel information does not exist by utilizing the frequency location at which channel information exists. In such a case, the frequency band of SRS transmission that the base station may estimate may widen, but the channel estimation performance may degrade at a frequency location at which channel information of a specific antenna port is absent.
  - If M is a divisor of Ns larger than 1 (for example, M=2), and if R is M, SRS transmission regarding some of the total of N antenna ports is performed at a specific frequency location, and SRS transmission regarding remaining some of the total of N antenna ports is performed at the same frequency location. That is, an SRS corresponding to the total of N antenna ports may be transmitted at the same frequency location. Therefore, when the base station receives the corresponding SRS and performs channel estimation, channel information regarding N antenna ports may be acquired at all SRS transmission frequency locations. In such a case, the frequency band of SRS transmission that the base station may estimate decreases compared with the case in which the minimum value of R is 1, but the channel estimation performance may be improved because all antenna ports are transmitted at all SRS transmission frequency locations.
- The UE may have Ns which is higher layer signaling configured as a value larger than or equal to 4 with regard to an aperiodic SRS, and may have R configured as a value larger than or equal to 2 or as a value larger than or equal to M. R and/or M may be a divisor of Ns. When performing frequency hopping, only intra-slot frequency hopping may be possible. When performing frequency hopping, the number of consecutive symbols having frequency resources at the same location may be R.
  - If M is a divisor of Ns larger than 1 (for example, M=2), and if R is 2, SRS transmission regarding some of the total of N antenna ports is performed at a specific frequency location, and SRS transmission regarding remaining some of the total of N antenna ports is performed at the same frequency location. That is, an SRS corresponding to the total of N antenna ports may be transmitted at the same frequency location. Therefore, when the base station receives the corresponding SRS and performs channel estimation, channel information regarding N antenna ports may be acquired at all SRS transmission frequency locations. In such a case, the frequency band of SRS transmission that the base station may estimate decreases compared with the case in which the minimum value of R is 1, but the channel estimation performance may be improved because all antenna ports are transmitted at all SRS transmission frequency locations.
  - If M is a divisor of Ns larger than 1 (for example, M=2), and if R is 4, SRS transmission regarding some of the total of N antenna ports is performed at a specific frequency location, SRS transmission regarding remaining some of the total of N antenna ports is performed at the same frequency location, and an SRS corresponding to the total of N antenna ports may thus be transmitted at the same frequency location. Therefore, when the base station receives the corresponding SRS and performs channel estimation, channel information regarding N antenna ports may be acquired at all SRS transmission frequency locations, and improvement of the channel estimation performance by the base station may be possible by repeated transmission of the SRS by means of the value of R.
- The UE may have Ns configured as M with regard to a periodic/semi-persistent SRS, and may have R configured as M. When performing frequency hopping, only inter-slot frequency hopping may be possible. When performing frequency hopping, the number of consecutive symbols having frequency resources at the same location may be M (=R).
  - The base station may configure higher layer signaling as described above for the UE such that, despite being periodic SRS transmission, time resource consumption is minimized, and SRS transmission regarding the total of N antenna ports is split into SRS transmissions corresponding to different antenna ports of M symbols, thereby obtaining power allocation gain per port, and obtaining more multiplexing gain with SRS transmission by other UEs.
- The UE may have Ns which is higher layer signaling configured as a value larger than or equal to 4 with regard to an aperiodic/semi-persistent SRS, may have R configured as a value larger than or equal to 2 or a value larger than or equal to M, and R and/or M may be divisor of Ns. When performing frequency hopping, intra-slot or inter-slot frequency hopping may be possible. When performing frequency hopping, the number of consecutive symbols having frequency resources at the same location may be R.
  - If M is a divisor of Ns larger than 1 (for example, M=2), and if R is 2, SRS transmission regarding some of the total of N antenna ports is performed at a specific frequency location, SRS transmission regarding remaining some of the total ofN antenna ports is performed at the same frequency location, and an SRS corresponding to the total of N antenna ports may thus be transmitted at the same frequency location. Therefore, when the base station receives the corresponding SRS and performs channel estimation, channel information regarding N antenna ports may be acquired at all SRS transmission frequency locations. In such a case, the frequency band of SRS transmission that the base station may estimate decreases compared with the case in which the minimum value of R is 1, but the channel estimation performance may be improved because all antenna ports are transmitted at all SRS transmission frequency locations.

If M is a divisor of Ns larger than 1 (for example, M=2), and if R is 4, SRS transmission regarding some of the total of N antenna ports is performed at a specific frequency location, SRS transmission regarding remaining some of the total of N antenna ports is performed at the same frequency location, and an SRS corresponding to the total of N antenna ports may thus be transmitted at the same frequency location. Therefore, when the base station receives the corresponding SRS and performs channel estimation, channel information regarding N antenna ports may be acquired at all SRS transmission frequency locations, and improvement of the channel estimation performance by the base station may be possible by repeated transmission of the SRS by means of the value of R.

The UE may have Ns which is higher layer signaling configured as a value larger than or equal to 4 with regard to an aperiodic/semi-persistent SRS, and may have R configured as the same value as Ns. When performing frequency hopping, intra-slot or inter-slot frequency hopping may be possible. When performing frequency hopping, the number of consecutive symbols having frequency resources at the same location may be R (=Ns).

The base station may configure corresponding higher layer signaling for the UE such that the UE performs repeated transmission by using multiple time resources at the same frequency resource location, thereby improving channel estimation accuracy regarding the corresponding frequency resource location during SRS reception by the base station.

[Time Resource Operation 2-2]

Assuming that the number of symbols necessary to transmit all antenna ports of a corresponding SRS resource is defined as M, the UE may understand that Ns is defined as a value indicating how many times the M symbols are used to transmit the corresponding SRS resource. That is, Ns may be defined as information regarding how many times M symbols units are used consecutively to transmit all of N antenna ports configured in an SRS resource, unlike the existing definition (the number of consecutive symbols used to transmit the SRS resource). As an example, assuming that N=8 antenna ports are configured for the UE, that an SRS resource is transmitted through four antenna ports with regard to each transmission symbol, and that the SRS resource is transmitted through all of N=8 antenna ports through M=2 symbols, the UE may have one of Ns=1, 2, 4, 5, 6, and 7 configured as information regarding how many times M=2 symbol units are used consecutively with regard to the corresponding SRS resource. As an example, if Ns is 2, the total number of consecutive symbols through which the corresponding SRS resource is transmitted may be 4, and this may mean that M=2 symbol units were used twice consecutively.

In addition, it may be expected that the SRS resource may be transmitted in the first and third symbols through 4 among the total of 8 antenna ports (for example, SRS antenna ports 0 to 3), and that the SRS resource may be transmitted in the second and fourth symbols through other 4 among the total of 8 antenna ports (for example, SRS antenna ports 4 to 7). As another method, it may be expected that the SRS resource may be transmitted in the first two symbols through 4 among the total of 8 antenna ports (for example, SRS antenna ports 0 to 3), and that the SRS resource may be transmitted in the remaining two symbols through other 4 among the total of 8 antenna ports (for example, SRS antenna ports 4 to 7). (The disclosure may not be limited to the above-described examples, and another example in which 4 among the total of 8 antenna ports are configured such as SRS antenna ports 0, 2, 4, 6 may not be excluded.)

The UE may assume that R has the existing definition, that is, refers to the number of consecutive symbols having frequency resources at the same location, in which the corresponding SRS resource is transmitted. Therefore, as described above, the value of R that may be configured for the UE may be a divisor of Ns. If the UE has N antenna ports configured for one SRS resource, if some of the N antenna ports are transmitted with regard to each transmission symbol, and if M symbols are necessary to transmit all of the N antenna ports, the minimum value of R may be 1 or M.

If the minimum value of R that may be configured for the UE is 1, meaning that the number of consecutive symbols having the same frequency resource is 1, only some of the N antenna ports may then be transmitted in one symbol, and an SRS corresponding to the corresponding antenna ports may be transmitted at different frequency locations with regard to each group of some specific antenna ports (which are transmitted in a specific symbol) among the N antenna ports. Therefore, an SRS corresponding to the total of N antenna ports cannot be transmitted at the same frequency location, and when the base station receives the corresponding SRS and performs channel estimation, channel information of a specific antenna port may be absent at some frequency resource locations. The base station may thus need to estimate channel information of a frequency location at which channel information does not exist by utilizing the frequency location at which channel information exists. In such a case, the frequency band of SRS transmission that the base station may estimate may widen, but the channel estimation performance may degrade at a frequency location at which channel information of a specific antenna port is absent.

If the minimum value of R that may be configured for the UE is M, meaning that the number of consecutive symbols having the same frequency resource is M, all of the N antenna ports may then be transmitted during M symbols, and an SRS corresponding to the N antenna ports may thus be transmitted at the same frequency location. Therefore, when the base station receives the corresponding SRS and performs channel estimation, channel information regarding all of N antenna ports may be acquired at all SRS transmission frequency locations. In such a case, the frequency band of SRS transmission that the base station may estimate decreases compared with the case in which the minimum value of R is 1, but the channel estimation performance may be improved because all antenna ports are transmitted at all SRS transmission frequency locations.

The minimum value of R that may be configured for the UE may be configured among 1 or M through higher layer signaling, indicated through L1 signaling, notified of through a combination of higher layer signaling and L1 signaling, activated/deactivated through MAC-CE signaling, or defined within specifications such that the UE operates accordingly.

Based on time resource operation 2-2 above, the UE may perform the following operations or operations according to a combination of some thereof according to a combination of startPosition, nrofSymbols, and repetitionFactor, which are higher layer signaling, with regard to periodic/semi-persistent/aperiodic SRS transmission.

The UE may have Ns configured as 1, 2, 4, 5, 6, or 7 with regard to an aperiodic SRS, and may have R configured as 1 or M. When the UE performs frequency hopping, only intra-slot frequency hopping may be possible. When performing frequency hopping, the number of consecutive symbols having frequency resources at the same location may be 1 or M (=R). Determination of the value of R may follow one of the above-described schemes.

If M is 2, and if R is 1, SRS transmission regarding some of the total of N antenna ports is performed at a specific frequency location, SRS transmission regarding remaining some of the total of N antenna ports is performed at a frequency location different therefrom, and an SRS corresponding to the total of N antenna ports thus cannot be transmitted at the same frequency location. That is, when the base station receives the corresponding SRS and performs channel estimation, channel information of a specific antenna port may be absent at some frequency resource locations. The base station may thus need to estimate channel information of a frequency location at which channel information does not exist by utilizing the frequency location at which channel information exists. In such a case, the frequency band of SRS transmission that the base station may estimate may widen, but the channel estimation performance may degrade at a frequency location at which channel information of a specific antenna port is absent.

If M is 2, and if R is M, SRS transmission regarding some of the total of N antenna ports is performed at a specific frequency location, SRS transmission regarding remaining some of the total of N antenna ports is performed at a frequency location different therefrom, and an SRS corresponding to the total ofN antenna ports may thus be transmitted at the same frequency location. Therefore, when the base station receives the corresponding SRS and performs channel estimation, channel information regarding N antenna ports may be acquired at all SRS transmission frequency locations. In such a case, the frequency band of SRS transmission that the base station may estimate decreases compared with the case in which the minimum value of R is 1, but the channel estimation performance may be improved because all antenna ports are transmitted at all SRS transmission frequency locations.

The UE may have Ns which is higher layer signaling configured as a value larger than or equal to 2 (=one of 2, 4, 5, 6, and 7) with regard to an aperiodic SRS, and may have R configured as a value larger than or equal to 2 or as a value larger than or equal to M. When performing frequency hopping, only intra-slot frequency hopping may be possible. When performing frequency hopping, the number of consecutive symbols having frequency resources at the same location may be R.

If M is 2, and if R is 2, SRS transmission regarding some of the total of N antenna ports is performed at a specific frequency location, SRS transmission regarding remaining some of the total of N antenna ports is performed at the same frequency location, and an SRS corresponding to the total of N antenna ports may thus be transmitted at the same frequency location. Therefore, when the base station receives the corresponding SRS and performs channel estimation, channel information regarding N antenna ports may be acquired at all SRS transmission frequency locations. In such a case, the frequency band of SRS transmission that the base station may estimate decreases compared with the case in which the minimum value of R is 1, but the channel estimation performance may be improved because all antenna ports are transmitted at all SRS transmission frequency locations.

If M is 2, and if R is 4, SRS transmission regarding some of the total of N antenna ports is performed at a specific frequency location, SRS transmission regarding remaining some of the total of N antenna ports is performed at the same frequency location, and an SRS corresponding to the total of N antenna ports may thus be transmitted at the same frequency location. Therefore, when the base station receives the corresponding SRS and performs channel estimation, channel information regarding N antenna ports may be acquired at all SRS transmission frequency locations, and improvement of the channel estimation performance by the base station may be possible by repeated transmission of the SRS by means of the value of R.

The UE may have Ns configured as M with regard to a periodic/semi-persistent SRS, and may have R configured as M. When performing frequency hopping, only inter-slot frequency hopping may be possible. When performing frequency hopping, the number of consecutive symbols having frequency resources at the same location may be M (=R).

The base station may configure higher layer signaling as described above for the UE such that, despite being periodic SRS transmission, time resource consumption is minimized, and SRS transmission regarding the total of N antenna ports is split into SRS transmissions corresponding to different antenna ports of M symbols, thereby obtaining power allocation gain per port, and obtaining more multiplexing gain with SRS transmission by other UEs.

The UE may have Ns which is higher layer signaling configured as a value larger than or equal to 2 (=one of 2, 4, 5, 6, and 7) with regard to a periodic/semi-persistent SRS, may have R configured as a value larger than or equal to 2 or a value larger than or equal to M. When performing frequency hopping, intra-slot or inter-slot frequency hopping may be possible. When performing frequency hopping, the number of consecutive symbols having frequency resources at the same location may be R.

If M is 2, and if R is 2, SRS transmission regarding some of the total of N antenna ports is performed at a specific frequency location, SRS transmission regarding remaining some of the total of N antenna ports is performed at the same frequency location, and an SRS corresponding to the total of N antenna ports may thus be transmitted at the same frequency location. Therefore, when the base station receives the corresponding SRS and performs channel estimation, channel information regarding N antenna ports may be acquired at all SRS transmission frequency locations. In such a case, the frequency band of SRS transmission that the base station may estimate decreases compared with the case in which the minimum value of R is 1, but the channel estimation performance may be improved because all antenna ports are transmitted at all SRS transmission frequency locations.

If M is 2, and if R is 4, SRS transmission regarding some of the total of N antenna ports is performed at a specific frequency location, SRS transmission regarding remaining some of the total of N antenna ports is performed at the same frequency location, and an SRS corresponding to the total of N antenna ports may thus be transmitted at the same frequency location. Therefore, when the base station receives the corresponding SRS and performs channel estimation, channel information regarding N antenna ports may be acquired at all SRS transmission frequency locations, and improvement of the channel estimation performance by the base station may be possible by repeated transmission of the SRS by means of the value of R.

The UE may have Ns which is higher layer signaling configured as a value larger than or equal to 2 (=one of 2, 4, 5, 6, and 7) with regard to a periodic/semi-persistent SRS, and may have R configured as the same value as M*Ns. When performing frequency hopping, intra-slot or inter-slot frequency hopping may be possible. When performing frequency hopping, the number of consecutive symbols having frequency resources at the same location may be R (=M*Ns).

The base station may configure corresponding higher layer signaling for the UE such that the UE performs repeated transmission by using multiple time resources at the same frequency resource location, thereby improving channel estimation accuracy regarding the corresponding frequency resource location during SRS reception by the base station.

If [method 1-3] in the above embodiment is used, that is, if N antenna ports are configured throughout all of multiple SRS resources, and if some of the N antenna ports configured with regard to each SRS resource and then transmitted, the UE may perform the following operations by considering the definition of startPosition, nrofSymbols, and repetitionFactor which are higher layer signaling.

[Time Resource Operation 3-1]

The UE may configure the total number of symbols in which multiple SRS resources are transmitted to be Ns of respective SRS resources. Assuming that each of n SRS resources are transmitted in m symbols, Ns may be n*m, and may Ns be configured as the same value in respective SRS resources. Assuming that the UE has N antenna ports configured with regard to each of multiple SRS resources, or N/n antenna ports configured with regard thereto (n may be a divisor of N), that some of the N antenna ports are transmitted with regard to each SRS resource, and that M (M may be smaller than or equal to m) symbols are necessary with regard to each SRS resource to transmit N antenna ports all (that is, a total of n*M OFDM symbols are necessary to transmit N antenna ports), the UE may then expect that Ns, which has n, m, and M as its divisors, may be configured with regard to each SRS resource.

As an example, assuming that two SRS resources that may express N=8 antenna ports are configured for the UE, and each SRS resource is transmitted in m=2 symbols, the UE may then have one of Ns=2, 4, 8, 10, 12, and 14, which have m=2 as divisors, configured with regard to each of the multiple SRS resources. If Ns is 4, the total number of symbols in which multiple SRS resources are transmitted is 4. It may be expected that, if 4 among the total of 8 antenna ports (for example, SRS antenna ports 0 to 3) are configured for the first SRS resource among the two SRS resources, an SRS resource (the first SRS resource) may be transmitted in the first and third symbols, and that, if other 4 among the total of 8 antenna ports (for example, SRS antenna ports 4 to 7) are configured for the second SRS resource, another SRS resource (second SRS resource) may be transmitted in the second and fourth symbols. As another method, it may be expected that the first SRS resource may be transmitted in the first two symbols through 4 among the total of 8 antenna ports (for example, SRS antenna ports 0 to 3), and that the second SRS resource may be transmitted in the remaining two symbols through other 4 among the total of 8 antenna ports (for example, SRS antenna ports 4 to 7). (The disclosure may not be limited to the above-described examples, and another example in which 4 among the total of 8 antenna ports are configured such as SRS antenna ports 0, 2, 4, 6 may not be excluded.)

The UE may assume that R has the existing definition, that is, refers to the number of consecutive symbols having frequency resources at the same location, in which the corresponding SRS resource is transmitted. Therefore, as described above, the value of R that may be configured for the UE may be a divisor of Ns. Assuming that the UE has N antenna ports configured for multiple SRS resources or has N/n antenna ports configured with regard to each SRS resource (n may be a divisor of N), that SRS resources are transmitted through some of the N antenna ports with regard to each SRS resource, and that M (M may be smaller than or equal to m) symbols are necessary with regard to each SRS resource to transmit SRS resources through all of N antenna ports (that is, a total of n*M OFDM symbols), the minimum value of R may then be 1 or M.

If the minimum value of R that may be configured for the UE is 1, meaning that the number of consecutive symbols having the same frequency resource is 1, only some of the N antenna ports may then be transmitted in one symbol, and an SRS corresponding to the corresponding antenna ports may be transmitted at different frequency locations with regard to each group of some specific antenna ports (which are transmitted in a specific symbol) among the N antenna ports. Therefore, an SRS corresponding to the total of N antenna ports cannot be transmitted at the same frequency location, and when the base station receives the corresponding SRS and performs channel estimation, channel information of a specific antenna port may be absent at some frequency resource locations. The base station may thus need to estimate channel information of a frequency location at which channel information does not exist by utilizing the frequency location at which channel information exists. In such a case, the frequency band of SRS transmission that the base station may estimate may widen, but the channel estimation performance may degrade at a frequency location at which channel information of a specific antenna port is absent.

If the minimum value of R that may be configured for the UE is M, meaning that the number of consecutive symbols having the same frequency resource is M, all of the N antenna ports may then be transmitted during a total of n*M symbols in view of n SRS resources, and an SRS corresponding to the N antenna ports may thus be transmitted at the same frequency location. Therefore, when the base station receives the corresponding SRS and performs channel estimation, channel information regarding N antenna ports may be acquired at all SRS transmission frequency locations. In such a case, the frequency band of SRS transmission that the base station may estimate decreases compared with the case in which the minimum value of R is 1, but the channel estimation performance may be improved because all antenna ports are transmitted at all SRS transmission frequency locations.

The minimum value of R that may be configured for the UE may be configured among 1 or M through higher layer signaling, indicated through L1 signaling, notified of through a combination of higher layer signaling and L1 signaling, activated/deactivated through MAC-CE signaling, or defined within specifications such that the UE operates accordingly.

Based on time resource operation 3-1 above, the UE may perform the following operations or operations according to a combination of some thereof according to a combination of startPosition, nrofSymbols, and repetitionFactor, which are higher layer signaling, with regard to periodic/semi-persistent/aperiodic SRS transmission.

The UE may have Ns configured as 2, 4, 8, 10, 12, or 14 with regard to an aperiodic SRS, and may have R configured as 1 or M. M may be a divisor of NS. When the UE performs frequency hopping, only intra-slot frequency hopping may be possible. When performing frequency hopping, the number of consecutive symbols having frequency resources at the same location may be 1 or M (=R). Determination of the value of R may follow one of the above-described schemes.

It may be assumed that n (the number of SRS resources necessary for SRS transmission regarding a total of N antenna ports) is 2, that m (the number of OFDM symbols in which SRS resources are transmitted) is 2, that M (the number of OFDM symbols necessary for SRS transmission regarding N/n antenna ports configured for each SRS resource among the total of N antenna ports) is 2, and that R is 1. In this case, SRS transmission regarding some of the total of N antenna ports is performed at a specific frequency location, and SRS transmission regarding remaining some of the total of N antenna ports is performed at a frequency location different therefrom. That is, an SRS corresponding to the total of N antenna ports cannot be transmitted at the same frequency location, and when the base station receives the corresponding SRS and performs channel estimation, channel information of a specific antenna port may be absent at some frequency resource locations. The base station may thus need to estimate channel information of a frequency location at which channel information does not exist by utilizing the frequency location at which channel information exists. In such a case, the frequency band of SRS transmission that the base station may estimate may widen, but the channel estimation performance may degrade at a frequency location at which channel information of a specific antenna port is absent.

It may be assumed that n (the number of SRS resources necessary for SRS transmission regarding a total of N antenna ports) is 2, that m (the number of OFDM symbols in which SRS resources are transmitted) is 2, that M (the number of OFDM symbols necessary for SRS transmission regarding N/n antenna ports configured for each SRS resource among the total of N antenna ports) is 2, and that R is M. In this case, SRS transmission regarding some of the total of N antenna ports is performed at a specific frequency location, SRS transmission regarding remaining some of the total of N antenna ports is performed at the same frequency location, and an SRS corresponding to the total ofN antenna ports may thus be transmitted at the same frequency location. Therefore, when the base station receives the corresponding SRS and performs channel estimation, channel information regarding N antenna ports may be acquired at all SRS transmission frequency locations. In such a case, the frequency band of SRS transmission that the base station may estimate decreases compared with the case in which the minimum value of R is 1, but the channel estimation performance may be improved because all antenna ports are transmitted at all SRS transmission frequency locations.

The UE may have Ns which is higher layer signaling configured as a value larger than or equal to 4 with regard to an aperiodic SRS, and may have R configured as a value larger than or equal to 2 or as a value larger than or equal to M. R or M may be a divisor of Ns. When performing frequency hopping, only intra-slot frequency hopping may be possible. When performing frequency hopping, the number of consecutive symbols having frequency resources at the same location may be R.

It may be assumed that n (the number of SRS resources necessary for SRS transmission regarding a total of N antenna ports) is 2, that m (the number of OFDM symbols in which SRS resources are transmitted) is 2, that M (the number of OFDM symbols necessary for SRS transmission regarding N/n antenna ports configured for each SRS resource among the total of N antenna ports) is 2, and that R is 2. In this case, SRS transmission regarding some of the total of N antenna ports is performed at a specific frequency location, SRS transmission regarding remaining some of the total of N antenna ports is performed at the same frequency location, and an SRS corresponding to the total of N antenna ports may be transmitted at the same frequency location. Therefore, when the base station receives the corresponding SRS and performs channel estimation, channel information regarding N antenna ports may be acquired at all SRS transmission frequency locations. In such a case, the frequency band of SRS transmission that the base station may estimate decreases compared with the case in which the minimum value of R is 1, but the channel estimation performance may be improved because all antenna ports are transmitted at all SRS transmission frequency locations.

It may be assumed that n (the number of SRS resources necessary for SRS transmission regarding a total of N antenna ports) is 2, that m (the number of OFDM symbols in which SRS resources are transmitted) is 2, that M (the number of OFDM symbols necessary for SRS transmission regarding N/n antenna ports configured for each SRS resource among the total of N antenna ports) is 2, and that R is 4. In this case, SRS transmission regarding some of the total of N antenna ports is performed at a specific frequency location, SRS transmission regarding remaining some of the total of N antenna ports is performed at the same frequency location, and an SRS corresponding to the total ofN antenna ports may thus be transmitted at the same frequency location. Therefore, when the base station receives the corresponding SRS and performs channel estimation, channel information regarding N antenna ports may be acquired at all SRS transmission frequency locations, and improvement of the channel estimation performance by the base station may be possible by repeated transmission of the SRS by means of the value of R.

The UE may have Ns configured as n*M with regard to a periodic/semi-persistent SRS (that is, m=M may be the case), and may have R configured as M. When performing frequency hopping, only inter-slot frequency hopping may be possible. When performing frequency hopping, the number of consecutive symbols having frequency resources at the same location may be M (=R).

The base station may configure higher layer signaling as described above for the UE such that, despite being periodic SRS transmission, time resource consumption is minimized, and SRS transmission regarding the total of N antenna ports is split into SRS transmissions corresponding to different antenna ports of M symbols, thereby obtaining power allocation gain per port, and obtaining more multiplexing gain with SRS transmission by other UEs.

The UE may have Ns which is higher layer signaling configured as a value larger than or equal to 4 with regard to a periodic/semi-persistent SRS, may have R configured as a value larger than or equal to 2 or a value larger than or equal to M, and R or M may be divisor of Ns. When performing frequency hopping, intra-slot or inter-slot frequency hopping may be possible. When performing frequency hopping, the number of consecutive symbols having frequency resources at the same location may be R.

It may be assumed that n (the number of SRS resources necessary for SRS transmission regarding a total of N antenna ports) is 2, that m (the number of OFDM symbols in which SRS resources are transmitted) is 2, that M (the number of OFDM symbols necessary for SRS transmission regarding N/n antenna ports configured for each SRS resource among the total of N antenna ports) is 2, and that R is 2. In this case, SRS transmission regarding some of the total of N antenna ports is performed at a specific frequency location, SRS transmission regarding remaining some of the total of N antenna ports is performed at the same frequency location, and an SRS corresponding to the total of N antenna ports may be transmitted at the same frequency location. Therefore, when the base station receives the corresponding SRS and performs channel estimation, channel information regarding N antenna ports may be acquired at all SRS transmission frequency locations. In such a case, the frequency band of SRS transmission that the base station may estimate decreases compared with the case in which the minimum value of R is 1, but the channel estimation performance may be improved because all antenna ports are transmitted at all SRS transmission frequency locations.

It may be assumed that n (the number of SRS resources necessary for SRS transmission regarding a total of N antenna ports) is 2, that m (the number of OFDM symbols in which SRS resources are transmitted) is 2, that M (the number of OFDM symbols necessary for SRS transmission regarding N/n antenna ports configured for each SRS resource among the total of N antenna ports) is 2, and that R is 4. In this case, SRS transmission regarding some of the total of N antenna ports is performed at a specific frequency location, SRS transmission regarding remaining some of the total of N antenna ports is performed at the same frequency location, and an SRS corresponding to the total of N antenna ports may thus be transmitted at the same frequency location. Therefore, when the base station receives the corresponding SRS and performs channel estimation, channel information regarding N antenna ports may be acquired at all SRS transmission frequency locations, and improvement of the channel estimation performance by the base station may be possible by repeated transmission of the SRS by means of the value of R.

The UE may have Ns which is higher layer signaling configured as a value larger than or equal to 4 with regard to a periodic/semi-persistent SRS, and may have R configured as the same value as Ns. When performing frequency hopping, inter-slot frequency hopping may be possible. When performing frequency hopping, the number of consecutive symbols having frequency resources at the same location may be R (=Ns).

The base station may configure corresponding higher layer signaling for the UE such that the UE performs repeated transmission by using multiple time resources at the same frequency resource location, thereby improving channel estimation accuracy regarding the corresponding frequency resource location during SRS reception by the base station.

[Time Resource Operation 3-2]

The UE may configure the number of symbols in which each of multiple SRS resources is transmitted as the Ns of each SRS resource. Assuming that the UE has N antenna ports or N/n antenna ports configured with regard to each of n SRS resources, that an SRS resource is transmitted through some of the N antenna ports with regard to each SRS resource, and that M symbols are necessary with regard to each SRS resource to transmit an SRS resource through all of N antenna ports, the UE may then expect that all SRS resources may be transmitted through the N antenna ports in a total of M*Ns symbols.

As an example, assuming that n=2 SRS resources that may express N=8 antenna ports are configured for the UE, and each SRS resource is transmitted through four antenna ports in Ns=2 symbols, the UE may then have one of Ns=1, 2, 4, 5, 6, and 7 configured with regard to each of the multiple SRS resources. If Ns is 2, the total number of symbols in which two SRS resources are transmitted is 4. It may be expected that, if 4 among the total of 8 antenna ports (for example, SRS antenna ports 0 to 3) are configured for the first SRS resource among the two SRS resources, an SRS resource (the first SRS resource) may be transmitted in the first and third symbols, and that, if the other 4 among the total of 8 antenna ports (for example, SRS antenna ports 4 to 7) are configured for the second SRS resource, another SRS resource (second SRS resource) may be transmitted in the second and fourth symbols. As another method, it may be expected that the first SRS resource may be transmitted in the first two symbols through 4 among the total of 8 antenna ports (for example, SRS antenna ports 0 to 3), and that the second SRS resource may be transmitted in the remaining two symbols through other 4 among the total of 8 antenna ports (for example, SRS antenna ports 4 to 7). (The disclosure may not be limited to the above-described examples, and another example in which 4 among the total of 8 antenna ports are configured such as SRS antenna ports 0, 2, 4, 6 may not be excluded.)

The UE may assume that R has the existing definition, that is, refers to the number of consecutive symbols having frequency resources at the same location, in which the corresponding SRS resource is transmitted. Therefore, as described above, the value of R that may be configured for the UE may be a divisor of Ns. Assuming that the UE has N antenna ports or N/n antenna ports configured with regard to each of n SRS resource, that some of the N antenna ports are transmitted with regard to each SRS resource, and that M symbols are necessary with regard to each SRS resource to transmit all of N antenna ports, the minimum value of R may then be 1 or M.

- If the minimum value of R that may be configured for the UE is 1, meaning that the number of consecutive symbols having the same frequency resource is 1, only some antenna ports (which are transmitted in a specific symbol) among N antenna ports may then be transmitted in one symbol, and an SRS corresponding to the corresponding antenna ports may be transmitted at different frequency locations with regard to each group of some specific antenna ports among the N antenna ports. Therefore, an SRS corresponding to all of the N antenna ports cannot be transmitted at the same frequency location, and when the base station receives the corresponding SRS and performs channel estimation, channel information of a specific antenna port may be absent at some frequency resource locations. The base station may thus need to estimate channel information of a frequency location at which channel information does not exist by utilizing the frequency location at which channel information exists. In such a case, the frequency band of SRS transmission that the base station may estimate may widen, but the channel estimation performance may degrade at a frequency location at which channel information of a specific antenna port is absent.
- If the minimum value of R that may be configured for the UE is M, meaning that the number of consecutive symbols having the same frequency resource is M, all of the N antenna ports may then be transmitted during M symbols, and an SRS corresponding to the N antenna ports may thus be transmitted at the same frequency location. Therefore, when the base station receives the corresponding SRS and performs channel estimation, channel information regarding all of N antenna ports may be acquired at all SRS transmission frequency locations. In such a case, the frequency band of SRS transmission that the base station may estimate decreases compared with the case in which the minimum value of R is 1, but the channel estimation performance may be improved because all antenna ports are transmitted at all SRS transmission frequency locations.
- The minimum value of R that may be configured for the UE may be configured among 1 or M through higher layer signaling, indicated through L1 signaling, notified of through a combination of higher layer signaling and L1 signaling, activated/deactivated through MAC-CE signaling, or defined within specifications such that the UE operates accordingly.

Based on time resource operation 3-2 above, the UE may perform the following operations or operations according to a combination of some thereof according to a combination of startPosition, nrofSymbols, and repetitionFactor, which are higher layer signaling, with regard to periodic/semi-persistent/aperiodic SRS transmission.

- The UE may have Ns configured as 1, 2, 4, 5, 6, or 7 with regard to an aperiodic SRS, and may have R configured as 1 or M. When the UE performs frequency hopping, only intra-slot frequency hopping may be possible. When performing frequency hopping, the number of consecutive symbols having frequency resources at the same location may be 1 or M (=R). Determination of the value of R may follow one of the above-described schemes.
  - It may be assumed that n (the number of SRS resources necessary for SRS transmission regarding a total of N antenna ports) is 2, that m (the number of OFDM symbols in which SRS resources are transmitted) is 2, that M (the number of OFDM symbols necessary for SRS transmission regarding N/n antenna ports configured for each SRS resource among the total of N antenna ports) is 2, and that R is 1. In this case, SRS transmission regarding some of the total of N antenna ports is performed at a specific frequency location, SRS transmission regarding remaining some of the total of N antenna ports is performed at a frequency location different therefrom, and an SRS corresponding to all of the N antenna ports cannot be transmitted at the same frequency location. Therefore, when the base station receives the corresponding SRS and performs channel estimation, channel information of a specific antenna port may be absent at some frequency resource locations. The base station may thus need to estimate channel information of a frequency location at which channel information does not exist by utilizing the frequency location at which channel information exists. In such a case, the frequency band of SRS transmission that the base station may estimate may widen, but the channel estimation performance may degrade at a frequency location at which channel information of a specific antenna port is absent.
  - It may be assumed that n (the number of SRS resources necessary for SRS transmission regarding a total of N antenna ports) is 2, that m (the number of OFDM symbols in which SRS resources are transmitted) is 2, that M (the number of OFDM symbols necessary for SRS transmission regarding N/n antenna ports configured for each SRS resource among the total of N antenna ports) is 2, and that R is 2. In this case, SRS transmission regarding some of the total of N antenna ports is performed at a specific frequency location, SRS transmission regarding remaining some of the total of N antenna ports is performed at the same frequency location, and an SRS corresponding to the total ofN antenna ports may thus be transmitted at the same frequency location. Therefore, when the base station receives the corresponding SRS and performs channel estimation, channel information regarding N antenna ports may be acquired at all SRS transmission frequency locations. In such a case, the frequency band of SRS transmission that the base station may estimate decreases compared with the case in which the minimum value of R is 1, but the channel estimation performance may be improved because all antenna ports are transmitted at all SRS transmission frequency locations.

The UE may have Ns which is higher layer signaling configured as a value larger than or equal to 2 (=one of 2, 4, 5, 6, and 7) with regard to an aperiodic SRS, and may have R configured as a value larger than or equal to 2 or as a value larger than or equal to M. When performing frequency hopping, only intra-slot frequency hopping may be possible. When performing frequency hopping, the number of consecutive symbols having frequency resources at the same location may be R.

It may be assumed that n (the number of SRS resources necessary for SRS transmission regarding a total of N antenna ports) is 2, that m (the number of OFDM symbols in which SRS resources are transmitted) is 2, that M (the number of OFDM symbols necessary for SRS transmission regarding N/n antenna ports configured for each SRS resource among the total of N antenna ports) is 2, and that R is 2. In this case, SRS transmission regarding some of the total of N antenna ports is performed at a specific frequency location, SRS transmission regarding remaining some of the total of N antenna ports is performed at the same frequency location, and an SRS corresponding to the total of N antenna ports may be transmitted at the same frequency location. Therefore, when the base station receives the corresponding SRS and performs channel estimation, channel information regarding N antenna ports may be acquired at all SRS transmission frequency locations. In such a case, the frequency band of SRS transmission that the base station may estimate decreases compared with the case in which the minimum value of R is 1, but the channel estimation performance may be improved because all antenna ports are transmitted at all SRS transmission frequency locations.

It may be assumed that n (the number of SRS resources necessary for SRS transmission regarding a total of N antenna ports) is 2, that m (the number of OFDM symbols in which SRS resources are transmitted) is 2, that M (the number of OFDM symbols. necessary for SRS transmission regarding N/n antenna ports configured for each SRS resource among the total of N antenna ports) is 2, and that R is 4. In this case, SRS transmission regarding some of the total of N antenna ports is performed at a specific frequency location, SRS transmission regarding remaining some of the total of N antenna ports is performed at the same frequency location, and an SRS corresponding to the total ofN antenna ports may thus be transmitted at the same frequency location. Therefore, when the base station receives the corresponding SRS and performs channel estimation, channel information regarding N antenna ports may be acquired at all SRS transmission frequency locations, and improvement of the channel estimation performance by the base station may be possible by repeated transmission of the SRS by means of the value of R.

The UE may have Ns configured as 1 with regard to a periodic/semi-persistent SRS, and may have R configured as 1. When performing frequency hopping, only inter-slot frequency hopping may be possible. When performing frequency hopping, the number of consecutive symbols having frequency resources at the same location may be R.

The base station may configure higher layer signaling as described above for the UE such that, despite being periodic SRS transmission, time resource consumption is minimized, and SRS transmission regarding the total of N antenna ports is split into SRS transmissions corresponding to different antenna ports of M symbols, thereby obtaining power allocation gain per port, and obtaining more multiplexing gain with SRS transmission by other UEs.

The UE may have Ns which is higher layer signaling configured as a value larger than or equal to 2 (=one of 2,4,5,6, and 7) with regard to a periodic/semi-persistent SRS, may have R configured as a value larger than or equal to 2 or a value larger than or equal to M. When performing frequency hopping, intra-slot or inter-slot frequency hopping may be possible. When performing frequency hopping, the number of consecutive symbols having frequency resources at the same location may be R.

It may be assumed that n (the number of SRS resources necessary for SRS transmission regarding a total of N antenna ports) is 2, that m (the number of OFDM symbols in which SRS resources are transmitted) is 2, that M (the number of OFDM symbols necessary for SRS transmission regarding N/n antenna ports configured for each SRS resource among the total of N antenna ports) is 2, and that R is 2. In this case, SRS transmission regarding some of the total of N antenna ports is performed at a specific frequency location, SRS transmission regarding remaining some of the total of N antenna ports is performed at the same frequency location, and an SRS corresponding to the total of N antenna ports may be transmitted at the same frequency location. Therefore, when the base station receives the corresponding SRS and performs channel estimation, channel information regarding N antenna ports may be acquired at all SRS transmission frequency locations. In such a case, the frequency band of SRS transmission that the base station may estimate decreases compared with the case in which the minimum value of R is 1, but the channel estimation performance may be improved because all antenna ports are transmitted at all SRS transmission frequency locations.

It may be assumed that n (the number of SRS resources necessary for SRS transmission regarding a total of N antenna ports) is 2, that m (the number of OFDM symbols in which SRS resources are transmitted) is 2, that M (the number of OFDM symbols necessary for SRS transmission regarding N/n antenna ports configured for each SRS resource among the total of N antenna ports) is 2, and that R is 4. In this case, SRS transmission regarding some of the total of N antenna ports is performed at a specific frequency location, SRS transmission regarding remaining some of the total of N antenna ports is performed at the same frequency location, and an SRS corresponding to the total of N antenna ports may thus be transmitted at the same frequency location. Therefore, when the base station receives the corresponding SRS and performs channel estimation, channel information regarding N antenna ports may be acquired at all SRS transmission frequency locations, and improvement of the channel estimation performance by the base station may be possible by repeated transmission of the SRS by means of the value of R.

The UE may have Ns which is higher layer signaling configured as a value larger than or equal to 2 (=one of 2, 4, 5, 6, and 7) with regard to a periodic/semi-persistent SRS, may have R configured as the same value as M*Ns. When performing frequency hopping, intra-slot or inter-slot frequency hopping may be possible. When performing frequency hopping, the number of consecutive symbols having frequency resources at the same location may be R (=M*Ns).

The base station may configure corresponding higher layer signaling for the UE such that the UE performs repeated transmission by using multiple time resources at the same frequency resource location, thereby improving channel estimation accuracy regarding the corresponding frequency resource location during SRS reception by the base station.

The UE may report UE capability to the base station regarding whether a combination of at least one of the above-described [time resource operation 2-1], [time resource operation 2-2], [time resource operation 3-1], and [time resource operation 3-2] can be supported. The UE capability may be reported differently depending on the frequency range (FR), or may be reported with regard to each band, each band combination, each feature set, or each feature set per CC. In addition, the above-mentioned UE capability may be UE capabilities independent of each other, or multiple components inside a single UE capability may be used to define whether respective methods are supported.

A combination of at least one of [time resource operation 2-1], [time resource operation 2-2], [time resource operation 3-1], and [time resource operation 3-2] described above may be configured for the UE by the base station through higher layer signaling, indicated through L1 signaling, notified of through a combination of higher layer signaling and L1 signaling, activated/deactivated through MAC-CE signaling, or defined within specifications such that the UE operates accordingly.

Third Embodiment: Method for Transmitting/Receiving an SRS for Antenna Switching As an embodiment of the disclosure, a method transmitting/receiving an SRS for antenna switching, based on an assumption that the UE supports an SRS having eight ports as described above, will now be described. The present embodiment may be combined with all embodiments in the disclosure and considered in a base station and a UE.

[Method 3-1] based on 8-port SRS resource.

Regarding the UE's 8T8R operation, higher layer signaling from the base station regarding a combination of at least one of the following details may be configured for the UE, and an operation based thereof may be possible. The following details may be related to a case in which an SRS resource including eight ports is configured for the UE by the base station. (Hereinafter, an SRS resource including A ports may be understood as meaning that A antenna ports are configured in the SRS resource.) That is, the UE may report a value such as t8r8 to the base station through a UE capability report, and the base station may configure one or more SRS resource sets each including one SRS resource including eight ports through higher layer signaling, based thereon. The corresponding SRS resource set may have "usage" which is higher layer signaling configured as "antennaSwitching."

- If the UE did not report srs-AntennaSwitching2SP-1Periodic-r17 which is a UE capability report, the base station may configure a maximum of two SRS resource sets for the UE. As an example, a combination of at least one of the following details may be possible.
  - Two SRS resource sets having resourceType value of "periodic" in SRS-ResourceSet which is higher layer signaling.
  - Two SRS resource sets having resourceType value of "semi-persistent" in SRS-ResourceSet which is higher layer signaling.
  - Regarding the above details, two SRS resource sets having resourceType value of "semi-persistent" in SRS-ResourceSet which is higher layer signaling may not be activated simultaneously.
  - Two SRS resource sets having resourceType value of "aperiodic" in SRS-ResourceSet which is higher layer signaling.
  - One SRS resource set having resourceType value of "periodic" in SRS-ResourceSet which is higher layer signaling, and one SRS resource set having resourceType value of "semi-persistent" in SRS-ResourceSet which is higher layer signaling.
  - One SRS resource set having resourceType value of "periodic" in SRS-ResourceSet which is higher layer signaling, and one SRS resource set having resourceType value of "aperiodic" in SRS-ResourceSet which is higher layer signaling.
  - One SRS resource set having resourceType value of "semi-persistent" in SRS-ResourceSet which is higher layer signaling, and one SRS resource set having resourceType value of "aperiodic" in SRS-ResourceSet which is higher layer signaling.
- If the UE reported srs-AntennaSwitching2SP-1Periodic-r17 which is a UE capability report, the UE may receive the following higher layer signaling configuration from the base station.
  - Two SRS resource sets having resourceType value of "semi-persistent" in SRS-ResourceSet which is higher layer signaling, and one SRS resource set having resourceType value of "periodic" in SRS-ResourceSet which is higher layer signaling.
  - Regarding the above details, two SRS resource sets having resourceType value of "semi-persistent" in SRS-ResourceSet which is higher layer signaling may not be activated simultaneously.
  - Maximum of two SRS resource sets: a combination of at least one of the following details may be possible with regard to the corresponding maximum of two SRS resource sets.

Two SRS resource sets having resourceType value of "periodic" in SRS-ResourceSet which is higher layer signaling.

Two SRS resource sets having resourceType value of "semi-persistent" in SRS-ResourceSet which is higher layer signaling.

Regarding the above details, two SRS resource sets having resourceType value of "semi-persistent" in SRS-ResourceSet which is higher layer signaling may not be activated simultaneously.

Two SRS resource sets having resourceType value of "aperiodic" in SRS-ResourceSet which is higher layer signaling.

One SRS resource set having resourceType value of "periodic" in SRS-ResourceSet which is higher layer signaling, and one SRS resource set having resourceType value of "semi-persistent" in SRS-ResourceSet which is higher layer signaling.

One SRS resource set having resourceType value of "periodic" in SRS-ResourceSet which is higher layer signaling, and one SRS resource set having resourceType value of "aperiodic" in SRS-ResourceSet which is higher layer signaling.

One SRS resource set having resourceType value of "semi-persistent" in SRS-ResourceSet which is higher layer signaling, and one SRS resource set having resourceType value of "aperiodic" in SRS-ResourceSet which is higher layer signaling.

Each SRS resource set includes one SRS resources, and in the case of 8T8R, the number of SRS ports configured for each SRS resource may be 8.

The UE may not expect that, in the case of 8T8R, SRS transmission regarding two or more SRS resource sets having "usage" which is higher layer signaling configured as "antennaSwitching" may be configured or triggered at the same OFDM symbol location.

[Method 3-2] based on 1/2/4-port SRS resource.

As an example, if the number of ports configured for each SRS resource is 1, the UE may need a total of eight SRS resources to support 8T8R operation by using such SRS resources. Similarly, as another example, if the number of ports configured for each SRS resource is 2 or 4, the UE may need a total of four or two SRS resources to support 8T8R operation. If transmission of multiple SRS resources, as in above cases, in the same slot is configured or triggered, the UE may be able to perform one of the following operations with regard to whether a guard period including Y OFDM symbols is necessary between two adjacent SRS resources as in existing cases. The guard period including Y OFDM symbols may be based on [Table 36] above, or a value different from the table may be used.

The UE may require no guard period including Y OFDM symbols between two adjacent SRS resources. That is, the UE may determine that no antenna switching operation occurs between two SRS resources. Alternatively, the UE may determine that, although the UE does not change the combination of connection between transmission and reception antennas, there may be a delay time in terms of activating/deactivating the connection between different transmission and reception antennas, but this value (delay time) is insignificant according to UE implementation (or this value (delay time) is negligible), thereby determining that no guard period is necessary between two SRS resources. The UE may also be defined, in terms of specifications, to be able to perform transmission regarding two SRS resources between two consecutive OFDM symbols.

The UE may require a guard period including Y OFDM symbols between two adjacent SRS resources. That is, the UE may determine that there is a delay time between two SRS resources in terms of activating/deactivating the connection between different transmission and reception antennas, and that this value (delay time) cannot be ignored according to UE implementation, thereby determining that a guard period is necessary between two SRS resources. The UE may also be defined, in terms of specifications, to be able to have a guard period including Y OFDM symbols between two SRS resources during transmission regarding the two SRS resources.

Regarding the above details, the UE may report, through a UE capability report, whether a guard period is necessary, or the actually necessary Y value as in [Table 36] to the base station with regard to each numerology. As another example, if the UE makes no UE capability report related thereto, that may mean that no guard period is necessary, and if the UE makes a UE capability report related thereto, that may mean that a guard period is necessary. The opposite case may not be excluded. (Hereinafter, the description that the UE makes a UE capability report regarding information indicating that no guard period is necessary may be used interchangeably with the description that the UE makes no UE capability report related to the necessity of a guard period.) In addition, upon receiving the UE capability report, the base station may configure a guard period for the UE through higher layer signaling, may activate the same through a MAC-CE, may indicate the same through L1 signaling, or may notify of the same through a combination of higher layer signaling and L1 signaling. Alternatively, the same may be fixedly defined in specifications.

Regarding the UE's 8T8R operation, the base station may configure a combination of at least one of the following details for the UE through higher layer signaling, and the UE may be able to perform operations based thereon. The following details may be based on an assumption that the UE has an SRS resource including one, two, or four SRS ports configured by the base station. That is, they may be understood as methods in which the UE supports 8T8R by expanding existing 1T8R, 2T8R, or 4T8R operation. That is, the UE may report a value such as t1r8, t2r8, or t4r8, for example, to the base station through a UE capability report, and the UE may additionally transmit a UE capability report to the base station to inform that the UE can support 8T8R, based on t1r8, t2r8, or t4r8. Based thereon, the base station may configure, for the UE, one or more SRS resource sets including one or more SRS resources each including one, two, or four ports through higher layer signaling. The corresponding SRS resource set may have "usage" which is higher layer signaling configured as "antennaSwitching."

If the UE did not report srs-AntennaSwitching2SP-1Periodic-r17 which is a UE capability report, the base station may configure a maximum of two SRS resource sets for the UE. As an example, a combination of at least one of the following details may be possible.

Two SRS resource sets having resourceType value of "periodic" in SRS-ResourceSet which is higher layer signaling.

Two SRS resource sets having resourceType value of "semi-persistent" in SRS-ResourceSet which is higher layer signaling.

Regarding the above details, two SRS resource sets having resourceType value of "semi-persistent" in SRS-ResourceSet which is higher layer signaling may not be activated simultaneously.

Two SRS resource sets having resourceType value of "aperiodic" in SRS-ResourceSet which is higher layer signaling.

One SRS resource set having resourceType value of "periodic" in SRS-ResourceSet which is higher layer signaling, and one SRS resource set having resourceType value of "semi-persistent" in SRS-ResourceSet which is higher layer signaling.

One SRS resource set having resourceType value of "periodic" in SRS-ResourceSet which is higher layer signaling, and one SRS resource set having resourceType value of "aperiodic" in SRS-ResourceSet which is higher layer signaling.

One SRS resource set having resourceType value of "semi-persistent" in SRS-ResourceSet which is higher layer signaling, and one SRS resource set having resourceType value of "aperiodic" in SRS-ResourceSet which is higher layer signaling.

Among the above details, with regard to the case in which one SRS resource set having resourceType value of "aperiodic" in SRS-ResourceSet which is higher layer signaling is configured, the UE needs to transmit all SRS resources in one SRS resource set in the same slot if an aperiodic SRS is triggered by the base station. Therefore, the case in which the UE performs 8T8R operation based on eight SRS resources each including one port may correspond to a case in which the UE made a UE capability report to the base station regarding information indicating that the guard period is unnecessary. If the UE made a UE capability report to the base station regarding information indicating that the guard period is necessary while the UE performs 8T8R operation based on eight SRS resources each including one port, the UE may not expect that one SRS resource set having resourceType value of "aperiodic" configured in SRS-ResourceSet which is higher layer signaling may be configured as above.

If the UE reported srs-AntennaSwitching2SP-1Periodic-r17 which is a UE capability report, the UE may receive the following higher layer signaling configuration or a higher layer signaling configuration based on a combination of parts thereof from the base station.

Two SRS resource sets having resourceType value of "semi-persistent" in SRS-ResourceSet which is higher layer signaling, and one SRS resource set having resourceType value of "periodic" in SRS-ResourceSet which is higher layer signaling.

Regarding the above details, two SRS resource sets having resourceType value of "semi-persistent" in SRS-ResourceSet which is higher layer signaling may not be activated simultaneously.

Maximum of two SRS resource sets: a combination of at least one of the following details may be possible with regard to the corresponding maximum of two SRS resource sets.

Two SRS resource sets having resourceType value of "periodic" in SRS-ResourceSet which is higher layer signaling.

Two SRS resource sets having resourceType value of "semi-persistent" in SRS-ResourceSet which is higher layer signaling.

Regarding the above details, two SRS resource sets having resourceType value of "semi-persistent" in SRS-ResourceSet which is higher layer signaling may not be activated simultaneously.

Two SRS resource sets having resourceType value of "aperiodic" in SRS-ResourceSet which is higher layer signaling.

One SRS resource set having resourceType value of "periodic" in SRS-ResourceSet which is higher layer signaling, and one SRS resource set having resourceType value of "semi-persistent" in SRS-ResourceSet which is higher layer signaling.

One SRS resource set having resourceType value of "periodic" in SRS-ResourceSet which is higher layer signaling, and one SRS resource set having resourceType value of "aperiodic" in SRS-ResourceSet which is higher layer signaling.

One SRS resource set having resourceType value of "semi-persistent" in SRS-ResourceSet which is higher layer signaling, and one SRS resource set having resourceType value of "aperiodic" in SRS-ResourceSet which is higher layer signaling.

Among the above details, with regard to the case in which one SRS resource set having resourceType value of "aperiodic" in SRS-ResourceSet which is higher layer signaling is configured, the UE needs to transmit all SRS resources in one SRS resource set in the same slot if an aperiodic SRS is triggered by the base station. Therefore, the case in which the UE performs 8T8R operation based on eight SRS resources each including one port may correspond to a case in which the UE made a UE capability report to the base station regarding information indicating that the guard period is unnecessary. If the UE made a UE capability report to the base station regarding information indicating that the guard period is necessary while the UE performs 8T8R operation based on eight SRS resources each including one port, the UE may not expect that one SRS resource set having resourceType value of "aperiodic" configured in SRS-ResourceSet which is higher layer signaling may be configured as above.

If the UE can perform 8T8R operation based on an SRS resource including one SRS port through t1r8 and the above-mentioned additional UE capability report, the UE may then perform 8T8R operation based on eight SRS resources each including SRS one port. Eight SRS resources may all be included in one SRS resource set, or a total of eight SRS resources may be included in multiple SRS resource sets.

If the UE made a UE capability report to the base station regarding information indicating that the guard period is necessary while the UE performs 8T8R operation based on eight SRS resources each including one port, the base station may configure, for the UE, 0 or 2-8 SRS resource sets having resourceType value of "aperiodic" configured in SRS-ResourceSet which is higher layer signaling as above. If the number of SRS resource sets is 2 or larger, a total of eight SRS resources may be included in the two or more SRS resource sets configured for the UE.

If the UE made a UE capability report to the base station regarding information indicating that the guard period is unnecessary while the UE performs 8T8R operation based on eight SRS resources each including one port, the base station may configure, for the UE, 0 or 1-8 SRS resource sets having resourceType value of "aperiodic" configured in SRS-ResourceSet which is higher layer signaling as above. If the number of SRS resource sets is 1 or larger, a total of eight SRS resources may be included in the one or more SRS resource sets configured for the UE.

If the UE can perform 8T8R operation based on an SRS resource including two SRS ports through t2r8 and the above-mentioned additional UE capability report, the UE may then perform 8T8R operation based on four SRS resources each including two SRS ports. Four SRS resources may all be included in one SRS resource set, or a total of four SRS resources may be included in multiple SRS resource sets.

If the UE made a UE capability report to the base station regarding information indicating that the guard period is necessary while the UE performs 8T8R operation based on four SRS resources each including two ports, the base station may configure, for the UE, 0 or 1-4 SRS resource sets having resourceType value of "aperiodic" configured in SRS-ResourceSet which is higher layer signaling as above. If the number of SRS resource sets is 1 or larger, a total of four SRS resources may be included in the one or more SRS resource sets configured for the UE.

If the UE can perform 8T8R operation based on an SRS resource including four SRS ports through t4r8 and the above-mentioned additional UE capability report, the UE may then perform 8T8R operation based on two SRS resources each including four SRS ports. Two SRS resources may all be included in one SRS resource set, or a total of two SRS resources may be included in multiple SRS resource sets.

If the UE made a UE capability report to the base station regarding information indicating that the guard period is necessary while the UE performs 8T8R operation based on two SRS resources each including four ports, the base station may configure, for the UE, 0 or 1-4 SRS resource sets having resourceType value of "aperiodic" configured in SRS-ResourceSet which is higher layer signaling as above. If the number of SRS resource sets is 1 or larger, a total of two SRS resources may be included in the one or more SRS resource sets configured for the UE.

The UE may not expect that, in the case of 8T8R, SRS transmission regarding two or more SRS resource sets having "usage" which is higher layer signaling configured as "antennaSwitching" may be configured or triggered at the same OFDM symbol location.

Fourth Embodiment: Method for Configuring Power Control Parameters During Antenna Switching As an embodiment of the disclosure, a method for configuring power control parameters during an antenna switching operation of a UE will be described. The present embodiment may be combined with all embodiments in the disclosure and considered in a base station and a UE.

As described above, if the UE operates based on 1T4R, and if the UE has multiple SRS resource sets configured by the base station (for example, if two or four SRS resource sets are configured), the UE may expect that respective values of p0, alpha, pathlossReferenceRS, and srs-PowerControlAdjustmentStates, which are power control parameters that may be configured in respective SRS resource sets through higher layer signaling, may be configured by the station as the same values in all SRS resource sets, as in the case of the above-mentioned [power control parameter restriction]. That is, the UE may expect that multiple SRS resource sets may all have the same power control parameters.

If such a restriction exists, the UE inevitably performs a method of configuring identical or different power control parameters with regard to each SRS resource set during an antenna switching operation based on multiple SRS resource sets when the UE operates according to 1T4R. This may be inappropriate for a multi-TRP situation in which different power control parameters may be required with regard to each SRS resource set. To the contrary, if such a restriction does not exist during an operation based on multiple SRS resource sets when the UE performs an antenna switching operation other than 1T4R (for example, when the UE performs an antenna switching operation regarding one of 1T2R, 2T4R, 1T1R, 2T2R, 4T4R, 8T8R, 1T6R, 1T8R, 2T6R, 2T8R, and 4T8R), the UE may have different transmission power with regard to each pair of connection between transmission and reception antennas expressed through respective SRS resources included in different SRS resource sets. This may cause the occurrence of different estimation errors during channel estimation by the base station. Therefore, as a method for alleviating such a restriction, and UE and the base station may operate according to at least one of the following methods:

[Method 4-1]

During a 1T4R operation using multiple SRS resource sets, the UE may report UE capability which may release the [power control parameter restriction] to the base station. The base station may deliver an intent to release the [power control parameter restriction] during a 1T4R antenna switching operation using multiple SRS resource sets by configuring a specific higher layer signaling parameter only to the UE that transmitted the received UE capability. At the same time, when configuring multiple SRS resource sets for 1T4R for the corresponding UE, the base station may configure respective values of p0, alpha, pathlossReferenceRS, and srs-PowerControlAdjustmentStates, which are power control parameters that may be configured in respective SRS resource sets through higher layer signaling, to be identical to or different from each other. Alternatively, when configuring multiple SRS resource sets for 1T4R for the corresponding UE without configuring a specific higher layer signaling parameter, the base station may configure respective values of p0, alpha, pathlossReferenceRS, and srs-PowerControlAdjustmentStates, which are power control parameters that may be configured in respective SRS resource sets through higher layer signaling, to be identical to or different from each other. The UE may then expect that, during a 1T4R operation using multiple SRS resource sets, identical or different power control parameters may be configured in respective SRS resource sets, and may perform SRS transmission based thereon.

[Method 4-2]

When the UE uses multiple SRS resource sets during an antenna switching operation other than 1T4R (for example, when the UE performs an antenna switching operation regarding one of 1T2R, 2T4R, 1T1R, 2T2R, 4T4R, 8T8R, 1T6R, 1T8R, 2T6R, 2T8R, and 4T8R), the UE may report UE capability which may apply the [power control parameter restriction] to the base station. The base station may deliver an intent to apply the [power control parameter restriction] when using multiple SRS resource sets during an antenna switching operation other than 1T4R (for example, when the UE performs an antenna switching operation regarding one of 1T2R, 2T4R, 1T1R, 2T2R, 4T4R, 8T8R, 1T6R, 1T8R, 2T6R, 2T8R, and 4T8R) by configuring a specific higher layer signaling parameter only to the UE that transmitted the received UE capability. At the same time, when configuring multiple SRS resource sets for an antenna switching operation other than 1T4R (for example, when the UE performs an antenna switching operation regarding one of 1T2R, 2T4R, 1T1R, 2T2R, 4T4R, 8T8R, 1T6R, 1T8R, 2T6R, 2T8R, and 4T8R) for the corresponding UE, the base station may configure respective values of p0, alpha, pathlossReferenceRS, and srs-PowerControlAdjustmentStates, which are power control parameters that may be configured in respective SRS resource sets through higher layer signaling, to be equal to each other. Alternatively, when configuring multiple SRS resource sets for an antenna switching operation other than 1T4R (for example, when the UE performs an antenna switching operation regarding one of 1T2R, 2T4R, 1T1R, 2T2R, 4T4R, 8T8R, 1T6R, 1T8R, 2T6R, 2T8R, and 4T8R) for the corresponding UE without configuring a specific higher layer signaling parameter, the base station may configure respective values of p0, alpha, pathlossReferenceRS, and srs-PowerControlAdjustmentStates, which are power control parameters that may be configured in respective SRS resource sets through higher layer signaling, to be identical to each other. The UE may then expect that, when using multiple SRS resource sets during an antenna switching operation other than 1T4R (for example, when the UE performs an antenna switching operation regarding one of 1T2R, 2T4R, 1T1R, 2T2R, 4T4R, 8T8R, 1T6R, 1T8R, 2T6R, 2T8R, and 4T8R), identical power control parameters may be configured in respective SRS resource sets, and may perform SRS transmission based thereon.

[Method 4-3]

Above-described [Method 4-1] and [Method 4-2] may correspond to a case in which TCIState or UL-TCIState in dl-OrJoint-TCIStateList which is higher layer signaling is not configured for the UE.

If TCIState or UL-TCIState in dl-OrJoint-TCIStateList which is higher layer signaling is configured for the UE,

- If pOAlphaSetforSRS which is higher layer signaling is configured for the UE
  - If the UE has followUnifiedTCIstateSRS which is higher layer signaling configured in an SRS resource set, the UE may be provided with values of p0, alpha, and srs-PowerControlAdjustmentStates, based on pOAlphaSetforSRS which is higher layer signaling associated with TCIState or UL-TCIState indicated by the base station. pathlossReferenceRS which is higher layer signaling that means a path loss reference signal may be provided based on pathlossReferenceRS-Id-r17 which is higher layer signaling associated with TCIState or UL-TCIState indicated by the base station, or included in corresponding TCIState or UL-TCIState.
  - If the UE has no followUnifiedTCIstateSRS which is higher layer signaling configured in an SRS resource set, the UE may be provided with values of p0, alpha, and srs-PowerControlAdjustmentStates, based on pOAlphaSetforSRS which is higher layer signaling associated with TCIState or UL-TCIState configured in an SRS resource of the lowest index in the corresponding SRS resource set. pathlossReferenceRS which is higher layer signaling that means a path loss reference signal may be provided based on pathlossReferenceRS-Id-r17 which is higher layer signaling associated with TCIState or UL-TCIState configured in an SRS resource of the lowest index in the corresponding SRS resource set, or included in corresponding TCIState or UL-TCIState.

If TCIState or UL-TCIState in dl-OrJoint-TCIStateList which is higher layer signaling is not configured for the UE, the UE may be provided with p0, alpha, and pathlossReferenceRS which is a path loss reference signal, based on p0, alpha, and pathlossReferenceRS which are higher layer signaling in the corresponding SRS resource set.

If TCIState or UL-TCIState in dl-OrJoint-TCIStateList which is higher layer signaling is configured for the UE,

- When the UE performs a 1T4R operation by using multiple SRS resource sets,
  - The UE may expect that followUnifiedTCIstateSRS which is higher layer signaling may be configured in all of multiple SRS resource sets.
  - If the UE have no followUnifiedTCIstateSRS which is higher layer signaling configured in all of multiple SRS resource sets, the UE may expect that p0, alpha, srs-PowerControlAdjustmentStates, and pathlossReferenceRS-Id-r17 associated with TCIState or UL-TCIState configured in an SRS resource of the lowest index in all SRS resource sets, or included in corresponding TCIState or UL-TCIState, may be equally configured.
- When the UE performed a 1T4R operation by using multiple SRS resource sets and reported the UE capability mentioned in [method 4-1] above.
  - The UE may expect that followUnifiedTCIstateSRS which is higher layer signaling may be configured or may not be configured in each of multiple SRS resource sets.
  - If the UE has no followUnifiedTCIstateSRS which is higher layer signaling configured in each of some or all of the multiple SRS resource sets, the UE may expect that p0, alpha, srs-PowerControlAdjustmentStates, and pathlossReferenceRS-Id-r17 associated with TCIState or UL-TCIState configured in an SRS resource of the lowest index in an SRS resource set having no followUnifiedTCIstateSRS configured therein, or included in corresponding TCIState or UL-TCIState, may be configured equally or differently.
- When the UE performed an antenna switching operation other than 1T4R (for example, when the UE performed an antenna switching operation regarding one of 1T2R, 2T4R, 1T1R, 2T2R, 4T4R, 8T8R, 1T6R, 1T8R, 2T6R, 2T8R, and 4T8R) by using multiple SRS resource sets and reported the UE capability mentioned in [method 4-2] above.
  - The UE may expect that followUnifiedTCIstateSRS which is higher layer signaling may be configured in each of all of multiple SRS resource sets.
  - If the UE has no followUnifiedTCIstateSRS which is higher layer signaling configured in each of all of multiple SRS resource sets, the UE may expect that p0, alpha, srs-PowerControlAdjustmentStates, and pathlossReferenceRS-Id-r17 associated with TCIState or UL-TCIState configured in an SRS resource of the lowest index in all SRS resource sets, or included in corresponding TCIState or UL-TCIState, may be configured equally.

[Method 4-4]

The base station may configure a combination of at least one of [method 4-1] to [method 4-3] described above for the UE through higher layer signaling, may activate the same through a MAC-CE, may indicate the same through L1 signaling, or may notify of the same through a combination of higher layer signaling and L1 signaling. Alternatively, the same may be fixedly defined in specifications.

The UE may report UE capability to the base station regarding whether a combination of at least one of [method 4-1] to [method 4-4] described above is supported. The UE capability may include at least one component therein so as to indicate whether a combination of at least one of [method 4-1] to [method 4-4] described above is supported, or may be defined as multiple different UE capabilities. If no UE capability is reported regarding a specific method described above, that may be interpreted as possible support for other methods.

[Method 4-1] to [method 4-4] described above may be applied only to SRS resource sets having resourceType value configured for the UE as "aperiodic" in SRS-ResourceSet which is higher layer signaling by the base station.

Alternatively, [method 4-1] to [method 4-4] described above may be applied only to SRS resource sets having resourceType value configured for the UE as "periodic," "semi-persistent," or "aperiodic" in SRS-ResourceSet which is higher layer signaling by the base station.

Fifth Embodiment: Method for Determining SRS Transmission Symbol Locations in Slots During Antenna Switching As an embodiment of the disclosure, a method for determining SRS transmission symbol locations in slots during an antenna switching operation of a UE will be described. The present embodiment may be combined with all embodiments in the disclosure and considered in a base station and a UE. In the disclosure, higher layer signaling in an SRS resource may be higher layer signaling/parameter regarding the SRS resource and/or higher layer signaling/parameter included in SRS-Resource (and/or SRS-PosResource). In addition, higher layer signaling in an SRS resource may be higher layer signaling/parameter regarding the SRS resource set and/or higher layer signaling/parameter included in SRS-ResourceSet (and/or SRS-PosResourceSet).

If the UE performs an antenna switching operation by using multiple SRS resource sets with regard to one of 1T2R, 1T4R, 2T4R, 1T1R, 2T2R, 4T4R, 8T8R, 1T6R, 1T8R, 2T6R, 2T8R, and 4T8R, and if the UE has resourceType value configured as "aperiodic" in SRS-ResourceSet which is higher layer signaling by the base station, the UE may expect that all SRS resources in each SRS resource set may be transmitted in different slots, and the UE may expect that respective SRS resources in all SRS resource sets may be transmitted at different OFDM symbol locations.

As an example, if the UE operates according to 1T4R and has two SRS resource sets configured therefor, first and second SRS resources each including one SRS port may be included in the first SRS resource set, and third and fourth SRS resources each including one SRS port may be included in the second SRS resource set.

One SRS port of each of the first and second SRS resources included in the first SRS resource set may be transmitted at first and second OFDM symbol locations in the first slot, and the first and second OFDM symbol locations may be different from each other.

One SRS port of each of the third and fourth SRS resources included in the second SRS resource set may be transmitted at third and fourth OFDM symbol locations in the second slot, and the third and fourth OFDM symbol locations may be different from each other.

In the above situation, the first and second slots may be different from each other.

In the above situation, the first OFDM symbol location may be different from the third and fourth OFDM symbol locations, and the second OFDM symbol location may be likewise different from the third and fourth OFDM symbol locations.

In such a case, a restriction on OFDM symbol locations of SRS resources in different SRS resource sets that may be transmitted in different slots mean that SRS resources in different SRS resource sets need to have different time resource-related higher layer signaling. This may mean that startPosition or nrofSymbols in resourceMapping, or startPosition-r16 or nrofSymbols-r16 in resourceMapping-r16, or startPosition-r17 or nrofSymbols-r17 in resourceMapping-r17, which is higher layer signaling in respective SRS resources, need to differ from each other. Such a restriction may be an appropriate configuration scheme if the UE transmits respective SRS resource sets in different slots, and if TDD configurations of two slots are different or overlap periodic signal locations, but may be unnecessary in other cases. Therefore, the base station and the UE may operate according to the following methods in order to alleviate such a restriction.

The UE may report UE capability having a meaning that the above-described restriction may be alleviated with regard to SRS resources included in different SRS resource sets to be transmitted in different slots. Upon receiving this, the base station may configure, for the UE, additional higher layer signaling having a meaning that SRS resources included in different SRS resource sets to be transmitted in different slots can be transmitted at identical or different OFDM symbol locations. Alternatively, without configuring additional higher layer signaling, the base station may configure, for the UE, startPosition or nrofSymbols in resourceMapping, or startPosition-r16 or nrofSymbols-r16 in resourceMapping-r16, or startPosition-r17 or nrofSymbols-r17 in resourceMapping-r17, which is higher layer signaling in respective SRS resources, to be identical to or different from each other such that SRS resources included in different SRS resource sets can be transmitted at identical or different OFDM symbol locations. Upon receiving such a higher layer signaling configuration, the UE may perform SRS transmission at OFDM symbol locations configured through startPosition or nrofSymbols in resourceMapping, or startPosition-r16 or nrofSymbols-r16 in resourceMapping-r16, or startPosition-r17 or nrofSymbols-r17 in resourceMapping-r17, which is higher layer signaling in respective SRS resources. As an example, SRS transmission that the UE may consider may be as follows:

As an example, if the UE operates according to 1T4R and has two SRS resource sets configured therefor, first and second SRS resources each including one SRS port may be included in the first SRS resource set, and third and fourth SRS resources each including one SRS port may be included in the second SRS resource set;

One SRS port of each of the first and second SRS resources included in the first SRS resource set may be transmitted at first and second OFDM symbol locations in the first slot, and the first and second OFDM symbol locations may be different from each other; and One SRS port of each of the third and fourth SRS resources included in the second SRS resource set may be transmitted at third and fourth OFDM symbol locations in the second slot, and the third and fourth OFDM symbol locations may be different from each other.

In the above situation, the first and second slots may be different from each other.

In the above situation, the first OFDM symbol location may be identical to or different from the third and fourth OFDM symbol locations, and the second OFDM symbol location may be likewise identical to or different from the third and fourth OFDM symbol locations.

Sixth Embodiment: Method for Determining Slot Offset During Aperiodic SRS Transmission As an embodiment of the disclosure, a method for determining a slot offset during aperiodic SRS transmission will be described. The present embodiment may be combined with all embodiments in the disclosure and considered in a base station and a UE.

If the UE performs an antenna switching operation by using multiple SRS resource sets with regard to one of 1T2R, 1T4R, 2T4R, 1T1R, 2T2R, 4T4R, 8T8R, 1T6R, 1T8R, 2T6R, 2T8R, and 4T8R, and if the UE has resourceType value configured as "aperiodic" in SRS-ResourceSet which is higher layer signaling by the base station, the UE may consider a combination of at least one of the following details:

The UE may consider the following methods or a combination of at least one of the following methods according to configuration values of slotOffset and availableSlotOffsetList which are higher layer signaling in an SRS resource set, and whether they are configured or not.

[Method 6-1] The UE may expect that slotOffset which is higher layer signaling in each SRS resource set configured from the base station may have different values.

[Method 6-2] If the UE fails to have availableSlotOffsetList which is higher layer signaling configured in all SRS resource sets in all bandwidth parts in a specific cell (or a component carrier), the UE may expect that slotOffset which is higher layer signaling in each SRS resource set configured from the base station may have different values. And/or, the availableSlotOffsetList is configured in at least one of the SRS resource sets, it is possible that values of two slotOffsets among slotOffset which is higher layer signaling in each SRS resource set are identical.

[Method 6-3] If the UE has availableSlotOffsetList which is higher layer signaling configured in at least one SRS resource set in at least one bandwidth part in a specific cell, the UE may expect that slotOffset which is higher layer signaling in each SRS resource set configured from the base station may have identical or different values. That is, with regard to corresponding multiple SRS resource sets, there may be no restriction which requires that values of slotOffset which is higher layer signaling configured for the UE by the base station be different from each other. In the case of identical slotOffset, the value of slotOffset may be 0, and a case in which the same has a different value may not be excluded.

[Method 6-4] If the UE has availableSlotOffsetList which is higher layer signaling configured in at least one SRS resource set in at least one bandwidth part in a specific cell, the UE may expect, in view of availableSlotOffset, that slots in which multiple SRS resource sets described above may be finally transmitted may be different from each other.

[Method 6-5] If the UE has no availableSlotOffsetList which is higher layer signaling configured in specific multiple SRS resource sets, the UE may expect that slotOffset which is higher layer signaling may have different values with regard to the multiple SRS resource sets. That is, the base station and/or the UE may need to follow the restriction which requires that, with regard to the multiple SRS resource sets, values of slotOffset which is higher layer signaling configured for the UE by the base station be different from each other.

[Method 6-6] If the UE has availableSlotOffsetList which is higher layer signaling configured in specific multiple SRS resource sets, the UE may expect that slotOffset which is higher layer signaling may have identical or different values with regard to the multiple SRS resource sets. That is, there may be no restriction which requires that, with regard to the multiple SRS resource sets, values of slotOffset which is higher layer signaling configured for the UE by the base station be different from each other. In the case of identical slotOffset, the value of slotOffset may be 0, and a case in which the same has a different value may not be excluded.

[Method 6-7] The UE may expect that multiple SRS resource sets may be transmitted in different slots, respectively, in view of aperiodic SRS triggering through DCI from the base station and applied availableSlotOffset.

[Method 6-8] The base station may configure a combination of at least one of [method 6-1] to [method 6-7] described above for the UE through higher layer signaling, may activate the same through a MAC-CE, may indicate the same through L1 signaling, or may notify of the same through a combination of higher layer signaling and L1 signaling. Alternatively, the same may be fixedly defined in specifications.

slotOffset is an offset in number of slots between triggering DCI and the actual transmission of the SRS-ResourceSet.

availableSlotOffsetList is a list of availableSlotOffsets and availableSlotOffset indicates the number of available slots from slot n+k to the slot where the aperiodic SRS resource set is transmitted, where slot n is the slot with the triggering DCI, and k is the slotOffset.

The UE may report UE capability to the base station regarding whether a combination of at least one of [method 6-1] to [method 6-8] described above is supported. The UE capability may include at least one component therein so as to indicate whether a combination of at least one of [method 6-1] to [method 6-8] described above is supported, or may be defined as multiple different UE capabilities. If no UE capability is reported regarding a specific method described above, that may be interpreted as possible support for other methods.

Figure 21:
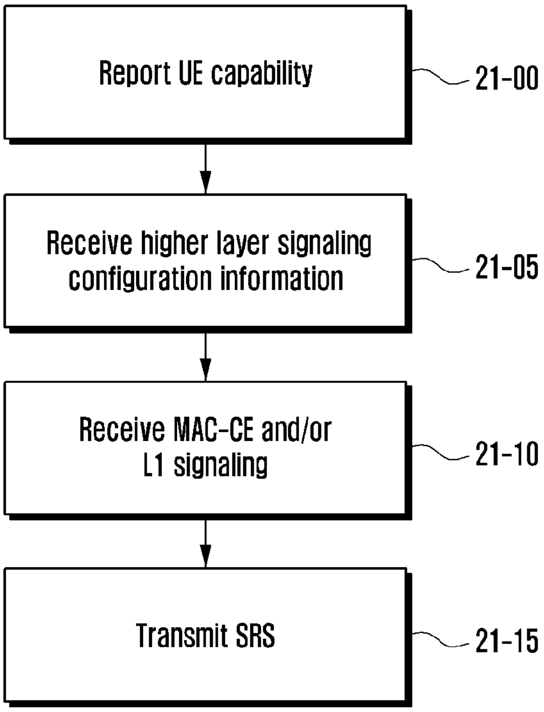
FIG. 21 illustrates operations of a UE for SRS transmission according to an embodiment of the present disclosure.

FIG. 21 illustrates operations of a UE for SRS transmission according to an embodiment of the present disclosure.

The UE may report UE capability to a base station (21-00). The UE capability report may be a combination of at least one of UE capabilities mentioned in the above-described embodiments. As an example, the UE capability reported by the UE may include at least one of UE capabilities indicating whether [method 1-1] to [method 1-4] are supported, whether [method 1-3-1] to [method 1-3-3] are supported, and whether [time resource operation 2-1], [time resource operation 2-2], [time resource operation 3-1], [time resource operation 3-2], [method 3-1] and [method 3-2], [method 4-1] to [method 4-4], the method for determining SRS transmission symbol locations during antenna switching, and [method 6-1] to [method 6-8] are supported.

The UE may then receive higher layer signaling configuration information from the base station (21-05). The higher layer signaling may be a combination of at least one of pieces of higher layer signaling configuration information mentioned in the above-described embodiments. As an example, the higher layer signaling may be related to at least one of [method 1-1] to [method 1-4], [method 1-3-1] to [method 1-3-3], [time resource operation 2-1], [time resource operation 2-2], [time resource operation 3-1], [time resource operation 3-2], [method 3-1] and [method 3-2], [method 4-1] to [method 4-4], the method for determining SRS transmission symbol locations during antenna switching, and [method 6-1] to [method 6-8] described above.

The UE may additionally receive MAC-CE and/or L1 signaling from the base station (21-10). The MAC-CE and/or L1 signaling may be related to at least one of [method 1-1] to [method 1-4], [method 1-3-1] to [method 1-3-3], [time resource operation 2-1], [time resource operation 2-2], [time resource operation 3-1], [time resource operation 3-2], [method 3-1] and [method 3-2], [method 4-1] to [method 4-4], the method for determining SRS transmission symbol locations in slots during antenna switching, and [method 6-1] to [method 6-8] described above. The UE may transmit an SRS for antenna switching, based on indications received from the base station through the above-described higher layer signaling, MAC CE, and/or L1 signaling (21-15).

Respective steps described in FIG. 21 may be performed after changing the order thereof, adding another step thereto, or omitting a described step.

Figure 22:
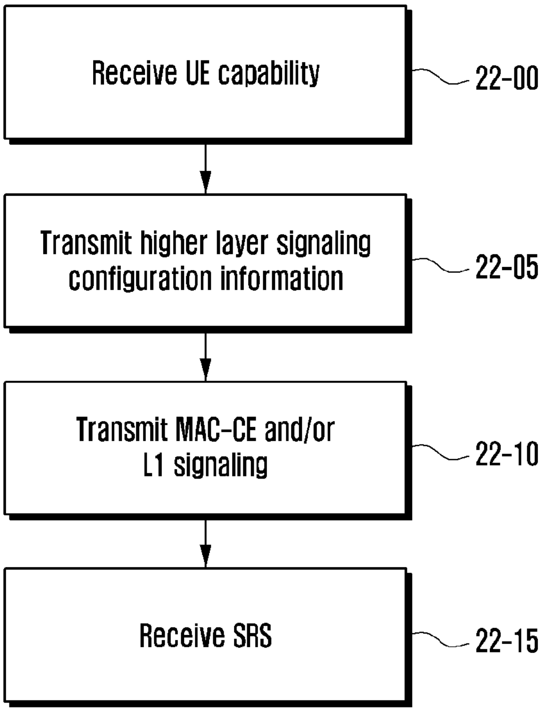
FIG. 22 illustrates operations of a base station for SRS reception according to an embodiment of the present disclosure.

FIG. 22 illustrates operations of a base station for SRS reception according to an embodiment of the present disclosure.

The base station may receive UE capability from the UE (22-00). The UE capability report may be a combination of at least one of UE capabilities mentioned in the above-described embodiments. As an example, the UE capability reported by the UE may include at least one of UE capabilities indicating whether [method 1-1] to [method 1-4] are supported, whether [method 1-3-1] to [method 1-3-3] are supported, and whether [time resource operation 2-1], [time resource operation 2-2], [time resource operation 3-1], [time resource operation 3-2], [method 3-1] and [method 3-2], [method 4-1] to [method 4-4], the method for determining SRS transmission symbol locations during antenna switching, and [method 6-1] to [method 6-8] are supported.

The base station may then transmit higher layer signaling configuration information to the UE (22-05). The higher layer signaling may be a combination of at least one of pieces of higher layer signaling configuration information mentioned in the above-described embodiments. As an example, the higher layer signaling may be related to at least one of [method 1-1] to [method 1-4], [method 1-3-1] to [method 1-3-3], [time resource operation 2-1], [time resource operation 2-2], [time resource operation 3-1], [time resource operation 3-2], [method 3-1] and [method 3-2], [method 4-1] to [method 4-4], the method for determining SRS transmission symbol locations during antenna switching, and [method 6-1] to [method 6-8] described above.

The base station may additionally transmit MAC-CE and/or L1 signaling to the UE (22-10). As an example, the MAC-CE and/or L1 signaling may be related to at least one of [method 1-1] to [method 1-4], [method 1-3-1] to [method 1-3-3], [time resource operation 2-1], [time resource operation 2-2], [time resource operation 3-1], [time resource operation 3-2], [method 3-1] and [method 3-2], [method 4-1] to [method 4-4], the method for determining SRS transmission symbol locations in slots during antenna switching, and [method 6-1] to [method 6-8] described above. The base station may receive an SRS for antenna switching transmitted by the UE, based on information indicated through the above-described higher layer signaling, MAC CE, and/or L1 signaling (22-15).

Respective steps described in FIG. 22 may be performed after changing the order thereof, adding another step thereto, or omitting a described step.

Figure 23:
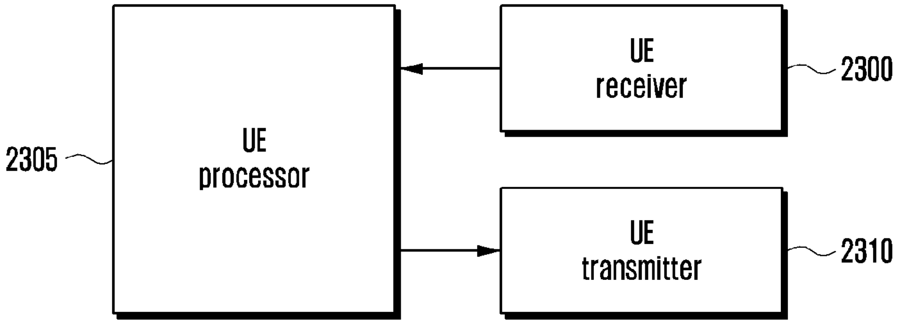
FIG. 23 illustrates the structure of a UE in a wireless communication system according to an embodiment of the present disclosure.

FIG. 23 illustrates the structure of a UE in a wireless communication system according to an embodiment of the present disclosure.

Referring to FIG. 23, the UE may include a transceiver, which refers to a UE receiver 2300 and a UE transmitter 2310 as a whole, a memory (not illustrated), and a UE processor 2305 (or UE controller or processor). According to the above-described communication methods of the UE, the UE's transceiver 2300 and 2310, memory, and the UE processor 2305 may operate. Components of the UE are not limited to the above-described example. For example, the UE may include a larger or smaller number of components than the above-described components. Furthermore, the transceiver, the memory, and the processor may be implemented as a single chip.

The transceiver may transmit/receive signals with the base station. The signals may include control information and data. To this end, the transceiver may include an RF transmitter configured to up-convert and amplify the frequency of transmitted signals, an RF receiver configured to low-noise-amplify received signals and down-convert the frequency thereof, and the like. This is only an embodiment of the transceiver, and the components of the transceiver are not limited to the RF transmitter and the RF receiver.

In addition, the transceiver may receive signals through a radio channel, output the same to the processor, and transmit signals output from the processor through the radio channel.

The memory may store programs and data necessary for the UE's operations. In addition, the memory may store control information or data included in signals transmitted/received by the UE. The memory may include storage media such as a ROM, a RAM, a hard disk, a CD-ROM, and a DVD, or a combination of storage media. In addition, the UE may include multiple memories.

In addition, the processor may control a series of processes such that the UE can operate according to the above-described embodiments. For example, the processor may control components of the UE so as to receive DCI configured in two layers such that multiple PDSCHs are received simultaneously. The UE may include multiple processors, and the processors may perform the UE's component control operations by executing programs stored in the memory.

Figure 24:
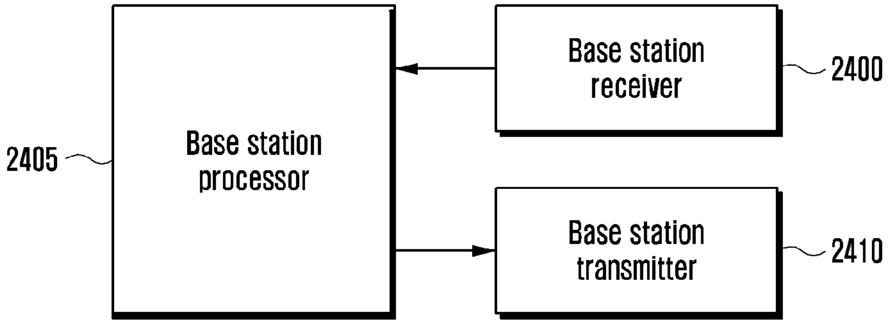
FIG. 24 illustrates the structure of a base station in a wireless communication system according to an embodiment of the present disclosure.

FIG. 24 illustrates the structure of a base station in a wireless communication system according to an embodiment of the present disclosure.

Referring to FIG. 24, the base station may include a transceiver, which refers to a base station receiver 2400 and a base station transmitter 2410 as a whole, a memory (not illustrated), and a base station processor 2405 (or base station controller or processor). According to the above-described communication methods of the base station, the base station's transceiver 2400 and 2410, memory, and the base station processor 2405 may operate. Components of the base station are not limited to the above-described example. For example, the base station may include a larger or smaller number of components than the above-described components. Furthermore, the transceiver, the memory, and the processor may be implemented as a single chip.

The transceiver may transmit/receive signals with the UE. The signals may include control information and data. To this end, the transceiver may include an RF transmitter configured to up-convert and amplify the frequency of transmitted signals, an RF receiver configured to low-noise-amplify received signals and down-convert the frequency thereof, and the like. This is only an embodiment of the transceiver, and the components of the transceiver are not limited to the RF transmitter and the RF receiver.

In addition, the transceiver may receive signals through a radio channel, output the same to the processor, and transmit signals output from the processor through the radio channel.

The memory may store programs and data necessary for the base station's operations. In addition, the memory may store control information or data included in signals transmitted/received by the base station. The memory may include storage media such as a ROM, a RAM, a hard disk, a CD-ROM, and a DVD, or a combination of storage media. In addition, the base station may include multiple memories.

The processor may control a series of processes such that the base station can operate according to the above-described embodiments of the disclosure. For example, the processor may control components of the base station so as to configure DCI configured in two layers including allocation information regarding multiple PDSCHs and to transmit the same. The base station may include multiple processors, and the processors may perform the base station's component control operations by executing programs stored in the memory.

The methods according to various embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

The embodiments of the disclosure described and shown in the specification and the drawings are merely specific examples that have been presented to easily explain the technical contents of the disclosure and help understanding of the disclosure, and are not intended to limit the scope of the disclosure. That is, it will be apparent to those skilled in the art that other variants based on the technical idea of the disclosure may be implemented. Furthermore, the above respective embodiments may be employed in combination, as necessary. For example, a part of one embodiment of the disclosure may be combined with a part of another embodiment to operate a base station and a terminal. As an example, a part of embodiment 1 of the disclosure may be combined with a part of embodiment 2 to operate a base station and a terminal. Moreover, although the above embodiments have been described based on the FDD LTE system, other variants based on the technical idea of the embodiments may also be implemented in other systems such as TDD LTE, 5G, and NR systems.

In the drawings in which methods of the disclosure are described, the order of the description does not always correspond to the order in which steps of each method are performed, and the order relationship between the steps may be changed or the steps may be performed in parallel.

Alternatively, in the drawings in which methods of the disclosure are described, some elements may be omitted and only some elements may be included therein without departing from the essential spirit and scope of the disclosure.

Furthermore, in methods of the disclosure, some or all of the contents of each embodiment may be implemented in combination without departing from the essential spirit and scope of the disclosure.

Various embodimentsof the disclosure have been described above. The above description of the disclosure is merely for the purpose of illustration, and embodiments of the disclosure are not limited to the embodiments set forth herein. Those skilled in the art will appreciate that other particular modifications and changes may be easily made without departing from the technical idea or the essential features of the disclosure. The scope of the disclosure should be determined not by the above description but by the appended claims, and all modifications or changes derived from the meaning and scope of the claims and equivalent concepts thereof shall be construed as falling within the scope of the disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a user equipment (UE) in a communication system, the method comprising:

receiving, via a higher layer signaling, a sounding reference signal (SRS) configuration including SRS resource set configurations, wherein each of the SRS resource set configurations includes a higher layer parameter usage set as antenna switching;

receiving downlink control information (DCI) for SRS triggering; and transmitting an SRS based on the SRS configuration after receiving the DCI, wherein in case that none of SRS resource sets corresponding to the SRS resource set configurations is configured with a higher layer parameter availableSlotOffsetList, a value of a higher layer parameter slotOffset in each SRS resource set configuration is different.

2. The method of claim 1, wherein the value of the higher layer parameter slotOffset in each SRS resource set configuration is different in case that none of the SRS resource sets is configured with the higher layer parameter availableSlotOffsetList across all configured bandwidth parts (BWPs) in a component carrier.

3. The method of claim 1, wherein 1T4R for the antenna switching is supported by the UE.

4. The method of claim 3, further comprising transmitting capability information including an SRS transmission port switching pattern supported by the UE, wherein the SRS transmission port switching pattern includes the 1T4R.

5. A user equipment (UE) in a communication system, the UE comprising:

a transceiver; and a processor coupled with the transceiver and configured to:

receive, via a higher layer signaling, a sounding reference signal (SRS) configuration including SRS resource set configurations, wherein each of the SRS resource set configurations includes a higher layer parameter usage set as antenna switching;

receive downlink control information (DCI) for SRS triggering; and transmit an SRS based on the SRS configuration after receiving the DCI, wherein in case that none of SRS resource sets corresponding to the SRS resource set configurations is configured with a higher layer parameter availableSlotOffsetList, a value of a higher layer parameter slotOffset in each SRS resource set configuration is different.

6. The UE of claim 5, wherein the value of the higher layer parameter slotOffset in each SRS resource set configuration is different in case that none of the SRS resource sets is configured with the higher layer parameter availableSlotOffsetList across all configured bandwidth parts (BWPs) in a component carrier.

7. The UE of claim 5, wherein 1T4R for the antenna switching is supported by the UE.

8. The UE of claim 7, wherein the processor is further configured to transmit capability information including an SRS transmission port switching pattern supported by the UE, and wherein the SRS transmission port switching pattern includes the 1T4R.

9. A method performed by a base station in a communication system, the method comprising:

transmitting, to a user equipment (UE) via a higher layer signaling, a sounding reference signal (SRS) configuration including SRS resource set configurations, wherein each of the SRS resource set configurations includes a higher layer parameter usage set as configured with antenna switching;

transmitting, to the UE, downlink control information (DCI) for SRS triggering; and receiving, from the UE, an SRS associated with the SRS configuration after transmitting the DCI, wherein in case that none of SRS resource sets corresponding to the SRS resource set configurations is configured with a higher layer parameter availableSlotOffsetList, a value of a higher layer parameter slotOffset in each SRS resource set configuration is different.

10. The method of claim 9, wherein the value of the higher layer parameter slotOffset in each SRS resource set configuration is different in case that none of the SRS resource sets is configured with the higher layer parameter availableSlotOffsetList across all configured bandwidth parts (BWPs) in a component carrier.

11. The method of claim 9, wherein 1T4R for the antenna switching is supported by the UE.

12. The method of claim 11, further comprising receiving capability information including an SRS transmission port switching pattern supported by the UE, wherein the SRS transmission port switching pattern includes the 1T4R.

13. A base station in a communication system, the base station comprising:

a transceiver; and a processor coupled with the transceiver and configured to:

transmit, to a user equipment (UE) via a higher layer signaling, a sounding reference signal (SRS) configuration including SRS resource set configurations, wherein each of the SRS resource set configurations includes a higher layer parameter usage set as configured with antenna switching;

transmit, to the UE, downlink control information (DCI) for SRS triggering; and receive, from the UE, an SRS associated with the SRS configuration after transmitting the DCI, wherein in case that none of SRS resource sets corresponding to the SRS resource set configurations is configured with a higher layer parameter availableSlotOffsetList, a value of a higher layer parameter slotOffset in each SRS resource set configuration is different.

14. The base station of claim 13, wherein the value of the higher layer parameter slotOffset in each SRS resource set configuration is different in case that none of the SRS resource sets is configured with the higher layer parameter availableSlotOffsetList across all configured bandwidth parts (BWPs) in a component carrier.

15. The base station of claim 13, wherein 1T4R for the antenna switching is supported by the UE.

16. The base station of claim 15, wherein the processor is further configured to receive capability information including an SRS transmission port switching pattern supported by the UE, and wherein the SRS transmission port switching pattern includes the 1T4R.

17. The method of claim 1, wherein the higher layer parameter slotOffset corresponds to a number of slots between the DCI and an SRS transmission associated with an SRS resource set configuration including the higher layer parameter slotOffset.

18. The UE of claim 5, wherein the higher layer parameter slotOffset corresponds to a number of slots between the DCI and an SRS transmission associated with an SRS resource set configuration including the higher layer parameter slotOffset.

19. The method of claim 9, wherein the higher layer parameter slotOffset corresponds to a number of slots between the DCI and an SRS reception associated with an SRS resource set configuration including the higher layer parameter slotOffset.

20. The base station of claim 13, wherein the higher layer parameter slotOffset corresponds to a number of slots between the DCI and an SRS reception associated with an SRS resource set configuration including the higher layer parameter slotOffset.

* * * * *